United States Patent
Leventis et al.

(10) Patent No.: US 12,077,639 B2
(45) Date of Patent: Sep. 3, 2024

(54) AQUEOUS POLYIMIDE PROCESSES

(71) Applicant: Aspen Aerogels, Inc., Northborough, MA (US)

(72) Inventors: Nicholas Leventis, Worcester, MA (US); Roxana Trifu, Worcester, MA (US); Redouane Begag, Hudson, MA (US); George L. Gould, Mendon, MA (US); Nicholas A. Zafiropoulos, Wayland, MA (US); Harris R. Miller, Sharon, MA (US)

(73) Assignee: Aspen Aerogels, Inc., Northborough, MA (US)

( * ) Notice: Subject to any disclaimer, the term of this patent is extended or adjusted under 35 U.S.C. 154(b) by 163 days.

(21) Appl. No.: 17/546,761

(22) Filed: Dec. 9, 2021

(65) Prior Publication Data

US 2022/0185970 A1    Jun. 16, 2022

Related U.S. Application Data

(60) Provisional application No. 63/124,451, filed on Dec. 11, 2020, provisional application No. 63/124,458, filed on Dec. 11, 2020.

(51) Int. Cl.
 *C08J 3/075* (2006.01)
 *C01B 32/05* (2017.01)
(52) U.S. Cl.
 CPC .............. *C08J 3/075* (2013.01); *C01B 32/05* (2017.08); *C08J 2379/08* (2013.01)
(58) Field of Classification Search
 CPC ........ C08J 3/075; C08J 2379/08; C01B 32/05
 See application file for complete search history.

(56) References Cited

U.S. PATENT DOCUMENTS

| 4,610,863 A | 9/1986 | Tewari et al. |
| 5,275,796 A | 1/1994 | Tillotson et al. |

(Continued)

FOREIGN PATENT DOCUMENTS

| CN | 110591142 A | 12/2019 |
| CN | 110606979 A | 12/2019 |

(Continued)

OTHER PUBLICATIONS

International Search Report and Written Opinion issued in International Patent Application No. PCT/US2021/062706 dated Apr. 7, 2022.

(Continued)

*Primary Examiner* — Robert S Jones, Jr.
*Assistant Examiner* — Jiangtian Xu
(74) *Attorney, Agent, or Firm* — WOMBLE BOND DICKINSON (US) LLP; Deborah M. Vernon; Scott R. Breining

(57) ABSTRACT

The present disclosure is directed to methods of forming polyamic acid and polyimide gels in water. The resulting polyamic acid and polyimide gels may be converted to aerogels, which may further be converted to carbon aerogels. Such carbon aerogels have the same physical properties as carbon aerogels prepared from polyimide aerogels obtained according to conventional methods, i.e., organic solvent-based. The disclosed methods are advantageous in reducing or avoiding costs associated with use and disposal of potentially toxic solvents and byproducts. Gel materials prepared according to the disclosed methods are suitable for use in environments involving electrochemical reactions, for example as an electrode material within a lithium-ion battery.

14 Claims, 73 Drawing Sheets

(56) References Cited

U.S. PATENT DOCUMENTS

| | | | |
|---|---|---|---|
| 5,395,805 | A | 3/1995 | Droege et al. |
| 5,420,168 | A | 5/1995 | Mayer et al. |
| 5,565,142 | A | 10/1996 | Deshpande et al. |
| 5,962,539 | A | 10/1999 | Perrut et al. |
| 6,315,971 | B1 | 11/2001 | Wallace et al. |
| 6,399,669 | B1 | 6/2002 | Suzuki et al. |
| 6,670,402 | B1 | 12/2003 | Lee et al. |
| 7,071,287 | B2 | 7/2006 | Rhine et al. |
| 7,074,880 | B2 | 7/2006 | Rhine et al. |
| 9,745,198 | B2 | 8/2017 | Leventis et al. |
| 2020/0269207 | A1* | 8/2020 | Zafiropoulos ......... H01M 4/583 |

FOREIGN PATENT DOCUMENTS

| | | | |
|---|---|---|---|
| EP | 3731311 | A1 | 10/2020 |
| JP | 2000154273 | * | 6/2000 |
| WO | 2018000872 | A1 | 1/2018 |

OTHER PUBLICATIONS

Chidambareswarapattar et al., "One-step room-temperature synthesis of fibrous polyimide aerogels from anhydrides and isocyanates and conversion to isomorphic carbons", Journal of Materials Chemistry, vol. 20, 2010, pp. 9666-9678.

Dimov, D. et. al., Microwave assisted processes for producing thin layer materials in the field of nanotechnology, Journal of Optoelectronics and Advanced Materials, Feb. 2007, 494-497, vol. 9, No. 2.

Ding et al., "Carbon Anode Materials for Rechargeable Alkali Metal Ion Batteries and in-situ Characterization Techniques", Frontiers in Chemistry, vol. 8, Dec. 2020, pp. 1-20.

Gou et al., "Polyimide Aerogels Cross-Linked through Amine Functionalized Polyoligomeric Silsesquioxane", ACS Applied Material & Interfaces, vol. 3, No. 2, 2011, pp. 546-552.

He et al., "Origin of lithium whisker formation and growth under stress", Nature Nanotechnology vol. 14, 2019, pp. 1042-1047.

Jin et al., "Advances in carbon materials for stable lithium metal batteries", New Carbon Materials, vol. 37, No. 1, Feb. 2022, pp. 1-24.

Kistler, S. S., "Coherent Expanded-Aerogels", Journal of Physical Chemistry, vol. 36, No. 1, 1932, pp. 52-64.

Leventis et al., "Isocyanate-Derived Organic Aerogels: Polyureas, Polyimides, Polyamides", MRS Online Proceedings Library, Article No. 1306, 2011.

Leventis et al., "Polyimide Aerogels by Ring-Opening Metathesis Polymerization (ROMP)". Chemistry of Materials, vol. 23, No. 8, pp. 2250-2261.

Liang et al., "Composite lithium electrode with mesoscale skeleton via simple mechanical deformation", Science Advances, vol. 5, No. 3, Mar. 15, 2019, 8 pages.

Liu et al. "Recent development in lithium metal anodes of liquid-state rechargeable batteries." J. Alloy Compounds., 730(2018): 135-149.

Liu et al., "Lithium Metal Anodes: A Recipe for Protection", Joule, vol. 1, No. 4, Dec. 20, 2017, pp. 649-650.

Meador et al., "Mechanically Strong, Flexible Polyimide Aerogels Cross-Linked with Aromatic Triamine", ACS Applied Materials & Interfaces, Appl. Mater, Interfaces, vol. 4, No. 2, 2012, pp. 536-544.

Meador et al., "Polyimide Aerogels with Amide Cross-Links: A Low Cost Alternative for Mechanically Strong Polymer Aerogels", ACS Applied Materials & Interfaces, vol. 7, No. 2, 2015, pp. 1240-1249.

Nguyen et al., "Development of High Temperature, Flexible Polyimide Aerogels", American Chemical Society, proceeding published 2011.

Pei et al., "Preparation and Characterization of Highly Cross-Linked Polyimide Aerogels Based on Polyimide Containing Trimethoxysilane Side Groups", vol. 30, No. 44, 2014, pp. 13375-13383.

Tong et al. "Synthesis of aromatic polyimides in DMAc containing large amount of water and the properties thereof." Polymer Bull. 42(1999): 47-53.

Wang et al., "Fundamental study on the wetting property of liquid lithium", Energy Storage Materials. 2018.

Wang et al., "Ultrafast Charging High Capacity Asphalt—Lithium Metal Batteries", American Chemical Society Nano, vol. 11, No. 11, 2017, pp. 10761-10767.

Xie et al., "Engineering stable interfaces for three-dimensional lithium metal anodes", Science Advances, vol. 4. No. 7, Jul. 27, 2018, 8 pages.

Zhang et al. "Modified secondary lithium metal batteries with the polyaniline-carbon nanotbue composite buffer layer." Chem. Commun. 51.2(2015):322-325.

Zhou, L. et. al., Preparation of polyimide films via microwaveassisted thermal imidization, RSC Adv., 2019, 7314-7320, vol. 9.

* cited by examiner

FIG. 2B

Method B (PAA ammonium salt)

1. Provide a polyamic acid (PAA)
2. Suspend the polyamic acid in water
3. Add a non-nucleophilic amine base → Aqueous solution of polyamic acid ammonium salt

FIG. 2A

Method A (PAA alkali metal salt)

1. Provide a polyamic acid (PAA)
2. Suspend the polyamic acid in water
3. Add an alkali metal hydroxide base → Aqueous solution of polyamic acid alkali metal salt Method C (PAA ammonium salt, *in situ* preparation)

Polyimide (PI) aerogel beads (droplet method)

PAA: polyamic acid
PAate: polyamic acid ammonium salt
AcOH: acetic acid

Carbon aerogels from PI aerogels

Metal- and metal oxide-doped carbon aerogels from metal polyamate salt aerogels

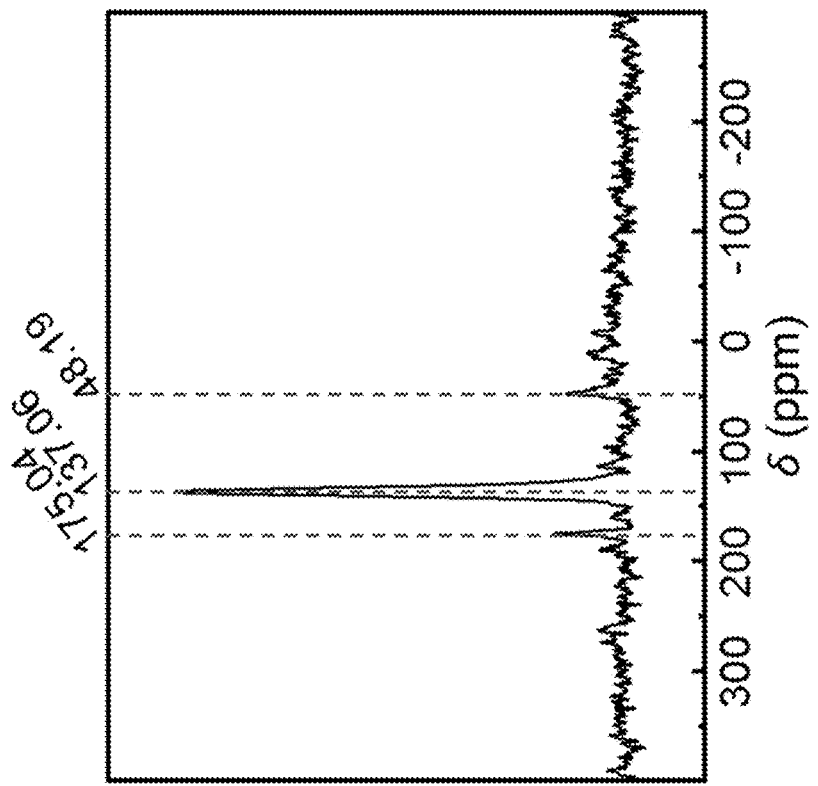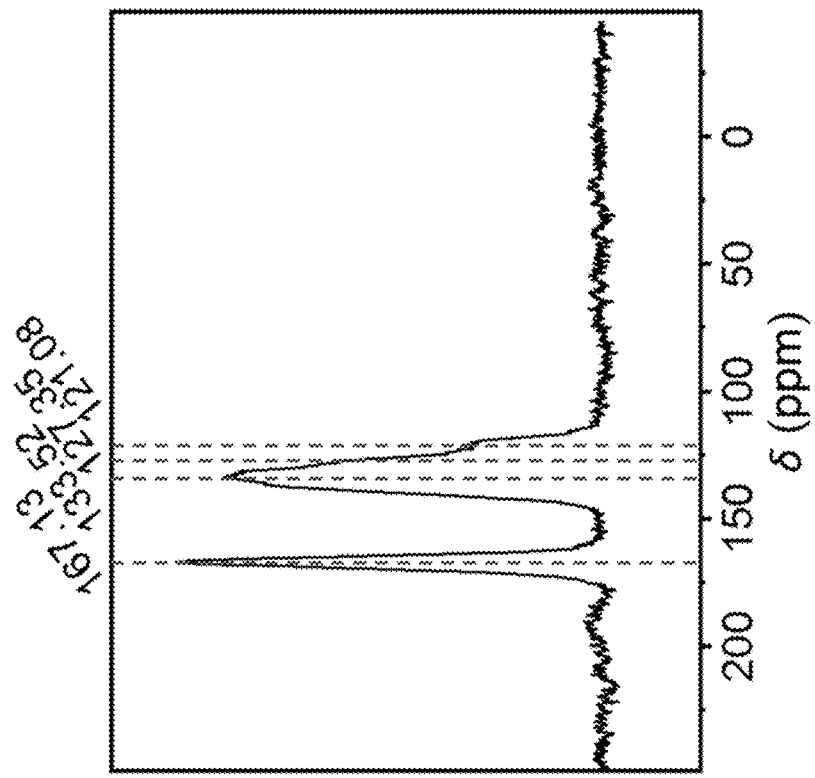

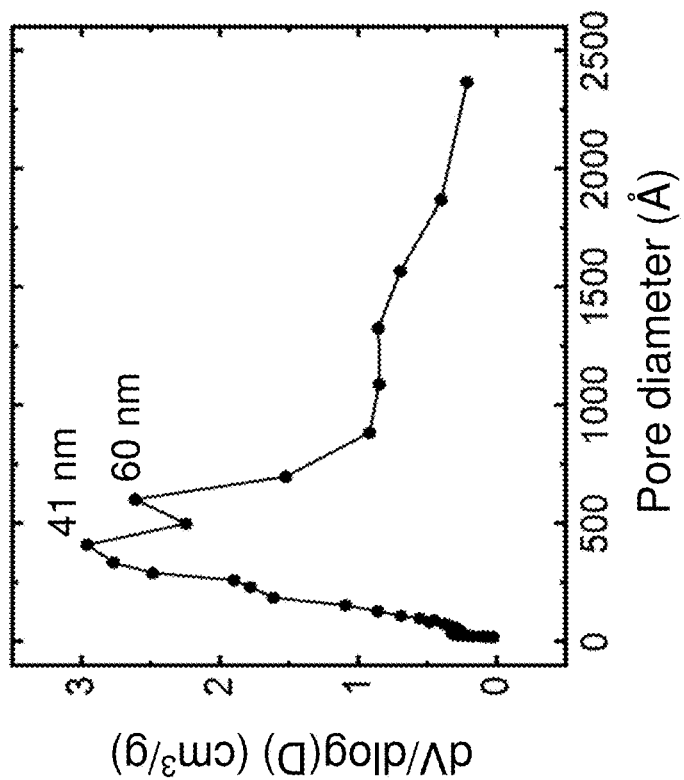

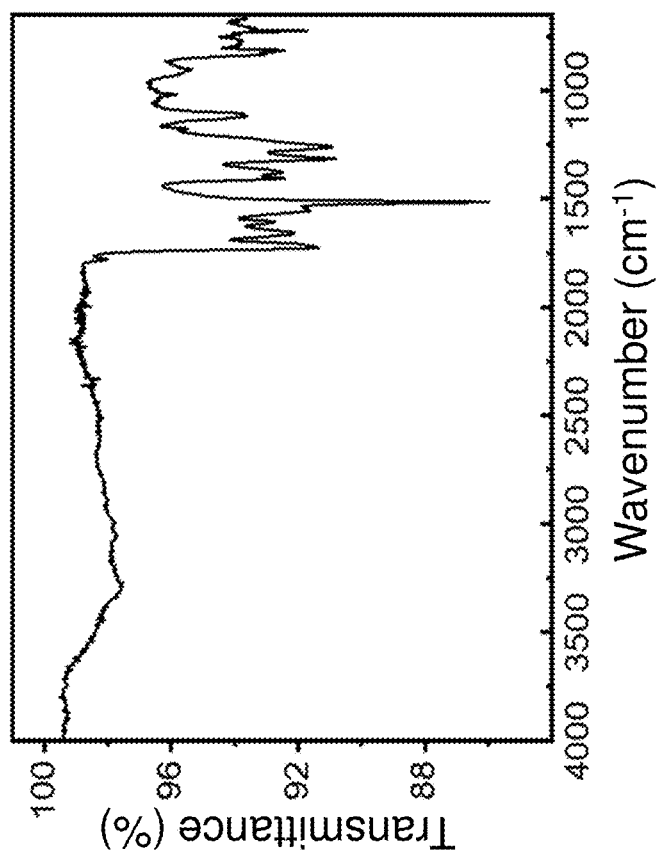
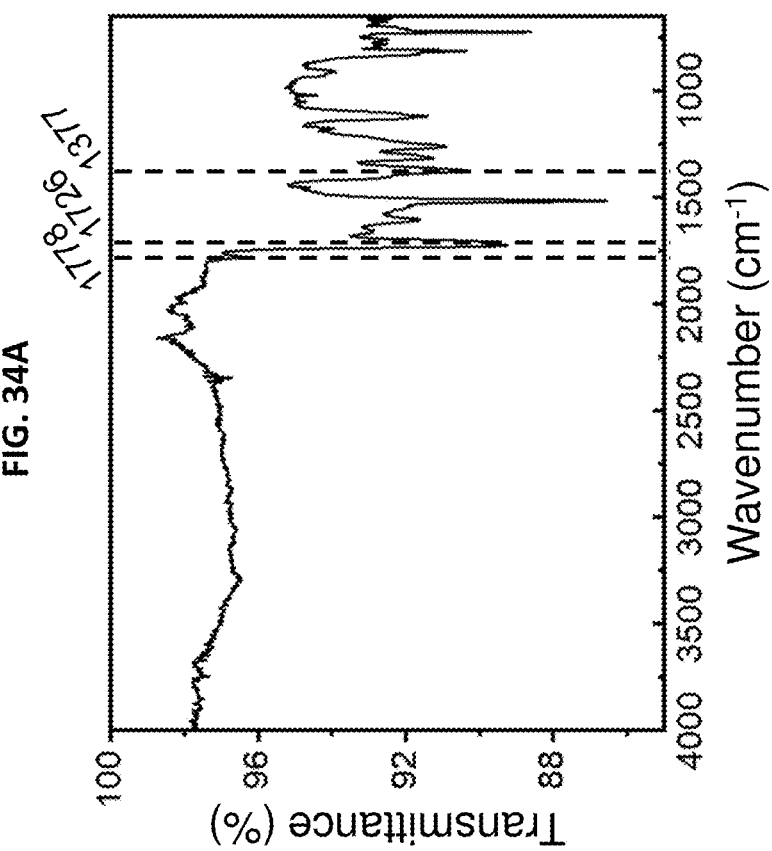

skin

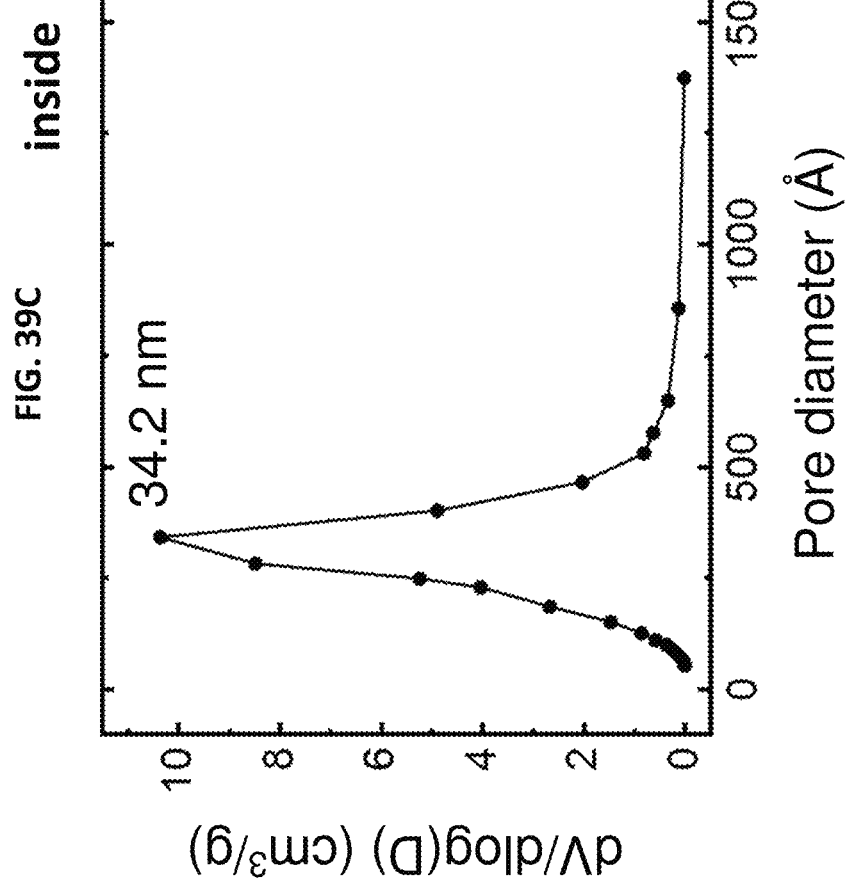

skin

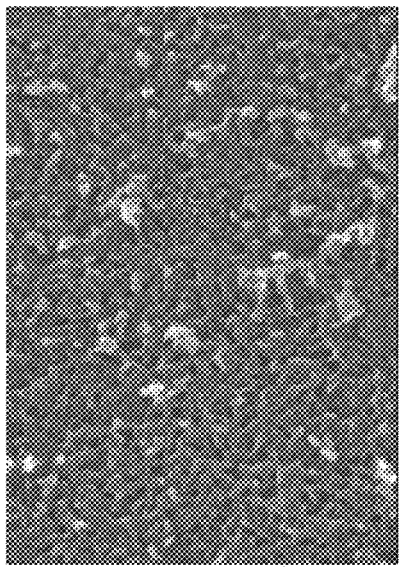
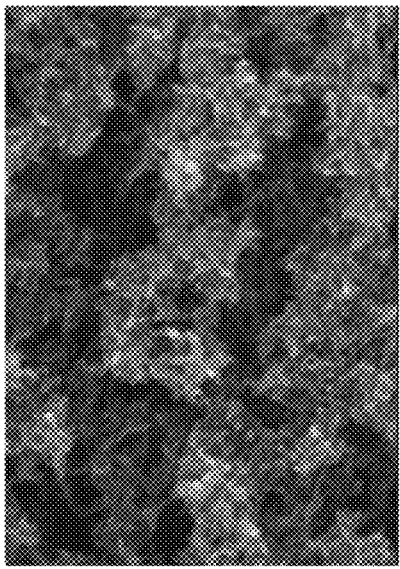
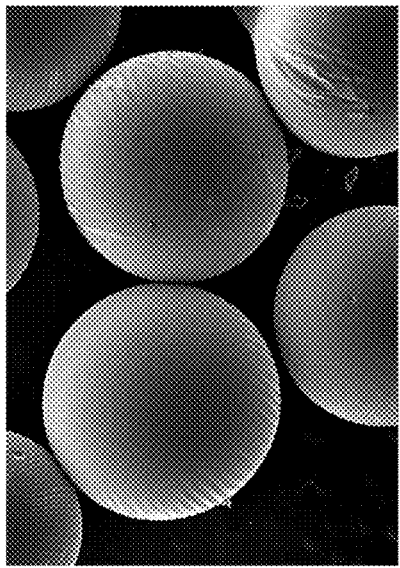
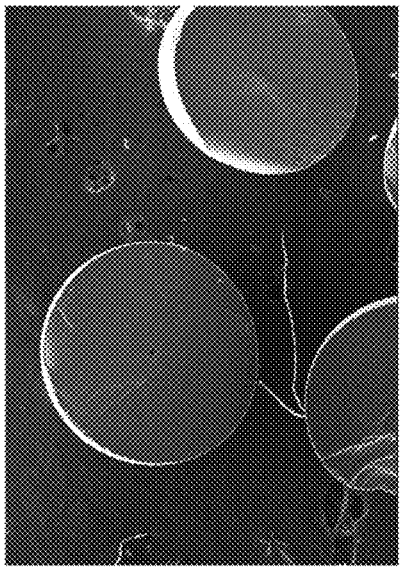

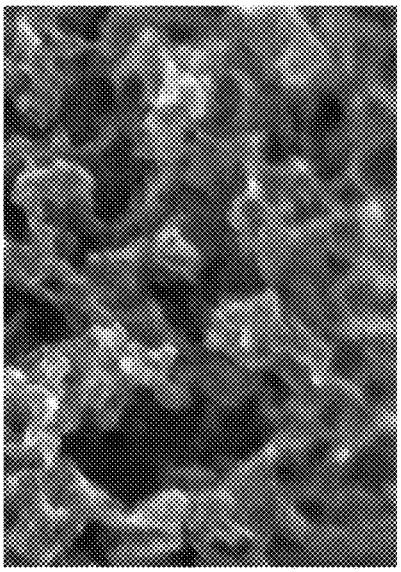
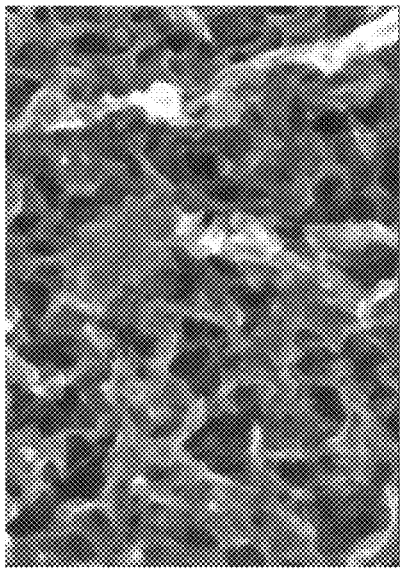
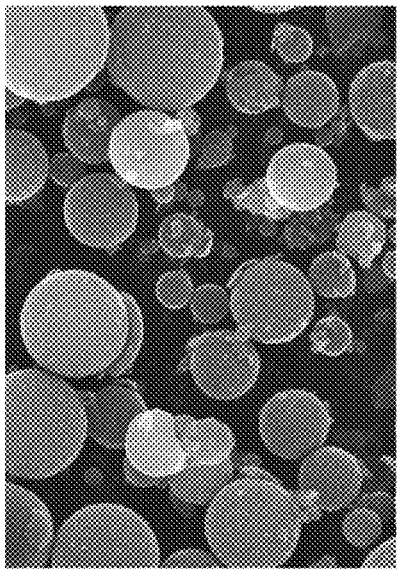
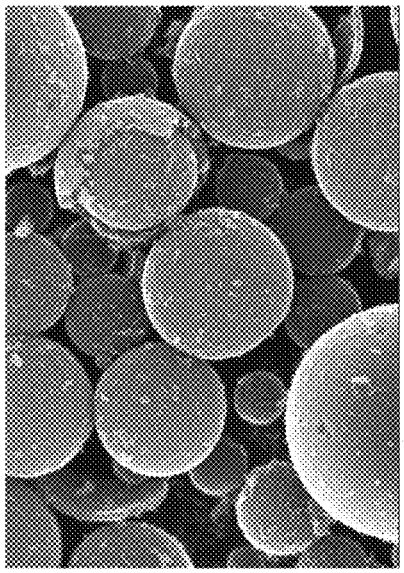

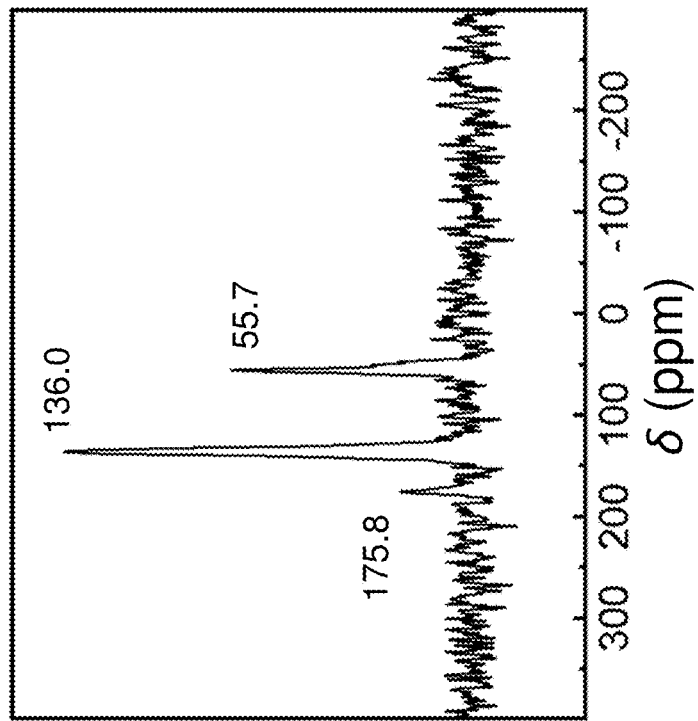
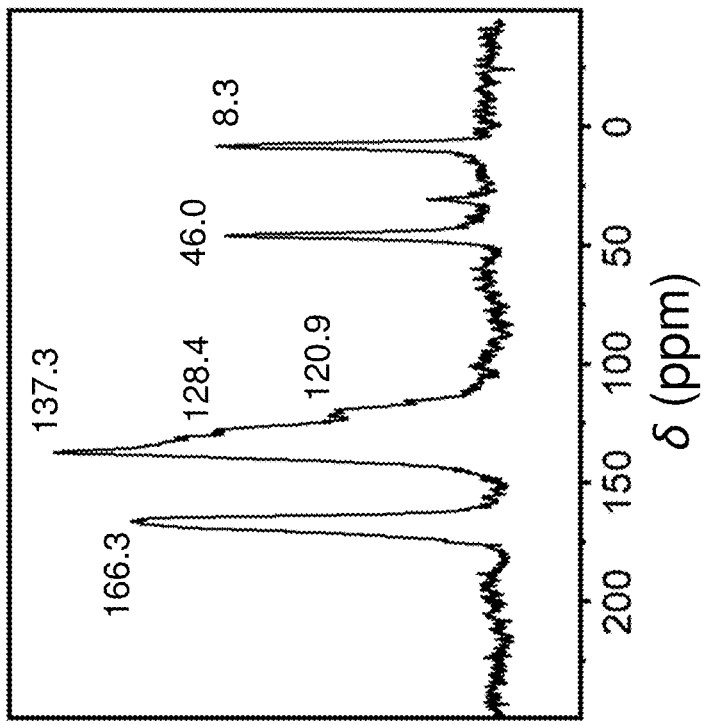

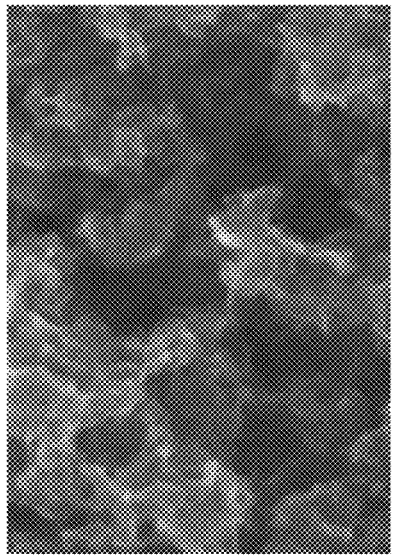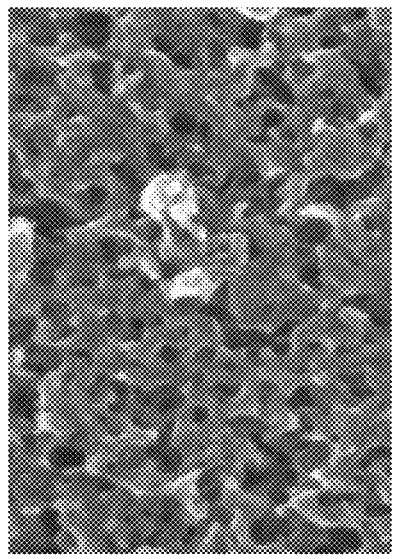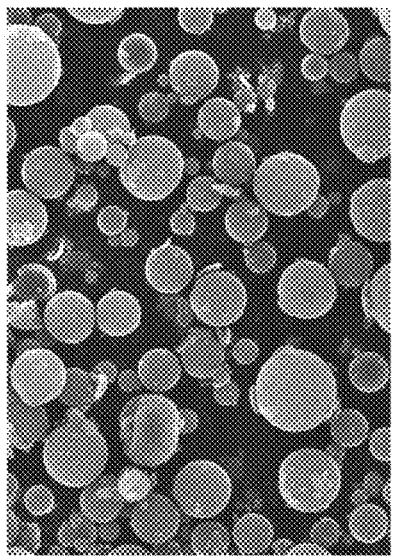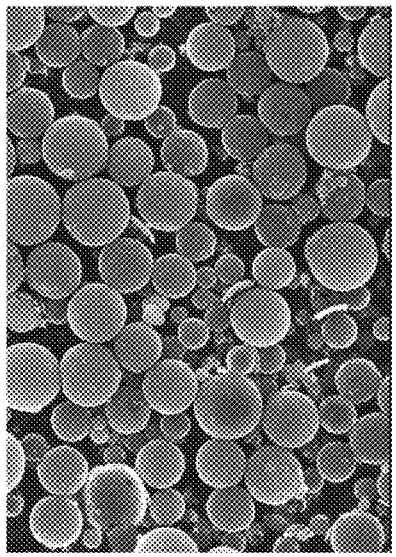

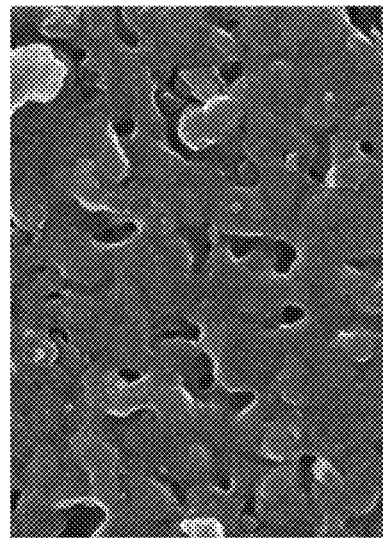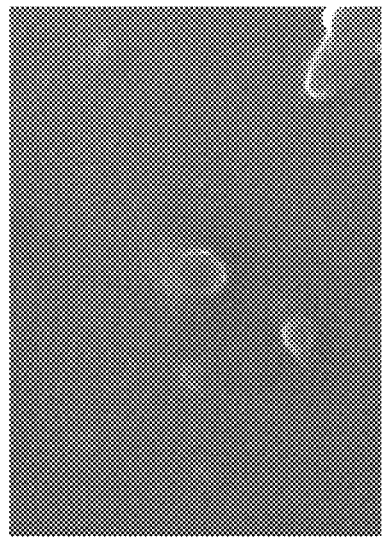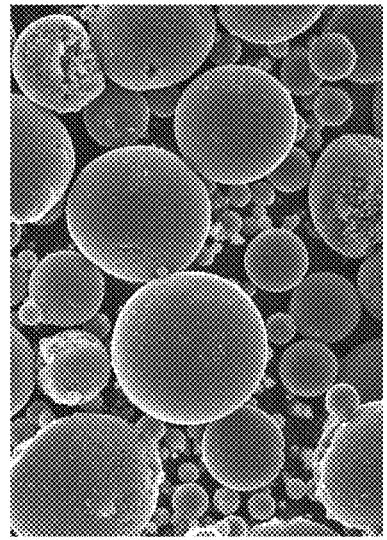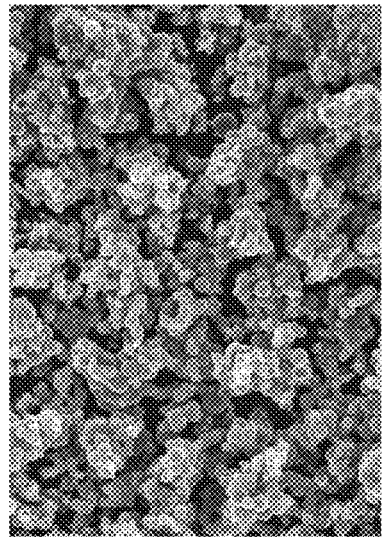

AQUEOUS POLYIMIDE PROCESSES

CROSS-REFERENCE TO RELATED APPLICATIONS

This application claims priority to U.S. Provisional Patent Application No. 63/124,451, filed Dec. 11, 2020, and to U.S. Provisional Patent Application No. 63/124,458, filed Dec. 11, 2020, each of which is herein incorporated by reference in its entirety.

TECHNICAL FIELD

The present disclosure relates generally to porous polyamic acid and polyimide gel materials and aqueous processes for making the same.

BACKGROUND

Aerogels are solid materials that include a highly porous network of micro-, meso-, and macro-sized pores. Depending on precursor materials used and processing undertaken, the pores of an aerogel can frequently account for over 90% of the volume when the density of the aerogel is about 0.05 g/cc. Aerogels are generally prepared by removing the solvent from a gel (a solid network that contains a solvent) in a manner such that minimal or no contraction of the gel can be brought by capillary forces at its pore walls. Methods of solvent removal include, but are not limited to, super-critical drying (or drying using supercritical fluids, such that the low surface tension of the supercritical fluid replaces the high surface tension gelation solvent within the gel), exchange of solvent with supercritical fluid, exchange of solvent with fluid that is subsequently transformed to the supercritical state, sub- or near-critical drying, and sublimating a frozen solvent in a freeze-drying process. See for example, PCT Patent Application Publication No. WO2016127084A1. It should be noted that when drying in ambient conditions, gel contraction may take place with solvent evaporation, and a xerogel can form. Therefore, aerogel preparation through a sol-gel process or other polymerization processes typically proceeds in the following series of steps: dissolution of the solute in a solvent, addition of a catalyst or reagent that induces or promotes reaction of the solute, formation of a reaction mixture, formation of the gel (may involve additional heating or cooling), and solvent removal by a supercritical drying technique or any other method that removes solvent from the gel without causing contraction or pore collapse.

Aerogels can be formed of inorganic materials, organic materials, or mixtures thereof. When formed of organic materials such as, for example, phenols, resorcinol-formaldehyde (RF), phloroglucinol-furfuraldehyde (PF), polyacrylonitrile (PAN), polyimide (PI), polyurethane (PU), polyurea (PUA), polyamine (PA), polybutadiene, polydicyclopentadiene, and precursors or polymeric derivatives thereof, the organic aerogel may be carbonized (e.g., by pyrolysis) to form carbon aerogels, which can have properties (e.g., pore volume, pore size distribution, morphology, etc.) that differ from or overlap with each other, depending on the precursor materials and methodologies used.

Recently, there has been effort devoted to the development and characterization of carbon aerogels as electrode materials with improved performance for applications in energy storage devices, such as lithium-ion batteries (LIBs). Consequently, there is a demand for the corresponding organic aerogels. Such organic aerogels are generally prepared in an organic solvent. For example, polyimide aerogels are generally prepared by allowing a diamine and a tetracarboxylic dianhydride to react in an organic solvent, followed by dehydrating the resulting polymeric amido acid ("'polyamic acid'") to form a polyimide gel. For economic, safety, and environmental reasons, it would be desirable to carry out such gelation using a "'green'" chemical process (i.e., using alternatives to the traditional organic solvents).

SUMMARY

The present technology is generally directed to methods of forming polyimide gels while minimizing or eliminating the use of harmful organic solvents. The methods generally comprise providing or forming a polyamic acid and subsequently imidizing the polyamic acid, where both the forming and imidizing are performed in water. In some embodiments, the imidizing is performed chemically, e.g., in the presence of a dehydrating agent. Surprisingly, according to the present disclosure, it was found that polyimide gels could be prepared in water. Particularly surprising was the finding that not only did the reaction sequence proceed in water, and without the intuitively expected destruction of the dehydrating reagent (e.g., an acid anhydride such as acetic anhydride), but also the gelation was very fast. In other embodiments, the imidizing is performed thermally, such as by utilizing microwave heating for rapid thermal dehydration of polyamic acids. Surprisingly, according to the present disclosure, it was found that the thermal dehydration occurred rapidly under aqueous conditions. The method is advantageous in providing rapid gelation, making the method amenable to configuration in a continuous process, for example, for preparing polyimide beads, and is environmentally friendly in the use of water-based solutions throughout. The method is less costly to carry out than conventional polyimide gelation methods, as byproducts from the reaction sequence are of low toxicity and less expensive to dispose of, and the use of costly and potentially toxic organic solvents is also avoided. The disclosed methods may be utilized to form polyimide monoliths, micron-sized beads, or millimeter-sized beads. The polyimide gels may be converted to aerogels as well as carbon aerogels. When the polyimide aerogels of the disclosure were converted to carbon aerogels, the carbon aerogels possessed nanostructures with similar properties to carbonized polyimide aerogels in which the corresponding polyimide aerogels were prepared by a conventional, organic solvent-based process. The present technology is further generally directed to methods of forming polyamic acid gels and aerogels. In some embodiments, the polyamic acid gels and aerogels are converted directly to carbon gels or aerogels without intermediate conversion to polyimide gels or aerogels. Such methods are advantageous in avoiding additional transformations, reducing overall complexity, time, and costs associated with carbon aerogel production, and may further reduce costs for e.g., disposal of additional waste streams.

Accordingly, in one aspect is provided a method of forming a polyimide aerogel, the method comprising: providing an aqueous solution of a polyamic acid salt, the polyamic acid salt comprising a polyamic acid including carboxylic acid groups, wherein the carboxylic acid groups are associated with cationic species and are substantially present as carboxylate anions; imidizing the polyamic acid salt to form a polyimide gel; and drying the polyimide gel to form the polyimide aerogel.

In some embodiments, providing the aqueous solution of the polyamic acid salt comprises: providing a polyamic acid;

adding the polyamic acid to water to form an aqueous suspension of the polyamic acid; and adding a base to the aqueous suspension of the polyamic acid to form the aqueous solution of the polyamic acid salt.

In some embodiments, the base is an alkali metal hydroxide, and wherein the cationic species is an alkali metal cation. In some embodiments, the alkali metal hydroxide is lithium hydroxide, sodium hydroxide, or potassium hydroxide.

In some embodiments, the base is a non-nucleophilic amine, and wherein the cationic species is an ammonium cation. In some embodiments, the non-nucleophilic amine has a solubility of at least about 4 grams per 1 L of water at 20° C. In some embodiments, the non-nucleophilic amine is a tertiary amine. In some embodiments, the non-nucleophilic amine is selected from the group consisting of triethylamine, trimethylamine, tri-n-butylamine, N-methylpyrrolidine, N-methylpiperidine, diisopropylethylamine, and combinations thereof. In some embodiments, the non-nucleophilic amine is triethylamine or diisopropylethylamine In some embodiments, the non-nucleophilic amine is added in a quantity sufficient to maintain substantially all of the polyamic acid in solution. In some embodiments, a molar ratio of the non-nucleophilic amine to the polyamic acid is from about 2 to about 4, or from about 2.2 to about 2.5.

In some embodiments, the polyamic acid comprises a tetracarboxylic acid selected from the group consisting of benzene-1,2,4,5-tetracarboxylic acid, [1,1'-biphenyl]-3,3',4,4'-tetracarboxylic acid, 4,4'-oxydiphthalic acid, 4,4'-sulfonyldiphthalic acid, 4,4'-carbonyldiphthalic acid, 4,4'-(propane-2,2-diyl)diphthalic acid, 4,4'-(perfluoropropane-2,2-diyl)diphthalic acid, naphthalene-1,4,5,8-tetracarboxylic acid, 4-(2-(4-(3,4-dicarboxyphenoxy)phenyl)propan-2-yl)phthalic acid, perylene tetracarboxylic acid, and combinations thereof.

In some embodiments, the polyamic acid comprises a C2-C6 alkylene diamine, wherein one or more of the carbon atoms of the C2-C6 alkylene is optionally substituted with one or more alkyl groups. In some embodiments, the C2-C6 alkylene diamine is selected from the group consisting of ethylenediamine, 1,3-diaminopropane, 1,4-diaminobutane, 1,5-diaminopentane, 1,6-diaminohexane, or a combination thereof. In some embodiments, the polyamic acid comprises 1,3-phenylenediamine, 1,4-phenylenediamine, 4,4'-methylenedianiline, 4,4'-diaminodiphenyl ether, or a combination thereof. In some embodiments, the polyamic acid comprises a diamine selected from the group consisting of 1,4-phenylenediamine, 4,4'-methylenedianiline, 4,4'-diaminodiphenyl ether, and combinations thereof.

In some embodiments, a range of concentration of the polyamic acid salt in the solution is from about 0.01 to about 0.3 $g/cm^3$, based on the weight of the polyamic acid.

In some embodiments, the polyimide gel is in monolithic form, and imidizing the polyamic acid salt comprises adding a dehydrating agent to the aqueous solution of the polyamic acid salt to form a gelation mixture, the method further comprising pouring the gelation mixture into a mold and allowing the gelation mixture to gel.

In some embodiments, the polyimide gel is in monolithic form, and imidizing the polyamic acid salt is performed thermally, the method further comprising: adding delta-gluconolactone to the aqueous solution of the polyamic acid salt to form a gelation mixture; pouring the gelation mixture into a mold and allowing the gelation mixture to gel; washing the resulting polyamic acid gel with water; and thermally imidizing the polyamic acid gel to form the polyimide gel, wherein thermally imidizing comprises exposing the polyamic acid gel to microwave frequency irradiation.

In some embodiments, the polyimide gel is in bead form, and imidizing the polyamic acid salt comprises adding a dehydrating agent to the aqueous solution of the polyamic acid salt to form a gelation mixture; the method further comprising adding the gelation mixture to a solution of a water-soluble acid in water to form the polyimide gel beads, wherein adding comprises dripping the gelation mixture into the solution of the water soluble acid in water, spraying the gelation mixture under pressure through one or more nozzles into the solution of the water-soluble acid in water using pressure; or electrospraying the gelation mixture into the solution of the water soluble acid in water.

In some embodiments, the dehydrating agent is acetic anhydride.

In some embodiments, the water-soluble acid is a mineral acid or is acetic acid.

In some embodiments, the polyimide gel is in bead form, and imidizing the polyamic acid salt comprises adding a dehydrating agent to the aqueous solution of the polyamic acid salt to form a gelation mixture, the method further comprising adding the gelation mixture to a water-immiscible solvent, optionally comprising an acid, wherein adding comprises dripping the gelation mixture into the water-immiscible solvent, spraying the gelation mixture under pressure through one or more nozzles into the water-immiscible solvent using pressure; or electrospraying the gelation mixture into the water-immiscible solvent.

In some embodiments, the dehydrating agent is acetic anhydride.

In some embodiments, the optional acid is acetic acid.

In some embodiments, the method comprises electrospraying the gelation mixture through one or more needles at a voltage in a range from about 5 to about 60 kV.

In some embodiments, the polyimide gel is in bead form, and imidizing the polyamic acid salt comprises adding a dehydrating agent to the aqueous solution of the polyamic acid salt to form a gelation mixture, the method further comprising combining the aqueous solution of the polyamic acid salt with a water-immiscible solvent comprising a surfactant; and mixing the resulting mixture under high-shear conditions.

In some embodiments, the polyimide gel is in bead form, and imidizing the polyamic acid salt comprises chemical imidization, the method comprising: combining the aqueous solution of the polyamic acid salt with a water-immiscible solvent comprising a surfactant; mixing the resulting mixture under high-shear conditions to form a quasi-stable emulsion; and adding a dehydrating agent to the quasi-stable emulsion.

In some embodiments, the water-immiscible organic solvent is a C5-C12 hydrocarbon. In some embodiments, the C5-C12 hydrocarbon is mineral spirits.

In some embodiments, providing an aqueous solution of a polyamic acid salt comprises: dissolving a water-soluble diamine in water to form an aqueous diamine solution; adding a non-nucleophilic amine to the aqueous diamine solution; adding a tetracarboxylic acid dianhydride to the aqueous diamine solution; and stirring the resulting solution for a period of time in a range from about 1 hour to about 24 hours at a temperature in a range from about 15 to about 60° C.

In some embodiments, providing an aqueous solution of a polyamic acid salt comprises: dissolving a water-soluble diamine in water to form an aqueous diamine solution;

adding a tetracarboxylic acid dianhydride to the aqueous diamine solution; stirring the resulting suspension for a period of time in a range from about 1 hour to about 24 hours at a temperature in a range from about 15 to about 60° C.; adding a non-nucleophilic amine to the aqueous diamine solution; and stirring the resulting suspension for a period of time in a range from about 1 hour to about 24 hours at a temperature in a range from about 15 to about 60° C.

In some embodiments, providing an aqueous solution of a polyamic acid salt comprises: adding to water, simultaneously or in rapid succession, a water-soluble diamine, a tetracarboxylic acid dianhydride, and a non-nucleophilic amine; and stirring the resulting mixture for a period of time in a range from about 1 hour to about 24 hours at a temperature in a range from about 15 to about 60° C.

In some embodiments, the water-soluble diamine, tetracarboxylic acid dianhydride, and non-nucleophilic amine are added to water simultaneously. In some embodiments, the water-soluble diamine, tetracarboxylic acid dianhydride, and non-nucleophilic amine are added to water in rapid succession.

In some embodiments, the resulting mixture is stirred at a temperature in a range from about 15 to about 25° C. In some embodiments, the resulting mixture is stirred at a temperature in a range from about 50 to about 60° C.

In some embodiments, the non-nucleophilic amine has a solubility of at least about 4 grams per 1 L of water at 20° C.

In some embodiments, the non-nucleophilic amine is a tertiary amine. In some embodiments, the non-nucleophilic amine is selected from the group consisting of triethylamine, trimethylamine, tri-n-butylamine, N-methylpyrrolidine, N-methylpiperidine, diisopropylethylamine, and combinations thereof. In some embodiments, the non-nucleophilic amine is triethylamine or diisopropylethylamine.

In some embodiments, a molar ratio of the non-nucleophilic amine to the diamine is from about 2 to about 2.5.

In some embodiments, the tetracarboxylic acid dianhydride is selected from the group consisting of pyromellitic anhydride (PMDA, biphthalic dianhydride (BPDA), oxydiphthalic dianhydride (ODPA), perylene tetracarboxylic dianhydride, and combinations thereof.

In some embodiments, the diamine is a C2-C6 alkylene diamine, wherein one or more carbon atoms of the C2-C6 alkylene are optionally substituted with one or more alkyl groups. In some embodiments, the C2-C6 alkylene diamine is selected from the group consisting of ethylenediamine, 1,3-diaminopropane, 1,4-diaminobutane, 1,5-diaminopentane, 1,6-diaminohexane, and combination thereof. In some embodiments, the diamine is 1,3-phenylenediamine, 1,4-phenylenediamine, or a combination thereof. In some embodiments, the diamine is 1,4-phenylenediamine.

In some embodiments, a molar ratio of the tetracarboxylic acid dianhydride to the diamine is from about 0.9 to about 1.1.

In another aspect is provided a method of forming a polyamic acid aerogel, the method comprising: providing an aqueous solution of a polyamic acid salt; acidifying the polyamic acid salt solution to form a polyamic acid gel; and drying the polyamic acid gel to form the polyamic acid aerogel.

In some embodiments, the polyamic acid gel is in monolithic form, and wherein acidifying the polyamic acid salt comprises adding delta-gluconolactone to the aqueous solution of the polyamic acid salt to form a gelation mixture and pouring the gelation mixture into a mold and allowing the gelation mixture to gel.

In some embodiments, the polyamic acid gel is in bead form, and acidifying the polyamic acid salt comprises adding the aqueous solution of polyamic acid salt to a solution of a water-soluble acid in water to form the polyamic acid gel beads, wherein adding comprises dripping the aqueous solution of polyamic acid salt into the solution of the water-soluble acid in water, spraying the aqueous solution of polyamic acid salt under pressure through one or more nozzles into the solution of the water-soluble acid in water using pressure; or electrospraying the aqueous solution of polyamic acid salt into the solution of the water-soluble acid in water.

In some embodiments, the water-soluble acid is a mineral acid or is acetic acid.

In some embodiments, the method comprises electrospraying the aqueous solution of polyamic acid salt through one or more needles at a voltage in a range from about 5 to about 60 kV.

In some embodiments, the polyamic acid gel is in microbead form, the method further comprising: combining the aqueous solution of polyamic acid salt with a water-immiscible solvent comprising a surfactant; mixing the resulting mixture under high-shear conditions to form an emulsion; and adding an organic acid to the emulsion.

In some embodiments, the water-immiscible organic solvent is a C5-C12 hydrocarbon. In some embodiments, the water-immiscible organic solvent is mineral spirits.

In some embodiments, the organic acid is acetic acid.

In some embodiments, providing the aqueous solution of the polyamic acid salt comprises: providing a polyamic acid in substantially pure form; adding the polyamic acid to water to form an aqueous suspension of the polyamic acid; adding a base to the aqueous suspension of the polyamic acid to form the aqueous solution of the polyamic acid salt.

In some embodiments, the base is a non-nucleophilic amine.

In some embodiments, the non-nucleophilic amine has a solubility of at least about 4 grams per 1 L of water at 20° C.

In some embodiments, the non-nucleophilic amine is a tertiary amine. In some embodiments, the non-nucleophilic amine is selected from the group consisting of triethylamine, trimethylamine, tri-n-butylamine, N-methylpyrrolidine, N-methylpiperidine, diisopropylethylamine, and combinations thereof. In some embodiments, the non-nucleophilic amine is triethylamine or diisopropylethylamine.

In some embodiments, the non-nucleophilic amine is added in a quantity sufficient to maintain substantially all of the polyamic acid in solution.

In some embodiments, a molar ratio of the non-nucleophilic amine to the polyamic acid is from about 2 to about 4, or from about 2.2 to about 2.5.

In some embodiments, the polyamic acid comprises a tetracarboxylic acid selected from the group consisting of benzene-1,2,4,5-tetracarboxylic acid, [1,1'-biphenyl]-3,3',4,4'-tetracarboxylic acid, 4,4'-oxydiphthalic acid, 4,4'-sulfonyldiphthalic acid, 4,4'-carbonyldiphthalic acid, 4,4'-(propane-2,2-diyl)diphthalic acid, 4,4'-(perfluoropropane-2,2-diyl)diphthalic acid, naphthalene-1,4,5,8-tetracarboxylic acid, 4-(2-(4-(3,4-dicarboxyphenoxy)phenyl)propan-2-yl)phthalic acid, perylene tetracarboxylic acid, and combinations thereof.

In some embodiments, the polyamic acid comprises a C2-C6 alkylene diamine, wherein optionally, one or more of the carbon atoms of the C2-C6 alkylene are substituted with one or more alkyl groups. In some embodiments, the C2-C6 alkylene diamine is selected from the group consisting of ethylenediamine, 1,3-diaminopropane, 1,4-diaminobutane, 1,5-diaminopentane, 1,6-diaminohexane, and combinations thereof.

In some embodiments, the polyamic acid comprises 1,3-phenylenediamine, 1,4-phenylenediamine, 4,4'-methylenedianiline, 4,4'-diaminodiphenyl ether, or a combination thereof. In some embodiments, the polyamic acid comprises a diamine selected from the group consisting of 1,4-phenylenediamine, 4,4'-methylenedianiline, 4,4'-diaminodiphenyl ether, and combinations thereof.

In some embodiments, a range of concentration of the polyamic acid salt in the solution is from about 0.01 to about 0.3 g/cm$^3$, based on the weight of the polyamic acid.

In some embodiments, providing an aqueous solution of a polyamic acid salt comprises: dissolving a water-soluble diamine in water to form an aqueous diamine solution; adding a non-nucleophilic amine to the aqueous diamine solution; adding a tetracarboxylic acid dianhydride to the aqueous diamine solution; and stirring the resulting mixture for a period of time in a range from about 1 hour to about 24 hours at a temperature in a range from about 15 to about 60° C.

In some embodiments, the resulting mixture is stirred at a temperature in a range from about 15 to about 25° C. In some embodiments, the resulting mixture is stirred at a temperature in a range from about 50 to about 60° C.

In some embodiments, providing an aqueous solution of a polyamic acid salt comprises: dissolving a water-soluble diamine in water to form an aqueous diamine solution; adding a tetracarboxylic acid dianhydride to the aqueous diamine solution; stirring the resulting mixture for a period of time in a range from about 1 hour to about 24 hours at a temperature in a range from about 15 to about 60° C.; adding a non-nucleophilic amine to the mixture; and stirring the resulting mixture for a period of time in a range from about 1 hour to about 24 hours at a temperature in a range from about 15 to about 60° C.

In some embodiments, the resulting mixture is stirred at a temperature in a range from about 15 to about 25° C. In some embodiments, the resulting mixture is stirred at a temperature in a range from about 50 to about 60° C.

In some embodiments, providing an aqueous solution of a polyamic acid salt comprises: adding to water, simultaneously or in rapid succession, a water-soluble diamine, a tetracarboxylic acid dianhydride, and a non-nucleophilic amine; and stirring the resulting mixture for a period of time in a range from about 1 hour to about 24 hours at a temperature in a range from about 15 to about 60° C.

In some embodiments, the resulting mixture is stirred at a temperature in a range from about 15 to about 25° C. In some embodiments, the resulting mixture is stirred at a temperature in a range from about 50 to about 60° C.

In some embodiments, the water-soluble diamine, the tetracarboxylic acid dianhydride, and the non-nucleophilic amine are added to the water simultaneously. In some embodiments, the water-soluble diamine, the tetracarboxylic acid dianhydride, and the non-nucleophilic amine are added to the water in rapid succession.

In some embodiments, the non-nucleophilic amine has a solubility of at least about 4 grams per 1 L of water at 20° C.

In some embodiments, the non-nucleophilic amine is a tertiary amine. In some embodiments, the non-nucleophilic amine is selected from the group consisting of triethylamine, trimethylamine, tri-n-butylamine, N-methylpyrrolidine, N-methylpiperidine, and diisopropylethylamine. In some embodiments, the non-nucleophilic amine is triethylamine or diisopropylethylamine In some embodiments, a molar ratio of the non-nucleophilic amine to the diamine is from about 2 to about 2.5.

In some embodiments, the tetracarboxylic acid dianhydride is selected from the group consisting of pyromellitic anhydride (PMDA, biphthalic dianhydride (BPDA), oxydiphthalic dianhydride (ODPA), perylene tetracarboxylic dianhydride, and combinations thereof.

In some embodiments, the diamine is a C2-C6 alkylene diamine, and wherein one or more carbon atoms of the C2-C6 alkylene are optionally substituted with one or more alkyl groups. In some embodiments, the C2-C6 alkylene diamine is selected from the group consisting of ethylenediamine, 1,3-diaminopropane, 1,4-diaminobutane, 1,5-diaminopentane, 1,6-diaminohexane, and combination thereof.

In some embodiments, the diamine is 1,4-phenylenediamine.

In some embodiments, a molar ratio of the tetracarboxylic acid dianhydride to the diamine is from about 0.9 to about 1.1.

In another aspect is provided a method of forming a polyimide aerogel in monolithic form, the method comprising:

providing an aqueous solution of a polyamic acid salt, the polyamic acid salt comprising a polyamic acid including carboxylic acid groups, wherein the carboxylic acid groups are associated with cationic species and are substantially present as carboxylate anions, and wherein providing the aqueous solution of the polyamic acid salt comprises: providing a polyamic acid, adding the polyamic acid to water to form an aqueous suspension of the polyamic acid, and adding a base to the aqueous suspension of the polyamic acid to form the aqueous solution of the polyamic acid salt, wherein the base is a non-nucleophilic amine, and wherein the cationic species is an ammonium cation;

adding delta-gluconolactone to the aqueous solution of the polyamic acid salt to form a gelation mixture;

pouring the gelation mixture into a mold and allowing the gelation mixture to gel;

washing the resulting polyamic acid gel with water;

thermally imidizing the polyamic acid gel to form the polyimide gel, the thermally imidizing comprising exposing the polyamic acid gel to microwave frequency irradiation; and drying the polyimide gel to form the polyimide aerogel in monolithic form.

In another aspect is provided a method of forming a polyimide aerogel in bead form, the method comprising:

providing an aqueous solution of a polyamic acid salt, the polyamic acid salt comprising a polyamic acid including carboxylic acid groups, wherein the carboxylic acid groups are associated with cationic species and are substantially present as carboxylate anions, and wherein providing the aqueous solution of the polyamic acid salt comprises: providing a polyamic acid, adding the polyamic acid to water to form an aqueous suspension of the polyamic acid, and adding a base to the aqueous suspension of the polyamic acid to form the aqueous solution of the polyamic acid salt, wherein the base is a non-nucleophilic amine, and wherein the cationic species is an ammonium cation;

adding a dehydrating agent to the aqueous solution of the polyamic acid salt to form a gelation mixture;

adding the gelation mixture to a solution of a water-soluble acid in water to form polyimide gel beads, wherein adding comprises dripping the gelation mixture into the solution of the water-soluble acid in water, spraying the gelation mixture under pressure through one or more nozzles into the solution of the water-soluble acid in water using pressure, or electrospraying the gelation mixture into the solution of the water soluble acid in water; and drying the polyimide gel beads to form the polyimide aerogel in bead form.

In some embodiments, the dehydrating agent is acetic anhydride.

In some embodiments, the water-soluble acid is a mineral acid or is acetic acid.

In another aspect is provided a method of forming a polyimide aerogel in bead form, the method comprising:

providing an aqueous solution of a polyamic acid salt, the polyamic acid salt comprising a polyamic acid including carboxylic acid groups, wherein the carboxylic acid groups are associated with cationic species and are substantially present as carboxylate anions, and wherein providing the aqueous solution of the polyamic acid salt comprises: providing a polyamic acid, adding the polyamic acid to water to form an aqueous suspension of the polyamic acid, and adding a base to the aqueous suspension of the polyamic acid to form the aqueous solution of the polyamic acid salt, wherein the base is a non-nucleophilic amine, and wherein the cationic species is an ammonium cation;

adding a dehydrating agent to the aqueous solution of the polyamic acid salt to form a gelation mixture;

adding the gelation mixture to a solution of a water-soluble acid in water to form polyimide gel beads, wherein adding comprises adding the gelation mixture to a water-immiscible solvent, optionally comprising an acid, wherein adding comprises dripping the gelation mixture into the water-immiscible solvent, spraying the gelation mixture under pressure through one or more nozzles into the water-immiscible solvent using pressure; or electrospraying the gelation mixture into the water-immiscible solvent; and drying the polyimide gel beads to form the polyimide aerogel in bead form.

In some embodiments, the dehydrating agent is acetic anhydride.

In some embodiments, the optional acid is acetic acid.

In some embodiments, the method comprises electrospraying the gelation mixture through one or more needles at a voltage in a range from about 5 to about 60 kV.

In another aspect is provided a method of forming a polyimide aerogel in bead form, the method comprising:

providing an aqueous solution of a polyamic acid salt, the polyamic acid salt comprising a polyamic acid including carboxylic acid groups, wherein the carboxylic acid groups are associated with cationic species and are substantially present as carboxylate anions, and wherein providing the aqueous solution of the polyamic acid salt comprises: providing a polyamic acid, adding the polyamic acid to water to form an aqueous suspension of the polyamic acid, and adding a base to the aqueous suspension of the polyamic acid to form the aqueous solution of the polyamic acid salt, wherein the base is a non-nucleophilic amine, and wherein the cationic species is an ammonium cation;

adding a dehydrating agent to the aqueous solution of the polyamic acid salt to form a gelation mixture;

combining the gelation mixture with a water-immiscible solvent comprising a surfactant;

mixing the resulting mixture under high-shear conditions; and drying the polyimide gel beads to form the polyimide aerogel in bead form.

In some embodiments, the dehydrating agent is acetic anhydride.

In some embodiments, the water-immiscible organic solvent is a C5-C12 hydrocarbon. In some embodiments, the C5-C12 hydrocarbon is mineral spirits.

In another aspect is provided a method of forming a polyimide aerogel in bead form, the method comprising:

providing an aqueous solution of a polyamic acid salt, the polyamic acid salt comprising a polyamic acid including carboxylic acid groups, wherein the carboxylic acid groups are associated with cationic species and are substantially present as carboxylate anions, and wherein providing the aqueous solution of the polyamic acid salt comprises: providing a polyamic acid, adding the polyamic acid to water to form an aqueous suspension of the polyamic acid, and adding a base to the aqueous suspension of the polyamic acid to form the aqueous solution of the polyamic acid salt, wherein the base is a non-nucleophilic amine, and wherein the cationic species is an ammonium cation;

combining the aqueous solution of the polyamic acid salt with a water-immiscible solvent comprising a surfactant;

mixing the resulting mixture under high-shear conditions to form a quasi-stable emulsion;

adding a dehydrating agent to the quasi-stable emulsion; and drying the polyimide gel beads to form the polyimide aerogel in bead form.

In some embodiments, the dehydrating agent is acetic anhydride.

In some embodiments, the water-immiscible organic solvent is a C5-C12 hydrocarbon. In some embodiments, the C5-C12 hydrocarbon is mineral spirits.

In another aspect is provided a method of forming a polyamic acid metal salt aerogel in the form of beads, the method comprising: providing an aqueous solution of an ammonium or alkali metal salt of a polyamic acid; performing a metal ion exchange comprising adding the solution of the polyamic acid salt to a solution comprising a soluble metal salt to form polyamate metal salt gel beads; and drying the polyamic acid metal salt gel beads to form the polyamic acid metal salt aerogel beads.

In some embodiments, the soluble metal salt comprises a main group transition metal, a rare earth metal, an alkaline earth metal, or a combination thereof. In some embodiments, the soluble metal salt comprises copper, iron, nickel, silver, calcium, magnesium, or a combination thereof. In some embodiments, the soluble metal salt comprises lanthanum, cerium, praseodymium, neodymium, promethium, samarium, europium, gadolinium, terbium, dysprosium, holmium, erbium, thulium, ytterbium, lutetium, or a combination thereof.

In some embodiments, adding the polyamic acid salt solution to a solution comprising a soluble metal salt comprises dripping the aqueous solution of polyamic acid salt into the solution of the soluble metal salt, spraying the aqueous solution of polyamic acid salt under pressure through one or more nozzles into the solution of the soluble metal salt, or electrospraying the aqueous solution of polyamic acid salt into the solution of the soluble metal salt.

In some embodiments, the method comprises electrospraying the polyamic acid salt solution through one or more needles at a voltage in a range from about 5 to about 60 kV.

In some embodiments, drying a polyimide gel comprises: optionally, washing or solvent exchanging the polyimide gel; and subjecting the optionally washed or solvent exchanged polyimide gel to elevated temperature conditions, lyophilizing the optionally washed or solvent exchanged polyimide gel, or contacting the optionally washed or solvent exchanged polyimide gel with supercritical fluid carbon dioxide.

In some embodiments, the washing or solvent exchanging is performed with water, a C1 to C3 alcohol, acetone, acetonitrile, ether, tetrahydrofuran, toluene, liquid carbon dioxide, or a combination thereof.

In some embodiments, the method further comprises converting a polyimide aerogel to an isomorphic carbon aerogel, the converting comprising pyrolyzing the polyimide aerogel under inert atmosphere at a temperature of at least about 650° C.

In some embodiments, drying a polyamic acid gel comprises: optionally, washing or solvent exchanging the polyamic acid gel; and subjecting the optionally washed or solvent exchanged polyamic acid gel to elevated temperature conditions, lyophilizing the optionally washed or solvent exchanged polyamic acid gel, or contacting the optionally washed or solvent exchanged polyamic acid gel with supercritical fluid carbon dioxide.

In some embodiments, the washing or solvent exchanging is performed with water, a C1 to C3 alcohol, acetone, acetonitrile, ether, tetrahydrofuran, toluene, liquid carbon dioxide, or a combination thereof.

In some embodiments, the method further comprises converting a polyamic acid aerogel to an isomorphic carbon aerogel, the converting comprising pyrolyzing the polyamic acid aerogel material under an inert atmosphere at a temperature of at least about 650° C.

In some embodiments, the method further comprises converting a polyamic acid aerogel to an isomorphic polyimide aerogel before the pyrolyzing, wherein converting the polyamic acid aerogel to a polyimide aerogel comprises thermally imidizing the polyamic acid aerogel.

In some embodiments, the method further comprises converting a polyamic acid metal salt aerogel to an isomorphic metal- or metal oxide-doped carbon aerogel, the converting comprising pyrolyzing the polyamic acid aerogel under an inert atmosphere at a temperature of at least about 650° C.

In some embodiments, the method further comprises adding an electroactive material to an aqueous solution of a polyamic acid salt.

In some embodiments, the carbon aerogel has properties substantially similar to those of a carbon aerogel prepared by pyrolyzing a corresponding polyimide aerogel that has been prepared by a conventional, non-aqueous method.

In some embodiments, the polyimide gel contains residual water in an amount greater than about 75% by volume.

In some embodiments, the polyamic acid gel contains residual water in an amount greater than about 75% by volume.

In some embodiments, the polyamic acid metal salt gel beads contain residual water in an amount greater than about 75% by volume.

In a further aspect is provided a polyimide aerogel prepared by the method disclosed herein. In some embodiments, the polyimide aerogel comprises terminal amine groups as determined by solid state $^{15}$N-NMR.

In a yet further aspect is provided a polyamic acid aerogel prepared by the method disclosed herein. In some embodiments, the polyamic aerogel comprises terminal amine groups as determined by solid state $^{15}$N-NMR.

In a further aspect is provided a carbon aerogel prepared by the method disclosed herein.

In a still further aspect is provided a carbon aerogel comprising an electroactive material, the carbon aerogel prepared by the method disclosed herein.

BRIEF DESCRIPTION OF THE DRAWINGS

In order to provide an understanding of embodiments of the technology, reference is made to the appended drawings, which are not necessarily drawn to scale. The drawings are exemplary only, and should not be construed as limiting the technology. The disclosure described herein is illustrated by way of example and not by way of limitation in the accompanying figures.

FIG. 2A is flow chart depicting a process for preparing an alkali metal salt solution of a polyamic acid according to a non-limiting embodiment of the disclosed method.

FIG. 2B is flow chart depicting a process for preparing a solution of an ammonium salt of a polyamic acid according to a non-limiting embodiment of the disclosed method.

FIG. 21A is the solid-state $^{13}$C NMR spectrum of a polyamic acid prepared from reaction of 1,4-phenylene diamine (PDA) and pyromellitic dianhydride (PMDA) in N,N-dimethylacetamide.

FIG. 21B is the solid-state $^{15}$N NMR spectrum of polyamic acid prepared from reaction of PDA and PMDA in N,N-dimethylacetamide.

FIG. 23B is a scanning electron micrograph of the skin of a carbonized aerogel bead according to a non-limiting embodiment of the disclosure.

FIG. 23C is a plot of pore size distribution for polyimide aerogels according to a non-limiting embodiment of the disclosure.

FIG. 34A is an FTIR spectrum of polyimide aerogel beads according to a non-limiting embodiment of the disclosure.

FIG. 34B is an FTIR spectrum of polyamic acid aerogel beads according to a non-limiting embodiment of the disclosure.

FIG. 39C is a plot showing the pore volume distribution as a function of pore size for carbon aerogel beads according to a non-limiting embodiment of the disclosure.

FIG. 43A is a scanning electron photomicrograph of a collection of carbon aerogel beads according to a non-limiting embodiment of the disclosure.

FIG. 43B is a scanning electron photomicrograph of the exterior skin of a carbon aerogel bead according to a non-limiting embodiment of the disclosure.

FIG. 43C is a scanning electron photomicrograph of a broken carbon aerogel bead according to a non-limiting embodiment of the disclosure.

FIG. 43D is a scanning electron photomicrograph of the interior of a carbon aerogel bead according to a non-limiting embodiment of the disclosure.

FIGS. 48A and 48B are scanning electron photomicrographs of a collection of carbon aerogel microbeads and their surfaces, respectively, obtained by pyrolysis of polyimide aerogel microbeads according to a non-limiting embodiment of the disclosure.

FIGS. 48C and 48D are scanning electron photomicrographs of a collection of carbon aerogel microbead and their surfaces, respectively, obtained by pyrolysis of polyamic acid aerogel microbeads according to a non-limiting embodiment of the disclosure.

FIGS. 49C and 49D are $^{13}C$ and $^{15}N$ solid-state NMR spectra, respectively, of polyamic acid aerogel microbeads according to a non-limiting embodiment of the disclosure.

FIGS. 50A and 50B are scanning electron photomicrographs of a collection of carbon aerogel microbeads, and their surfaces, respectively, obtained from pyrolysis of polyimide aerogel microbeads according to a non-limiting embodiment of the disclosure.

FIGS. 50C and 50D are scanning electron photomicrographs of a collection of carbon aerogel microbeads, and their surfaces, respectively, obtained from pyrolysis of polyamic acid aerogel microbeads according to a non-limiting embodiment of the disclosure.

FIGS. 56A and 56B are scanning electron photomicrographs of a collection of carbon aerogel microbeads and their surfaces, respectively, obtained by pyrolysis of polyimide aerogel microbeads according to a non-limiting embodiment of the disclosure.

FIGS. 56C and 56D are scanning electron photomicrographs of a collection of carbon aerogel microbeads and their surfaces, respectively, obtained by pyrolysis of polyimide aerogel microbeads according to a non-limiting embodiment of the disclosure.

DETAILED DESCRIPTION

Figure 1:
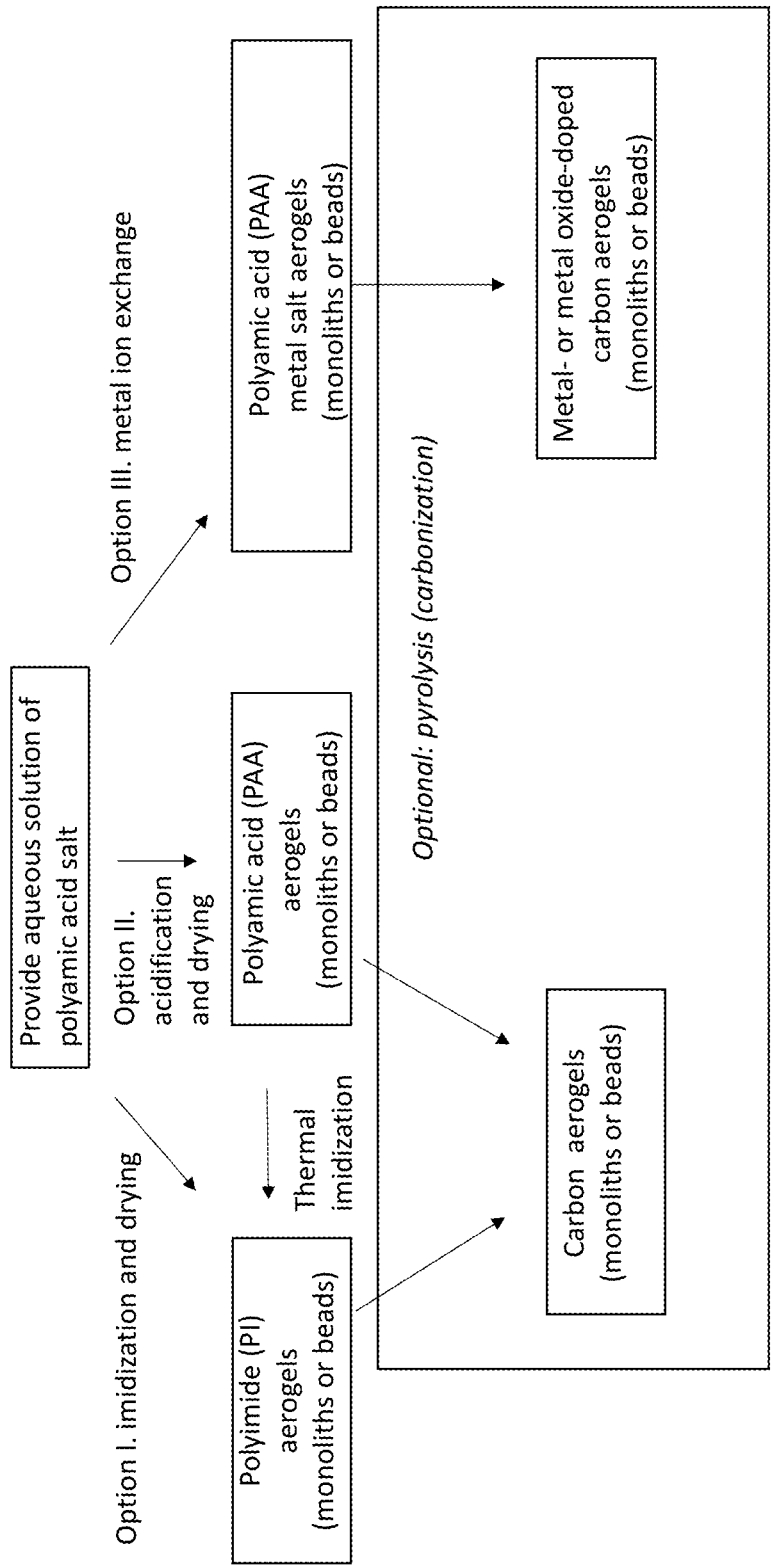
FIG. 1 is flow chart summarizing several generalized routes for forming aerogel materials according to non-limiting embodiments of the disclosed method.

Before describing several example embodiments of the technology, it is to be understood that the technology is not limited to the details of construction or process steps set forth in the following description. The technology is capable of other embodiments and of being practiced or being carried out in various ways.

In general, the technology is directed to methods of forming polyamic acid and polyimide gels without the use of harmful organic solvents. The methods generally comprise providing an aqueous solution of a polyamic acid salt; and 1) dehydrating a polyamic acid in an aqueous solution to form a polyimide gel, and drying the polyimide gel to form a polyimide aerogel; 2) acidifying the aqueous solution of a polyamic acid salt to form a polyamic acid gel, and drying the polyamic acid gel to form a polyamic acid aerogel; or 3) performing a metal ion exchange to form a polyamic acid metal salt gel, and drying the polyamic acid metal salt gel to form a polyamic acid metal salt aerogel. In some embodiments, the methods further comprise one or more of preparing a polyamic acid salt aqueous solution in situ, thermally imidizing a polyamic acid gel, converting polyimide gels to carbon gels, and converting polyamic acid or polyamic acid metal salt gels to carbon gels.

According to the present disclosure, it was surprisingly found that polyimide gels could be prepared in water with very fast gelation of aqueous solutions of polyamic acids and ammonium salts thereof. It was concluded that hydrolytic destruction of the dehydrating agent (e.g., acetic anhydride), was slower than the dehydrating activity. The resulting polyimide gels may be converted to aerogels, which possess nanostructures with similar properties to aerogels prepared by a conventional organic solvent-based process. According to the present disclosure, it was also surprisingly found that polyamic acids could be prepared and gelled in water, and that these polyamic acid gels could be thermally dehydrated under aqueous conditions to provide a corresponding polyimide gel. The method is advantageous in providing rapid gelation, making the method amenable to configuration in a continuous process, for example, for preparing polyimide beads. Further, it was surprisingly found according to the present disclosure that polyamic acid gels could be directly pyrolyzed to carbon gels without requiring an intermediate conversion to the corresponding polyimide. The disclosed methods are economically preferable to the conventional methods of preparing polyimide and polyamic acid gel materials (e.g., expensive organic solvents are avoided, and disposal costs are minimized) and "green" (i.e., beneficial from an environmental standpoint, as potentially toxic organic solvents are avoided and production of toxic byproducts is minimized or eliminated), and are advantageous in potentially reducing the overall number of operations which must be performed to provide carbon gel materials.

Accordingly, provided herein are methods of preparing polyamic acid, polyamic acid metal salt, and polyimide gels under aqueous conditions, for converting polyamic acids to polyimides under aqueous conditions, and for converting polyamic acid, polyamic acid metal salt, and polyimide gel materials to the corresponding carbon gel materials. Each of the various methods are described further herein below.

Definitions

With respect to the terms used in this disclosure, the following definitions are provided. This application will use the following terms as defined below unless the context of the text in which the term appears requires a different meaning.

The articles "'a'" and "'an'" are used herein to refer to one or to more than one (i.e., to at least one) of the grammatical object of the article. The term "'about'" used throughout this specification is used to describe and account for small fluctuations. For example, the term "'about'" can refer to less than or equal to ±10%, or less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "'about,'" whether or not explicitly indicated. A value modified by the term "'about'" of course includes the specific value. For instance, "'about 5.0'" must include 5.0.

Within the context of the present disclosure, the terms "'framework'" or "'framework structure'" refer to the network of interconnected oligomers, polymers, or colloidal particles that form the solid structure of a gel or an aerogel. The polymers or particles that make up the framework structures typically have a diameter of about 100 angstroms. However, framework structures of the present disclosure can also include networks of interconnected oligomers, polymers, or colloidal particles of all diameter sizes that form the solid structure within in a gel or aerogel.

As used herein, the term "'aerogel'" refers to a solid object, irrespective of shape or size, comprising a framework of interconnected solid structures, with a corresponding network of interconnected pores integrated within the framework, and containing gases such as air as a dispersed interstitial medium. As such, and irrespective of the drying method used, aerogels are open non-fluid colloidal or polymer networks that are expanded throughout their whole volume by a gas, and are formed by the removal of all swelling agents from a corresponding wet-gel. Reference to an "'aerogel'" herein includes any open-celled porous materials which can be categorized as aerogels, xerogels, cryogels, ambigels, microporous materials, and the like, regardless of material (e.g., polyimide, polyamic acid, or carbon), unless otherwise stated.

Generally, aerogels possess one or more of the following physical and structural properties: (a) an average pore diameter ranging from about 2 nm to about 100 nm; (b) a porosity of about 60% or more; (c) a specific surface area of about 0 to about 100 $m^2/g$ or more, typically from about 0 to about 20, about 0 to about 100, or from about 100 to about 1000 $m^2/g$. Typically, such properties are determined using nitrogen porosimetry testing and/or helium pycnometry. It can be understood that the inclusion of additives, such as a reinforcement material or an electrochemically active species, for example, silicon, may decrease porosity and the specific surface area of the resulting aerogel composite. Densification may also decrease porosity of the resulting aerogel composite.

In some embodiments, a gel material may be referred to specifically as a xerogel. As used herein, the term "'xerogel'" refers to a type of aerogel comprising an open, non-fluid colloidal or polymer networks that is formed by the removal of all swelling agents from a corresponding gel without any precautions taken to avoid substantial volume reduction or to retard compaction. A xerogel generally comprises a compact structure. Xerogels suffer substantial volume reduction during ambient pressure drying, and generally have surface areas of 0-100 $m^2/g$, such as from about 0 to about 20 $m^2/g$ as measured by nitrogen sorption analysis.

As used herein, reference to a "'conventional'" or "'organic solvent-based'" method of forming a polyamic acid or polyimide gel refers to a method in which a polyamic acid or polyimide gel is prepared in an organic solvent solution from condensation of a diamine and a tetracarboxylic acid dianhydride to form a polyamic acid, and optionally, dehydration of the polyamic acid to form a polyimide. See, for example, U.S. Pat. Nos. 7,071,287 and 7,074,880 to Rhine et al., and U.S. Patent Application Publication No. 2020/0269207 to Zafiropoulos, et al.

As used herein, the term "'gelation'" or "'gel transition'" refers to the formation of a wet-gel from a polymer system, e.g., a polyimide or polyamic acid as described herein. At a point in the polymerization or dehydration reactions as described herein, which is defined as the "'gel point,'" the sol loses fluidity. Without intending to be bound to any particular theory, the gel point may be viewed as the point where the gelling solution exhibits resistance to flow. In the present context, gelation proceeds from an initial sol state (e.g., a solution of an ammonium salt of a polyamic acid), through a highly viscous disperse state, until the disperse state solidifies and the sol gels (the gel point), yielding a wet-gel (e.g., polyimide or polyamic acid gel). The amount of time it takes for the polymer (e.g., ammonium salt of a polyamic acid or a polyimide) in solution to transform into a gel in a form that can no longer flow is referred to as the "'phenomenological gelation time.'" Formally, gelation time is measured using rheology. At the gel point, the elastic property of the solid gel starts dominating over the viscous properties of the fluid sol. The formal gelation time is near the time at which the real and imaginary components of the complex modulus of the gelling sol cross. The two moduli are monitored as a function of time using a rheometer. Time starts counting from the moment the last component of the sol is added to the solution. See, for example, discussions of gelation in H. H. Winter "'Can the Gel Point of a Cross-linking Polymer Be Detected by the G'-G''' Crossover?'" Polym. Eng. Sci., 1987, 27, 1698-1702; S.-Y. Kim, D.-G.

Choi and S.-M. Yang "'Rheological analysis of the gelation behavior of tetraethylorthosilane/vinyltriethoxysilane hybrid solutions'" Korean J. Chem. Eng., 2002, 19, 190-196; and M. Muthukumar "'Screening effect on viscoelasticity near the gel point'" Macromolecules, 1989, 22, 4656-4658.

As used herein, the term "'wet-gel'" refers to a gel in which the mobile interstitial phase within the network of interconnected pores is primarily comprised of a liquid phase such as a conventional solvent or water, liquefied gases such as liquid carbon dioxide, or a combination thereof. Aerogels typically require the initial production of a wet-gel, followed by processing and extraction to replace the mobile interstitial liquid phase in the gel with air or another gas. Examples of wet-gels include, but are not limited to: alcogels, hydrogels, ketogels, carbonogels, and any other wet-gels known to those in the art.

The term "'alkyl'" as used herein refers to a straight chain or branched, saturated hydrocarbon group generally having from 1 to 20 carbon atoms (i.e., C1 to C20). Representative alkyl groups include, but are not limited to, methyl, ethyl, n-propyl, n-butyl, n-pentyl, and n-hexyl; while branched alkyl groups include, but are not limited to, isopropyl, sec-butyl, isobutyl, tert-butyl, isopentyl, and neopentyl. An alkyl group can be unsubstituted or substituted.

The term "'alkenyl'" as used herein refers to a hydrocarbon group generally having from 1 to 20 carbon atoms (i.e., C1 to C20), and having at least one site of unsaturation, i.e., a carbon-carbon double bond. Examples include, but are not limited to: ethylene or vinyl, allyl, 1-butenyl, 2-butenyl, isobutylenyl, 1-pentenyl, 2-pentenyl, 3-methyl-1-butenyl, 2-methyl-2-butenyl, 2,3-dimethyl-2-butenyl, and the like. An alkenyl group can be unsubstituted or substituted.

The term "'alkynyl'" as used herein refers to a hydrocarbon group generally having from 1 to 20 carbon atoms (i.e., C1 to C20), and having at least one carbon-carbon triple bond. Examples of alkynyl groups include, but are not limited to ethynyl and propargyl. An alkynyl group can be unsubstituted or substituted.

The term "'aryl'" as used herein refers to aromatic carbocyclic group generally having from 6 to 20 carbon atoms (i.e., C6 to C20). Examples of aryl groups include, but are not limited to, phenyl, naphthyl, and anthracenyl. An aryl group can be unsubstituted or substituted.

The term "'cycloalkyl'" as used herein refers to a saturated carbocyclic group, which may be mono- or bicyclic. Cycloalkyl groups include a ring having 3 to 7 carbon atoms (i.e., C3 to C7) as a monocycle, or 7 to 12 carbon atoms (i.e., C7 to C12) as a bicycle. Examples of monocyclic cycloalkyl groups include cyclopropyl, cyclobutyl, cyclopentyl, cyclohexyl, cycloheptyl, and cyclooctyl. A cycloalkyl group can be unsubstituted or substituted.

The term "'substituted'" as used herein and as applied to any of the above groups (alkyl, alkenyl, alkynyl, aryl, cycloalkyl, and the like), means that one or more hydrogen atoms of said group are each independently replaced with a substituent. Typical substituents include, but are not limited to, $-X$, $-R$, $-OH$, $-OR$, $-SH$, $-SR$, $NH_2$, $-NHR$, $-N(R)_2$, $-N^+(R)_3$, $-CX_3$, $-CN$, $-OCN$, $-SCN$, $-NCO$, $-NCS$, $-NO$, $-NO_2$, $-N_3$, $-NC(=O)H$, $-NC(=O)R$, $-C(=O)H$, $-C(=O)R$, $-C(=O)NH_2$, $-C(=O)N(R)_2$, $-SO_3-$, $-SO_3H$, $-S(=O)_2R$, $-OS(=O)_2OR$, $-S(=O)_2NH_2$, $-S(=O)_2N(R)_2$, $-S(=O)R$, $-OP(=O)(OH)_2$, $-OP(=O)(OR)_2$, $-P(=O)(OR)_2$, $-PO_3$, $-PO_3H_2$, $-C(=O)X$, $-C(=S)R$, $-CO_2H$, $-CO_2R$, $-CO_2-$, $-C(=S)OR$, $-C(=O)SR$, $-C(=S)SR$, $-C(=O)NH_2$, $-C(=O)N(R)_2$, $-C(=S)NH_2$, $-C(=S)N(R)_2$, $-C(=NH)NH_2$, and $-C(=NR)N(R)_2$; wherein each X is independently selected for each occasion from F, Cl, Br, and I; and each R is independently selected for each occasion from $C_1$-$C_{20}$ alkyl and $C_6$-$C_{20}$ aryl. Wherever a group is described as "'optionally substituted,'" that group can be substituted with one or more of the above substituents, independently for each occasion.

It is to be understood that certain naming conventions can include various attachment scenarios, depending on the context. For example, where a substituent requires two points of attachment to the rest of the molecule, it is understood that the substituent is bidentate. For example, a substituent identified as alkyl but that requires two points of attachment includes forms such as $-CH_2-$, $-CH_2CH_2-$, $-CH_2CH(CH_3)CH_2-$, and the like. Other naming conventions clearly indicate that a group is bidentate, such as "'alkylene,'" "'alkenylene,'" "'arylene,'" and the like. Wherever a substituent is bidentate, it is to be understood that the substituent can be attached in any directional configuration unless otherwise indicated.

The term "'substantially'" as used herein, unless otherwise indicated, means to a great extent, for example, greater than about 95%, greater than about 99%, greater than about 99.9%, greater than 99.99%, or even 100% of a referenced characteristic, quantity, etc. as pertains to the particular context (e.g., substantially pure, substantially the same, and the like).

Methods of Forming Polyimide, Polyamic Acid, Polyamic Acid Metal Salt, and Carbon Aerogels The methods disclosed herein generally utilize polyamic acid and polyimide wet-gels, which may be prepared without the use of organic solvents. These water-based methods are advantageous in reducing material and waste disposal costs, and reducing potential safety and environmental hazards. FIG. 1 provides a general, non-limiting overview of three options for preparing polyimide aerogels, polyamic acid aerogels, and polyamic acid metal salt aerogels, and their corresponding carbon aerogels, all from an aqueous solution of a polyamic acid salt.

With reference to FIG. 1, in Option 1, the aqueous solution of polyamic acid is imidized and dried to provide a polyimide (PI) aerogel in the form of monoliths or beads. Optionally, the PI aerogels may be pyrolyzed to form the corresponding carbon aerogels.

With further reference to FIG. 1, in Option 2, the aqueous solution of polyamic acid is acidified and dried to form polyamic acid (PAA) aerogels, either as monoliths or beads. The PAA aerogels may be converted to PI aerogels by thermal imidization, or may be converted directly to the corresponding carbon aerogel by pyrolysis.

With still further reference to FIG. 1, in Option 3, the aqueous solution of polyamic acid is subjected to a metal ion exchange to form a PAA metal salt aerogel in the form of monoliths or beads. Such PAA metal salt aerogels may be directly pyrolyzed to form the corresponding metal- or metal oxide-doped carbon aerogel.

Accordingly, in one aspect of the disclosure is provided a method of preparing a polyimide aerogel. The method generally comprises providing an aqueous solution of a salt of a polyamic acid; imidizing the polyamic acid to form a polyimide gel; and drying the polyimide gel to form the polyimide aerogel. Reference herein to an aqueous solution means that the solution is substantially free of any organic solvent. The term "'substantially free'" as used herein in the context of organic solvents means that no organic solvent has been intentionally added, and no organic solvent is present beyond trace amounts. For example, in certain embodiments, the aqueous solution can be characterized as having less than 1% by volume of organic solvent, or less than 0.1%, or less than 0.01%, or even 0% by volume of organic solvent.

In some embodiments, a polyamic acid is purchased or previously prepared, and dissolved in water in the presence of a base. In other embodiments, the polyamic acid is prepared in situ under aqueous conditions, directly forming the polyamic acid salt solution.

In another aspect of the disclosure is provided a method of preparing a polyamic acid aerogel. The method generally comprises providing an aqueous solution of a polyamic acid salt; acidifying the polyamic acid salt solution to form a polyamic acid gel; and drying the polyamic acid gel to form the polyamic acid aerogel.

In yet another aspect of the disclosure is provided a method of preparing a polyamic acid metal salt aerogel. The method generally comprises providing an aqueous solution of an ammonium or alkali metal salt of a polyamic acid; performing a metal ion exchange comprising adding the solution of the polyamic acid salt to a solution comprising a soluble metal salt to form polyamate metal salt gel beads; and drying the polyamic acid metal salt gel beads to form the polyamic acid metal salt aerogel beads.

In other aspects are provided methods of converting a polyamic acid aerogel to an isomorphic polyimide aerogel, and converting the various polyamic acid, polyimide, and polyamic acid metal salt aerogels to the corresponding carbonized aerogels. Each of these methods and the individual steps thereof are discussed in detail herein below.

I. Providing an Aqueous Solution of a Polyamic Acid Salt

The disclosed methods all share the common feature of providing an aqueous solution of a polyamic acid salt. Such solutions may be obtained by dissolving a pre-formed polyamic acid in water in the presence of a base, or may be obtained by in situ preparation from polyamic acid precursors (diamine and tetracarboxylic dianhydride) under aqueous conditions in the presence of a base. Each method is described further herein below.

Polyamic Acid

Polyamic acids are polymeric amides having repeat units comprising carboxylic acid groups, carboxamido groups, and aromatic or aliphatic moieties which comprise the diamine and tetracarboxylic acid from which the polyamic acid is derived. A "'repeat unit'" as defined herein is a part of the polyamic acid (or corresponding polyimide) whose repetition would produce the complete polymer chain (except for the terminal amino groups or unreacted anhydride termini) by linking the repeat units together successively along the polymer chain. One of skill in the art will recognize that the polyamic acid repeat units result from partial condensation of tetracarboxylic acid dianhydride carboxyl groups with the amino groups of a diamine.

In some embodiments, the polyamic acid is any commercially available polyamic acid. In other embodiments, the polyamic acid has been previously formed ("'pre-formed'") and isolated, e.g., prepared by reaction of a diamine and a tetracarboxylic dianhydride in an organic solvent according to conventional synthetic methods. In either case, whether purchased or prepared and isolated, a suitable polyamic acid is in substantially pure form. Pre-formed and isolated or commercially available polyamic acids may be in, for example, solid form, such as a powder or crystal form, or in liquid form.

The structure of suitable polyamic acids may vary. In some embodiments, the polyamic acid has a structure represented by Formula I:

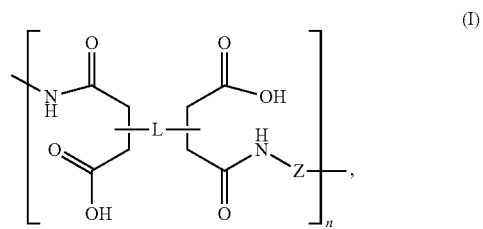

wherein:
Z is a group connecting the two terminal amino groups of a diamine;
L is a group connecting the carboxyl groups; and
n is an integer indicating the number of polyamic acid repeat units, and which determines the molecular weight of the polyamic acid.

In some embodiments, Z is aliphatic (e.g., alkyl, alkenyl, alkynyl, or cycloalkyl) as described herein above. Accordingly, in some embodiments, the polyamic acid comprises as the repeat unit an amide of an aliphatic diamine. In some embodiments, the polyamic acid comprises as the repeat unit an amide of an alkane diamine having from 2 to 12 carbon atoms (i.e., C2 to C12). In some embodiments, the polyamic acid comprises as the repeat unit an amide of a C2 to C6 alkane diamine, such as, but not limited to, ethylenediamine, 1,3-diaminopropane, 1,4-diaminobutane, 1,5-diaminopentane, or 1,6-diaminohexane. In some embodiments, one or more of carbon atoms of the C2 to C6 alkane of the diamine is substituted with one or more alkyl groups, such as methyl.

In some embodiments, Z is aryl as described herein above. Accordingly, in some embodiments, the polyamic acid comprises as the repeat unit an amide of an aryl diamine. In some embodiments, the polyamic acid comprises as the repeat unit an amide of a phenylene diamine, a diaminodiphenyl ether, or an alkylenedianiline. In some embodiments, the polyamic acid comprises as the repeat unit an amide of an aryl diamine selected from the group consisting of 1,3-phenylenediamine, 1,4-phenylenediamine, 4,4'-diaminodiphenyl ether, 4,4'-methylenedianiline, and combinations thereof. In some embodiments, the polyamic acid comprises as the repeat unit an amide of an aryl diamine selected from the group consisting of 1,4-phenylenediamine, 4,4'-methylenedianiline, 4,4'-diaminodiphenyl ether. In some embodiments, the polyamic acid comprises as the repeat unit an amide of an aryl diamine which is 1,4-phenylenediamine (PDA).

In some embodiments, L comprises an alkyl group, a cycloalkyl group, an aryl group, or a combination thereof, each as described herein above. In some embodiments, L comprises an aryl group. In some embodiments, L comprises a phenyl group, a biphenyl group, or a diphenyl ether group. In some embodiments, the polyamic acid comprises as the repeat unit an amide of a tetracarboxylic acid selected from the group consisting of benzene-1,2,4,5-tetracarboxylic acid, [1,1'-biphenyl]-3,3',4,4'-tetracarboxylic acid, 4,4'-oxydiphthalic acid, 4,4'-sulfonyldiphthalic acid, 4,4'-carbonyldiphthalic acid, 4,4'-(propane-2,2-diyl)diphthalic acid, 4,4'-(perfluoropropane-2,2-diyl)diphthalic acid, naphthalene-1,4,5,8-tetracarboxylic acid, 4-(2-(4-(3,4-dicarboxyphenoxy)phenyl)propan-2-yl)phthalic acid, perylene tetracarboxylic acid, and combinations thereof. In some embodiments, the polyamic acid comprises as the repeat unit an amide of a tetracarboxylic acid which is benzene-1,2,4,5-tetracarboxylic acid, Polyamic Acid Salts While polyamic acids are generally insoluble in water, it has been found according to the present disclosure that certain polyamic acid salts, in which the carboxylic acid groups of the polyamic acid are associated with cationic species and are substantially present as carboxylate anions, possess useful water solubility. By "'substantially present as carboxylate anions'" it is meant that greater than about 95%, greater than about 99%, greater than about 99.9%, greater than 99.99%, or even 100% of the free carboxylic acid groups present within the polyamic acid molecules are in their unprotonated (i.e., $-CO_2^-$) state. The cationic species may be, for example, an alkali metal cation or an ammonium cation. With reference to FIGS. 2A and 2B, generally, providing a polyamic acid salt in solution comprises adding a polyamic acid to water to form an aqueous suspension of the polyamic acid, and adding a base to the aqueous suspension of the polyamic acid to form the aqueous solution of the polyamic acid salt. The polyamic acid is as described herein above, and may be purchased or may be prepared as described herein.

The base may vary. For example, in some embodiments, the base is an alkali metal hydroxide, and the cation is an alkali metal ion. With reference to FIG. 2A, a polyamic acid is suspended in water, and an alkali metal hydroxide is added to the suspension, resulting in an aqueous solution of the polyamic acid alkali metal salt. Suitable alkali metal hydroxides include, but are not limited to, lithium hydroxide, sodium hydroxide, and potassium hydroxide.

The quantity of alkali metal hydroxide added may vary, but is generally sufficient to react with (e.g., neutralize or deprotonate) substantially all of the free carboxylic acid groups present in the polyamic acid, and such that substantially all of the polyamic acid dissolves. As used herein in the context of neutralizing carboxylic acid groups, "'substantially all'" means that greater than 95% of the carboxylic acid groups are neutralized, such as 99%, or 99.9%, or 99.99%, or even 100% of the carboxylic acid groups are neutralized. As used herein in the context of dissolution of the polyamic acid, "'substantially all'" means that greater than 95% of the polyamic acid, such as 99%, or 99.9%, or 99.99%, or even 100% of the polyamic acid dissolves. In some embodiments, a molar ratio of the alkali metal hydroxide to the polyamic acid is from about 0.1 to about 8, such as from about 2 to about 8. In some embodiments, a molar ratio of the alkali metal hydroxide to the polyamic acid is from about 2 to about 4, or from about 2.2 to about 2.5.

The quantity of water utilized will vary depending on the desired concentration, the scale at which the solution is formed, and the solubility of the polyamic acid salt in water. In some embodiments, a range of concentration of the alkali metal salt of the polyamic acid in the solution is from about 0.01 to about 0.3 g/cm$^3$, based on the weight of the polyamic acid.

In some embodiments, the base is a non-nucleophilic amine base, and the cation is an ammonium ion. With reference to FIG. 2B, a polyamic acid is suspended in water, and a non-nucleophilic amine base is added to the suspension, resulting in an aqueous solution of the polyamic acid ammonium salt. Typical non-nucleophilic amines are bulky, tertiary, or both, such that protons can attach to the basic center, but alkylation, acylation, complexation, and the like are impossible or too slow to be of any practical consequence. Suitable non-nucleophilic amine bases include, but are not limited to, tertiary amines, such as alkyl, cycloalkyl and aromatic tertiary amines. As used herein in the context of amines, "tertiary" means that the amine nitrogen atom has three bonds or organic substituents attached thereto. Generally, suitable non-nucleophilic amines will have a solubility in water of at least about 4 grams per liter at 20° C. Particularly suitable non-nucleophilic amine bases are the water-soluble lower trialkylamines, including cyclic trialkylamines. In some embodiments, the non-nucleophilic amine base is selected from the group consisting of trimethylamine, triethylamine, tri-n-propylamine, tri-n-butylamine, N-methylpyrrolidine, N-methylpiperidine, diisopropylethylamine, and combinations thereof. In some embodiments, the non-nucleophilic amine base is triethylamine. In some embodiments, the non-nucleophilic amine base is diisopropylethylamine.

The quantity of non-nucleophilic amine base added may vary, but is generally sufficient to react with (e.g., neutralize or deprotonate) substantially all of the free carboxylic acid groups present in the polyamic acid, and such that substantially all of the polyamic acid dissolves. In some embodiments, the non-nucleophilic amine is added in a quantity sufficient to maintain substantially all of the polyamic acid in solution. In some embodiments, a molar ratio of the non-nucleophilic amine base to the polyamic acid is from about 0.1 to about 8, such as from about 2 to about 8. In some embodiments, a molar ratio of the non-nucleophilic amine base to the polyamic acid is from about 2 to about 4, or from about 2.2 to about 2.5.

The quantity of water utilized will vary depending on the desired concentration, the scale at which the solution is formed, and the solubility of the polyamic acid salt and/or the non-nucleophilic amine base in water. In some embodiments, a range of concentration of the ammonium salt of the polyamic acid in the solution is from about 0.01 to about 0.3 g/cm$^3$, based on the weight of the polyamic acid (i.e., the free acid weight).

Polyamic Acid Ammonium Salt, In Situ Preparation

In some embodiments, the aqueous solution of a polyamic acid salt is prepared in situ by e.g., reaction of a diamine and a tetracarboxylic acid dianhydride in the presence of a non-nucleophilic amine, providing an aqueous solution of the polyamic acid ammonium salt. Generally, the diamine is allowed to react with the tetracarboxylic acid dianhydride in the presence of the non-nucleophilic amine to form the polyamic acid ammonium salt. In some embodiments, combinations of more than one diamine may be used. Combinations of diamines may be used in order to optimize the properties of the gel material. In some embodiments, a single diamine is used. Generally, the diamine has appreciable solubility in water. For example, suitable diamines may have a solubility in water at 20° C. of at least about 0.1 g per 100 ml, at least about 1 g per 100 ml, or at least about 10 g per 100 ml.

A non-limiting, generic reaction sequence is provided in Scheme 1. In some embodiments, the reactions occur generally according to Scheme 1, and the reagents and product have structures according to the formulae in Scheme 1.

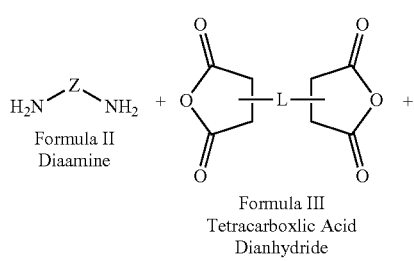

Scheme 1

Formula II
Diaamine

Formula III
Tetracarboxlic Acid
Dianhydride

-continued
non-nucleophilic amine
(e.g., $R_1R_2R_3N$) →

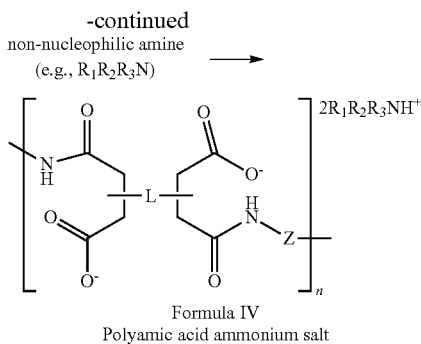

Formula IV
Polyamic acid ammonium salt

With reference to Scheme 1, each of Z, L, and n are as defined herein above with reference to Formula I, and the non-nucleophilic amine is a non-nucleophilic amine base as described herein above (e.g., $R_1$, $R_2$, and $R_3$ are alkyl, cycloalkyl aryl, or combinations thereof). Suitable diamines, tetracarboxylic acid dianhydrides, and non-nucleophilic amines are further described below. The order of addition of the individual reactants may vary, as may the structure of the reactants. Suitable reactant structures and reaction conditions, as well as orders of addition, are described further herein below.

Figure 2C:
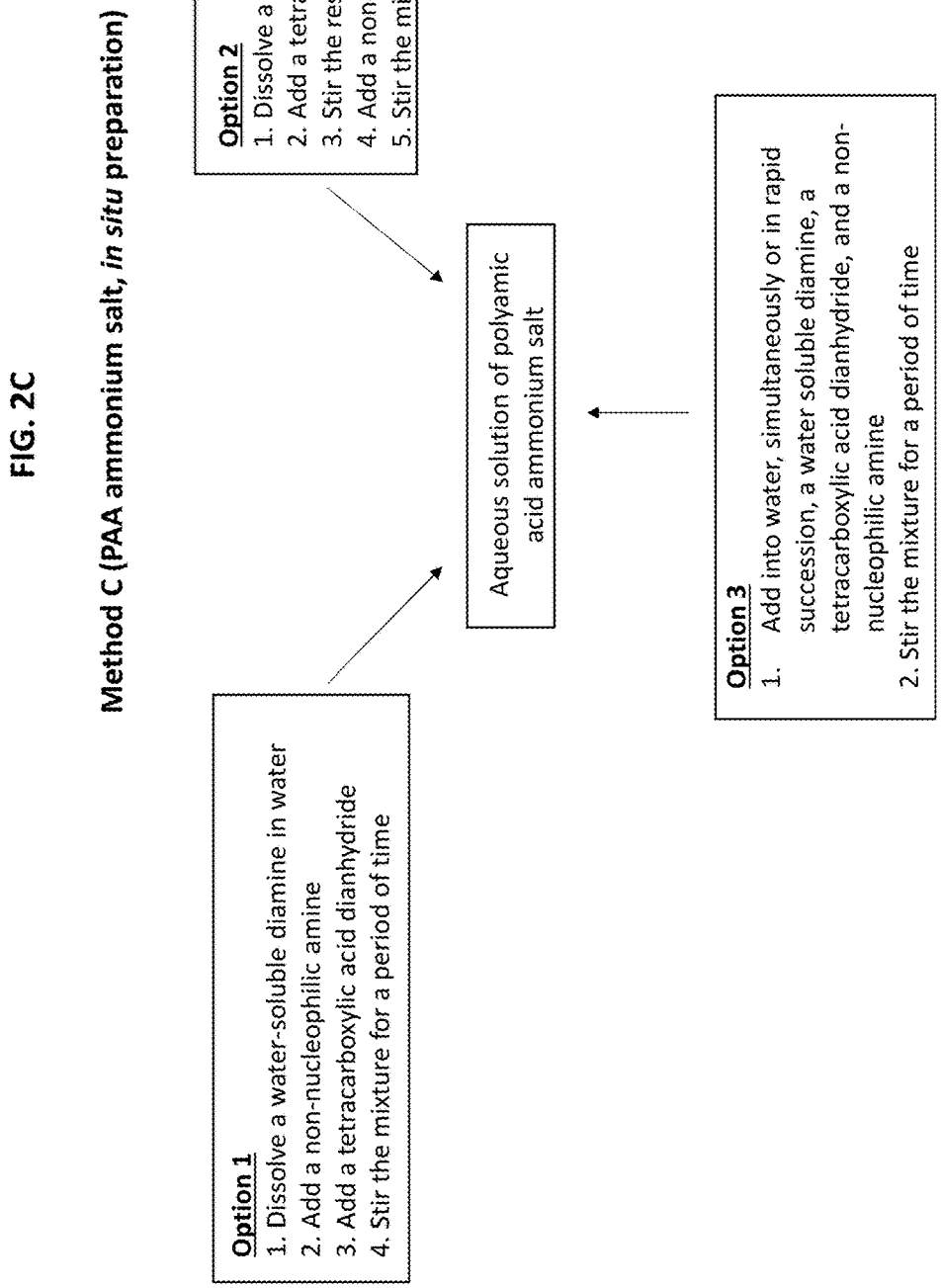
FIG. 2C is flow chart depicting three routes for in situ preparation of a solution of an ammonium salt of a polyamic acid according to non-limiting embodiments of the disclosed method.

With reference to FIG. 2C, there are three general options for providing an aqueous solution of a polyamic acid salt in accordance with general Scheme 1.

Option 1

In some embodiments, providing an aqueous solution of a polyamic acid salt comprises:
   dissolving a water-soluble diamine in water to form an aqueous diamine solution;
   adding a non-nucleophilic amine to the aqueous diamine solution;
   adding a tetracarboxylic acid dianhydride to the aqueous diamine solution; and
   stirring the resulting solution for a period of time in a range from about 1 hour to about 24 hours at a temperature in a range from about 15 to about 60° C.

With reference to FIG. 2C, Option 1 and Scheme 1, a water-soluble diamine is dissolved in water. The structure of the diamine may vary. In some embodiments, the diamine has a structure according to Formula II, where Z is aliphatic (i.e., alkylene, alkenylene, alkynylene, or cycloalkylene) or aryl, each as described herein above. In some embodiments, Z is alkylene, such as C2 to C12 alkylene or C2 to C6 alkylene. In some embodiments, the diamine is a C2 to C6 alkane diamine, such as, but not limited to, ethylenediamine, 1,3-diaminopropane, 1,4-diaminobutane, 1,5-diaminopentane, or 1,6-diaminohexane. In some embodiments, the C2 to C6 alkylene of the alkane diamine is substituted with one or more alkyl groups, such as methyl.

In some embodiments, Z is aryl. In some embodiments, the aryl diamine is 1,3-phenylenediamine, 1,4-phenylenediamine, or a combination thereof. In some embodiments, the diamine is 1,4-phenylenediamine (PDA).

With continued reference to FIG. 2C, Option 1 and Scheme 1, a non-nucleophilic amine is added to the aqueous diamine solution. Suitable non-nucleophilic amines are described herein above. In some embodiments, the non-nucleophilic amine is selected from the group consisting of triethylamine, trimethylamine, tri-n-butylamine, N-methylpyrrolidine, N-methylpiperidine, diisopropylethylamine, and combinations thereof. In some embodiments, the non-nucleophilic amine is triethylamine. In some embodiments, the non-nucleophilic amine is diisopropylethylamine.

The quantity of non-nucleophilic amine added may vary. In some embodiments, the molar ratio of the non-nucleophilic amine to the diamine is from about 2 to about 4, or from about 2 to about 3. In some embodiments, the molar ratio is from about 2.0, about 2.1, about 2.2, about 2.3, about 2.4, or about 2.5, to about 2.6, about 2.7, about 2.8, about 2.9, or about 3.0. In some embodiments, a molar ratio of the non-nucleophilic amine to the diamine is from about 2 to about 2.5. Without wishing to be bound by any particular theory, it is believed that in some exemplary embodiments, at least enough amine is required to allow neutralization of substantially all free carboxylic acid groups of the polyamic acid (i.e., form a salt with). It has been observed according to the present disclosure that molar ratios below 2.0, or below 2.2, may in some embodiments result in precipitation of the polyamic acid. Accordingly, the molar ratio may require optimization for each set of reactants and conditions. In some embodiments, the molar ratio is selected so as to maintain solubility of the polyamic acid. In some embodiments, the molar ratio is selected so as to avoid any precipitation of the polyamic acid.

With continued reference to FIG. 2C, Option 1 and Scheme 1, a tetracarboxylic acid dianhydride is added. In some embodiments, more than one tetracarboxylic acid dianhydride is added. Combinations of tetracarboxylic acid dianhydrides may be used in order to optimize the properties of the gel material. In some embodiments, a single tetracarboxylic acid dianhydride is added.

The structure of the tetracarboxylic acid dianhydride may vary. In some embodiments, the tetracarboxylic acid dianhydride has a structure according to Formula III, where L comprises an alkylene group, a cycloalkylene group, an arylene group, or a combination thereof, each as described herein above. In some embodiments, L comprises an arylene group. In some embodiments, L comprises a phenyl group, a biphenyl group, or a diphenyl ether group. In some embodiments, the tetracarboxylic acid dianhydride of Formula III has a structure selected from one or more structures as provided in Table 1.

TABLE 1

Non-limiting list of potential tetracarboxylic acid dianhydrides

| Structure | IUPAC Name | Common/Alternative Name |
|---|---|---|
|  | 1H,3H-benzo[1,2-c:4,5-c']difuran-1,3,5,7-tetrone | pyromellitic anhydride (PMDA) |

TABLE 1-continued

Non-limiting list of potential tetracarboxylic acid dianhydrides

| Structure | IUPAC Name | Common/Alternative Name |
|---|---|---|
| 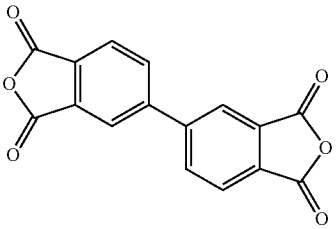 [SMILES: O=C1OC(=O)c2cc(-c3ccc4c(c3)C(=O)OC4=O)ccc21] | [5,5'-biisobenzofuran]-1,1',3,3'-tetraone | 3,3',4,4'-bisphenyltetracarboxylic dianhydride; biphthalic dianhydride (BPDA) |
| 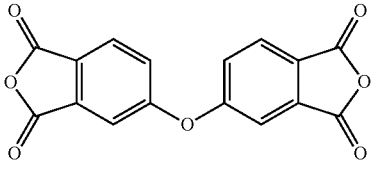 [SMILES: O=C1OC(=O)c2cc(Oc3ccc4c(c3)C(=O)OC4=O)ccc21] | 5,5'-oxybis(isobenzofuran-1,3-dione) | 4,4'-oxydiphthalic dianhydride (ODPA) |
| 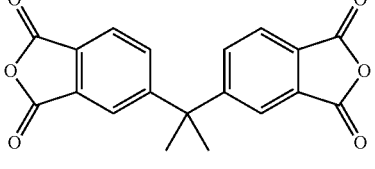 | 5,5'-(propane-2,2-diyl)bis(isobenzofuran-1,3-dione) | 4,4'-(isopropylidene)diphathalic dianhydride |
| 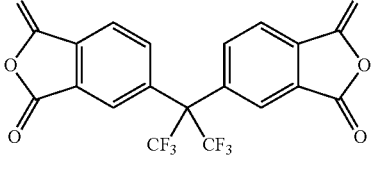 | 5,5'-(perfluoropropane-2,2-diyl)bis(isobenzofuran-1,3-dione) | 4,4'-(hexafluoroisopropylidene) diphathalic dianhydride (6FDA) |
| 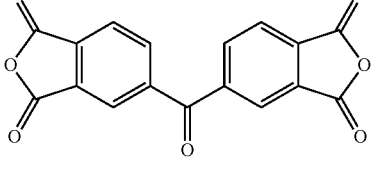 | 5,5'-carbonylbis(isobenzofuran-1,3-dione) | 3,3',4,4'-benzophenonetetracarboxylic dianhydride (BTDA) |
| 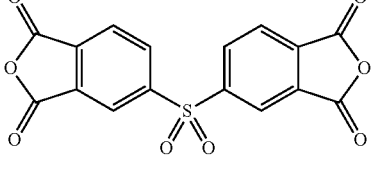 | 5,5'-sulfonylbis(isobenzofuran-1,3-dione) | 3,3',4,4'-diphenyl-sulfonetetracarboxylic dianhydride |
| 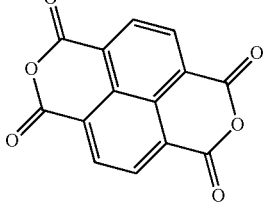 | isochromeno[6,5,4-def]isochromene-1,3,6,8-tetraone | 1,4,5,8-Naphthalenetetracarboxylic dianhydride |

TABLE 1-continued

Non-limiting list of potential tetracarboxylic acid dianhydrides

| Structure | IUPAC Name | Common/Alternative Name |
| --- | --- | --- |
| | anthra[2,1,9-def:6,5,10-d'ef']diisochromene-1,3,8,10-tetraone | perylene tetracarboxylic anhydride |
| | 5-(2-(4-((1,3-dioxo-1,3-dihydroisobenzofuran-5-yl)oxy)phenyl)propan-2-yl)isobenzofuran-1,3-dione | |
| | 5,5'-((propane-2,2-diylbis(4,1-phenylene))bis(oxy))bis(isobenzofuran-1,3-dione) | 4,4'-(4,4')-isopropylidene-diphenoxy)bis-phthalic dianhydride (BPADA) |

In some embodiments, the tetracarboxylic acid dianhydride is selected from the group consisting of pyromellitic anhydride (PMDA), biphthalic dianhydride (BPDA), oxydiphthalic dianhydride (ODPA), benzophenone tetracarboxylic dianhydride (BTDA), ethylenediaminetetraacetic dianhydride (EDDA), 1,4,5,8-naphthalenetetracarboxylic dianhydride, and combinations thereof. In some embodiments, the tetracarboxylic acid dianhydride is PMDA.

The molar ratio of the diamine to the dianhydride may vary according to desired reaction time, reagent structure, and desired material properties. In some embodiments, the molar ratio is from about 0.1 to about 10, such as from about 0.1, about 0.5, or about 1, to about 2, about 3, about 5, or about 10. In some embodiments, the ratio is from about 0.5 to about 2. In some embodiments, the ratio is about 1 (i.e., stoichiometric), such as from about 0.9 to about 1.1. In specific embodiments, the ratio is from about 0.99 to about 1.01.

With reference to Scheme 1, the diamine and the dianhydride are allowed to react with each other in the presence of the non-nucleophilic amine, forming the polyamic acid. Without wishing to be bound by theory, it is believed that the polyamic acid, in the presence of the non-nucleophilic amine, forms an ammonium salt of the polyamic acid having a structure according to Formula IV, and the water solubility of this salt allows the ammonium salt of the polyamic acid to remain in solution.

The molecular weight of the polyamic acid may vary based on reaction conditions (e.g., concentration, temperature, duration of reaction, nature of diamine and dianhydride, etc.). The molecular weight is based on the number of polyamic acid repeat units, as denoted by the value of the integer "n" for the structure of Formula IV in Scheme 1. The specific molecular weight range of polymeric materials produced by the disclosed method may vary. Generally, the noted reaction conditions may be varied to provide a gel with the desired physical properties without specific consideration of molecular weight. In some embodiments, a surrogate for molecular weight is provided in the viscosity of the polyamic acid ammonium salt solution, which is determined by variables such as temperature, concentrations, molar ratios of reactants, reaction time, and the like.

The molar ratio of the diamine to the dianhydride may vary according to desired reaction time, reagent structure, and desired material properties. In some embodiments, the molar ratio is from about 0.1 to about 10, such as from about 0.1, about 0.5, or about 1, to about 2, about 3, about 5, or about 10. In some embodiments, the ratio is from about 0.5 to about 2. In some embodiments, the ratio is about 1 (i.e., stoichiometric), such as from about 0.9 to about 1.1. In specific embodiments, the ratio is from about 0.99 to about 1.01.

The molar ratio of the non-nucleophilic amine to the diamine or the dianhydride determines the solubility of the polyamic acid. In some embodiments, the molar ratio of the non-nucleophilic amine to the diamine is from about 2 to about 4, or from about 2 to about 3. In some embodiments, the molar ratio is from about 2.0, about 2.1, about 2.2, about 2.3, about 2.4, or about 2.5, to about 2.6, about 2.7, about 2.8, about 2.9, or about 3.0. Without wishing to be bound by any particular theory, it is believed that in some exemplary embodiments, at least enough amine is required to allow neutralization of substantially all free carboxylic acid groups of the polyamic acid (i.e., form a salt with). It has been observed according to the present disclosure that molar ratios below 2.0, or below 2.2, may in some embodiments result in precipitation of the intermediate polyamic acid (e.g., because of evaporative loss of the non-nucleophilic amine). Accordingly, the molar ratio may require optimization for each set of reactants and conditions. In some embodiments, the molar ratio is selected so as to maintain solubility of the reaction components (e.g., the polyamic acid). In some embodiments, the molar ratio is adjusted so as to avoid any precipitation.

The temperature at which the reaction is conducted may vary. A suitable range is generally between about 10° C. and about 100° C. In some embodiments, the reaction temperature is from about 15 to about 60° C., such as about 20, about 25, about 30, about 35, about 40, about 45, about 50, about 55, or about 60° C. In some embodiments, the temperature is from about 15 to about 25° C. In some embodiments, the temperature is from about 50 to about 60° C.

In some embodiments, as the temperature is increased, polyimide gels may be produced with a different pore size distribution and different structural properties. Without wishing to be bound by theory, it is believed that properties such as pore size distribution and structural rigidity may, in certain embodiments, vary with temperature, perhaps as a consequence of polyimide molecular weights, degree of chemical cross linking (when possible), and other factors which may exhibit a temperature dependence.

The reaction is allowed to proceed for a period of time, and is generally allowed to proceed until all of the available reactants (e.g., diamine and dianhydride) have reacted with one another. The time required for complete reaction may vary based on reagent structures, concentration, temperature. In some embodiments, the reaction time is from about 1 minute to about 1 week, for example, from about 15 minutes to about 5 days, from about 30 minutes to about 3 days, or from about 1 hour to about 1 day. In some embodiments, the reaction time is from about 1 hour to about 12 hours.

Option 2

In some embodiments, providing an aqueous solution of a polyamic acid salt comprises:

dissolving a water-soluble diamine in water to form an aqueous diamine solution;

adding a tetracarboxylic acid dianhydride to the aqueous diamine solution;

stirring the resulting suspension for a period of time in a range from about 1 hour to about 24 hours at a temperature in a range from about 15 to about 60° C.

adding a non-nucleophilic amine to the aqueous diamine solution; and stirring the resulting suspension for a period of time in a range from about 1 hour to about 24 hours at a temperature in a range from about 15 to about 60° C.

With reference to FIG. 2C, Option 2 and Scheme 1, a water-soluble diamine is dissolved in water as described above with respect to Option 1. However, in this embodiment, the tetracarboxylic acid dianhydride (as described herein above with respect to Option 1) is added to the aqueous diamine solution to form a suspension. The relative quantities of the reactants may vary as described above with respect to Option 1.

In some embodiments, the suspension is stirred for a period of time ranging from about 1 hour to about 1 day, such as from about 1 hour to about 12 hours.

The temperature at which the suspension is stirred may vary. A suitable range is generally between about 15 to about 60° C., such as about 20, about 25, about 30, about 35, about 40, about 45, about 50, about 55, or about 60° C. In some embodiments, the temperature is from about 15 to about 25° C. In some embodiments, the temperature is from about 50 to about 60° C.

With reference to FIG. 2C, Option 2 and Scheme 1, a non-nucleophilic amine is added. Suitable non-nucleophilic amines are described herein above. In some embodiments, the non-nucleophilic amine is selected from the group consisting of triethylamine, trimethylamine, tri-n-butylamine, N-methylpyrrolidine, N-methylpiperidine, diisopropylethylamine, and combinations thereof. In some embodiments, the non-nucleophilic amine is triethylamine. In some embodiments, the non-nucleophilic amine is diisopropylethylamine.

The quantity of non-nucleophilic amine added may vary as described above with respect to Option 1. In some embodiments, a molar ratio of the non-nucleophilic amine to the diamine is from about 2 to about 2.5.

In some embodiments, the resulting mixture is stirred for a period of time ranging from about 1 hour to about 1 day, such as from about 1 hour to about 12 hours.

The temperature at which the mixture is stirred may vary. A suitable range is generally between about 15 to about 60° C., such as about 20, about 25, about 30, about 35, about 40, about 45, about 50, about 55, or about 60° C. In some embodiments, the temperature is from about 15 to about 25° C. In some embodiments, the temperature is from about 50 to about 60° C.

Option 3

In some embodiments, providing an aqueous solution of a polyamic acid salt comprises:

adding to water, simultaneously or in rapid succession, a water-soluble diamine, a tetracarboxylic acid dianhydride, and a non-nucleophilic amine; and stirring the resulting solution for a period of time in a range from about 1 hour to about 24 hours at a temperature in a range from about 15 to about 60° C.

With reference to FIG. 2C, Option 3 and Scheme 1, the water-soluble diamine, the tetracarboxylic acid dianhydride, and the non-nucleophilic amine are added to water, either simultaneously or in rapid succession. Each of the water-soluble diamine, the tetracarboxylic acid dianhydride, and the non-nucleophilic amine, and the relative quantities thereof are as described above with respect to Options 1 and 2.

In some embodiments, the resulting mixture is stirred for a period of time ranging from about 1 hour to about 1 day, such as from about 1 hour to about 12 hours.

The temperature at which the mixture is stirred may vary. A suitable range is generally between about 15 to about 60° C., such as about 20, about 25, about 30, about 35, about 40, about 45, about 50, about 55, or about 60° C. In some embodiments, the temperature is from about 15 to about 25° C. In some embodiments, the temperature is from about 50 to about 60° C.

II. Methods of Forming Polyimide Aerogels

As described herein above, in one aspect of the disclosure is provided a method of preparing a polyimide aerogel comprising providing an aqueous solution of a salt of a polyamic acid; imidizing the polyamic acid to form a polyimide gel; and drying the polyimide gel to form the polyimide aerogel. The polyimide gel and corresponding aerogel may be in the form of monoliths or in bead form. The salt of the polyamic acid may be an alkali metal salt or an ammonium salt. The various permutations for preparing polyimide aerogels from such polyamic acid salt solutions are described further herein below.

A. Monolithic Polyimide Aerogels from an Aqueous Solution of a Salt of a Polyamic Acid by Chemical Imidization In some embodiments, the polyimide gel and corresponding aerogel are in monolithic form, and the salt if the polyamic acid in the aqueous solution is an ammonium salt, prepared as described above with reference to FIG. 2B or FIG. 2C (Options 1, 2, or 3). In such embodiments, the imidization may be chemical imidization, and the method may be that generally described in FIG. 3.

Figure 3:
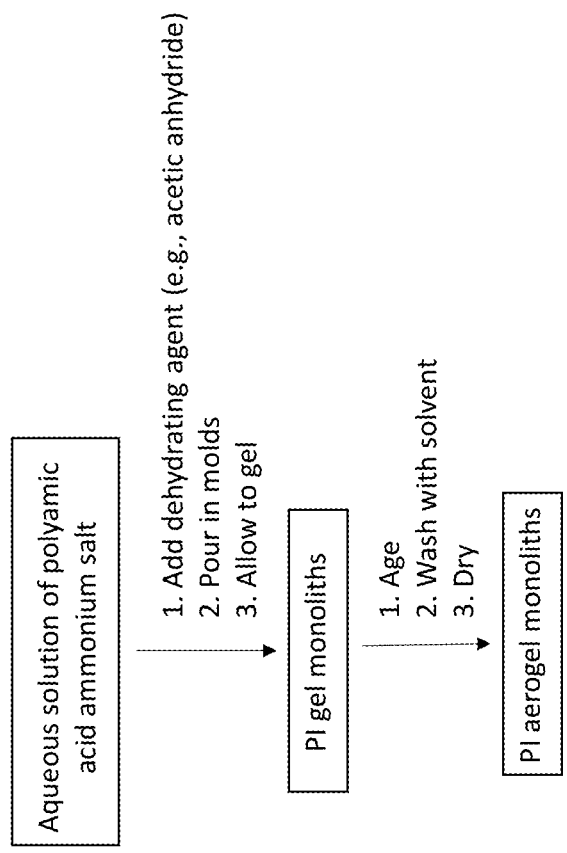
FIG. 3 is flow chart depicting a process for preparing polyimide aerogel monoliths according to a non-limiting embodiment of the disclosed method.

With reference to FIG. 3, imidizing the polyamic acid salt comprises adding a dehydrating agent to the aqueous solution of the polyamic acid salt to form a gelation mixture (a "sol"), pouring the gelation mixture into molds, and allowing the gelation mixture to gel. The dehydrating agent is added to initiate and drive imidization, forming the polyimide wet-gel from the polyamic acid ammonium salt. A non-limiting, generic reaction sequence is provided in Scheme 2. In some embodiments, the polyimide has a structure according to Formula V as illustrated in Scheme 2, wherein L, Z, and n are each as described herein above with respect to forming the polyamic acid ammonium salt of Formula IV.

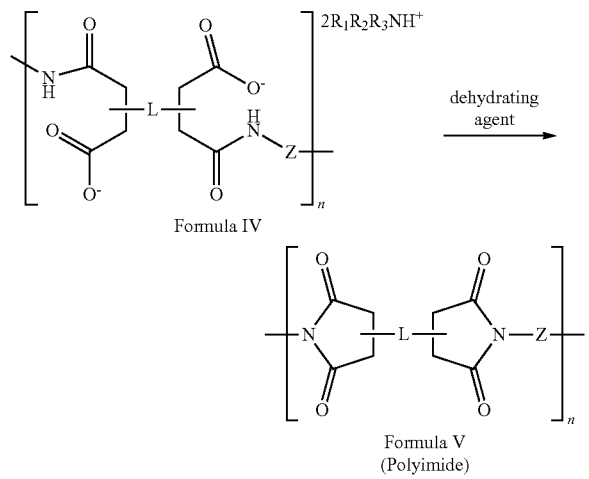

Scheme 2

Formula IV

Formula V
(Polyimide)

The structure of the dehydrating agent may vary, but is generally a reagent that is at least partially soluble in the reaction solution, reactive with the carboxylate groups of the ammonium salt, and effective in driving the imidization of the polyamic acid carboxyl and amide groups, while having minimal reactivity with the aqueous solution. One example of a class of suitable dehydrating agents is the carboxylic acid anhydrides, such as acetic anhydride, propionic anhydride, and the like. In some embodiments, the dehydrating agent is acetic anhydride. Surprisingly, according to the present disclosure, it has been found that addition of acetic anhydride to the aqueous solution of the ammonium salt resulted in rapid gelation of the polyimide without observing the intuitively expected substantial hydrolysis of the acetic anhydride with water. Any hydrolysis which did occur was not sufficient to compete with the function of the acetic anhydride in polyimide formation.

In some embodiments, the quantity of dehydrating agent may vary based on the quantity of tetracarboxylic acid dianhydride. For example, in some embodiments, the dehydrating agent is present in various molar ratios with the tetracarboxylic acid dianhydride. The molar ratio of the dehydrating agent to the tetracarboxylic acid dianhydride may vary according to desired reaction time, reagent structure, and desired material properties. In some embodiments, the molar ratio is from about 2 to about 10, such as from about 2, about 3, about 4, or about 5, to about 6, about 7, about 8, about 9, or about 10. In some embodiments, the ratio is from about 4 to about 5. In some embodiments, the ratio is 4.3.

The temperature at which the dehydration reaction is allowed to proceed may vary, but is generally less than about 50° C., such as from about 10 to about 50° C., or from about 15 to about 25° C.

With further reference to FIG. 3, the gelation mixture is poured into molds and the gelation mixture allowed to gel. Generally, the resulting wet-gel material is allowed to remain in the mold ("'cast'") for a period of time. The time required for complete gelation of the gelation mixture, forming the wet-gel, may vary. The period of time may vary based on many factors, such as the desirability of aging the material, but will generally be between a few hours and a few days.

The process of transitioning the gelation mixture into a wet-gel material can also include an aging step (also referred to as curing) prior to drying. Aging a wet-gel material after it reaches its gel point can further strengthen the gel framework. For example, in some embodiments, the framework may be strengthened during aging. The duration of gel aging can be adjusted to control various properties within the corresponding aerogel material. This aging procedure can be useful in preventing potential volume loss and shrinkage during liquid phase extraction of the wet-gel material. Aging can involve: maintaining the gel (prior to extraction) at a quiescent state for an extended period; maintaining the gel at elevated temperatures; or any combination thereof. The preferred temperatures for aging are usually between about 10° C. and about 200° C. Aging may also take place during solvent exchange, as described herein below. The aging of a wet-gel material may also be referred to as "'curing,'" and typically continues up to the liquid phase extraction of the wet-gel material.

The resulting wet-gel monolith may vary in size and shape. In some embodiments, the wet-gel monolith has a thickness from about 5 to about 25 mm. In some embodiments, the monolith is in the form of a film, such as a film having a thickness from about 50 microns to about 1 mm.

One of skill in the art will recognize that the polyimide wet-gels prepared according to this and other methods described herein, will have unreacted terminal amino groups on one end or on both ends of the individual polymer chains. The percent concentration of such amino groups in the polyimide wet-gel will vary in inverse proportion to the average number of repeat units (i.e., the molecular weight) present in the polyimide wet-gel. In some embodiments, the terminal amino groups may undergo reaction with the dehydrating agent to form, e.g., terminal acetamides. The relative concentration of such terminal amines or amides may be determined according to methods known in the art, including, but not limited to, nuclear magnetic resonance spectroscopy, such as solid state $^{15}$N-NMR.

In some embodiments, the water content in a polyimide wet-gel prepared as disclosed herein, prior to any solvent exchange or drying, is essentially the entire quantity of water initially utilized as the reaction solvent, not accounting for any evaporation, or water produced or destroyed in the various reactions which occur during the polyimide synthesis as described herein above. Accordingly, in some embodiments, the water content in the polyimide wet-gel varies between about 75% and about 83% by volume for formulations having a target density ($T_d$) of about 0.07 to about 0.10 g/cm$^3$.

With further reference to FIG. 3, following any aging, the resulting wet-gel material, may be demolded and washed or solvent exchanged in a suitable secondary solvent to replace the primary reaction solvent (i.e., water) present in the wet-gel. Such secondary solvents may be linear alcohols with 1 or more aliphatic carbon atoms, diols with 2 or more carbon atoms, or branched alcohols, cyclic alcohols, alicyclic alcohols, aromatic alcohols, polyols, ethers, ketones, cyclic ethers or their derivatives. In some embodiments, the secondary solvent is water, a C1 to C3 alcohol (e.g., methanol, ethanol, propanol, isopropanol), acetone, tetrahydrofuran, ethyl acetate, acetonitrile, supercritical fluid carbon dioxide ($CO_2$), or a combination thereof. In some embodiments, the secondary solvent is ethanol.

Once the wet-gel monoliths have been formed and processed, the liquid phase of the wet-gel monoliths can then be at least partially extracted from the wet-gel material using extraction methods, including processing and extraction techniques, to form an aerogel material (i.e., "'drying'"). Liquid phase extraction, among other factors, plays an important role in engineering the characteristics of aerogels, such as porosity and density, as well as related properties such as thermal conductivity. Generally, aerogels are obtained when a liquid phase is extracted from a wet-gel in a manner that causes low shrinkage to the porous network and framework of the wet-gel. Wet-gels can be dried using various techniques to provide aerogels or xerogels. In exemplary embodiments, wet-gel materials can be dried at ambient pressure, under vacuum (e.g., through freeze drying), at subcritical conditions, or at supercritical conditions to form the corresponding dry gel (e.g., an aerogel, such as a xerogel).

In some embodiment, it may be desirable to fine tune the surface area of the dry gel. If fine tuning of the surface area is desired, aerogels can be converted completely or partially to xerogels with various porosities. The high surface area of aerogels can be reduced by forcing some of the pores to collapse. This can be done, for example, by immersing the aerogels for a certain time in solvents such as ethanol or acetone or by exposing them to solvent vapor. The solvents are subsequently removed by drying at ambient pressure.

Aerogels are commonly formed by removing the liquid mobile phase from the wet-gel material at a temperature and pressure near or above the critical point of the liquid mobile phase. Once the critical point is reached (near critical) or surpassed (supercritical; i.e., pressure and temperature of the system is at or higher than the critical pressure and critical temperature, respectively) a new supercritical phase appears in the fluid that is distinct from the liquid or vapor phase. The solvent can then be removed without introducing a liquid-vapor interface, capillary forces, or any associated mass transfer limitations typically associated with receding liquid-vapor boundaries. Additionally, the supercritical phase is more miscible with organic solvents in general, thus having the capacity for better extraction. Co-solvents and solvent exchanges are also commonly used to optimize the supercritical fluid drying process.

If evaporation or extraction occurs below the supercritical point, capillary forces generated by liquid evaporation can cause shrinkage and pore collapse within the gel material. Maintaining the mobile phase near or above the critical pressure and temperature during the solvent extraction process reduces the negative effects of such capillary forces. In certain embodiments of the present disclosure, the use of near-critical conditions just below the critical point of the solvent system may allow production of aerogels or compositions with sufficiently low shrinkage, thus producing a commercially viable end-product.

Wet-gels can be dried using various techniques to provide aerogels. In example embodiments, wet-gel materials can be dried at ambient pressure, at subcritical conditions, or at supercritical conditions.

Both room temperature and high temperature processes can be used to dry gel materials at ambient pressure. In some embodiments, a slow ambient pressure drying process can be used in which the wet-gel is exposed to air in an open container for a period of time sufficient to remove solvent, e.g., for a period of time in the range of hours to weeks, depending on the solvent, the quantity of wet-gel, the exposed surface area, the size of the wet-gel, and the like.

In another embodiment, the wet-gel material is dried by heating. For example, the wet-gel material can be heated in a convection oven for a period of time to evaporate most of the solvent (e.g., ethanol). After partially drying, the gel can be left at ambient temperature to dry completely for a period of time, e.g., from hours to days. This method of drying produces xerogels.

In some embodiments, the wet-gel material is dried by freeze drying. By "'freeze drying'" or "'lyophilizing'" is meant a low temperature process for removal of solvent that involves freezing a material (e.g., the wet-gel material), lowering the pressure, and then removing the frozen solvent by sublimation. As water represents an ideal solvent for removal by freeze drying, and water is the solvent in the method as disclosed herein, freeze drying is particularly suited for aerogel formation from the disclosed polyimide wet-gel materials. This method of drying produces cryogels, which may closely resemble aerogels.

Both supercritical and sub-critical drying can be used to dry wet-gel materials. In some embodiments, the wet-gel material is dried under subcritical or supercritical conditions. In an example embodiment of supercritical drying, the gel material can be placed into a high-pressure vessel for extraction of solvent with supercritical $CO_2$. After removal of the solvent, e.g., ethanol, the vessel can be held above the critical point of $CO_2$ for a period of time, e.g., about 30 minutes. Following supercritical drying, the vessel is depressurized to atmospheric pressure. Generally, aerogels are obtained by this process.

In an example embodiment of subcritical drying, the gel material is dried using liquid $CO_2$ at a pressure in the range of about 800 psi to about 1200 psi at room temperature. This operation is quicker than supercritical drying; for example, the solvent (e.g., ethanol) can be extracted in about 15 minutes. Generally, aerogels are obtained by this process.

Several additional aerogel extraction techniques are known in the art, including a range of different approaches in the use of supercritical fluids in drying aerogels, as well as ambient drying techniques. For example, Kistler (J. Phys. Chem. (1932) 36: 52-64) describes a simple supercritical extraction process where the gel solvent is maintained above its critical pressure and temperature, thereby reducing evaporative capillary forces and maintaining the structural integrity of the gel network. U.S. Pat. No. 4,610,863 describes an extraction process where the gel solvent is exchanged with liquid carbon dioxide and subsequently extracted at conditions where carbon dioxide is in a supercritical state. U.S. Pat. No. 6,670,402 teaches extracting a liquid phase from a gel via rapid solvent exchange by injecting supercritical (rather than liquid) carbon dioxide into an extractor that has been pre-heated and pre-pressurized to substantially supercritical conditions or above, thereby producing aerogels. U.S. Pat. No. 5,962,539 describes a process for obtaining an aerogel from a polymeric material that is in the form of a sol-gel in an organic solvent, by exchanging the organic solvent for a fluid having a critical temperature below a temperature of polymer decomposition, and supercritically extracting the fluid from the sol-gel. U.S. Pat. No. 6,315,971 discloses a process for producing gel compositions comprising: drying a wet gel comprising gel solids and a drying agent to remove the drying agent under drying conditions sufficient to reduce shrinkage of the gel during drying. U.S. Pat. No. 5,420,168 describes a process whereby resorcinol/formaldehyde aerogels can be manufactured using a simple air-drying procedure. U.S. Pat. No. 5,565,142 describes drying techniques in which the gel surface is modified to be stronger and more hydrophobic, such that the gel framework and pores can resist collapse during ambient drying or subcritical extraction. Other examples of extracting a liquid phase from aerogel materials can be found in U.S. Pat. Nos. 5,275,796 and 5,395,805.

In some embodiments, extracting the liquid phase from the wet-gel uses supercritical conditions of carbon dioxide, including, for example: first substantially exchanging the primary solvent present in the pore network of the gel with liquid carbon dioxide; and then heating the wet gel (typically in an autoclave) beyond the critical temperature of carbon dioxide (about 31.06° C.) and increasing the pressure of the system to a pressure greater than the critical pressure of carbon dioxide (about 1070 psig). The pressure around the gel material can be slightly fluctuated to facilitate removal of the supercritical carbon dioxide fluid from the gel. Carbon dioxide can be recirculated through the extraction system to facilitate the continual removal of the primary solvent from the wet gel. Finally, the temperature and pressure are slowly returned to ambient conditions to produce a dry aerogel material. Carbon dioxide can also be pre-processed into a supercritical state prior to being injected into an extraction chamber. In other embodiments, extraction can be performed using any suitable mechanism, for example altering the pressures, timings, and solvent discussed above.

Figure 4:
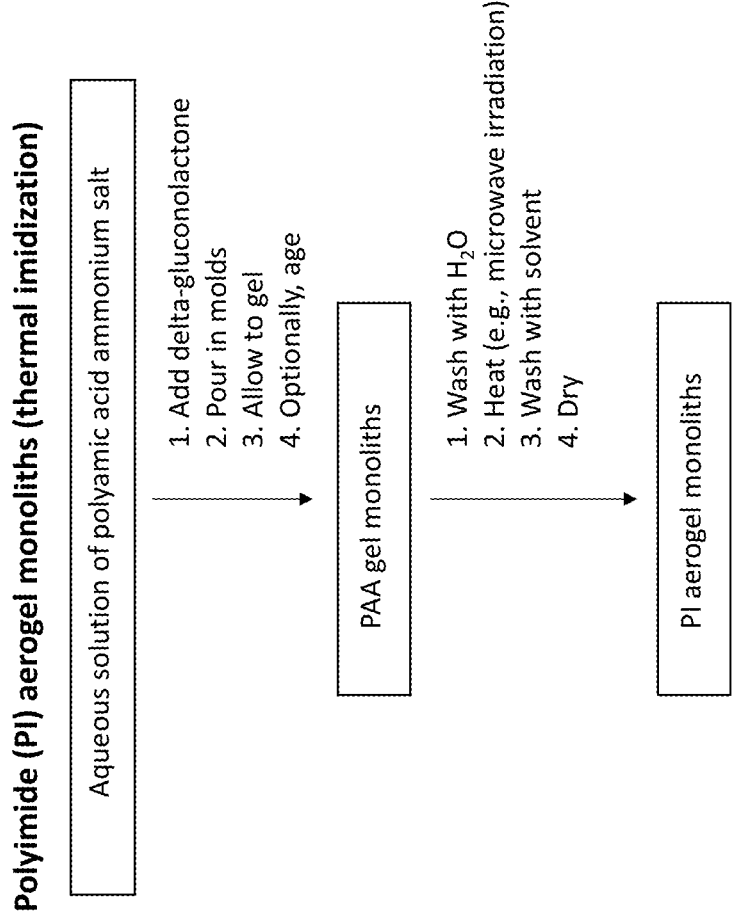
FIG. 4 is flow chart depicting another process for preparing polyimide aerogel monoliths according to a non-limiting embodiment of the disclosed method.

B. Monolithic Polyimide Aerogels from an Aqueous Solution of a Salt of a Polyamic Acid by Thermal Imidization In some embodiments, the imidization may be thermal imidization, and the method may be that generally described in FIG. 4. With reference to FIG. 4, in this embodiment, imidizing the polyamic acid ammonium salt comprises:
  adding delta-gluconolactone to the aqueous solution of the polyamic acid salt to form a gelation mixture;
  pouring the gelation mixture into a mold and allowing the gelation mixture to gel;
  washing the resulting polyamic acid gel with water; and
  thermally imidizing the polyamic acid gel to form the polyimide gel, the thermally imidizing comprising exposing the polyamic acid gel to microwave frequency irradiation.

In an aqueous environment, DGL reacts slowly with water to form delta-gluconic acid (DGA; Eq. 1), which serves to at least begin the acidification process for polyamic acid gelation.

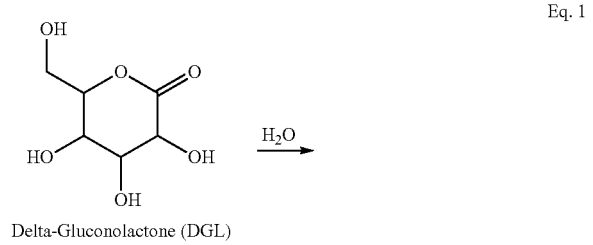

Delta-Gluconolactone (DGL)

Delta-Gluconic Acid (DGA)

Eq. 1

The gelation mixture is poured into molds and the gelation mixture allowed to gel. Upon acidification, the polyamic acid becomes insoluble in the aqueous environment, forming a polyamic acid wet-gel. In some embodiments, the polyamic acid ammonium salt has a structure according to Formula IV, and the polyamic acid gel has a structure according to Formula VI (Scheme 3), wherein L, Z, and n are each as described herein above, and the acid is DGA.

Scheme 3

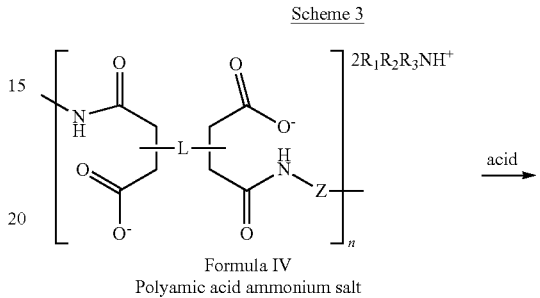

Formula IV
Polyamic acid ammonium salt

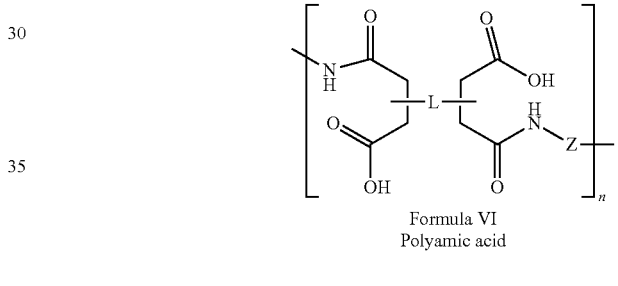

Formula VI
Polyamic acid

The time required for complete gelation of the gel-forming solution (sol; e.g. polyamic acid), forming the wet-gel, may vary. Generally, gelation occurs in about 1.5 hours or less. Generally, the wet-gel material is allowed to remain in the mold ("cast") for a period of time. The period of time may vary based on many factors, such as the desirability of aging the material as described herein above with respect to chemical imidization.

With reference to FIG. 4, the resulting polyamic acid gel monolith is then washed with water. The washing is performed for a sufficient time and with a sufficient amount of water to remove any water-soluble by products, such as ammonium salts, DGA or DGL, and other byproducts from formation of the polyamic acid ammonium salt solution.

With continued reference to FIG. 4, following formation and washing of the polyamic acid wet-gel monolith, thermal treatment (e.g., microwave exposure) is utilized to dehydrate (i.e., imidize) the polyamic acid gel to form the corresponding polyimide gel. A non-limiting, generic reaction sequence is provided in Scheme 4. In some embodiments, the polyimide has a structure according to Formula V as illustrated in Scheme 4, wherein L, Z, and n are each as described herein above.

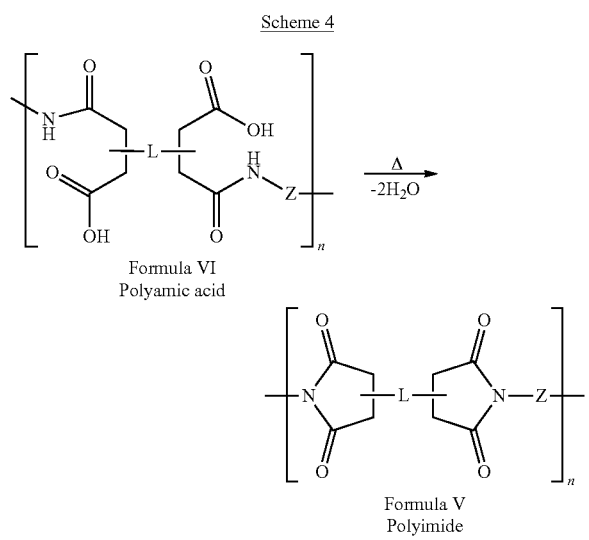

Scheme 4

Formula VI
Polyamic acid

Formula V
Polyimide

Irradiation of the wet-gel material with microwave frequency energy is one particularly suitable thermal treatment. A microwave is a low energy electromagnetic wave with a wavelength in the range of 0.001-0.3 meters and a frequency in the range of 1,000-300,000 MHz. Typical microwave devices operate with microwaves at a frequency of 2450 MHz. The electric field component of the microwaves is primarily responsible for generation of heat, interacting with molecules via dipolar rotation and ionic conduction. In dipolar rotation, a molecule rotates back and forth constantly, attempting to align its dipole with the ever-oscillating electric field; the friction between each rotating molecule results in heat generation. In ionic conduction, a free ion or ionic species moves translationally through space, attempting to align with the changing electric field. As with dipolar rotation, the friction between these moving species results in heat generation. In both cases, the more polar and/or ionic the molecular species, the more efficient the rate of heat generation. In comparison to conventional heating, which relies on slow thermal conduction, microwave heating allows rapid and efficient energy transfer. Accordingly, microwave heating is particularly suitable for conducting the present thermal imidization reactions. Generally, the microwave frequency irradiation is at a power and for a length of time sufficient to convert a substantial portion of the amide and carboxyl groups of the polyamic acid to imide groups. As used herein in the context of converting the amide and carboxyl groups to imide groups, "'substantial portion'" means that greater than 90%, such as 95%, 99%, or 99.9%, or 99.99%, or even 100%, of the amide and carboxyl groups are converted to imide groups.

With continued reference to FIG. 4, following the heating and formation of the polyimide gel monoliths, the polyimide gel monoliths are washed (solvent exchanged) and dried as described herein above with respect to chemically imidized polyimide monoliths, to form the polyimide aerogel monoliths.

C. Polyimide Aerogel Beads from an Aqueous Solution of an Ammonium Salt of a Polyamic Acid by Chemical Imidization (Droplet Method in Aqueous Solution)

In some embodiments, the polyimide gel and corresponding aerogel are in bead form, and the salt if the polyamic acid in the aqueous solution is an ammonium salt, prepared as described above with reference to FIG. 2B or FIG. 2C (Options 1, 2, or 3). In such embodiments, the imidization may be chemical imidization, and the method may be that generally described in FIG. 5. As used herein, the term "'beads'" or "'bead form'" is meant to include discrete small units or pieces having a generally spherical shape. In some embodiments, the gel beads are substantially spherical. The beads are generally uniform in composition, such that each bead in a plurality of beads comprises the same polyimide in approximately the same amounts within normal variations expected in preparing such beads. The size of the beads may vary according to the desired properties and method of preparing.

Figure 5:
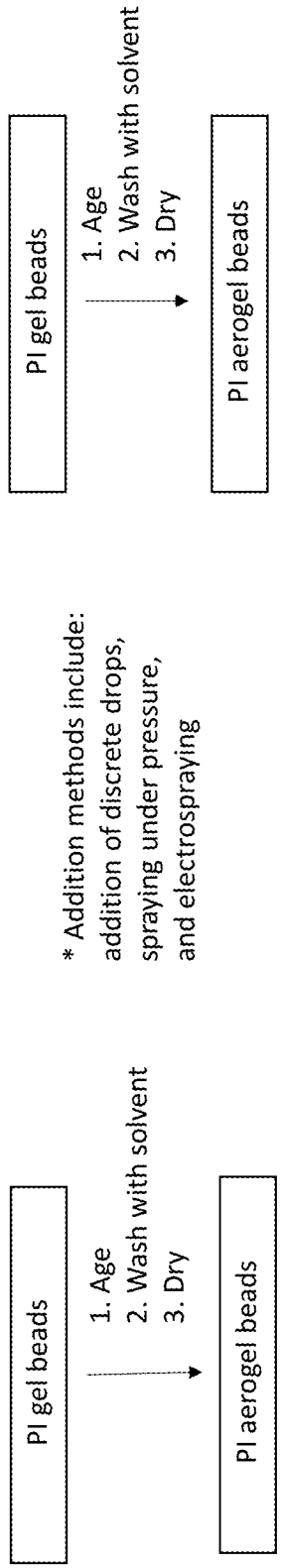
FIG. 5 is flow chart depicting a process for preparing polyimide aerogel beads according to a non-limiting embodiment of the disclosed method.

With reference to FIG. 5, the polyamic acid ammonium salt is imidized chemically by adding a dehydrating agent to the aqueous solution of the polyamic acid ammonium salt, forming a gelation mixture as described herein above with respect to FIG. 3. In some embodiments, the dehydrating agent is acetic anhydride. However, in this embodiment, instead of pouring the gelation mixture into molds to form monoliths, the method comprises adding the gelation mixture, prior to gelation, to a solution of a water-soluble acid in water, or adding the gelation mixture to a water-immiscible solvent, optionally comprising an acid, to form polyimide gel beads. Generally, the sol is added rapidly in order to complete the dropwise addition before gelation of the sol occurs. The adding can be performed by a number of different techniques, including dripping the gelation mixture into the solution of the water-soluble acid in water, spraying the gelation mixture under pressure through one or more nozzles into the solution of the water-soluble acid in water, or electrospraying the gelation mixture through one or more needles into the solution of the water-soluble acid in water.

With reference to FIG. 5, in some embodiments, the method comprises adding the gelation mixture to a solution of a water-soluble acid in water. The water-soluble acid may vary, and may be, for example, an organic acid or a mineral acid. In some embodiments, the acid is a mineral acid, such as hydrochloric, sulfuric, or phosphoric acid. In some embodiments, the acid is an organic acid. The organic acid may vary, but is typically a lower carboxylic acid, including, but not limited to, formic, acetic, or propionic acid. In some embodiments, the acid is acetic acid. The quantity of acid present may vary, but is typically from about 10 to about 20% by volume in the water. In some embodiments, the solution comprises acetic acid in an amount of about 10%, or an amount of about 20% by volume.

The size of the polyimide gel beads may vary based on the size of the drops added to the solution of water-soluble acid in water. In some embodiments, the gelation mixture is added as discrete droplets (e.g., dripped in from a pipet or other suitable drop-forming device, either manually or in an automated fashion). The polyimide gel beads produced from such droplets tend to be relatively large in diameter, e.g., having a diameter in a range from about 0.5 to about 10 millimeters, for example from about 0.5, about 1, about 2, about 3, about 4, or about 5, to about 6, about 7, about 8, about 9, or about 10 mm. In some embodiments, the beads have a size ranging from about 0.5 to about 5 mm in diameter.

With reference to FIG. 5, in some embodiments, the gelation mixture is added by spraying, producing relatively smaller polyimide gel beads (e.g., on the order of microns). The spraying may be conducted using a variety of aerosol formation techniques known in the art, such as pressurized gas assisted aerosol formation or electrospraying. In particular embodiments, the spraying is electrospraying. Generally, electrospraying is carried out by pumping the solution comprising the gelation mixture through one or more needles into a bath of the solution of the water-soluble acid in water while applying a voltage differential of about 5 to 60 kV between the bath and the one or more needles. This method results in very fine droplets of the gelation mixture being introduced to the solution of the water-soluble acid in water. Upon contact, the micron-size droplets react with the acid to form a polyamic acid skin around the droplet, which gradually gels to form the polyimide beads. Without wishing to be bound by theory, it is believed that the water-soluble acid protonates the carboxylate groups of the polyamic acid salt, forming an initial skin, which is penetrated by the dehydrating agent, imidizing the salt of the polyamic acid within the droplet, forming a wet-gel polyimide bead. In some embodiments, the beads have a size ranging from about 5 to about 200 microns in diameter, for example from about 5, about 10, about 20, about 30, about 40, or about 50, to about 60, about 70, about 80, about 90, about 100, or about 200 microns in diameter.

With continued reference to FIG. 5, following the formation of the polyimide gel beads by dripping or spraying, the polyimide gel beads are aged, washed (solvent exchanged), and dried as described herein above with respect to chemically imidized polyimide monoliths, to form the corresponding polyimide aerogel beads.

D. Polyimide Aerogel Beads from an Aqueous Solution of an Ammonium Salt of a Polyamic Acid by Chemical Imidization (Droplet Method; Water-Immiscible Solvent)

With continued reference to FIG. 5, in another embodiment, a gelation mixture as described herein above with respect to the aqueous droplet method. However, in this embodiment, instead of adding the gelation mixture as drops into the solution of the water-soluble acid in water, the method comprises adding the gelation mixture to a water-immiscible solvent, optionally containing an acid, to form polyimide gel beads. Generally, the sol is added rapidly in order to complete the dropwise addition before gelation of the sol occurs.

The adding can be performed by a number of different techniques, including dripping the gelation mixture into the water-immiscible solvent, spraying the gelation mixture under pressure through one or more nozzles into the water-immiscible solvent, or electrospraying the gelation mixture through one or more needles into the water-immiscible solvent, each as described herein above.

The water-immiscible solvent may vary. Suitable solvents include, but are not limited to, oils such as silicone oil or mineral oil, aliphatic hydrocarbons, aromatic hydrocarbons, and chlorinated hydrocarbons. In some embodiments, the solvent is a five to twelve carbon atom (C5-C12) aliphatic or aromatic hydrocarbon. In some embodiments, the solvent is hexane. In particular embodiments, the solvent is mineral spirits.

The optional acid may vary, but is typically a lower carboxylic acid, including, but not limited to, formic, acetic, or propionic acid. In some embodiments, the acid is acetic acid. The quantity of acid present may vary, but when present, is typically from about 10 to about 20% by volume of the water-immiscible solvent. Without wishing to be bound by theory, it is believed that the presence of acid during the gelation may form an outer surface of the bead having carboxyl groups which do not react to form imide groups, and the presence of such acid groups on the outer surface may avoid coalescence of the beads.

In some embodiments, the gelation mixture is added as discrete droplets (e.g., dripped in from a pipet or other suitable drop-forming device, either manually or in an automated fashion). The polyimide gel beads produced from such droplets tend to be relatively large in diameter, e.g., having a diameter in a range from about 0.5 to about 10 millimeters, for example from about 0.5, about 1, about 2, about 3, about 4, or about 5, to about 6, about 7, about 8, about 9, or about 10 mm. In some embodiments, the beads have a size ranging from about 0.5 to about 5 mm in diameter.

In some embodiments, the gelation mixture is added by spraying, producing relatively smaller polyimide gel beads (e.g., on the order of microns). The spraying may be conducted using a variety of aerosol formation techniques known in the art, such as pressurized gas assisted aerosol formation or electrospraying. In particular embodiments, the spraying is electrospraying. Generally, electrospraying is carried out by pumping the solution comprising the gelation mixture through one or more needles into a bath of the solution of the water-soluble acid in water while applying a voltage differential of about 5 to 60 kV between the bath and the one or more needles. This method results in very fine droplets of the gelation mixture being introduced to the solution of the water-soluble acid in water. Upon contact, the micron-size droplets react with the acid to form a polyamic acid skin around the droplet, which gradually gels to form the polyimide beads. Without wishing to be bound by theory, it is believed that the water-soluble acid protonates the carboxylate groups of the polyamic acid salt, forming an initial skin, which is penetrated by the dehydrating agent, imidizing the salt of the polyamic acid within the droplet, forming a wet-gel polyimide bead. In some embodiments, the beads have a size ranging from about 5 to about 200 microns in diameter, for example from about 5, about 10, about 20, about 30, about 40, or about 50, to about 60, about 70, about 80, about 90, about 100, or about 200 microns in diameter.

With continued reference to FIG. 5, following the formation of the polyimide gel beads by dripping or spraying, the polyimide gel beads are aged, washed (solvent exchanged), and dried as described herein above with respect to chemically imidized polyimide monoliths, to form the corresponding polyimide aerogel beads.

E. Polyimide Aerogel Beads from an Aqueous Solution of an Ammonium Salt of a Polyamic Acid by Chemical Imidization (Emulsion Method 1)

Figure 6:
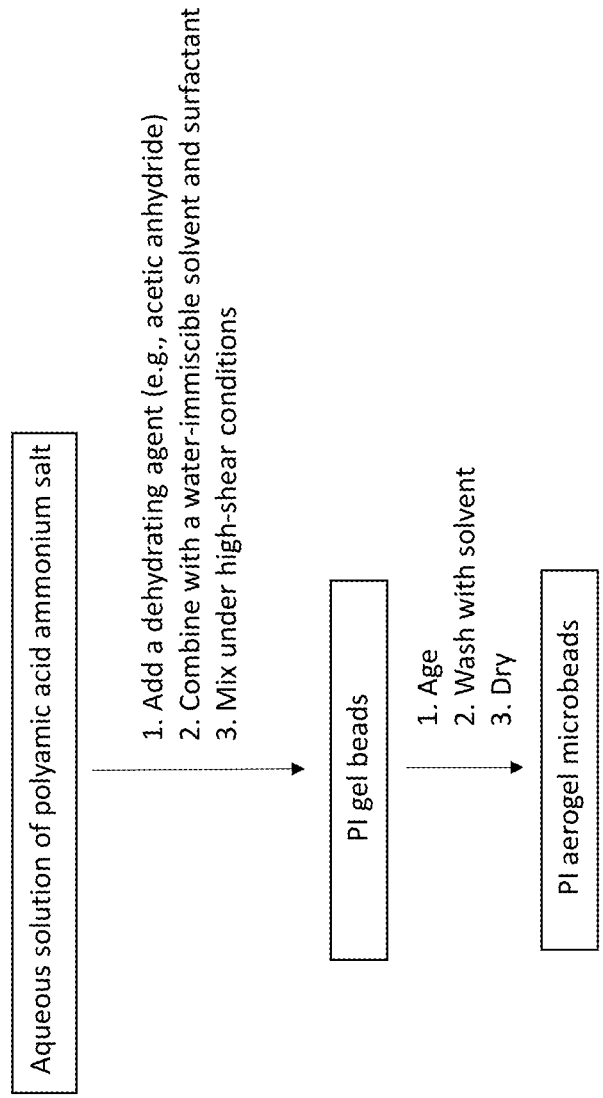
FIG. 6 is flow chart depicting another process for preparing polyimide aerogel microbeads according to a non-limiting embodiment of the disclosed method.

In some embodiments, the polyimide gel and corresponding aerogel are in bead form, and the salt if the polyamic acid in the aqueous solution is an ammonium salt, prepared as described above with reference to FIG. 2B or FIG. 2C (Options 1, 2, or 3). In such embodiments, the imidization may be chemical imidization, and the method may be that generally described in FIG. 6. With reference to FIG. 6, imidizing the polyamic acid salt comprises adding a dehydrating agent to the aqueous solution of the polyamic acid salt to form a gelation mixture as described herein above. The method further comprises combining the gelation mixture with a water-immiscible solvent comprising a surfactant; and mixing the resulting mixture under high-shear conditions.

Mixing the biphasic mixture under high-shear conditions generally provides micron-sized polyimide beads. In some embodiments, the water-immiscible solvent and surfactant are added to the aqueous gelation mixture. In some embodiments, the aqueous gelation mixture is added to the water-immiscible solvent and surfactant.

The water-immiscible solvent may vary. Suitable solvents include, but are not limited to, oils such as silicone oil or mineral oil, aliphatic hydrocarbons, aromatic hydrocarbons, and chlorinated hydrocarbons. In some embodiments, the solvent is a C5-C12 aliphatic or aromatic hydrocarbon. In some embodiments, the solvent is hexane. In particular embodiments, the solvent is mineral spirits.

The surfactant may vary. As used herein, the term "'surfactant'" refers to a substance which aids in the formation and stabilization of emulsions by promoting dispersion of hydrophobic and hydrophilic (e.g., oil and water) components. Suitable surfactants are generally non-ionic, and include, but are not limited to, polyethylene glycol esters of fatty acids, propylene glycol esters of fatty acids, polysorbates, polyglycerol esters of fatty acids, sorbitan esters of fatty acid, and the like. Suitable surfactants have an HLB number ranging from about 0 to about 20. In some embodiments, the HLB number is from about 3.5 to about 6. As will be understood by one skilled in the art, HLB is the hydrophilic-lipophilic balance of an emulsifying agent or surfactant is a measure of the degree to which it is hydrophilic or lipophilic. The HLB value may be determined by calculating values for the different regions of the molecule, as described by Griffin in Griffin, William C. (1949), "'Classification of Surface-Active Agents by 'HLB'"" (PDF), Journal of the Society of Cosmetic Chemists, 1 (5): 311-26 and Griffin, William C. (1954), "'Calculation of HLB Values of Non-Ionic Surfactants'" (PDF), Journal of the Society of Cosmetic Chemists, 5 (4): 249-56, and by Davies in Davies JT (1957), "'A quantitative kinetic theory of emulsion type, I. Physical chemistry of the emulsifying agent'" (PDF), Gas/Liquid and Liquid/Liquid Interface, Proceedings of the International Congress of Surface Activity, pp. 426-38. HLB value may be determined in accordance with the industry standard text book, namely "'The HLB SYSTEM, a time-saving guide to emulsifier selection'" ICI Americas Inc., Published 1976 and Revised, March, 1980.

Examples of suitable surfactants generally include, but are not limited to: polyoxyethylene-sorbitan-fatty acid esters; e.g., mono- and tri-lauryl, palmityl, stearyl and oleyl esters; e.g., products of the type known as polysorbates and commercially available under the trade name Tween®; polyoxyethylene fatty acid esters, e.g., polyoxyethylene stearic acid esters of the type known and commercially available under the trade name Myrj®; polyoxyethylene ethers, such as those available under the trade name Brij®; polyoxyethylene castor oil derivatives, e.g., products of the type known and commercially available as Cremophors®, sorbitan fatty acid esters, such as the type known and commercially available under the name Span® (e.g., Span 80); polyoxyethylene-polyoxypropylene co-polymers, e.g., products of the type known and commercially available as Pluronic® or Poloxamer®; glycerol triacetate; and monoglycerides and acetylated monoglycerides, e.g., glycerol monodicocoate (Imwitor® 928), glycerol monocaprylate (Imwitor® 308), and mono- and di-acetylated monoglycerides. In some embodiments, the one or surfactants comprise a commercially available polymeric surfactant of the type known under the trade name Hypermer® (Croda Industrial Chemicals; Edison, NJ, USA).

In some embodiments, the one or more surfactants comprise Tween 20, Tween 80, Span 20, Span 40, Span 60, Span 80, or a combination thereof. In some embodiments, the surfactant is Span 20, Tween 80, or a mixture thereof. In some embodiments, the one or more surfactants is Hypermer® B246SF. In some embodiments, the one or more surfactants is Hypermer® A70.

The concentration of the surfactant may vary. In some embodiments, the surfactant, or a mixture of surfactants, is present in the water-immiscible solvent in amount by weight from about 1 to about 5%, such as about 1, about 2, about 3, about 4, or about 5%.

Spherical droplets of the aqueous sol form in the water-immiscible solvent by virtue of the interface tension. The droplets gel and strengthen during the time in the water-immiscible solvent, e.g., mineral spirits. Agitation of the mixture is typically used to form an emulsion and/or to prevent the droplets from agglomerating. For example, the mixture of aqueous gelation mixture and water-immiscible solvent can be agitated (e.g., stirred) to form an emulsion, which may be stable or temporary. Exemplary embodiments of agitation to provide gel beads from the sol mixture and water-immiscible solvent include magnetic stirring (up to about 600 rpm), mechanical mixing (up to about 1500 rpm) and homogenization (i.e., mixing at up to about 9000 rpm). In some embodiments, mixing is performed under high-shear conditions e.g., using a high-shear mixer or homogenizer). Fluid undergoes shear when one area of fluid travels at a different velocity relative to an adjacent area. A high-shear mixer (homogenizer) uses a rotating impeller or high-speed rotor, or a series of such impellers or inline rotors, to "work" the fluid, creating flow and shear. The tip velocity (i.e., the speed encountered by the fluid at the outside diameter of the rotor), will be higher than the velocity encountered at the center of the rotor, with this velocity difference creating shear. Generally, higher shear results in smaller beads.

In some embodiments, an additional solvent, e.g., water or ethanol, can be added after gelation to produce smaller beads and reduce agglomeration of large clusters of beads.

The size of the wet-gel beads may vary. In some embodiments, the wet-gel beads have a size ranging from about 5 to about 500 microns in diameter, for example from about 5, about 10, about 20, about 30, about 40, or about 50, to about 60, about 70, about 80, about 90, about 100, about 200, about 300, about 400, or about 500 microns in diameter.

With continued reference to FIG. 6, following the formation of the polyimide gel beads, the polyimide gel beads are aged, washed (solvent exchanged), and dried as described herein above with respect to chemically imidized polyimide beads from the droplet methods, to form the corresponding polyimide aerogel beads.

F. Polyimide Aerogel Beads from an Aqueous Solution of an Ammonium Salt of a Polyamic Acid by Chemical Imidization (Emulsion Method 2)

Figure 7:
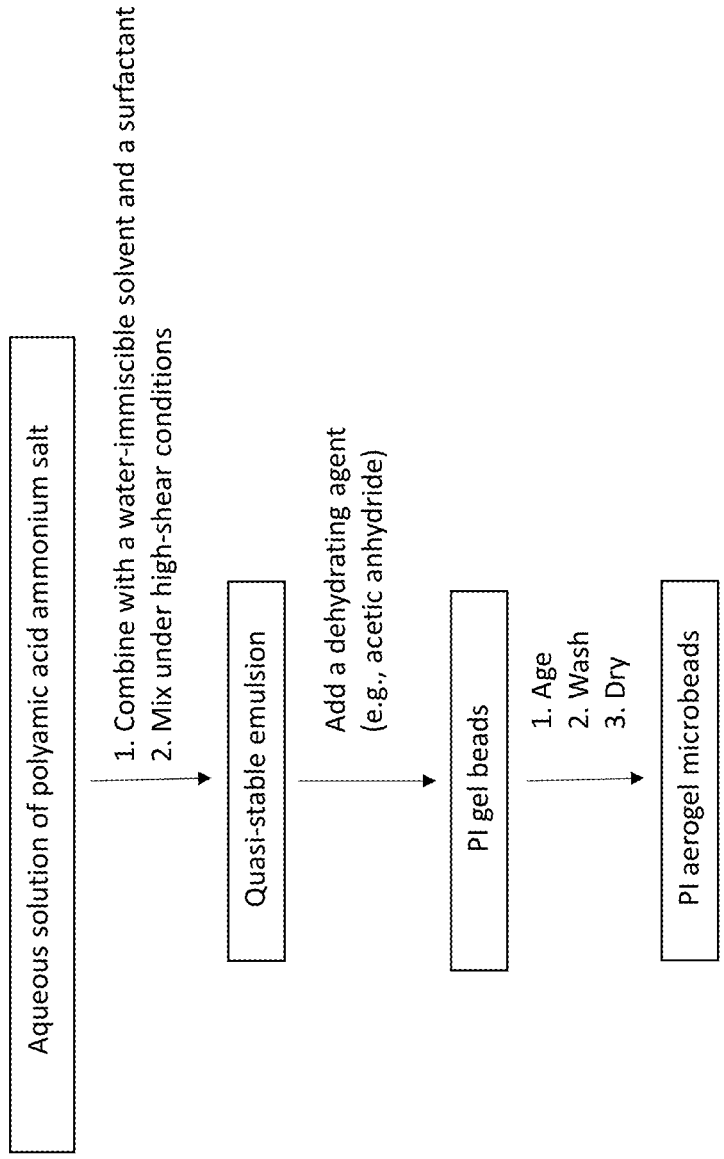
FIG. 7 is flow chart depicting another process for preparing polyimide aerogel microbeads according to a non-limiting embodiment of the disclosed method.

In some embodiments, the polyimide gel and corresponding aerogel are in bead form, and the salt if the polyamic acid in the aqueous solution is an ammonium salt, prepared as described above with reference to FIG. 2B or FIG. 2C (Options 1, 2, or 3). In such embodiments, the imidization may be chemical imidization, and the method may be that generally described in FIG. 7. With reference to FIG. 7, the method comprises: combining the gelation mixture with a water-immiscible solvent comprising a surfactant; mixing the resulting mixture under high-shear conditions to form a quasi-stable emulsion; and adding a dehydrating agent to the quasi-stable emulsion. The method differs from that of emulsion method 1 described herein above only in that a quasi-stable emulsion of the aqueous polyamic acid ammonium salt and the water-immiscible solvent is formed first, followed by adding the dehydrating agent.

Each of the surfactant, the water-immiscible solvent, and the mixing conditions are as described above with respect to emulsion method 1. In some embodiments, the water-immiscible organic solvent is a C5-C12 hydrocarbon. In some embodiments, the water-immiscible organic solvent is mineral spirits. In some embodiments, the dehydrating agent is acetic anhydride.

Figure 8:
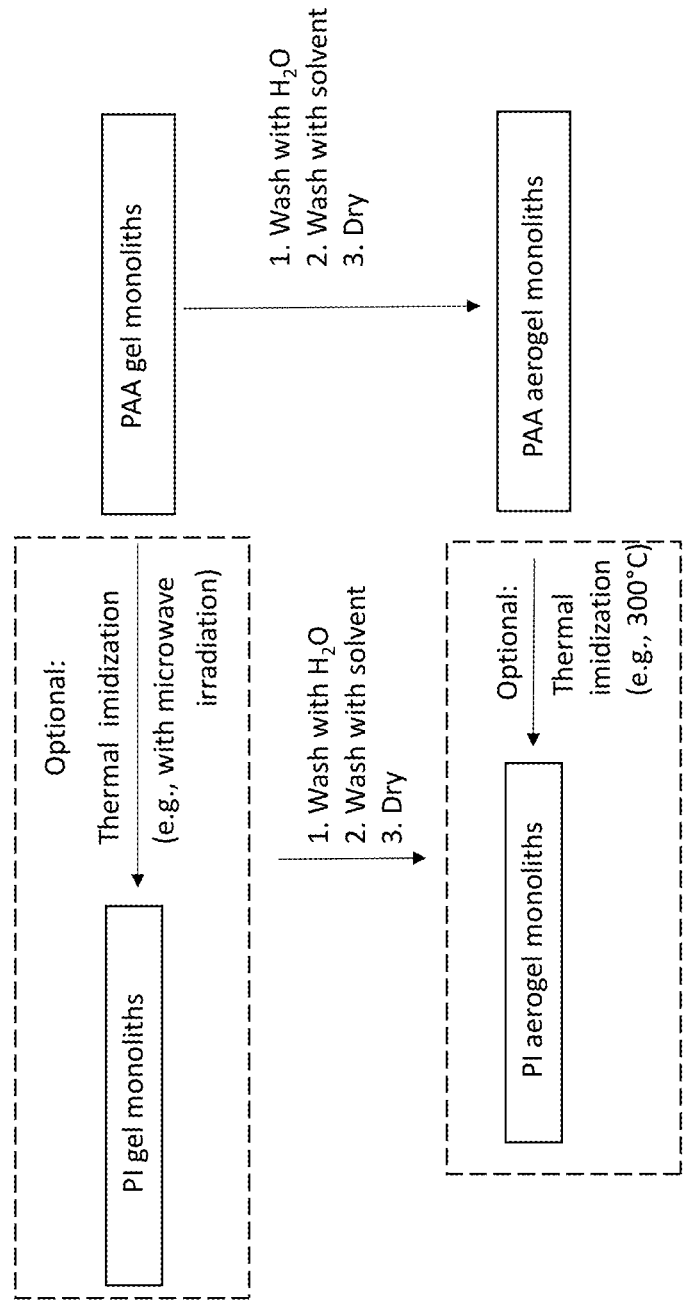
FIG. 8 is flow chart depicting a process for preparing polyamic acid aerogel monoliths according to a non-limiting embodiment of the disclosed method.

II. Monolithic Polyamic Acid and Polyimide Aerogels from an Aqueous Solution of a Salt of a Polyamic Acid In another aspect is provided a method of forming a polyamic acid aerogel in monolithic form. The method generally comprises: providing an aqueous solution of a polyamic acid salt; acidifying the polyamic acid salt solution to form a polyamic acid gel; and drying the polyamic acid gel to form the polyamic acid aerogel. In some embodiments, acidifying the polyamic acid salt comprises adding delta-gluconolactone to the aqueous solution of the polyamic acid salt to form a gelation mixture and pouring the gelation mixture into a mold and allowing the gelation mixture to gel, each as described with respect to FIG. 4. Accordingly, the polyamic acid gel monolith as described with reference to FIG. 4 may be the starting point for providing the polyamic acid aerogel monolith. In some embodiments, the polyamic acid aerogel monolith may be prepared from the corresponding polyamic acid gel monolith according to FIG. 8. With reference to FIG. 8, the polyamic acid gel monolith is washed with water, solvent exchanged, and dried, each as described herein above, to provide the polyamic acid aerogel monolith.

In some embodiments, the method further comprises preparing a polyimide gel monolith from the polyamic acid gel monolith. With reference to FIG. 8, thermal imidization (e.g., by subjecting the polyamic acid gel monolith to a temperature of about 300° C. for a period of time) converts the polyamic acid gel monolith to a corresponding polyimide gel monolith.

In some embodiments, the method further comprises preparing a polyimide aerogel monolith from the polyamic acid aerogel monolith. With reference to FIG. 8, thermal imidization (e.g., by subjecting the polyamic acid gel monolith to a temperature of about 300° C. for a period of time) converts the polyamic acid aerogel monolith to a corresponding polyimide aerogel monolith.

In some embodiments, the method further comprises preparing a polyimide aerogel monolith from the polyimide aerogel monolith. With further reference to FIG. 8, the polyimide gel monolith is washed with water, solvent exchanged, and dried, each as described herein above, to provide the polyimide aerogel monolith.

Figure 9A:
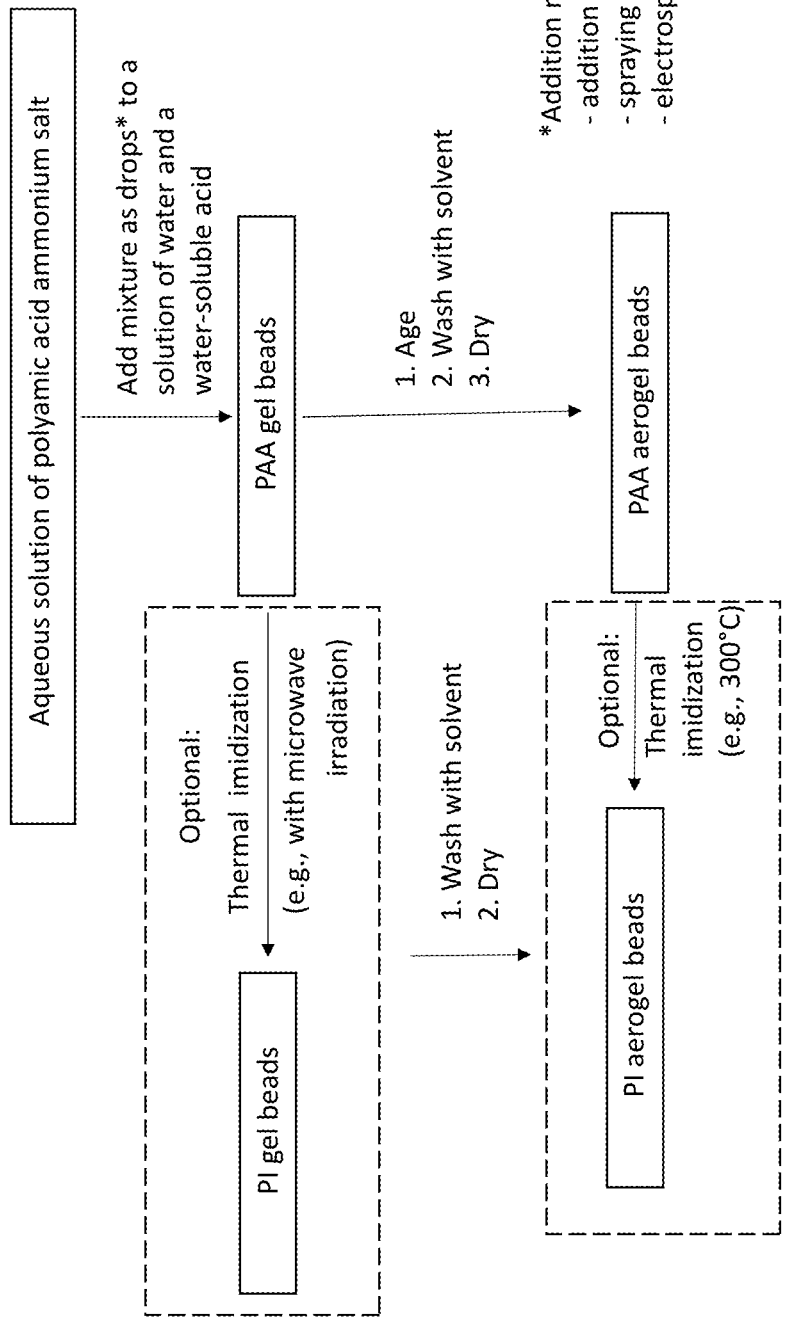
FIG. 9A is flow chart depicting a process for preparing polyamic acid aerogel beads according to a non-limiting embodiment of the disclosed method.
Figure 9B:
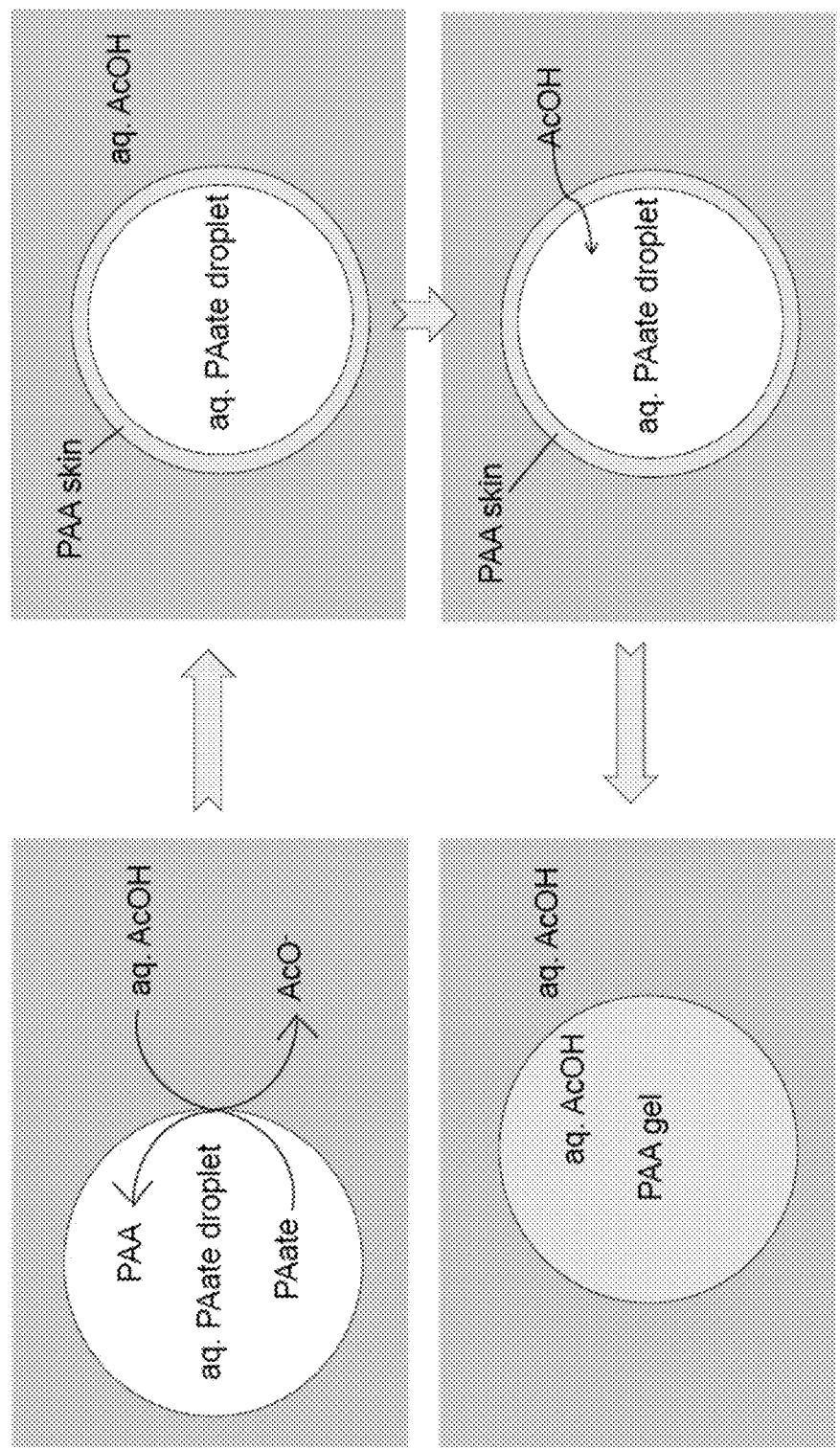
FIG. 9B is a cartoon illustration depicting formation of a polyamic acid wet-gel bead according to a non-limiting embodiment of the disclosed method.

III. Polyamic Acid and Polyimide Aerogel Beads from an Aqueous Solution of a Salt of a Polyamic Acid A. Droplet Method In another aspect is provided a method of forming a polyamic acid aerogel in bead form. In some embodiments, the method may be that generally described in FIG. 9A. With reference to FIG. 9A, the method generally comprises: providing an aqueous solution of a polyamic acid salt; acidifying the polyamic acid salt solution to form a polyamic acid gel; and drying the polyamic acid gel to form the polyamic acid aerogel. In some embodiments, acidifying the polyamic acid salt comprises adding the aqueous solution of polyamic acid salt to a solution of a water-soluble acid in water to form the polyamic acid gel beads, wherein adding comprises dripping the aqueous solution of polyamic acid salt into the solution of the water-soluble acid in water, spraying the aqueous solution of polyamic acid salt under pressure through one or more nozzles into the solution of the water-soluble acid in water using pressure; or electrospraying the aqueous solution of polyamic acid salt into the solution of the water-soluble acid in water, each as described with respect to FIG. 5. A non-limiting cartoon illustration of the process believed to occur during the bead formation is provided in FIG. 9B. Without wishing to be bound by theory, it is believed that the water-soluble acid (e.g., acetic acid) protonates the carboxylate groups of the polyamate, forming an initial skin, which is penetrated by the water-soluble acid, protonating the carboxylate groups of the polyamic acid ammonium salt within the droplet, forming a wet-gel polyamic acid bead.

In some embodiments, the polyamic acid gel beads as described with reference to FIG. 5 are the starting point for providing the polyamic acid aerogel beads of FIG. 9A. With reference to FIG. 9A, the polyamic acid gel beads are washed with water, solvent exchanged, and dried, each as described herein above, to provide the polyamic acid aerogel beads.

In some embodiments, the method further comprises preparing polyimide gel beads from the polyamic acid gel beads. With reference to FIG. 9A, thermal imidization (e.g., by subjecting the polyamic acid gel beads to a temperature of about 300° C. for a period of time) converts the polyamic acid gel beads to the corresponding polyimide gel beads.

In some embodiments, the method further comprises preparing polyimide aerogel beads from the polyamic acid aerogel beads. With reference to FIG. 9A, thermal imidization (e.g., by subjecting the polyamic acid gel beads to a temperature of about 300° C. for a period of time) converts the polyamic acid aerogel beads to the corresponding polyimide aerogel beads.

In some embodiments, the method further comprises preparing polyimide aerogel beads from the polyimide aerogel beads. With further reference to FIG. 9A, the polyimide gel beads are washed with water, solvent exchanged, and dried, each as described herein above, to provide the polyimide aerogel beads.

B. Emulsion Method

Figure 10:
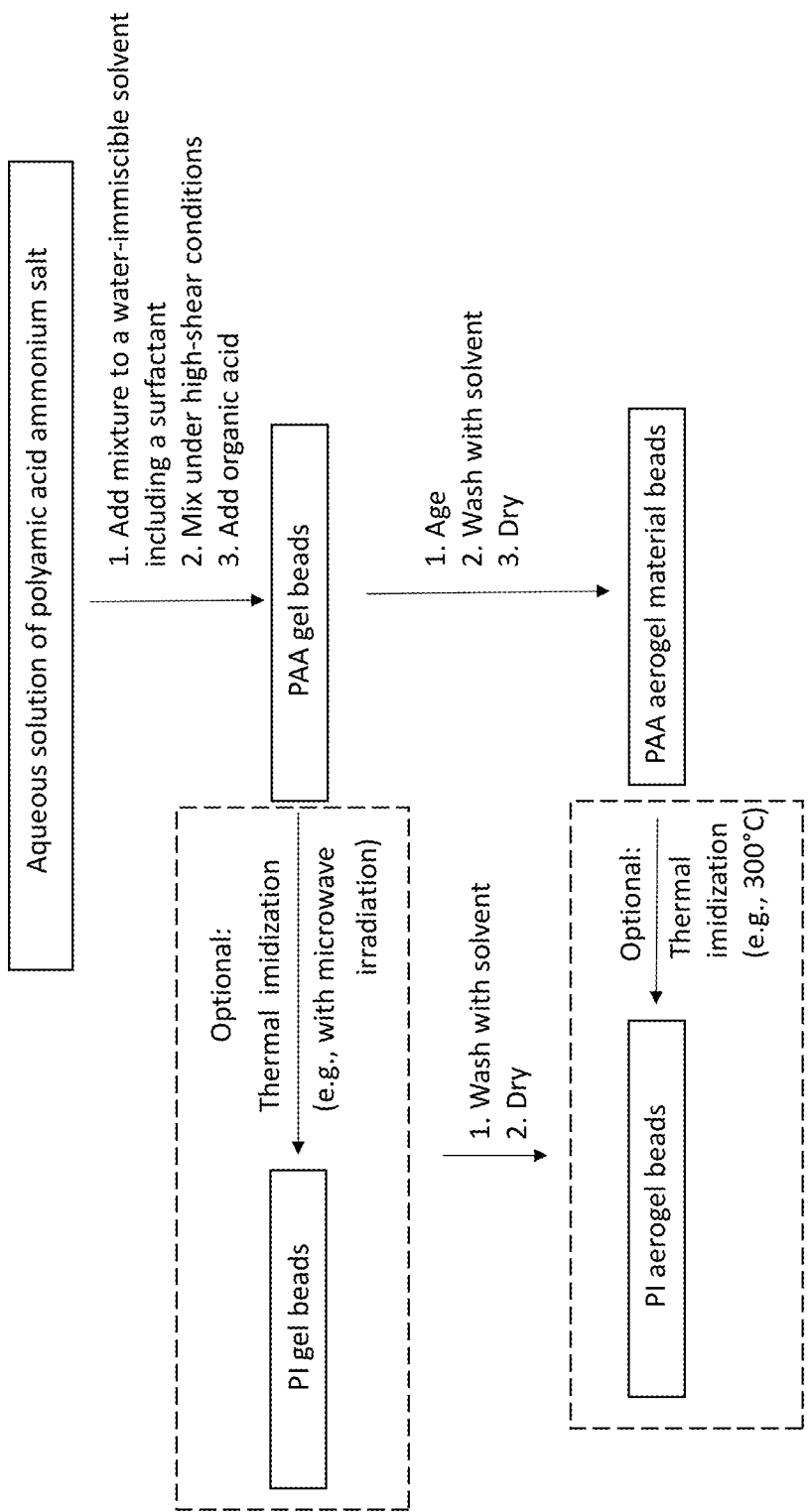
FIG. 10 is flow chart depicting a process for preparing polyamic acid aerogel microbeads according to a non-limiting embodiment of the disclosed method.

In another aspect is provided a method of forming a polyamic acid aerogel in bead form. In some embodiments, the method may be that generally described in FIG. 10. With reference to FIG. 10, the method generally comprises: providing an aqueous solution of a polyamic acid salt; combining the aqueous solution of polyamic acid salt with a water-immiscible solvent comprising a surfactant; mixing the resulting mixture under high-shear conditions to form an emulsion; and adding an organic acid to the emulsion.

The water-immiscible solvent may vary. Suitable solvents include, but are not limited to, oils such as silicone oil or mineral oil, aliphatic hydrocarbons, aromatic hydrocarbons, and chlorinated hydrocarbons. In some embodiments, the solvent is a C5-C12 aliphatic or aromatic hydrocarbon. In particular embodiments, the solvent is mineral spirits.

The water-immiscible solvent includes a surfactant as described herein above. In some embodiments, the surfactant comprises Tween 20, Tween 80, Span 20, Span 40, Span 60, Span 80, or a combination thereof. In some embodiments, the surfactant is Span 20, Tween 80, or a mixture thereof. In some embodiments, the surfactant is Hypermer® B246SF. In some embodiments, the surfactant is Hypermer® A70.

The concentration of the surfactant may vary. In some embodiments, the surfactant, or a mixture of surfactants, is present in the water-immiscible solvent in amount by weight from about 1 to about 5%, such as about 1, about 2, about 3, about 4, or about 5%.

In some embodiments, combining comprises adding the aqueous solution of the polyamic acid ammonium salt to the water-immiscible solvent including the surfactant. In some embodiments, combining comprises adding the water-immiscible solvent including the surfactant to the aqueous solution of the polyamic acid ammonium salt.

Mixing the biphasic mixture under high-shear conditions generally provides micron-sized polyamic acid beads. The size of the polyamic acid wet-gel beads may vary. In some embodiments, the wet-gel beads have a size ranging from about 5 to about 500 microns in diameter, for example from about 5, about 10, about 20, about 30, about 40, or about 50, to about 60, about 70, about 80, about 90, about 100, about 200, about 300, about 400, or about 500 microns in diameter.

With continued reference to FIG. 10, the polyamic acid gel beads are washed with water, solvent exchanged, and dried, each as described herein above, to provide the polyamic acid aerogel beads.

In some embodiments, the method further comprises preparing polyimide gel beads from the polyamic acid gel beads. With reference to FIG. 10, thermal imidization (e.g., by subjecting the polyamic acid gel beads to a temperature of about 300° C. for a period of time) converts the polyamic acid gel beads to the corresponding polyimide gel beads.

In some embodiments, the method further comprises preparing polyimide aerogel beads from the polyamic acid aerogel beads. With reference to FIG. 10, thermal imidization (e.g., by subjecting the polyamic acid aerogel beads to a temperature of about 300° C. for a period of time) converts the polyamic acid aerogel beads to the corresponding polyimide aerogel beads.

In some embodiments, the method further comprises preparing polyimide aerogel beads from the polyimide gel beads. With further reference to FIG. 10, the polyimide gel beads are washed with water, solvent exchanged, and dried, each as described herein above, to provide the polyimide aerogel beads.

Figure 11:
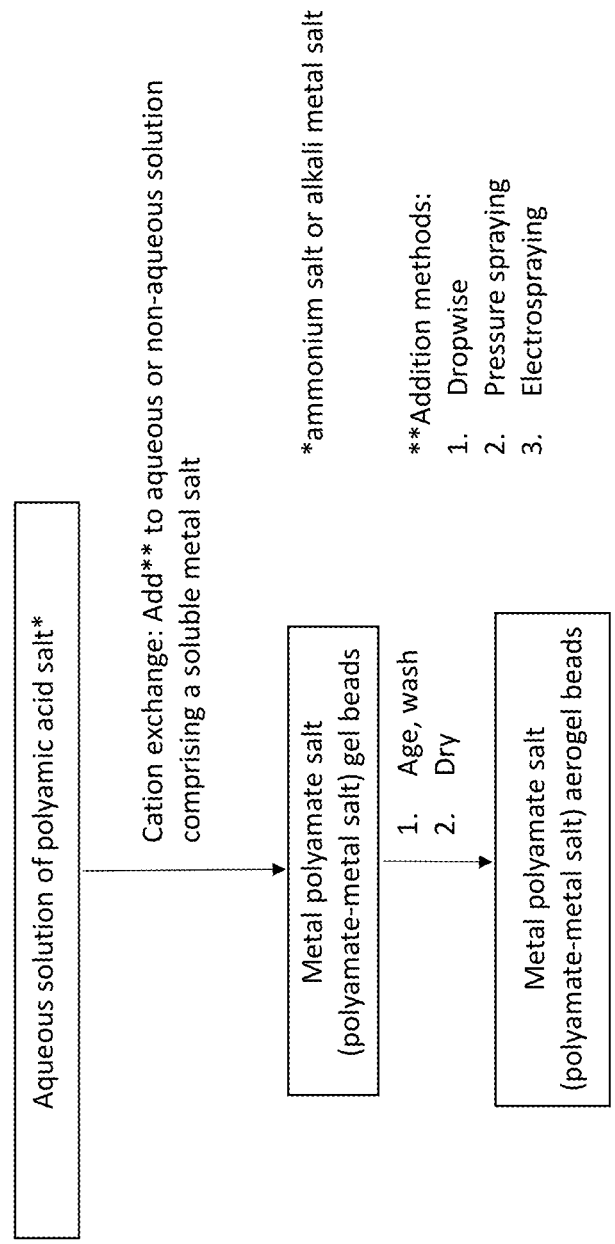
FIG. 11 is flow chart depicting a process for preparing metal polyamate aerogel beads according to a non-limiting embodiment of the disclosed method.

IV. Polyamic Acid Metal Salt Aerogel Beads from an Aqueous Solution of a Salt of a Polyamic Acid In another aspect is provided a method of forming a polyamic acid metal salt aerogel in the form of beads. In some embodiments, the method may be that generally described in FIG. 11. With reference to FIG. 11, the method generally comprises:

providing an aqueous solution of an ammonium or alkali metal salt of a polyamic acid;

performing a metal ion exchange comprising adding the solution of the polyamic acid salt to a solution comprising a soluble metal salt to form polyamate metal salt gel beads; and drying the polyamic acid metal salt gel beads to form the polyamic acid metal salt aerogel beads.

In some embodiments, the salt is prepared as described above with reference to FIG. 2A, FIG. 2B, or FIG. 2C. In some embodiments, the salt is an ammonium salt. In some embodiments, the salt is an alkali metal salt. The method comprises performing a metal ion exchange. With reference to FIG. 11, the metal ion exchange comprises adding the solution of the polyamic acid salt to a solution comprising a soluble metal salt. In some embodiments, the addition comprises dripping the aqueous solution of polyamic acid salt into the solution of the soluble metal salt, spraying the aqueous solution of polyamic acid salt under pressure through one or more nozzles into the solution of the soluble metal salt, or electrospraying the aqueous solution of polyamic acid salt into the solution of the soluble metal salt, wherein each of the dripping, spraying, and electrospraying are as described herein above. In particular embodiments, the method comprises electrospraying the polyamic acid salt solution through one or more needles at a voltage in a range from about 5 to about 60 kV.

In some embodiments, the soluble metal salt comprises a main group transition metal, a rare earth metal, an alkaline earth metal, or combinations thereof. In some embodiments, the soluble metal salt comprises copper, iron, nickel, silver, calcium, magnesium, yttrium, or a combination thereof. In some embodiments, the soluble metal salt comprises lanthanum, cerium, praseodymium, neodymium, promethium, samarium, europium, gadolinium, terbium, dysprosium, holmium, erbium, thulium, ytterbium, lutetium, or a combination thereof.

Without wishing to be bound by theory, it is believed that the droplets of the aqueous solution of the ammonium or alkali metal salt of the polyamic acid, upon contact with metal ions in the solution comprising a soluble metal salt, generates an outer crust of insoluble polyamate metal salt, followed by migration of ions of the soluble metal salt into the interior of the droplet, thus forming a polyamate metal salt gel bead in which a substantial portion of the polyamic acid carboxylate groups are associated with anions of the soluble metal salt.

With continued reference to FIG. 11, the resulting polyamic acid metal salt gel beads are aged, washed with water, solvent exchanged, and dried, each as described herein above, to provide the polyamic acid metal salt (polyamate) aerogel beads.

V. Formation of Carbon Aerogels from Polyimide Aerogels

Figure 12:
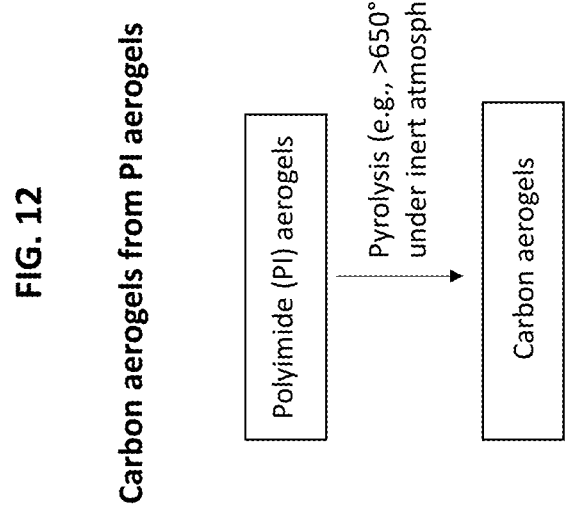
FIG. 12 is flow chart depicting a process for preparing carbon aerogels from polyamic acid aerogels according to a non-limiting embodiment of the disclosed method.

In some embodiments, the polyimide aerogels (monolithic or beads) as disclosed herein are pyrolyzed (e.g., carbonized) as illustrated in FIG. 12, meaning the polyimide aerogel is heated at a temperature and for a time sufficient to convert substantially all of the organic material into carbon. As used herein in the context of pyrolysis, "'substantially all'" means that greater than 95% of the organic material is converted to carbon, such as 99%, or 99.9%, or 99.99%, or even 100% of the organic material is converted to carbon. Pyrolyzing the polyimide aerogel converts the polyimide aerogel to an isomorphic carbon aerogel, meaning the physical properties (e.g., porosity, surface area, pore size, diameter, and the like) are substantially retained in the corresponding carbon aerogel. The time and temperature required for pyrolyzing may vary. In some embodiments, the polyimide aerogel is subjected to a treatment temperature of about 650° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the polyimide aerogel. Generally, the pyrolysis is conducted under an inert atmosphere to prevent combustion of the organic or carbon material. Suitable atmospheres include, but are not limited to, nitrogen, argon, or combinations thereof. In some embodiments, pyrolysis is performed under nitrogen.

VI. Formation of Carbon Aerogels from Polyamic Acid Aerogels

Figure 13:
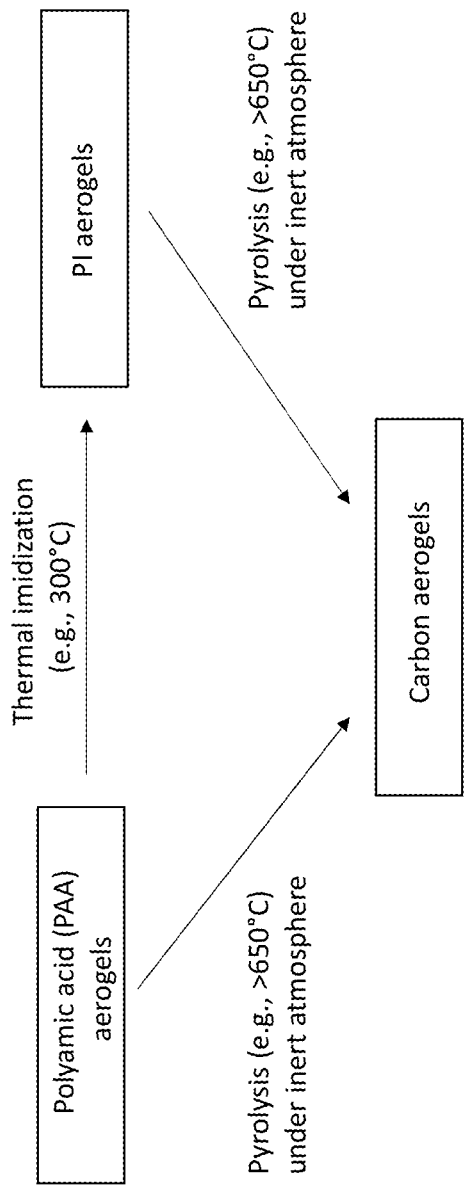
FIG. 13 is flow chart depicting a process for preparing carbon aerogels from polyamic acid or polyimide aerogels according to a non-limiting embodiment of the disclosed method.

In some embodiments, the polyamic acid aerogels (monolithic or beads) as disclosed herein are pyrolyzed as illustrated in FIG. 13. Surprisingly, according to the disclosure, it was found that polyamic acid aerogels may be directly converted to carbon aerogels (i.e., without first imidizing to provide a polyimide aerogel). Pyrolyzing the polyamic acid aerogel converts the polyamic acid aerogel to an isomorphic carbon aerogel. The time and temperature required for pyrolyzing may vary. In some embodiments, the polyamic acid aerogel is subjected to a treatment temperature of about 650° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the polyamic acid aerogel. Generally, the pyrolysis is conducted under an inert atmosphere to prevent combustion of the organic or carbon material. Suitable atmospheres include, but are not limited to, nitrogen, argon, or combinations thereof. In some embodiments, pyrolysis is performed under nitrogen.

With further reference to FIG. 13, optionally, the polyamic acid aerogel may be thermally imidized as disclosed herein to first provide a polyimide aerogel, which is then subsequently pyrolyzed to provide the carbon aerogel.

Figure 14:
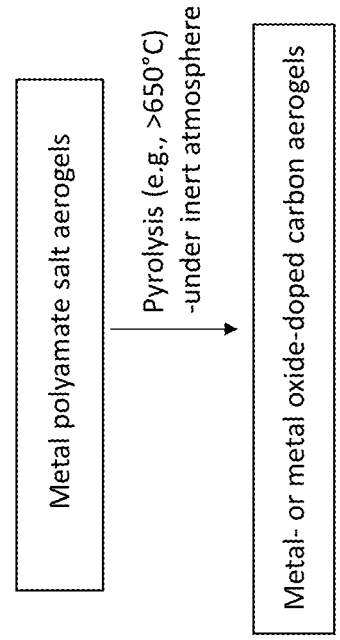
FIG. 14 is flow chart depicting a process for preparing metal- or metal oxide-doped carbon aerogels from metal polyamate salt aerogels according to a non-limiting embodiment of the disclosed method.

VII. Formation of Metal- or Metal Oxide-Doped Carbon Aerogels from Polyamic acid Metal Salt Aerogels In some embodiments, the polyamic acid metal salt aerogels (monolithic or beads) as disclosed herein are pyrolyzed as illustrated in FIG. 14. Pyrolyzing the polyamic acid metal salt aerogel converts the polyamic acid aerogel to an isomorphic carbon aerogel. The time and temperature required for pyrolyzing may vary. In some embodiments, the polyamic acid metal salt aerogel is subjected to a treatment temperature of about 650° C. or above, 800° C. or above, 1000° C. or above, 1200° C. or above, 1400° C. or above, 1600° C. or above, 1800° C. or above, 2000° C. or above, 2200° C. or above, 2400° C. or above, 2600° C. or above, 2800° C. or above, or in a range between any two of these values, for carbonization of the polyimide aerogel.

Upon pyrolyzing, the ions of the soluble metal salt which are present may either form a corresponding metal oxide, or may sinter and form the corresponding metal, depending on the metal species and the pyrolysis conditions.

VIII. Formation of Electroactive Material-Doped Gels

In some embodiments, any of the polyimide or polyamic acid gels and aerogels as disclosed herein may be doped with an electroactive material, for example, silicon, such as silicon particles, to provide electroactive material-doped polyamic acid, polyimide, or carbon gels (wet-gels, aerogels, monoliths, or beads).

Within the context of the present disclosure, the term "'silicon particles'" refers to silicon or silicon-based materials with a range of particle sizes suitable for use with polyimide or carbon gels as disclosed herein. Silicon particles of the present disclosure can be nanoparticles, e.g., particles with two or three dimensions in the range of about 1 nm to about 150 nm. Silicon particles of the present disclosure can be fine particles, e.g., micron-sized particles with a maximum dimension, e.g., a diameter for a substantially spherical particle, in the range of about 150 nm to about 10 micrometers or larger. For example, silicon particles of the present disclosure can have a maximum dimension, e.g., a diameter for a substantially spherical particle, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the particles are flat fragmented shapes, e.g., platelets, having two dimensions, e.g., a length and a width, of about 10 nm, 50 nm, 100 nm, 150 nm, 200 nm, 500 nm, 1 micrometer, 1.5 micrometers, 2 micrometers, 3 micrometers, 5 micrometers, 10 micrometers, 20 micrometers, 40 micrometers, 50 micrometers, 100 micrometers, or in a range between any two of these values. In some embodiments, the silicon particles can be monodispersed or substantially monodispersed. In other embodiments, the silicon particles can have a particle size distribution. Within the context of the present disclosure, the dimensions of silicon particles are provided based upon the median of the particle size distribution, i.e., the D50. Silicon particles of the present disclosure can be silicon wires, crystalline silicon, amorphous silicon, silicon alloys, silicon oxides ($SiO_x$), coated silicon, e.g., carbon coated silicon, and any combinations of silicon particle materials disclosed herein. In some embodiments, silicon particles can be substantially planar flakes, i.e., having a flat fragmented shape, which can also be referred to as a platelet shape. For example, the particles have two substantially flat major surfaces connected by a minor surface defining the thickness between the major surfaces. In other embodiments, particles of silicon or other electroactive materials can be substantially spherical, cubic, obloid, elliptical, disk-shaped, or toroidal.

Silicon particles can be produced by various techniques, including electrochemical reduction and mechanical milling, i.e., grinding. Grinding can be conducted using wet or dry processes. In dry grinding processes, powder is added to a vessel, together with grinding media. The grinding media typically includes balls or rods of zirconium oxide (yttrium stabilized), silicon carbide, silicon oxide, quartz, or stainless steel. The particle size distribution of the resulting ground material is controlled by the energy applied to the system and by matching the starting material particle size to the grinding media size. However, dry grinding is an inefficient and energy consuming process. Wet grinding is similar to dry grinding with the addition of a grinding liquid. An advantage of wet grinding is that the energy consumption for producing the same result is 15-50% lower than for dry grinding. A further advantage of wet grinding is that the grinding liquid can protect the grinding material from oxidizing. It has also been found that wet grinding can produce finer particles and result in less particle agglomeration.

Wet grinding can be performed using a wide variety of liquid components. In an exemplary embodiment, the grinding liquid or components included in the grinding liquid are selected to reduce or eliminate chemical functionalization on the surface of the silicon particles during or after grinding. In other embodiments, the grinding liquid or components included in the grinding liquid are selected to provide a desired surface chemical functionalization of the particles, e.g., the silicon particles, during or after grinding. The grinding liquid or components included in the grinding liquid can also be selected to control the chemical reactivity or crystalline morphology of the particles, e.g., the silicon particles. In exemplary embodiments, the grinding liquid or components included in the grinding liquid can be selected based on compatibility or reactivity with downstream materials, processing steps or uses for the particles, e.g., the silicon particles. For example, the grinding liquid or components included in the grinding liquid can be compatible with, useful in, or identical to the liquid or solvent used in a process for forming or manufacturing organic or inorganic aerogel materials. In yet another embodiment, the grinding liquid can be selected such that the grinding liquid or components included in the grinding liquid produce a coating on the silicon particle surface or an intermediary species, such as an aliphatic or aromatic hydrocarbon, or by cross-linking or producing cross-functional compounds, that react with the organic or inorganic aerogel material.

The solvent or mixture of solvents used for grinding can be selected to control the chemical functionalization of the particles during or after grinding. Using silicon as an example, and without being bound by theory, grinding silicon in alcohol-based solvents, such as isopropanol, can functionalize the surface of the silicon and covalently bond alkyl surface groups, e.g., isopropyl, onto the surface of the silicon particles. With air exposure, the alkyl groups can transform to corresponding alkoxides through oxidation as evidenced by FTIR-ATR analysis. In exemplary embodiments, grinding can be carried out in polar aprotic solvents such as DMSO, DMF, NMP, DMAC, THF, 1,4-dioxane, diglyme, acetonitrile, water or any combination thereof.

The electroactive material (e.g., silicon) particles may be incorporated into the polyamic acid, polyimide, or carbon gels as disclosed herein in a number of ways. Generally, electroactive material (e.g., silicon) particles are incorporated during the sol-gel process. In one non-limiting embodiment, electroactive material (e.g., silicon) particles are dispersed in the polyamic acid sol prior to imidization. In some embodiments, electroactive material (e.g., silicon) particles are dispersed in a solvent, e.g., water, or a polar, aprotic solvent, before combination with the polyimide precursors. In some embodiments, electroactive material (e.g., silicon) particles are dispersed in the polyamic acid sol during the imidization process. In some embodiments, an electroactive material is added to an aqueous solution of a polyamic acid salt. In some embodiments, the electroactive material is silicon.

IX. Properties of the Polyimide, Polyamic Acid, and Carbon Aerogels

In some embodiments, the aerogel as disclosed herein (e.g., polyamic acid, polyimide, or carbon aerogel) can take the form of a monolith. As used herein, the term "monolith" refers to aerogel materials in which a majority (by weight) of the aerogel included in the aerogel material is in the form of a macroscopic, unitary, continuous, self-supporting object. Monolithic aerogel materials include aerogel materials which are initially formed to have a well-defined shape, but which can be subsequently cracked, fractured or segmented into non-self-repeating objects. For example, irregular chunks are considered as monoliths. Monolithic aerogels may take the form of a freestanding structure, or a reinforced material with fibers or an interpenetrating foam.

In other embodiments, the aerogel of the disclosure (e.g., polyamic acid, polyimide or carbon aerogel) may be in particulate form, for example as beads or particles from, e.g., crushing monolithic material, or from preparative methods directed to bead formation. The aerogel in particulate form can have various particle sizes. In the case of spherical particles (e.g., beads), the particle size is the diameter of the particle. In the case of irregular particles, the term particle size refers to the maximum dimension (e.g., a length, width, or height). The particle size may vary depending on the physical form, preparation method, and any subsequent physical steps performed. In some embodiments, the aerogel in particulate form can have a particle size from about 1 micrometer to about 10 millimeters. For example, the aerogel in particulate form can have a particle size of about 1 micrometer, about 2 micrometers, about 3 micrometers, about 4 micrometers, about 5 micrometers, about 6 micrometers, about 7 micrometers, about 8 micrometers, about 9 micrometers, about 10 micrometers, about 15 micrometers, about 20 micrometers, about 25 micrometers, about 30 micrometers, about 35 micrometers, about 40 micrometers, about 45 micrometers, about 50 micrometers, about 60 micrometers, about 70 micrometers, about 80 micrometers, about 90 micrometers, about 100 micrometers, about 200 micrometers, about 300 micrometers, about 400 micrometers, about 500 micrometers, about 600 micrometers, about 700 micrometers, about 800 micrometers, about 900 micrometers, about 1 millimeter, about 2 millimeters, about 3 millimeters, about 4 millimeters, about 5 millimeters, about 6 millimeters, about 7 millimeters, about 8 millimeters, about 9 millimeters, about 10 millimeters, or in a range between any two of these values. In some embodiments, the aerogel can have a particle size in the range of about 5 micrometers to about 100 micrometers, or from about 5 to about 50 micrometers. In some embodiments, the aerogel can have a particle size in the range of about 1 to about 4 millimeters.

Aerogels as disclosed herein have a density. As used herein, the term "density" refers to a measurement of the mass per unit volume of an aerogel material or composition. The term "'density'" generally refers to the true or skeletal density of an aerogel material, as well as the bulk density of an aerogel composition. Density is typically reported as $kg/m^3$ or $g/cm^3$. The skeletal density of a polyimide or carbon aerogel may be determined by methods known in the art, including, but not limited to helium pycnometry. The bulk density of a polyimide or carbon aerogel may be determined by methods known in the art, including, but not limited to: Standard Test Method for Dimensions and Density of Preformed Block and Board-Type Thermal Insulation (ASTM C303, ASTM International, West Conshohocken, Pa.); Standard Test Methods for Thickness and Density of Blanket or Batt Thermal Insulations (ASTM C167, ASTM International, West Conshohocken, Pa.); or Determination of the apparent density of preformed pipe insulation (ISO 18098, International Organization for Standardization, Switzerland). Within the context of the present disclosure, density measurements are acquired according to ASTM C167 standards, unless otherwise stated. In some embodiments, the polyimide or carbon aerogels as disclosed herein have a bulk density from about 0.01 to about 0.3 $g/cm^3$.

Aerogels as disclosed herein have a pore size distribution. As used herein, the term "'pore size distribution'" refers to the statistical distribution or relative amount of each pore size within a sample volume of a porous material. A narrower pore size distribution refers to a relatively large proportion of pores at a narrow range of pore sizes. In some embodiments, a narrow pore size distribution may be desirable in e.g., optimizing the amount of pores that can surround an electrochemically active species and maximizing use of the available pore volume. Conversely, a broader pore size distribution refers to relatively small proportion of pores at a narrow range of pore sizes. As such, pore size distribution is typically measured as a function of pore volume and recorded as a unit size of a full width at half max of a predominant peak in a pore size distribution chart. The pore size distribution of a porous material may be determined by methods known in the art, for example including, but not limited to, surface area, skeletal density, and porosimetry, from which pore size distribution can be calculated. Suitable methods for determination of such features include, but are not limited to, measurements of gas adsorption/desorption (e.g., nitrogen), helium pycnometry, mercury porosimetry, and the like. Measurements of pore size distribution reported herein are acquired by nitrogen sorption analysis unless otherwise stated. In certain embodiments, polyimide or carbon aerogels of the present disclosure have a relatively narrow pore size distribution.

Aerogels as disclosed herein have a pore volume. As used herein, the term "'pore volume'" refers to the total volume of pores within a sample of porous material. Pore volume is specifically measured as the volume of void space within the porous material, and is typically recorded as cubic centimeters per gram ($cm^3/g$ or cc/g). The pore volume of a porous material may be determined by methods known in the art, for example including, but not limited to, surface area and porosity analysis (e.g. nitrogen porosimetry, mercury porosimetry, helium pycnometry, and the like). In certain embodiments, polyimide or carbon aerogels of the present disclosure have a relatively large pore volume of about 1 cc/g or more, 1.5 cc/g or more, 2 cc/g or more, 2.5 cc/g or more, 3 cc/g or more, 3.5 cc/g or more, 4 cc/g or more, or in a range between any two of these values. In other embodiments, polyimide or carbon aerogels and xerogels of the present disclosure have a pore volume of about 0.03 cc/g or more, 0.1 cc/g or more, 0.3 cc/g or more, 0.6 cc/g or more, 0.9 cc/g or more, 1.2 cc/g or more, 1.5 cc/g or more, 1.8 cc/g or more, 2.1 cc/g or more, 2.4 cc/g or more, 2.7 cc/g or more, 3.0 cc/g or more, 3.3 cc/g or more, 3.6 cc/g or more, or in a range between any two of these values.

In some embodiments of the disclosure, the aerogels (polyamic acid, polyimide, or carbon, aerogel or xerogel, monolith or beads) may comprise a fibrillar morphology. Within the context of the present disclosure, the term "'fibrillar morphology'" refers to the structural morphology of a nanoporous material (e.g., a carbon aerogel) being inclusive of struts, rods, fibers, or filaments.

In some embodiments, a carbon aerogel produced by any of the disclosed methods has properties substantially similar to those of a carbon aerogel prepared by pyrolyzing a corresponding polyimide aerogel that has been prepared by a conventional, non-aqueous method.

In some embodiments, a polyimide gel prepared by any of the disclosed methods, prior to any solvent exchange or drying, contains residual water in an amount greater than about 75% by volume.

In some embodiments, a polyimide aerogel prepared by any of the disclosed methods comprises terminal amine groups as determined by solid state $^{15}$N-NMR. In some embodiments, a polyamic acid aerogel prepared by any of the disclosed methods comprises terminal amine groups as determined by solid state $^{15}$N-NMR.

All methods described herein can be performed in any suitable order unless otherwise indicated herein or otherwise clearly contradicted by context. The use of any and all examples, or exemplary language (e.g., "'such as'") provided herein, is intended merely to better illustrate the materials and methods and does not pose a limitation on the scope unless otherwise claimed. No language in the specification should be construed as indicating any non-claimed element as essential to the practice of the disclosed materials and methods.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the technology herein has been described with reference to particular embodiments, it is to be understood that these embodiments are merely illustrative of the principles and applications of the present technology. It will be apparent to those skilled in the art that various modifications and variations can be made to the method and apparatus of the present technology without departing from the spirit and scope of the technology. Thus, it is intended that the present technology include modifications and variations that are within the scope of the appended claims and their equivalents.

Reference throughout this specification to "'one embodiment,'" "'certain embodiments,'" "'one or more embodiments'" or "'an embodiment'" means that a particular feature, structure, material, or characteristic described in connection with the embodiment is included in at least one embodiment of the technology. Thus, the appearances of phrases such as "'in one or more embodiments,'" "'in certain embodiments,'" "'in one embodiment'" or "'in an embodiment'" in various places throughout this specification are not necessarily referring to the same embodiment of the technology. Furthermore, the particular features, structures, materials, or characteristics may be combined in any suitable manner in one or more embodiments. Any ranges cited herein are inclusive.

Aspects of the present technology are more fully illustrated with reference to the following examples. Before describing several exemplary embodiments of the technology, it is to be understood that the technology is not limited to the details of construction or process steps set forth in the following description. The technology is capable of other embodiments and of being practiced or being carried out in various ways. The following examples are set forth to illustrate certain aspects of the present technology and are not to be construed as limiting thereof.

EXAMPLES

The present invention may be further illustrated by the following non-limiting examples describing the methods.

Figure 15B:
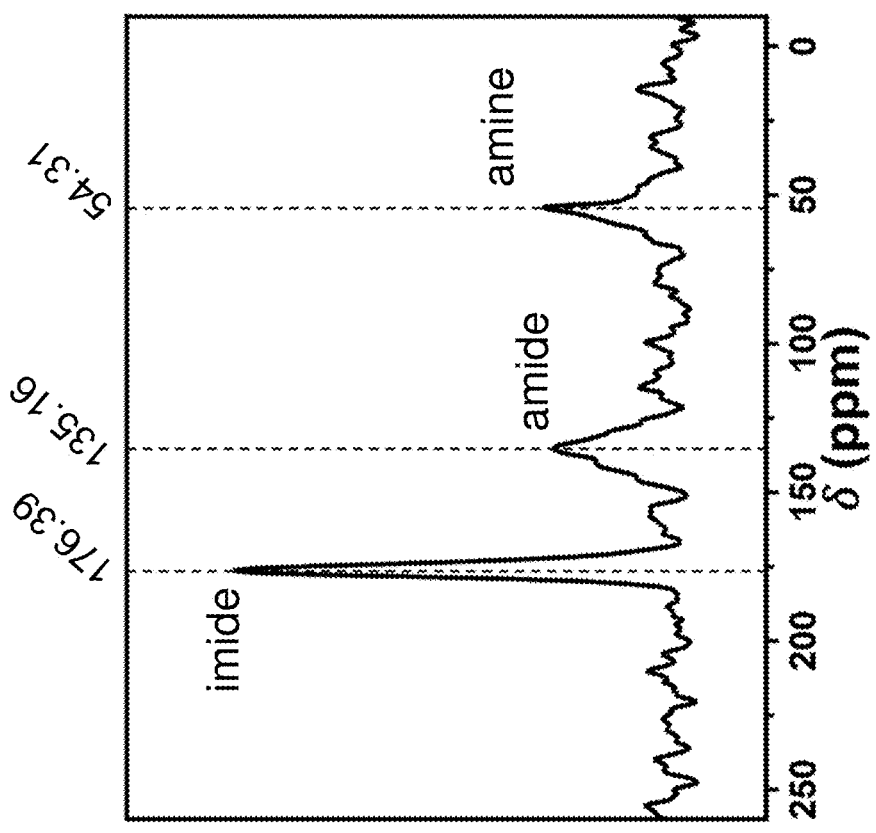
FIG. 15B is a solid state $^{15}$N NMR spectrum of a polyimide aerogel monolith prepared with a target density equal to about 0.040 g/mL according to a non-limiting embodiment of the disclosure.
Figure 15A:
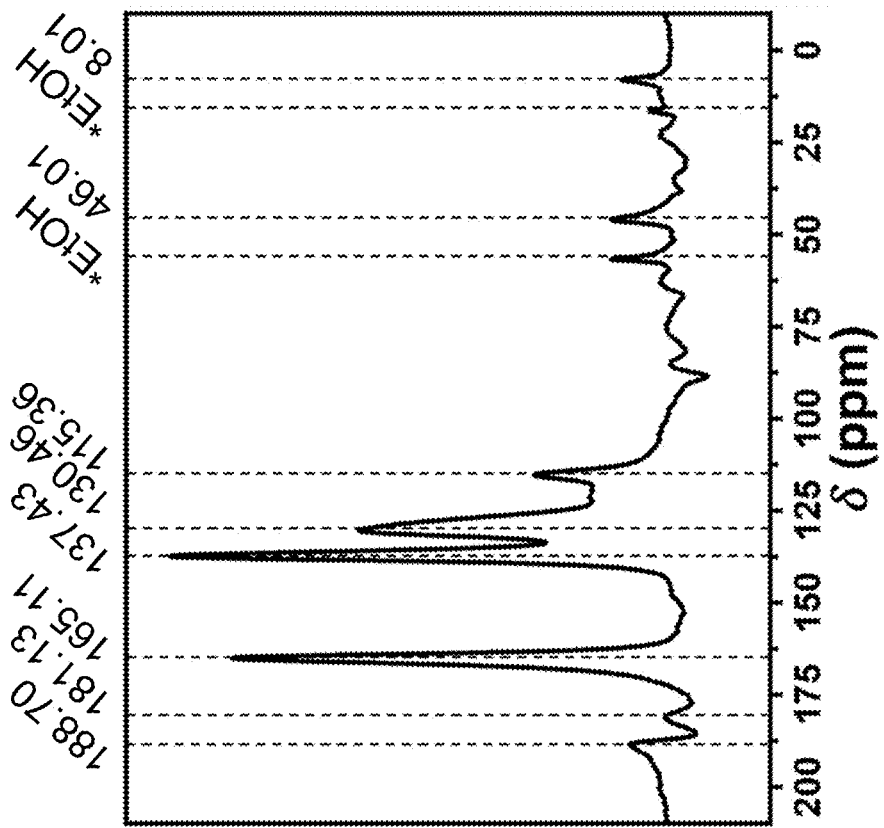
FIG. 15A is a solid state $^{13}$C NMR spectrum of a polyimide aerogel monolith prepared with a target density of about 0.040 g/mL according to a non-limiting embodiment of the disclosure.
Figure 16A:
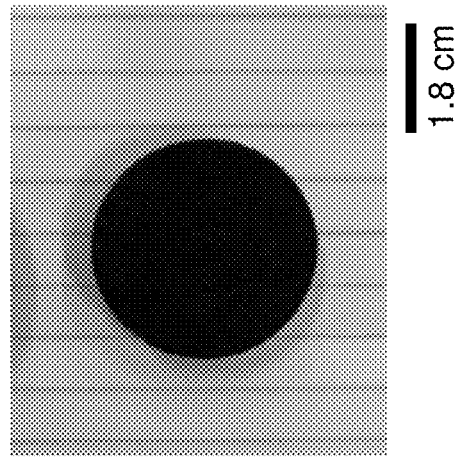
FIG. 16A is a photograph of a polyimide aerogel monolith according to a non-limiting embodiment of the disclosure.

Example 1. Water-Based Preparation of Polyimide and Carbon Aerogel Monolith Using In-Situ Formed Polyamic Acid from 1,4-Phenylenediamine (PDA) and Pyromellitic Dianhydride (PMDA) in Water 1,4-Phenylenediamine (PDA; 1.66 g, 15.3 mmol) was dissolved in 100 mL of water. Triethylamine (TEA; 3.4 g, 4.69 mL, 33.7 mmol, 2.2 equivalents relative to PDA), was added to the solution followed by addition of solid pyromellitic dianhydride (PMDA; 3.34 g, 15.3 mmol). The solution was stirred at room temperature for 5 days. At the end of the period 4.3 equivalents of acetic anhydride (6.7 g, 6.19 mL, 65.8 mmol) was added to the solution. The target density, $T_d$, of the expected aerogels was 0.040 g/cm$^3$. The new solution was divided into cylindrical molds and gelled within approximately 3 minutes. The resulting gels were allowed to age in the molds for 1 day. After 24 hours, the wet gels were removed from the molds by pouring ethanol into the molds, and the wet gels were washed three times with ethanol. The resulting wet gels were treated with supercritical fluid (SCF) carbon dioxide to form polyimide aerogel monoliths (Example 1A). Polyimide aerogels were characterized with solid-state $^{13}$C and $^{15}$N NMR (FIGS. 15A and 15B, respectively). In addition to the resonance for the imide (—(C═O)—N—(C═O)—) functional group at about 176 ppm, the solid-state $^{15}$N NMR spectrum also indicated the presence of amide functional groups (~133 ppm) and free amine-related groups (at around 54.3 ppm). Notably, the resonances at around 54.3 ppm were either of very low intensity or were completely lacking in the corresponding spectra of polyimides of the same diamine and dianhydride when prepared by the conventional organic solvent-based method (i.e., in N,N-dimethylacetamide, such as in reference Example 8). A photograph of the polyimide aerogel is provided in FIG. 16A.

Figure 16B:
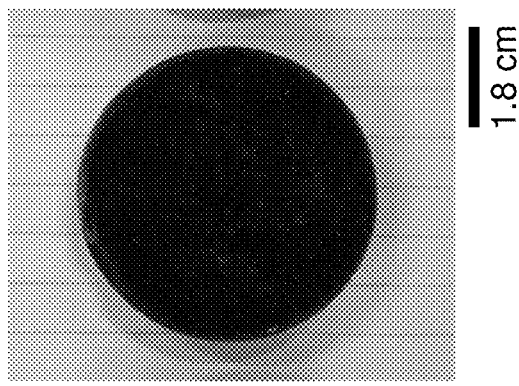
FIG. 16B is a photograph of a carbonized polyimide aerogel monolith according to a non-limiting embodiment of the disclosure.

A sample of these aerogels was carbonized at 1050° C. under nitrogen to provide the corresponding carbon aerogel monolith (Example 1B). A photograph of the aerogel 1B is provided in FIG. 16B. Scanning electron micrographs of samples of Examples 1A and 1B are provided in FIG. 17A, and FIG. 17B respectively. FIGS. 17C and 17D provide pore size distribution of samples of Examples 1A and 1B, respectively. The properties of aerogels of Examples 1A and 1B are provided in Table 2 below

TABLE 2

Physical properties of aerogels of Examples 1A and 1B.

| Example # | Density (g/cm³) | Fiber thickness(nm) | Fiber length (nm) | Average Pore Size (nm) | Linear shrinkage (%) |
|---|---|---|---|---|---|
| 1A | 0.073 | ~10 | 20 ± 6 | 29 ± 7 | 11.6 |
| 1B | 0.053 | ~10 | 19 ± 5 | 27 ± 4 | 30.1 |

Figure 18A:
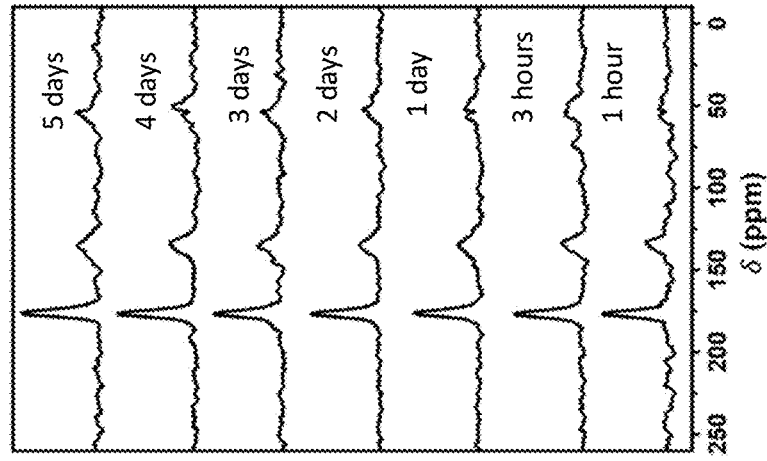
FIG. 18A is a series of solid-state $^{13}$C NMR spectra obtained after different reaction times for polyimide aerogel monoliths according to non-limiting embodiments of the disclosure.
Figure 18B:
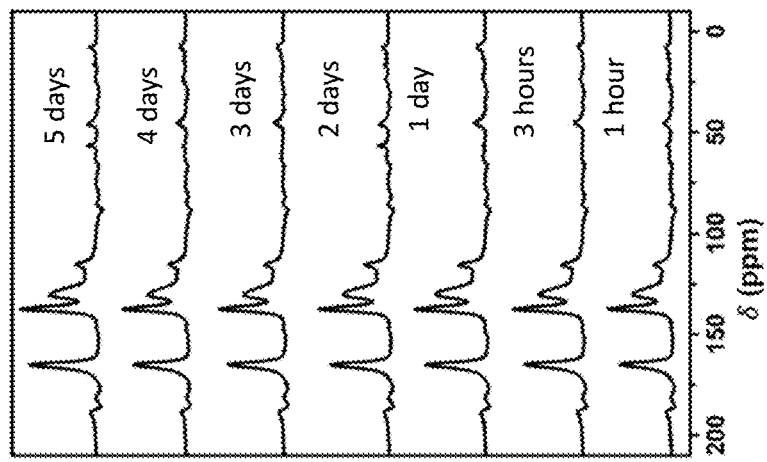
FIG. 18B is a series of solid-state $^{15}$N NMR spectra obtained after different reaction times for polyimide aerogel monoliths according to non-limiting embodiments of the disclosure.

Examples 2-7. Water-Based Preparation Polyimide Aerogel Monoliths Using in-situ Formed Polyamic Acid from PDA and PMDA in Water Samples of polyimide aerogels were prepared using the procedure of Example 1, but varying the length of time for which the PDA-PMDA reaction was allowed to continue prior to addition of acetic anhydride (from 1 hour up to 4 days). The polyimide aerogels were each characterized with solid-state $^{13}C$ and $^{15}N$ NMR as illustrated in the stacked spectra in FIGS. 18A and 18B, respectively (from top to bottom, samples according to Examples 1, 7, 6, 5, 4, 3, and 2). The spectral features were similar irrespective of the PDA-PMDA reaction time. The reaction time allowed before gelation to polyimide gels and the corresponding imide-to-amide group ratios in the resulting aerogels of Examples 1-7 are provided in Table 3 below. The imide-to-amide group ratios were obtained by integration of the solid state $^{15}N$ NMR spectra (FIG. 18B).

TABLE 3

Reaction times and imide-to-amide group ratio for Examples 1-7

| Example # | Reaction Time | imide-to-amide group ratios in aerogels |
|---|---|---|
| 1 | 5 days | 5.51 |
| 2 | 1 hour | 5.32 |
| 3 | 3 hours | 6.83 |
| 4 | 1 day | 4.36 |
| 5 | 2 days | 5.92 |
| 6 | 3 days | 4.98 |
| 7 | 4 days | 5.32 |

As shown in Table 3, the aerogels from all Examples 1-7 included 4.36 to 6.83 more imide groups than amide groups. The calculated ratios were based on the ratio of the integrated peak intensities in FIG. 18B, multiplied by a response factor.

Figure 19A:
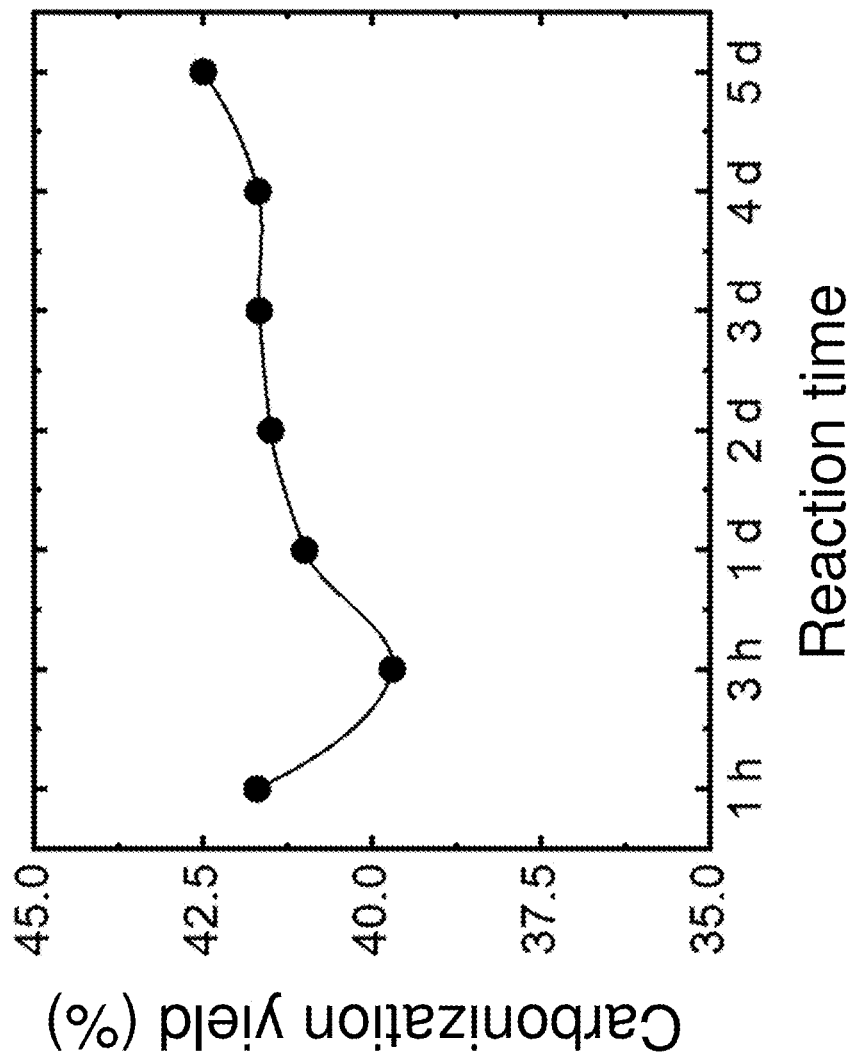
FIG. 19A is a plot of carbonization yield versus reaction time for a series of polyimide aerogels according to non-limiting embodiments of the disclosure.

Samples of each of the polyimide aerogels were carbonized as in Example 1. The carbonization yields for each remained constant at 40 to 42% across the reaction times (FIG. 19A).

Figure 19B:
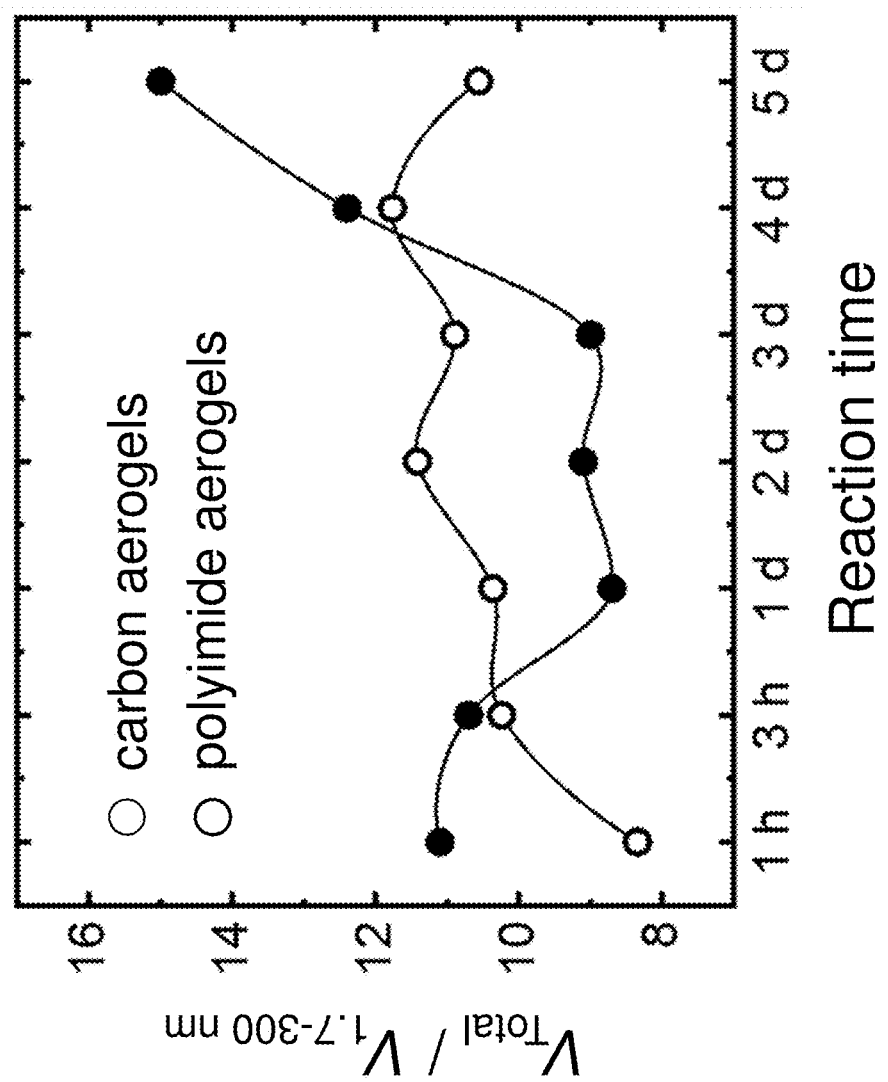
FIG. 19B is a plot of the total pore volume over the pore volume measured with nitrogen sorption porosimetry as a function of reaction time for a series of polyimide aerogel monoliths according to non-limiting embodiments of the disclosure, and a series of carbonized polyimide aerogel monoliths according to non-limiting embodiments of the disclosure.
Figure 19C:
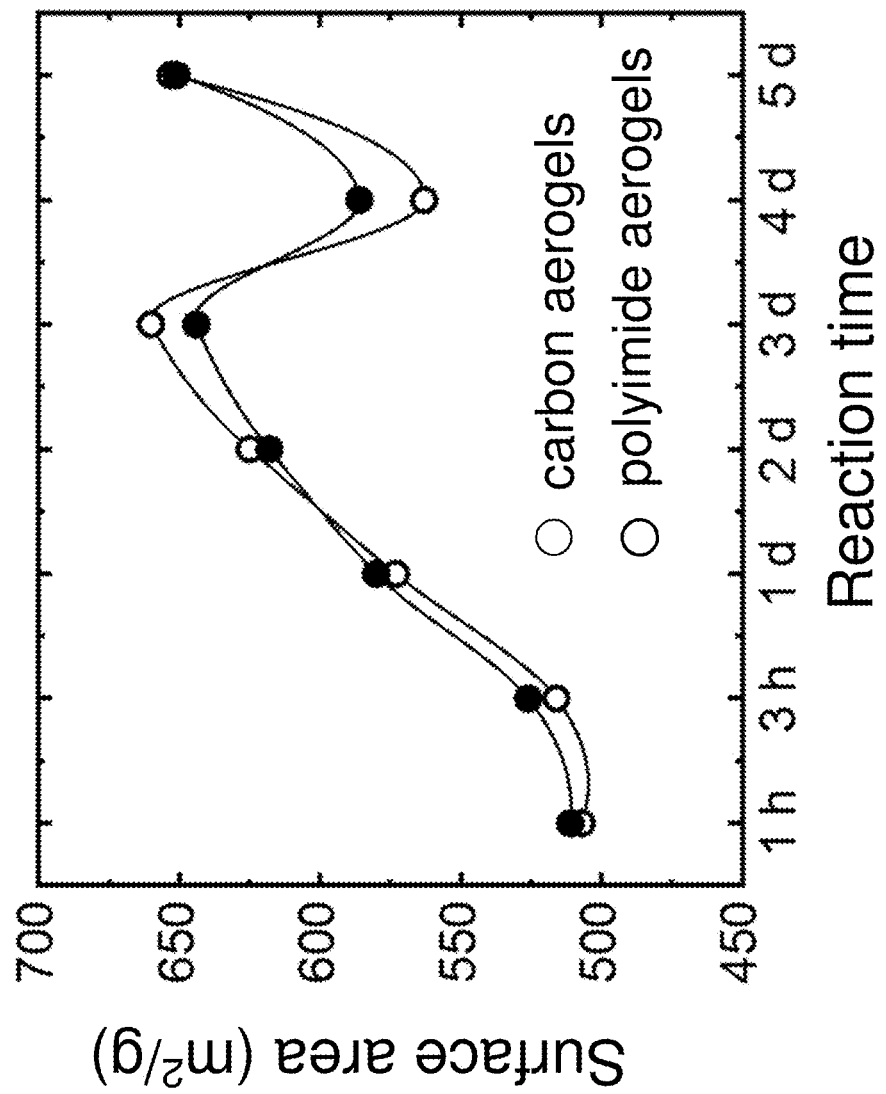
FIG. 19C is a plot of the BET surface area versus reaction time for a series of polyimide aerogel monoliths according to non-limiting embodiments of the disclosure, and a series of carbonized polyimide aerogel monoliths according to non-limiting embodiments of the disclosure.
Figure 19D:
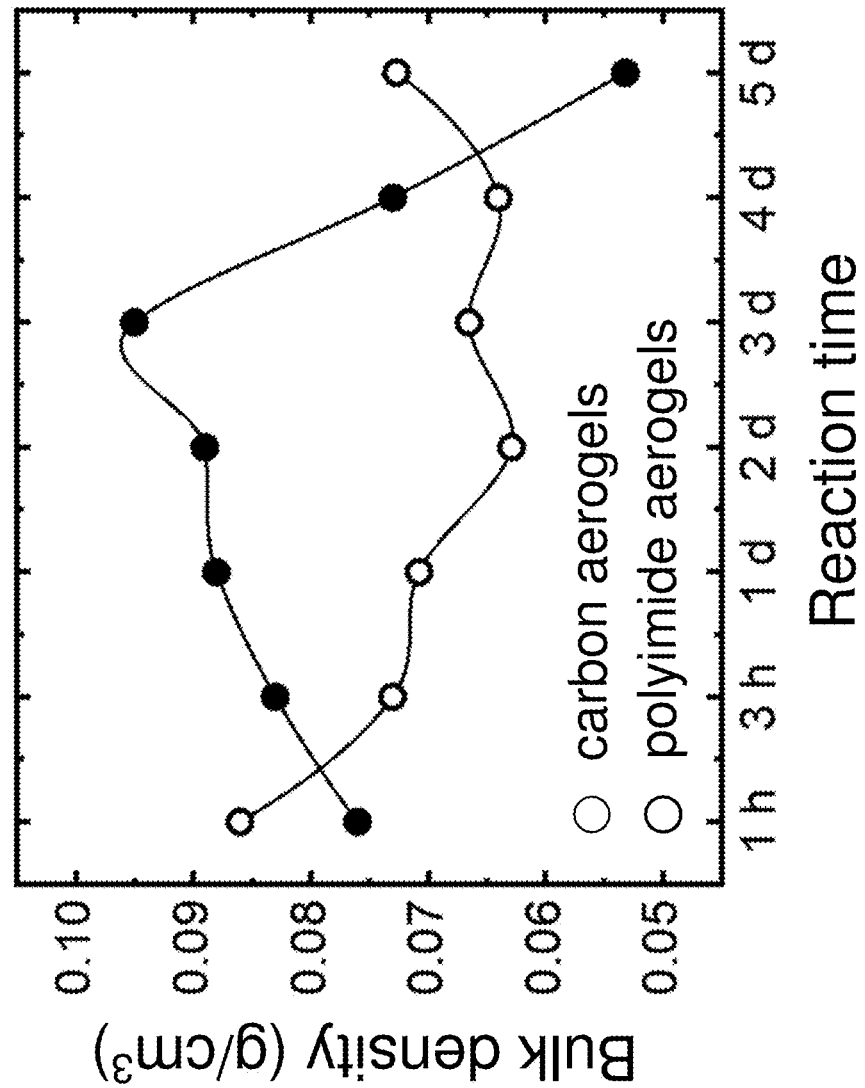
FIG. 19D is a plot of bulk density versus reaction time for a series of polyimide aerogel embodiments of the disclosure, and a series of carbonized polyimide aerogel monoliths according to non-limiting embodiments of the disclosure.

FIGS. 19B-19D provide plots versus reaction time of the pore size distributions, surface areas, and bulk densities, respectively, for the polyimide and the corresponding carbon aerogel monoliths of Examples 1-7. As shown in FIGS. 19A-19D, the properties of the polyimide and carbon aerogels remained similar to one another across the reaction times.

Example 8. Preparation of PMDA-PDA Polyimide Monolith in Organic Solvent (Reference Example)

A reference polyimide aerogel monolith was prepared at the same target density ($T_d$=0.040 g/cm³) as in Example 1, but using N,N-dimethylacetamide as the solvent instead of water, and the PDA-PMDA coupling reaction was allowed to proceed for 3 hours before triethylamine and acetic anhydride were added.

Figure 20B:
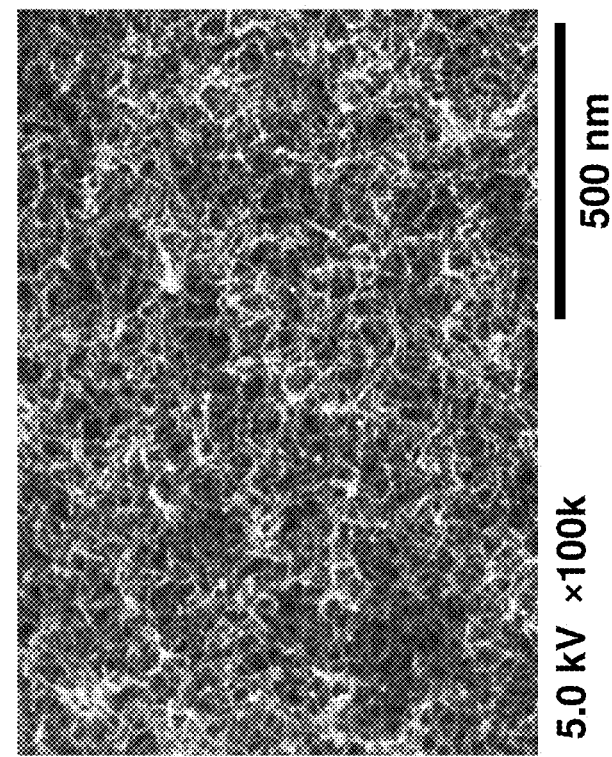
FIG. 20B is a scanning electron micrograph of a polyimide aerogel according to a non-limiting embodiment of the disclosure.
Figure 20A:
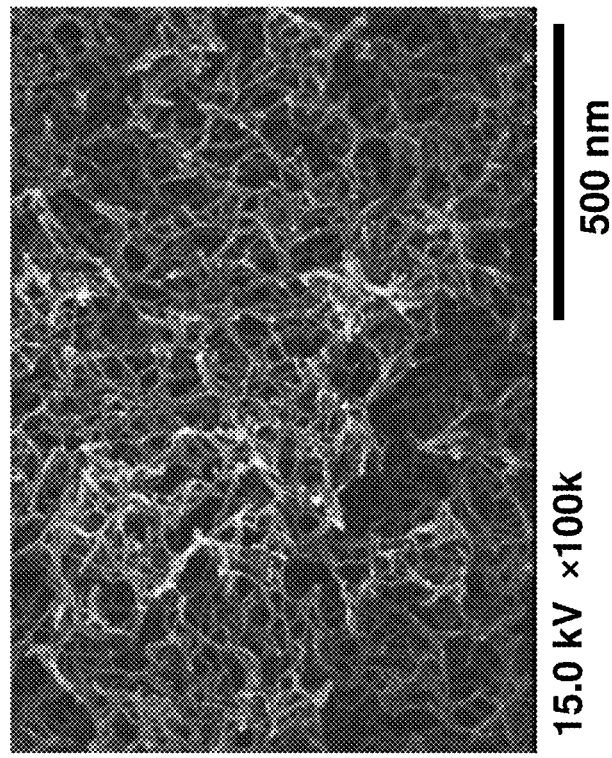
FIG. 20A is a scanning electron micrograph of a polyimide aerogel prepared by a conventional (reference) organic solvent method.

A scanning electron micrograph of a sample of the reference polyimide aerogel is provided in FIG. 20A, along with a comparative image of a sample of the material of Example 1A (FIG. 20B). As illustrated in FIGS. 20A and 20B, the inventive Example 1A (FIG. 20B) had a similar fibrous structure to the material prepared by the conventional method (Example 8; FIG. 20A).

Figure 22B:
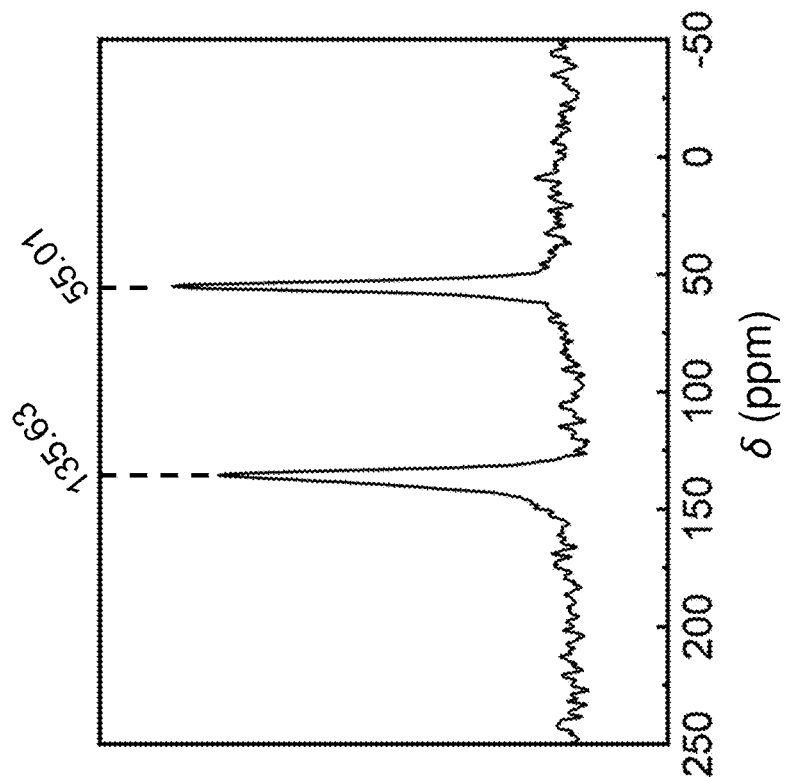
FIG. 22B is the solid-state $^{15}$N NMR of the reaction product obtained after stirring PDA and PMDA in water for 24 hours in the presence of triethylamine (TEA).
Figure 22A:
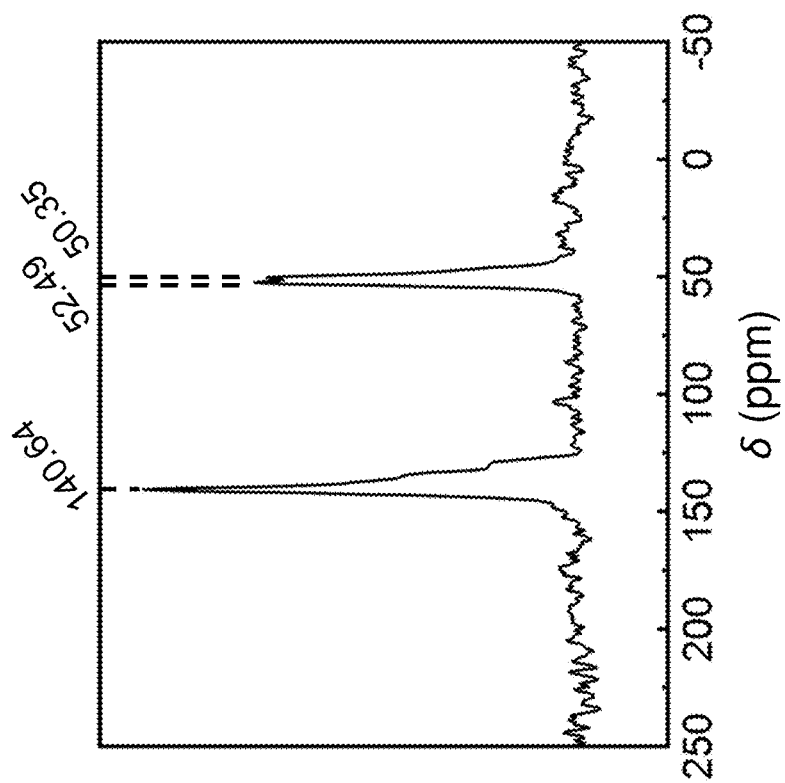
FIG. 22A is the solid-state $^{15}$N NMR spectrum of the precipitate obtained after stirring PDA and PMDA in water for 24 hours.

Example 9. Water-Based Preparation of Millimeter-Sized PMDA-PDA Polyimide Aerogel Beads Using Pre-Formed and Isolated Polyamic Acid from PMDA and PDA Polyimide gel beads of millimeter size were prepared from gelation of an aqueous triethylammonium salt solution of a polyamic acid prepared from pre-formed, solid polyamic acid. The solid-state $^{13}C$ and $^{15}N$ NMR spectra of the pre-formed polyamic acid (the product of a PDA-PMDA coupling reaction, in 1:1 mol ratio, in N,N-dimethylacetamide as the solvent) are shown in FIG. 21A and FIG. 21B, respectively. The solid polyamic acid was isolated by adding the reaction mixture slowly to water. It is noted that the $^{15}N$ NMR spectrum includes a weak resonance at 175 ppm, which is assigned to a small amount of polyimide, and a low-intensity resonance at 48.2 ppm that is assigned to terminal amines. For comparison, FIG. 22A shows the solid-state $^{15}N$ NMR spectrum of a 1:1 mol/mol mixture of PDA and PMDA stirred in water for 24 hours. Resonances of unreacted aromatic amines in various forms showed up at 52.5 and 50.4 ppm. Also, FIG. 22B shows the solid-state $^{15}N$ NMR of the 24-hour reaction mixture of PDA and PMDA in water in the presence of TEA (as in Examples 1-7). The expected product was the triethylammonium salt of the polyamic acid and was isolated by adding the reaction mixture to acetone. The triethylammonium resonance appeared at 55.0 ppm.

Figure 23A:
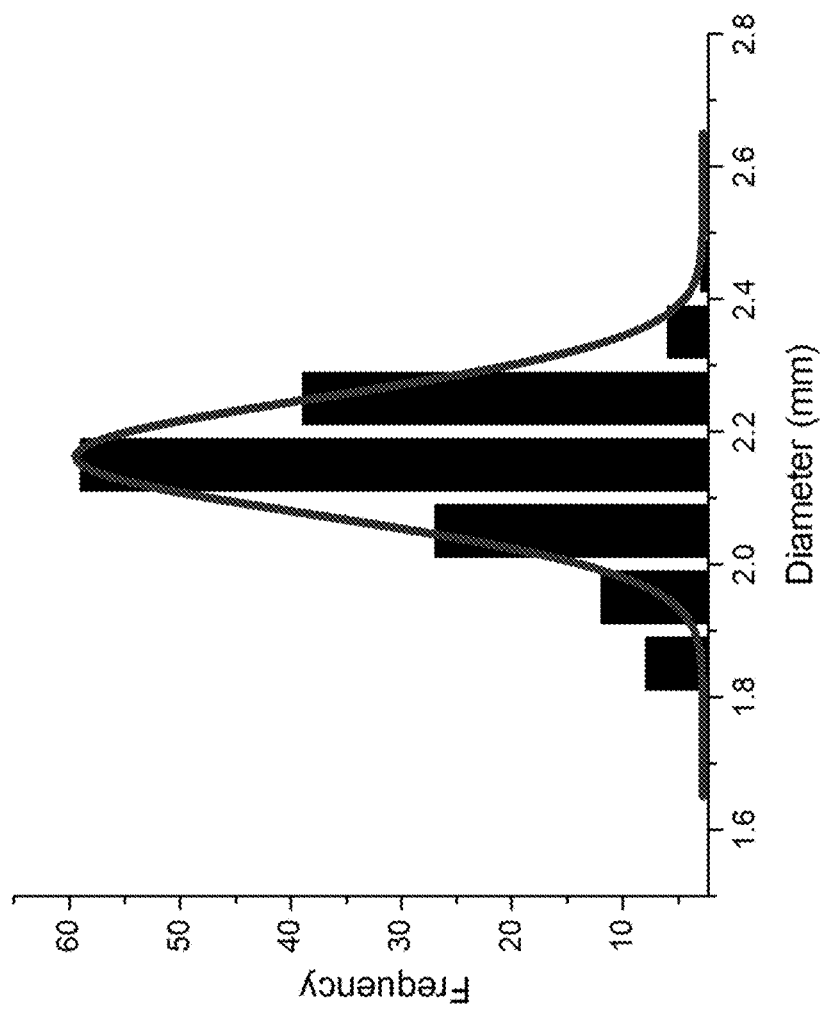
FIG. 23A is a histogram showing the size distribution of millimeter-sized carbonized aerogel beads according to a non-limiting embodiment of the disclosure.

The solid polyamic acid was suspended in 100 mL of water and was dissolved by adding triethylamine (3.41 g, 4.7 mL, 2.2 mol excess relative to the polyamic acid repeat unit). To this solution, acetic anhydride was added (6.73 g, 6.22 mL, 4.3 mol excess relative to the polyamic acid repeat unit) and the new solution was stirred vigorously with a magnetic stirrer for about 1.5 min. The target density of the sol was 0.045 g cm³, and it gelled in about 3 min. Two minutes after addition of acetic anhydride, the sol was added dropwise to 100 mL of a receiving solution consisting of hexane:acetic acid (90:10 v/v). The millimeter-sized beads that were formed from each drop of the sol entering the receiving solution were allowed to stay in that solution for 12 hours. They were then washed 4 times with water, 2 hours each time, using 100 mL of water each time, and dried with supercritical fluid $CO_2$. Based on IR spectroscopy, the aerogel beads contained polyimide. Subsequently, the beads were pyrolyzed at 1050° C. under flowing nitrogen. A photograph of a collection of the resulting carbon aerogel beads was obtained with a digital camera and the image was analyzed using the Image J software package. From the histogram (FIG. 23A), the mean diameter of the carbon aerogel beads was calculated to be 2.16+/−0.09 mm.

Figure 17B:
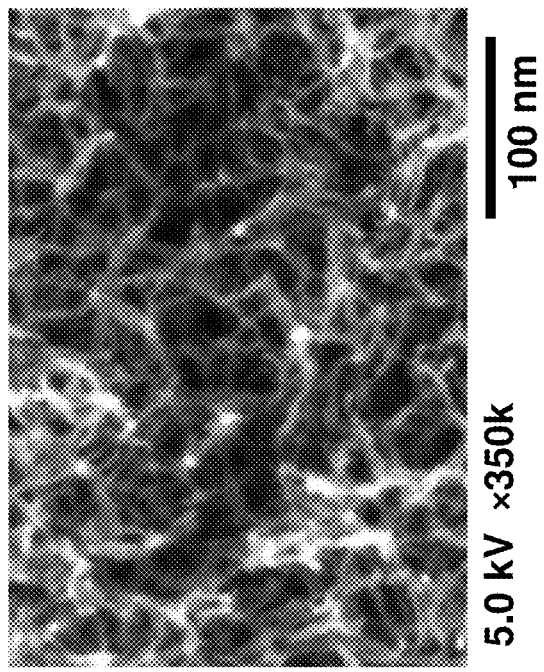
FIG. 17B is a high magnification scanning electron micrograph of a carbonized polyimide aerogel according to a non-limiting embodiment of the disclosure.
Figure 17A:
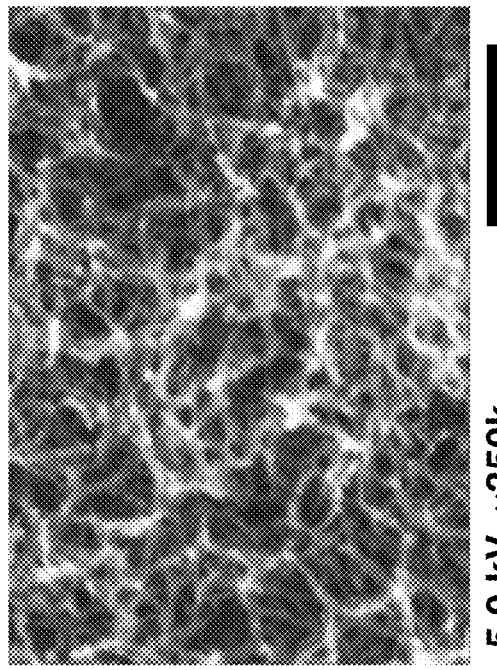
FIG. 17A is a high magnification scanning electron micrograph of a polyimide aerogel according to a non-limiting embodiment of the disclosure.
Figure 17C:
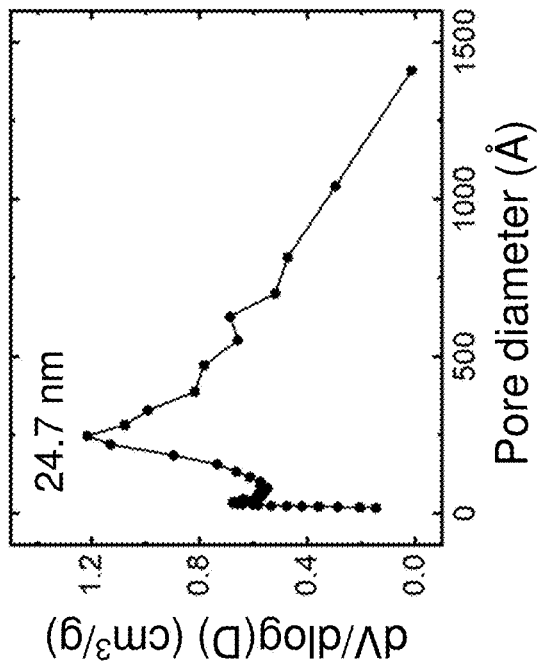
FIG. 17C is a plot of the pore size distribution and showing the pore sizes of a polyimide aerogel according to a non-limiting embodiment of the disclosure.
Figure 17D:
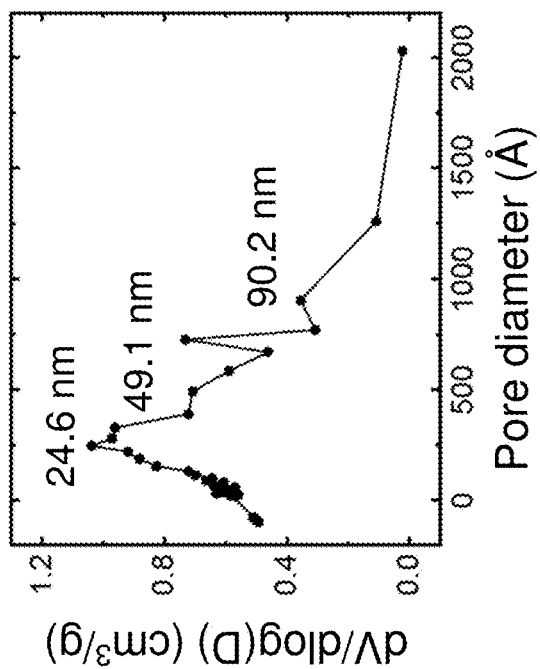
FIG. 17D is a plot of the pore size distribution and showing the pore sizes of a carbonized polyimide aerogel according to a non-limiting embodiment of the disclosure.

Under an electron microscope, the beads possessed a denser skin and their interior consisted of interconnected short fibers (FIG. 23B), just like their monolithic counterparts (FIGS. 17A, 17B, and 20B). The carbonization yield was 32.6% w/w. The pore-size distribution in the range of 1.7-300 nm was relatively broad with a maximum at around 41 nm (FIG. 23C). The properties of the carbon aerogel beads of Example 9 are summarized in Table 4 below.

TABLE 4

Physical characteristics of carbon aerogel beads from Example 9.

| Property | Value |
| --- | --- |
| Carbonization yield (% w/w) | 32.6 |
| Bulk density (g/cm$^3$) | 0.0948 |
| Skeletal density (g/cm$^3$) | 2.65 |
| Porosity (% v/v) | 96.4 |
| BET (m$^2$/g) | 539 |
| Micropore surface area (m$^2$/g) | 124 |
| V$_{Total}$ (cm$^3$/g) | 10.18 |
| V$_{1.7-300}$ (cm$^3$/g) | 2.22 |
| V$_{Total}$/V$_{1.7-300}$ | 4.58 |

Figure 24:
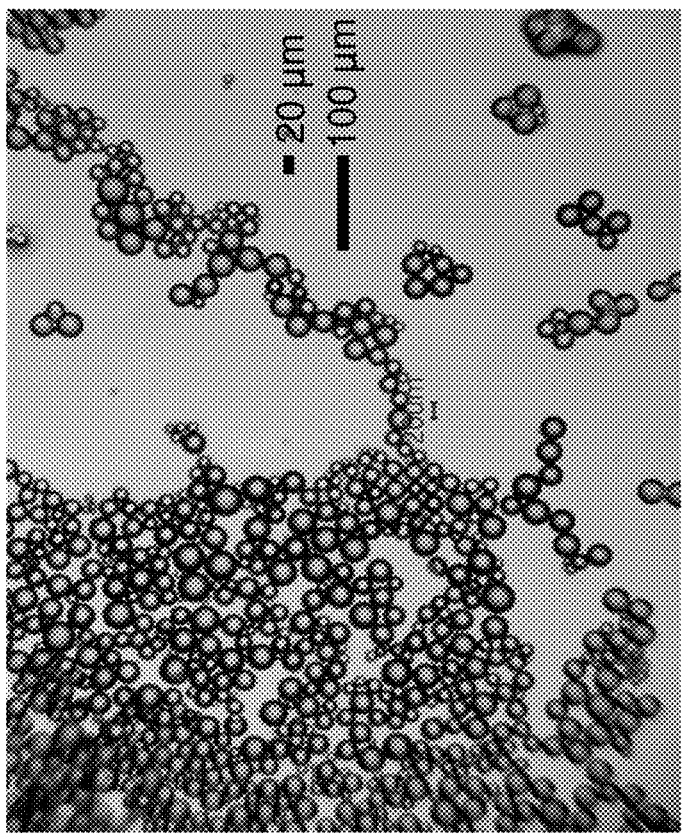
FIG. 24 is a photomicrograph of micron-sized polyimide gel beads according to a non-limiting embodiment of the disclosure.

Example 10. Water-Based Preparation of Micron-Sized PMDA-PDA Polyimide Aerogel Beads Using Pre-Formed and Isolated Polyamic Acid from PMDA and PDA Polyimide gel beads of micron size were prepared from gelation in an emulsion of an aqueous triethylammonium salt solution of a polyamic acid at a target density of 0.07 g/cm$^3$. The solid polyamic acid (isolated as the product of a PDA-PMDA coupling reaction in N,N-dimethylacetamide as the solvent (see FIG. 21A and FIG. 21B) was dissolved in a mixture of 50 g of water and 3.45 g triethylamine (TEA; 2.2:1 mol/mol ratio of TEA to PMDA). After 3 hours of stirring, acetic anhydride (6.73 g, 4.25 mol/mol ratio relative to PMDA) was added, and the mixture was stirred for 30 seconds. At the end of that period, the sol was poured into an immiscible phase under shear using a Ross mixer at 3800 rpm The immiscible phase was prepared by mixing 9.7 g of surfactant (Hypermer® B246SF; HLB of 6) in 500 mL hexane. The sol was added to the hexane phase at a 1:8 v/v ratio. Gelation took place at room temperature in 3.2 minutes. After stirring under high shear for 8 minutes, the mixture was removed from the Ross mixer and left to age for 35 minutes. Water (300 mL) was added, and the biphasic mixture was stirred briefly. The hexane layer was decanted, or removed with a separatory funnel. The gel beads were collected from the water phase by vacuum filtration making sure that they were not allow to dry on the filter, and were aged in ethanol at 68° C. Three ethanol solvent exchanges were performed prior to drying. A photomicrograph of the gel beads after aging in ethanol is provided in FIG. 24.

The gel beads were split in two batches and were dried using either supercritical $CO_2$ or in an oven at 68° C. The former batch (Example 10A) is referred to herein as aerogel beads, and the latter (Example 10B) as xerogel beads. The aerogel beads had a surface area of 465 to 516 m$^2$/g.

Figure 25:
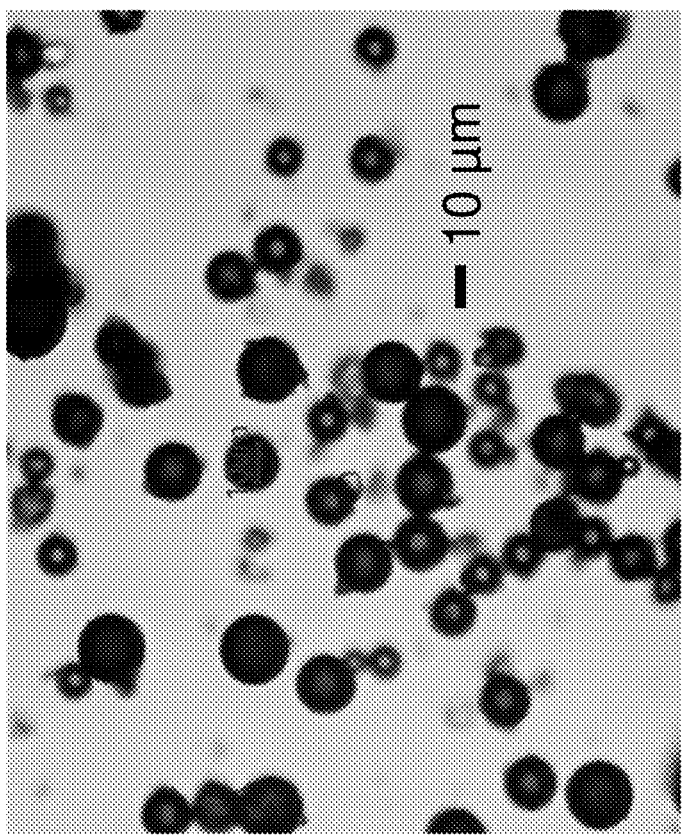
FIG. 25 is a photomicrograph of micron-sized polyimide xerogel beads according to a non-limiting embodiment of the disclosure.
Figure 26:
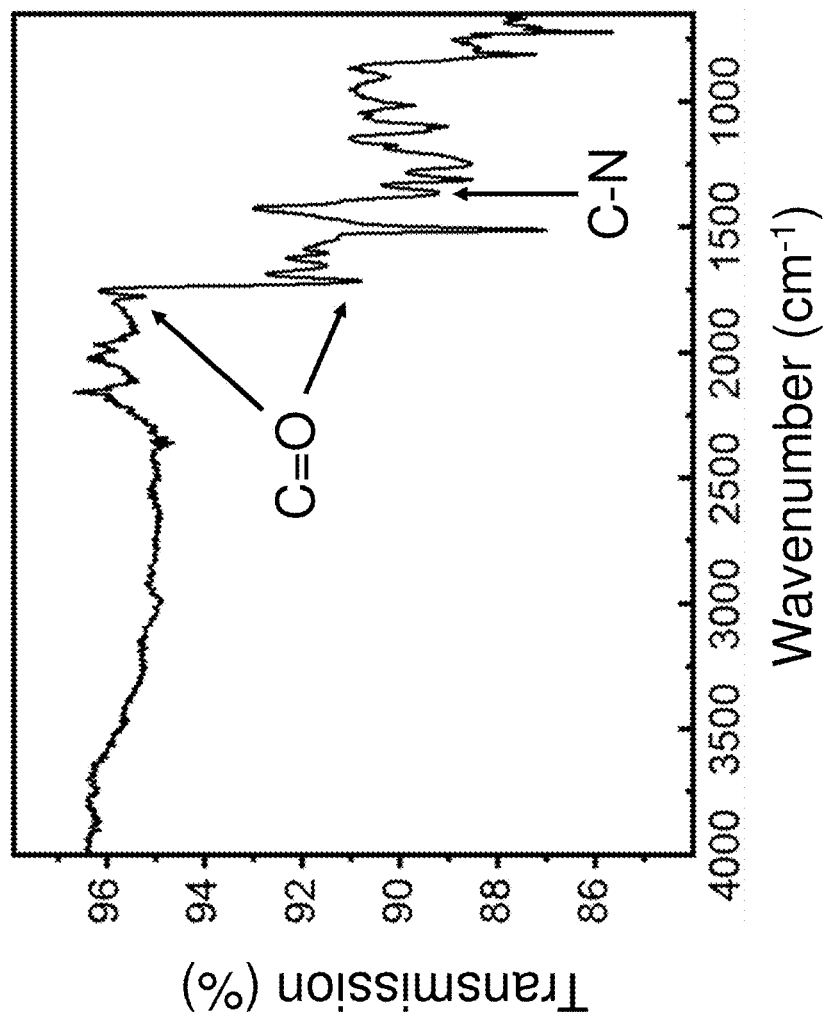
FIG. 26 is a Fourier Transform Infrared-Attenuated Total Reflectance (FTIR-ATR) spectrum of polyimide xerogel beads according to a non-limiting embodiment of the disclosure.

The polyimide xerogel beads had a diameter of 2-15 microns, as shown in the photomicrograph of FIG. 25. The FTIR-ATR spectrum (FIG. 26) of these xerogel beads included the characteristic features of polyimide, with bands at 1714 and 1775 cm$^{-1}$ (C=O) and 1367 cm$^{-1}$ (C—N).

Figure 27A:
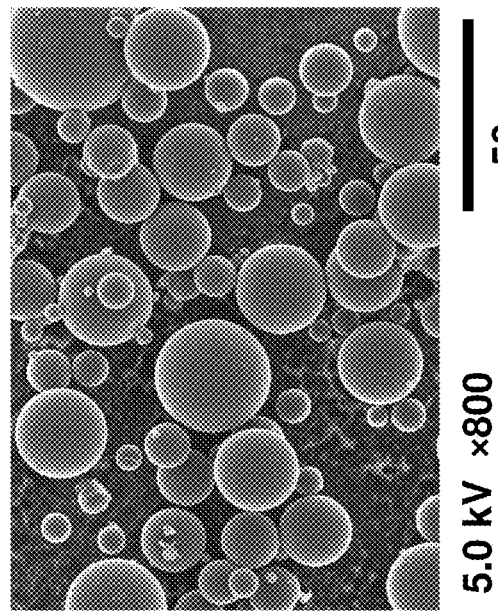
FIG. 27A is a scanning electron micrograph of carbonized aerogel beads according to a non-limiting embodiment of the disclosure.
Figure 27B:
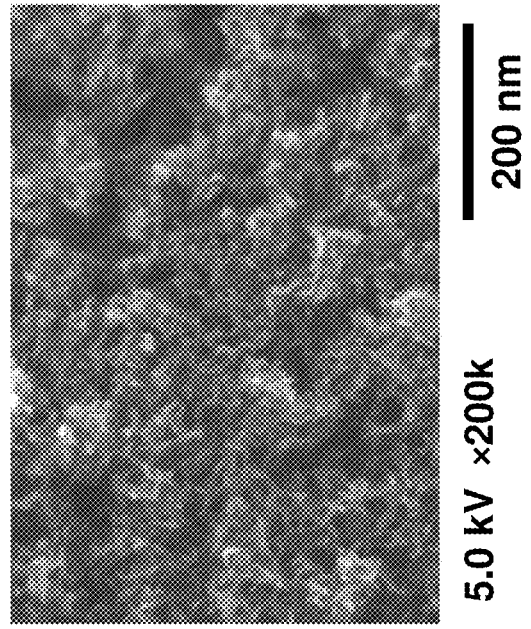
FIG. 27B is a scanning electron micrograph of the interior of a carbonized aerogel bead according to a non-limiting embodiment of the disclosure.
Figure 27C:
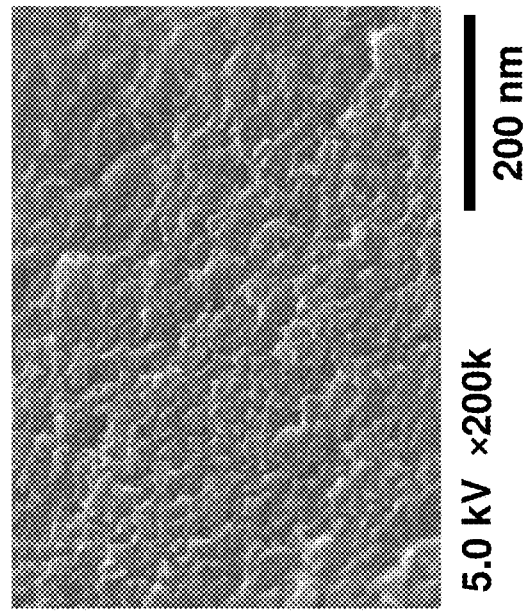
FIG. 27C is a scanning electron micrograph of the interior of a carbonized xerogel bead according to a non-limiting embodiment of the disclosure.

Carbonization of the beads was performed at 1050° C. for 2 hours under nitrogen using a ramp rate of 3° per minute. Scanning electron microscope images of the carbonized aerogel beads is provided in FIGS. 27A and 27B. In cross-section (FIG. 27B), the carbon aerogel beads showed a mesoporous fibrous microstructure. In contrast, the carbon xerogels of the same formulation (Example 10B) showed a more compact microstructure comprising smaller pores (FIG. 27C).

Example 11. Water-Based Preparation of PMDA-PDA Polyimide Aeroggel Beads Using Pre-Formed and Isolated Polyamic Acid and Various Surfactants Polyimide gel beads were prepared as in Example 10, but using magnetic bar stirring in place of the high-shear mixing. Various surfactants and mixtures thereof were used at a concentration of 2 g/100 mL of an immiscible phase, as shown in Table 5, below.

TABLE 5

Preparation conditions of polyimide beads

| Example # | T$_d$ (g/cm$^3$) | Immiscible phase | Ratio of sol-to-immiscible phase (v/v) | Surfactant | Surfactant/surfactant ratio (%/%) |
| --- | --- | --- | --- | --- | --- |
| 11A | 0.10 | hexane | 1:10 | Span 80/Tween 80 | 93/7 |
| 11B | 0.07 | hexane | 1:8 | Span 65/Tween 80 | 72/28 |
| 11C | 0.07 | Silicone oil | 1:8 | Span 80 | 100 |
| 11D | 0.10 | hexane | 1:10 | Span 20 | 100 |
| 11E | 0.07 | cyclohexane | 1:10 | Hypermer® B246SF | 100 |

The polyimide beads had diameters of 100-200 microns. Carbonization of the beads was performed at 1050° C. for 2 hours under nitrogen using a ramp rate of 3° per minute.

Figure 28:
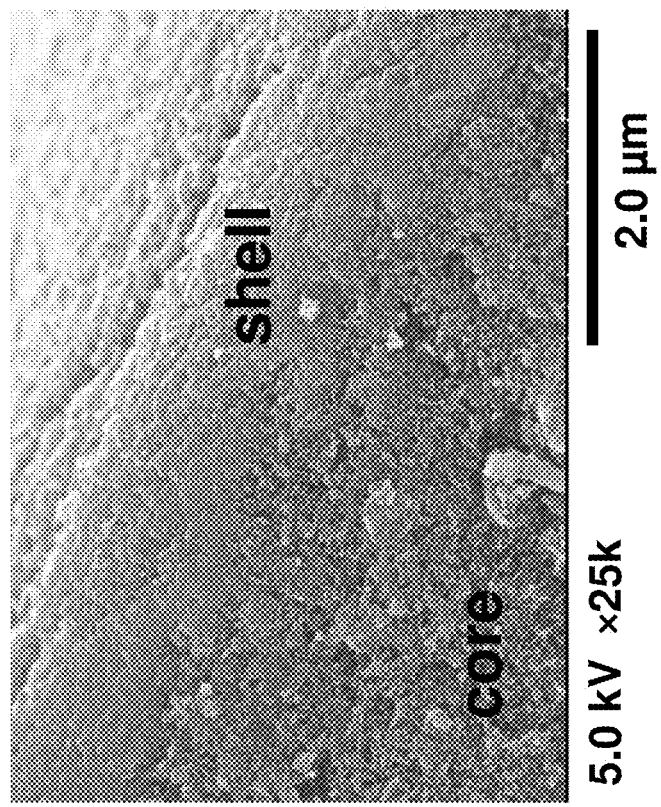
FIG. 28 is a scanning electron micrograph of a cross-section near the surface of a carbonized xerogel bead according to a non-limiting embodiment of the disclosure.

An SEM image of the interior of carbonized xerogel beads prepared with Span 80/Tween 80 in hexane (Example 11A) is provided in FIG. 28, which shows that these beads had a less porous shell as compared to the core.

Figure 29B:
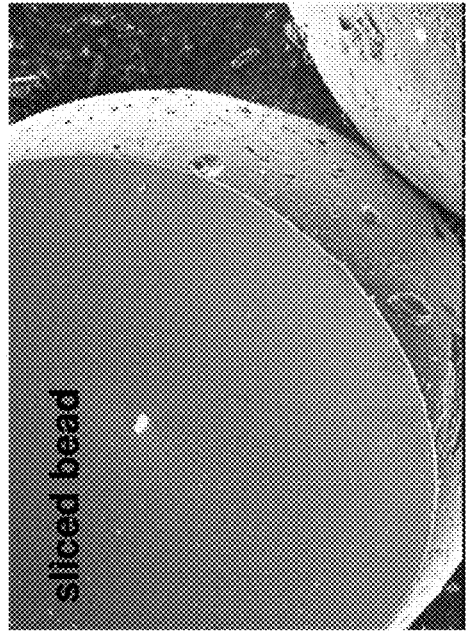
FIGS. 29A, 29B, and 29C are a series of scanning electron micrographs of carbon xerogel beads, the cross-section of such a bead, and the area near the surface of such a bead, respectively, according to a non-limiting embodiment of the disclosure.
Figure 29A:
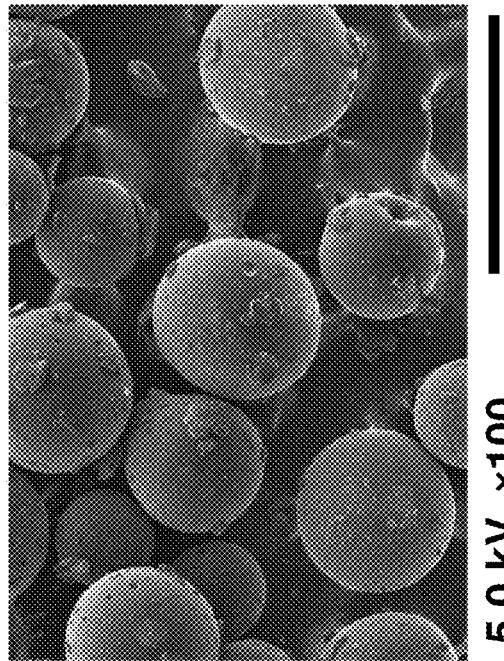
Figure 29C:
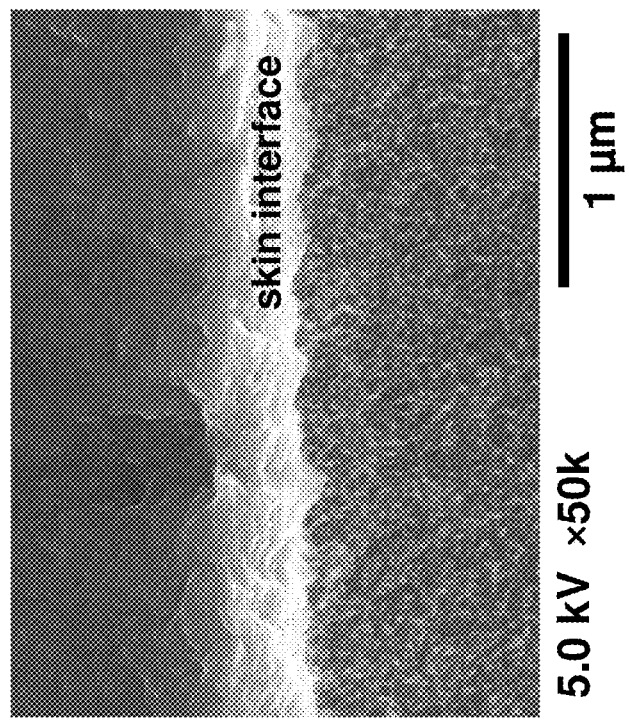

A series of SEM images of the carbonized xerogel beads prepared with Span 20 in hexane (Example 11D) is provided in FIGS. 29A-29C. These beads showed a unique morphology, with a mesoporous core and a denser shell. These core/shell morphologies may be advantageous for certain applications.

The carbonized xerogel beads prepared with Span 80 (Example 11C) were fused together and broke during processing and debris statically clinging to the beads was observed in lower-resolution SEM.

Not all surfactants gave spherical beads. For example, using the mixture of Span 65 and Tween 80 in hexane (Ex. 11B) resulted in elongated or irregular shape carbonized particles, while Span 80 in silicone oil (Ex. 11C) gave agglomerates of small beads fused together.

The polyimide gels prepared in the presence of Hypermer® B246SF surfactant (Ex. 11E) were strong, and distinct spherical beads were obtained after carbonization, which may be advantageous for certain applications.

The weight loss with carbonization of the polyimide beads at 1050° C. is shown in Table 6.

TABLE 6

Weight loss upon carbonization of beads according to Example 11

| Example # | Weight loss (%) |
|---|---|
| 11A | 65.3 |
| 11B | 58.9 |
| 11C | 73.6 |
| 11E | 59.8 |

In a further example, polyimide gel beads were prepared as above, but in the absence of any surfactant and using silicone oil as the immiscible phase. The FTIR-ATR spectrum showed that they were imidized, with the 1368 cm$^{-1}$ band being characteristic of the C—N stretching resonance of the imide. Carbonization of the beads was performed at 1050° C. for 2 hours under nitrogen using a ramp rate of 3° per minute. The surface area of these carbonized xerogel beads was 41.5 m$^2$/g.

Example 12. Water-Based Preparation of Polyimide Aerogel Microbeads Using Polyamic Acid Formed In Situ from PMDA and PDA in Water Polyimide gel beads were prepared from gelation in an emulsion of an aqueous triethylammonium salt solution of polyamic acid at a target density of about 0.088 g/cm$^3$. For this, PDA (1.68 g, 1:1 mol/mol relative to PMDA) was mixed with 50 g of water and 3.72 g triethylamine (2.37:1 mol/mol ratio to PMDA) for 1 hour. PMDA (3.38 g, 0.0155 mol) was added to the mixture and stirred for 1 day to 4 days at room temperature. To the resulting triethylammonium salt solution of the polyamic acid, acetic anhydride (6.73 g, 4.25 mol/mol ratio relative to PMDA) was added, and the mixture was stirred for 30 seconds. At the end of that period, the sol was poured into an immiscible phase under high shear using a Ross mixer at 1500 rpm. The immiscible phase was prepared by dissolving 7.5 g of surfactant Hypermer® B246SF (HLB of 6) in 500 mL of hexane or cyclohexane. The sol was added to the immiscible phase at 1:8 v/v ratio and the mixture was stirred for 15 minutes. Gelation took place at room temperature in 3.5 min. The mixture was removed from the Ross mixer and the hexane phase was decanted. Water (500 mL) was added to the gel beads. After brief stirring, the water layer was separated by decanting. The gel beads were placed in ethanol and the agglomerates were dispersed by probe sonication for 1 minute. Three ethanol exchanges at 68° C. were performed prior to drying, and the beads were further processed as in Example 10.

Example 13. Water-Based Preparation of Silicon-Doped Polyimide Aerogel Microbeads Using Polyamic Acid Formed In Situ from PMDA and PDA Polyimide gel beads were prepared from gelation in an emulsion of an aqueous triethylammonium salt solution of polyamic acid at a target density of about 0.088 g/cm$^3$. For this, PDA (1.68 g, 1:1 mol/mol relative to PMDA) was added to a mixture of 50 g of water and 3.72 g triethylamine (2.37:1 mol/mol ratio to PMDA) and the solution was stirred for 1 hour. PMDA (3.38 g, 0.0155 mol) was added to the mixture, and the new solution was stirred for 4 days at room temperature. Silicon powder 1.78 g (4.10 mol/mol ratio to PMDA) was dispersed for 5 minutes in 10 g of the triethylammonium salt solution of the resulting polyamic acid using 1.78 g of zirconia media and a FlackTek centrifugal mixer. The silicon powder had a particle size of 178 nm. The silicon dispersion was added to the rest of the polyamic acid solution and the mixture was stirred for 5 minutes. To this solution, acetic anhydride (6.73 g, 4.25 mol/mol ratio relative to PMDA) was added, and the mixture was stirred for 30 seconds. At the end of that period, the silicon dispersion was poured into an immiscible phase under high-shear using a Ross mixer at 3000 rpm at 1:8 v/v ratio. The immiscible phase was prepared by dissolving 7.3 g of surfactant (Hypermer® B246SF, HLB of 6) in 600 mL of hexane or cyclohexane. Gelation took place at room temperature in 3.5 min. The mixture was removed from the Ross mixer after 16 minutes and was stirred with 300 mL of water for 2 hours. A stable emulsion formed at that point. The emulsion was broken by adding 1 L of ethanol, and the gel beads were separated and processed as in Example 12.

Figure 30:
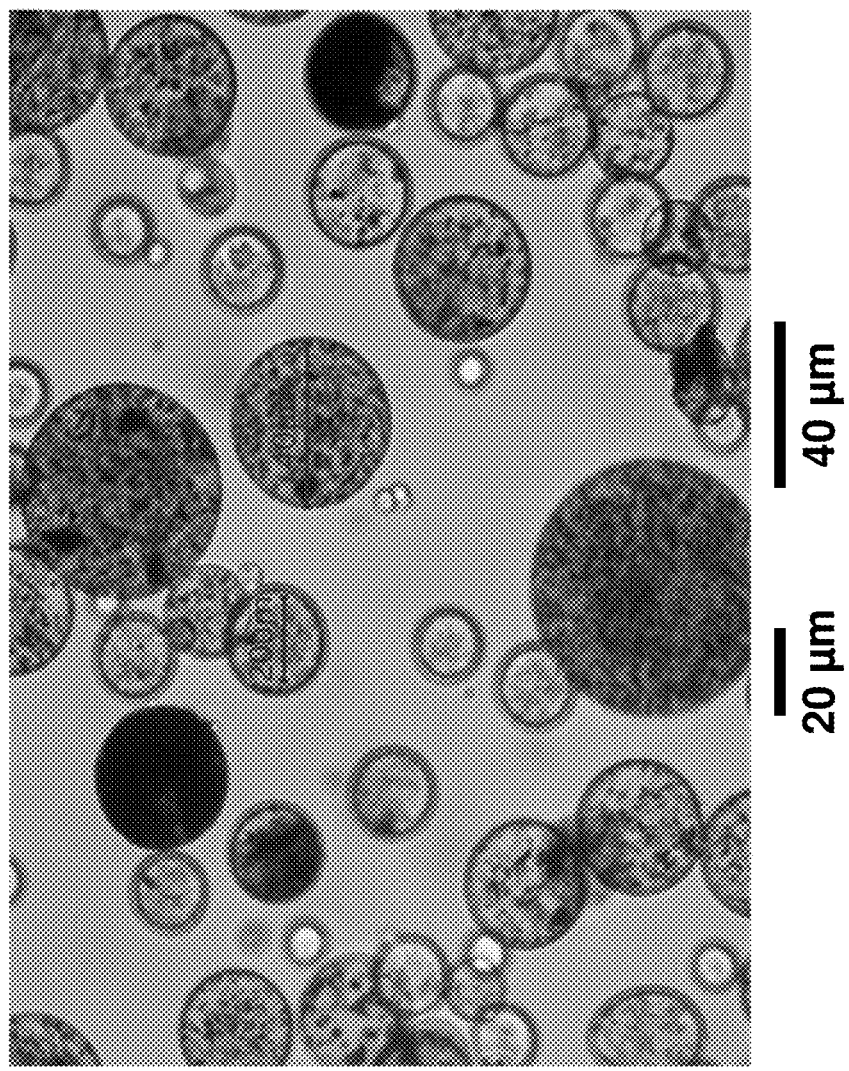
FIG. 30 is a photomicrograph of silicon-doped polyimide gel beads according to a non-limiting embodiment of the disclosure.

Example 14. Water-Based Preparation of Silicon-Doped Polyimide Xerogel Microbeads Using Preformed and Isolated Polyamic Acid from PMDA and PDA Polyimide gel beads were prepared from gelation in an emulsion of an aqueous triethylammonium salt solution of polyamic acid at a target density of about 0.10 g/cm$^3$. Silicon powder 0.946 g (1.61 mol/mol ratio to PMDA) was sonicated in 46 g water for 2 minutes using a probe sonicator. Triethylamine 4.68 g (2.2 mol/mol ratio to PMDA) was added to the silicon dispersion and the mixture was stirred for 5 minutes. Solid polyamic acid (6.8 g; pre-prepared and isolated from the condensation reaction of PDA and PMDA in N,N-dimethylacetamide) was added to this dispersion, and the mixture was stirred for 2 hours. At the end of this period, acetic anhydride 9.12 g (4.25 mol/mol ratio to PMDA) was added and mixed for 10 seconds. The viscous dispersion was rapidly poured into an immiscible phase consisting of 7 g of a surfactant (Hypermer® B246SF, HLB of 6) dissolved in 500 mL of hexane. The aqueous solution of the triethylammonium salt of the polyamic acid was added to the hexane phase at 1:8 v/v ratio. Gelation took place at room temperature in 2 minutes. After stirring at 4500 rpm for 6 minutes, the mixture was removed from the Ross mixer and left undisturbed for 60 minutes. Water (300 mL) was added and mixed briefly. The hexane layer was separated by decanting and the gel beads were processed as described in Example 12. The spherical wet-gel beads had a diameter in the range of 5 to 60 microns (FIG. 30). The silicon particles are clearly visible within the wet-gel beads, and were randomly dispersed. After processing and drying the beads in an oven, the beads shrank as expected for xerogels, while maintaining the spherical shape.

Similarly, following the method described in the previous paragraph, silicon-doped polyimide gel beads were prepared from gelation of a polyamic acid sol at a target density of 0.08 g/cm$^3$. After drying the gel beads in an oven at 68° C., the silicon-doped polyimide xerogel beads showed a surface area of 1.51 m$^2$/g and a pore volume of 0.028 cm$^3$/g by nitrogen sorption analysis.

Figure 31B:
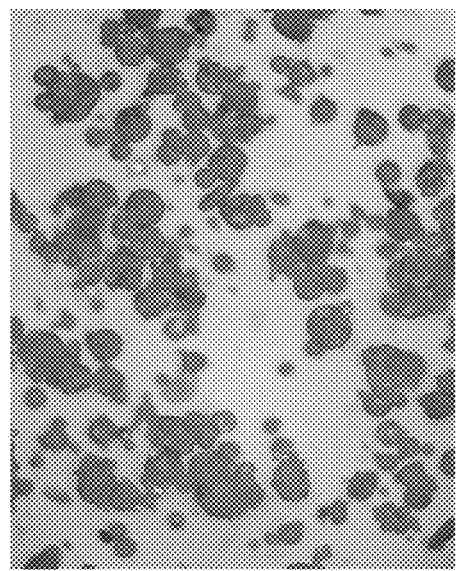
FIGS. 31B and 31C are scanning electron micrographs of silicon-doped carbonized aerogel beads according to a non-limiting embodiment of the disclosure.
Figure 31A:
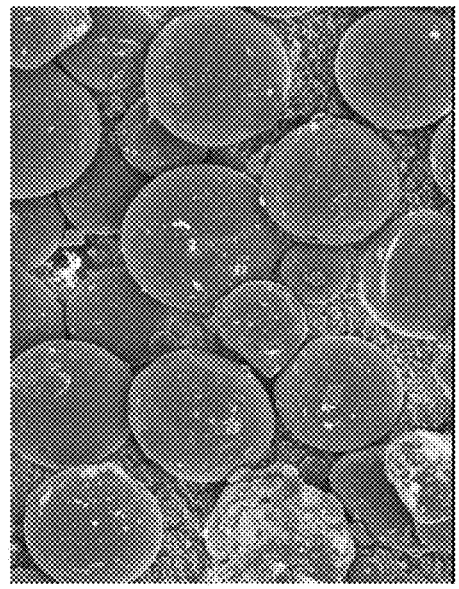
FIG. 31A is a photomicrograph of silicon-doped polyimide aerogel beads according to a non-limiting embodiment of the disclosure.
Figure 31C:
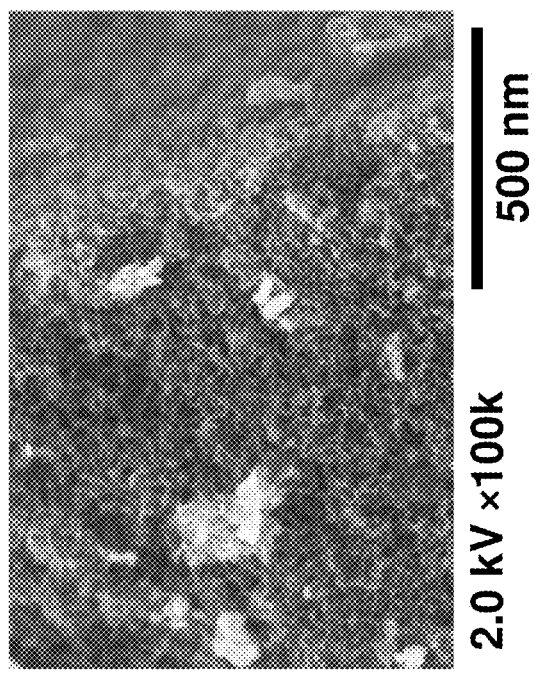

Example 15. Water-Based Preparation of Silicon-Doped Polyimide Aerogel Microbeads Using Preformed and Isolated Polyamic Acid from PMDA and PDA Polyimide gels were prepared as described in Example 14, but at a target density of about 0.08 g/cc. The silicon particles are clearly visible within the wet-gel beads, and are randomly dispersed, comparable to that of FIG. 30. After drying using supercritical $CO_2$ extraction, the silicon doped aerogel beads showed particle sizes in the range of 10 to 70 microns as shown in FIG. 31A. The surface area of these aerogel beads was 328.48 $m^2/g$ and the pore volume was 1.92 $cm^3/g$. Carbonization of the beads was performed at 1050° C. for 2 hours under nitrogen using a ramp rate of 3° per minute. SEM images of the outer surface and inner core (FIGS. 31B and 31C, respectively) of those carbon aerogel beads showed a nearly spherical shape with a porous fibrous internal structure having silicon flakes dispersed throughout the carbon matrix.

Figure 32:
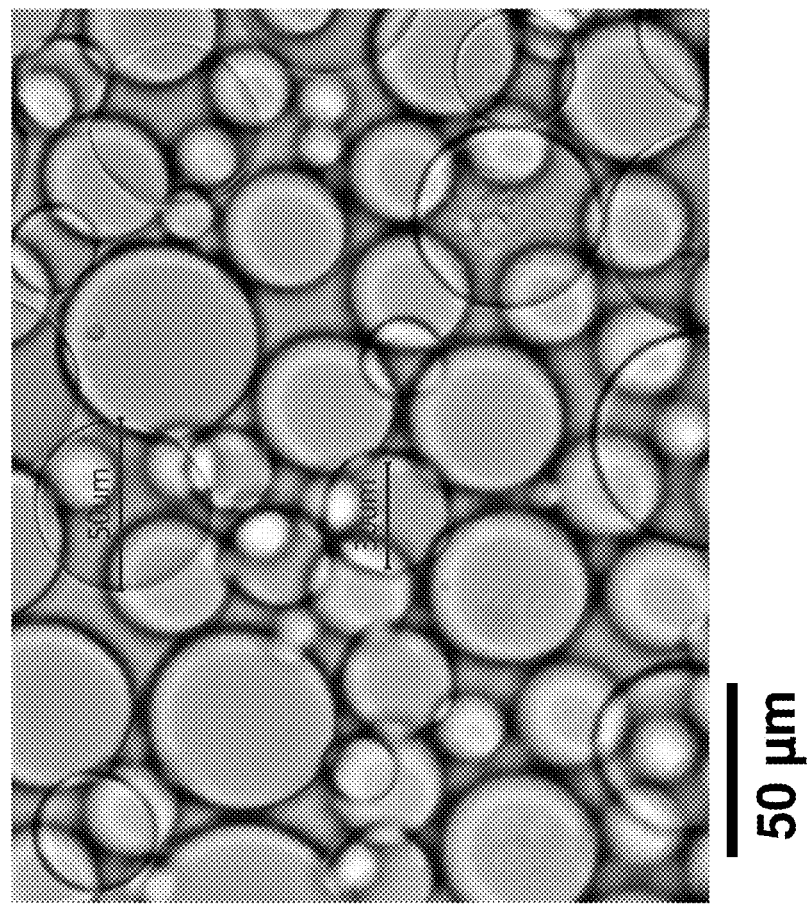
FIG. 32 is a photomicrograph of polyimide aerogel beads according to a non-limiting embodiment of the disclosure.

Example 16. Water-Based Preparation of Polyimide Aerogel Micro Beads Using Preformed and Isolated Polyamic Acid from PMDA and PDA with Diisopropylethylamine as the Non-Nucleophilic Amine Polyimide aerogel beads were prepared as described in Example 15, but using diisopropylethylamine instead of triethylamine as the non-nucleophilic amine. The polyimide aerogel beads were prepared with and without silicon doping. A photomicrograph of the non-doped polyimide aerogel beads is shown FIG. 32.

Example 17. Water-Based Preparation of Polyamic Acid Aerogel Beads, Polyimide Aerogel Beads, and Corresponding Carbon Aerogel Beads from an Aqueous Solution of the Triethylammonium Salt of Pre-Formed and Isolated Polyamic Acid Added to Aqueous Acetic Acid/Acetic Anhydride Polyamic acid and polyimide beads were prepared starting with preformed and isolated solid polyamic acid obtained from the reaction of stoichiometric amounts of 1,4-phenylenediamine and pyromellitic dianhydride in N,N-dimethylacetamide. The solid-state $^{13}C$ NMR and $^{15}N$ NMR spectra of that polyamic acid are shown in FIG. 21A and FIG. 21B, respectively.

The solid polyamic acid (5 g) was suspended in 20 mL of water and dissolved by adding triethylamine (3.4 g, 4.7 mL, 2.2 mol excess relative to the polyamic acid repeat unit). The nominal target density (Td) of the solution was 0.2024 (5 g polyamic acid per 24.7 mL of total volume of liquids).

Figure 33:
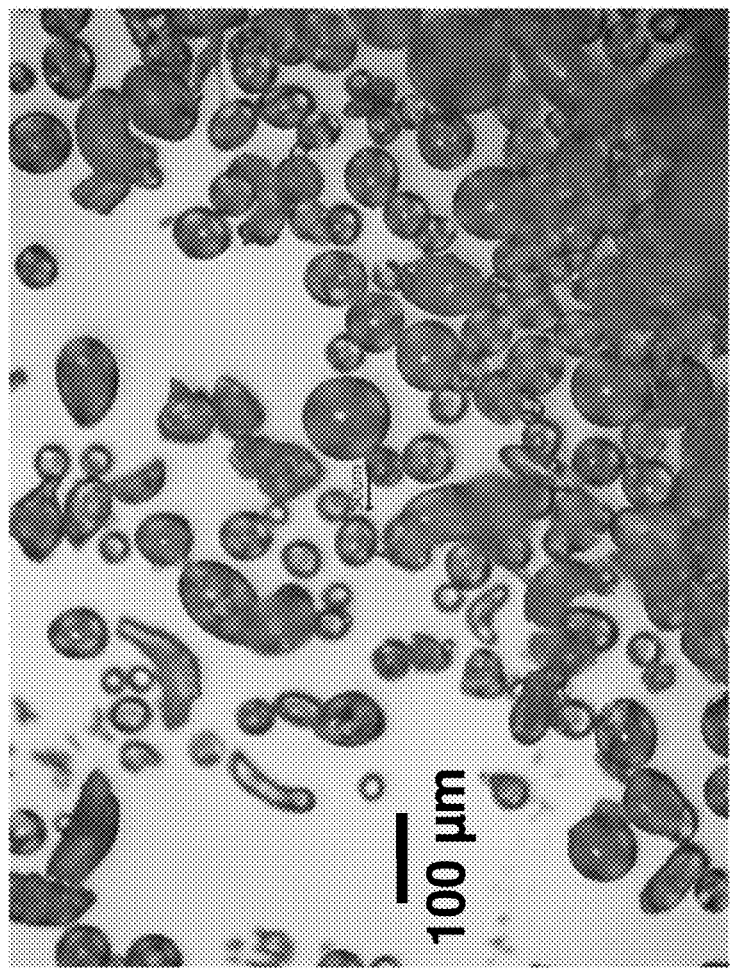
FIG. 33 is a photomicrograph of polyamic acid wet-gel beads according to a non-limiting embodiment of the disclosure.

A portion of the resulting viscous solution of the triethylammonium of the polyamic acid was sprayed into a solution of acetic acid and acetic anhydride in water (20/20/80 by volume) using compressed gas assistance to form sub-millimeter polyamic acid beads (Example 17A). A picture of the resulting wet-gel beads taken with an optical microscope is shown in FIG. 33.

A portion of the sub-millimeter polyamic acid wet-gel beads were solvent-exchanged with water (3×) and microwaved in water (3×30 seconds and 2×20 seconds). The resulting polyimide beads were solvent-exchanged with ethanol and dried with supercritical fluid (SCF) $CO_2$ to provide polyimide aerogel beads (Example 17B). The infrared spectrum is provided as FIG. 34A, which shows peaks at 1778, 1726, and 1377 $cm^{-1}$, demonstrating at least partial imidization.

Another portion of the viscous solution of the triethylammonium salt of the polyamic acid was added dropwise with a disposable pipet to a solution of acetic acid and acetic anhydride in water (20/20/80 ratio by volume) to form millimeter-sized polyamic acid wet-gel beads (Example 17C). The resulting polyamic acid wet-gel beads were solvent-exchanged with ethanol and dried with SCF $CO_2$ to provide millimeter-sized polyamic acid aerogel beads. The infrared spectrum of the aerogel beads of Example 17C is provided as FIG. 34B, which shows that the aerogel beads consisted mostly of polyamic acid. A portion of the polyamic acid wet-gel beads were carbonized at 1050° C. under $N_2$ to give the corresponding carbon aerogel beads (Example 17D).

Another portion of the millimeter-sized polyamic acid wet-gel beads were solvent-exchanged with water (3×) and microwaved in water (3×30 seconds and 2×20 seconds). The resulting polyimide wet-gel beads were solvent-exchanged with ethanol and dried with SCF $CO_2$ to provide polyimide aerogel beads (Example 17E). A portion of the polyimide aerogel beads were carbonized at 1050° C. under $N_2$ to give the corresponding carbon aerogel beads (Example 17F). Physical characterization data for Examples 17C-17F is provided in Table 7.

TABLE 7

Physical characteristics of Examples 17C-17F

| Property | Example 17C | Example 17D | Example 17E | Example 17F |
|---|---|---|---|---|
| Bead diameter | 3.65 | 2.41 | 3.52 | 2.07 |
| Carbonization yield (% w/w) | N/A | 38.1 | N/A | 39.4 |
| $\rho_b$ (g/cm³) | 0.164 | 0.315 | 0.134 | 0.182 |
| $\rho_s$ (g/cm³) | 1.2 | 2.0 | 1.2 | 2.0 |
| porosity (% v/v) | 86 | 84.3 | 91 | 91 |
| BET surface area (m²/g) | 360 | 403 | 413 | 486 |
| Micropore surface area (m²/g) | 79 | 107 | 91 | 98 |
| $V_{Total}$ (cm³/g) | 5.27 | 2.68 | 4.99 | 4.99 |
| $V_{1.7-300}$ (cm³/g) | 2.62 | 1.79 | 3.22 | 3.57 |
| $V_{Total}/V_{1.7-300}$ | 2.01 | 1.50 | 1.55 | 1.40 |

Figure 35B:
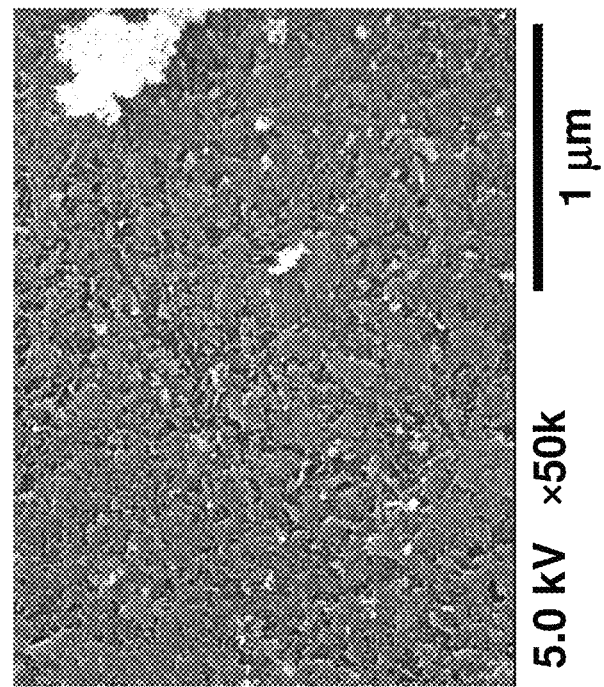
FIGS. 35A and 35B are scanning electron photomicrographs of the exterior skin at two different magnifications of a carbon aerogel bead according to a non-limiting embodiment of the disclosure.
Figure 35A:
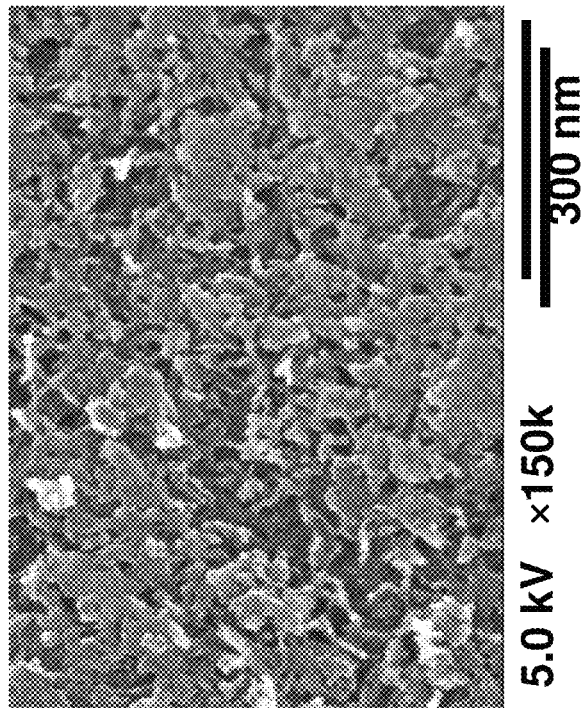
Figure 35D:
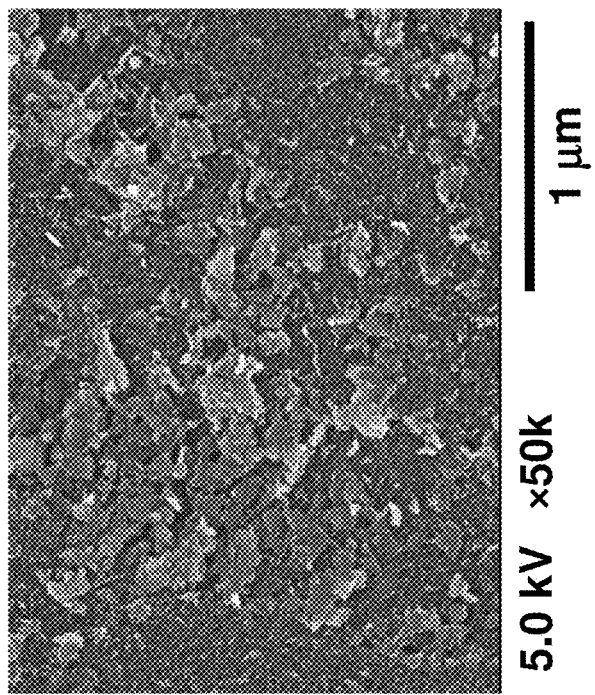
FIGS. 35C and 35D are scanning electron photomicrographs of the exterior skin at two different magnifications of a carbon aerogel bead according to a non-limiting embodiment the disclosure.
Figure 35C:
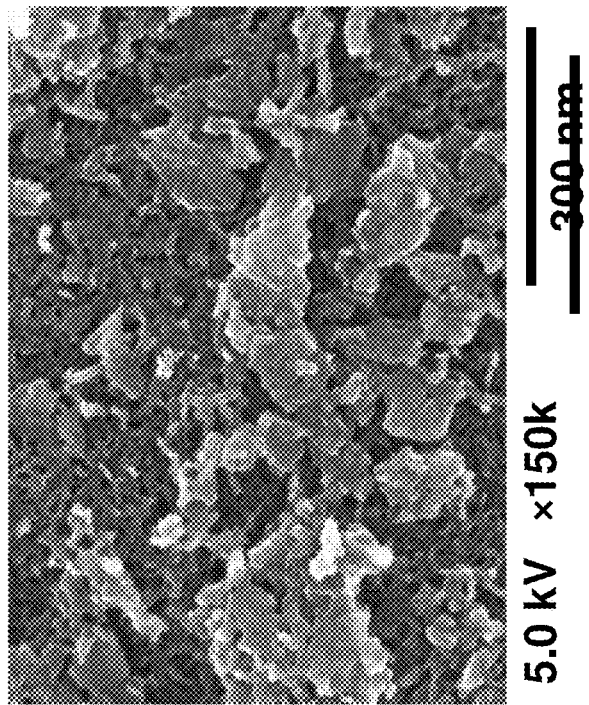
Figure 36A:
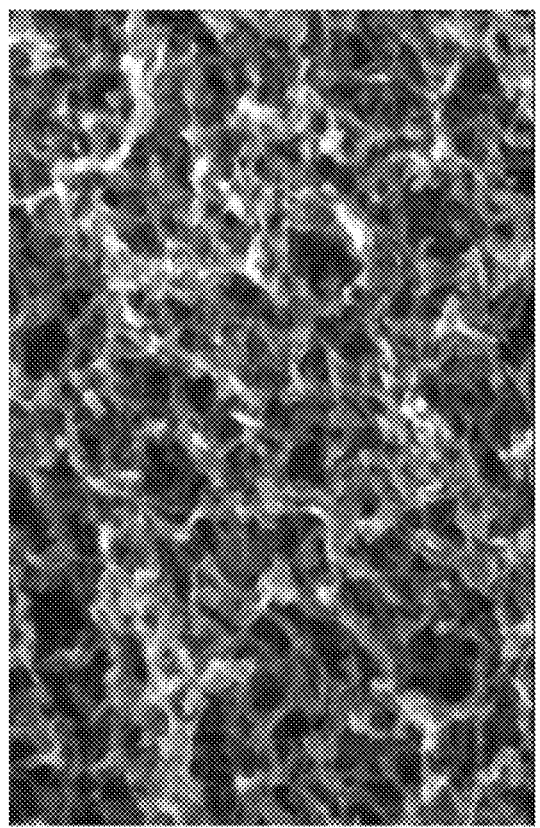
FIG. 36A is a scanning electron photomicrograph of the interior of a carbon aerogel bead according to a non-limiting embodiment of the disclosure.
Figure 36B:
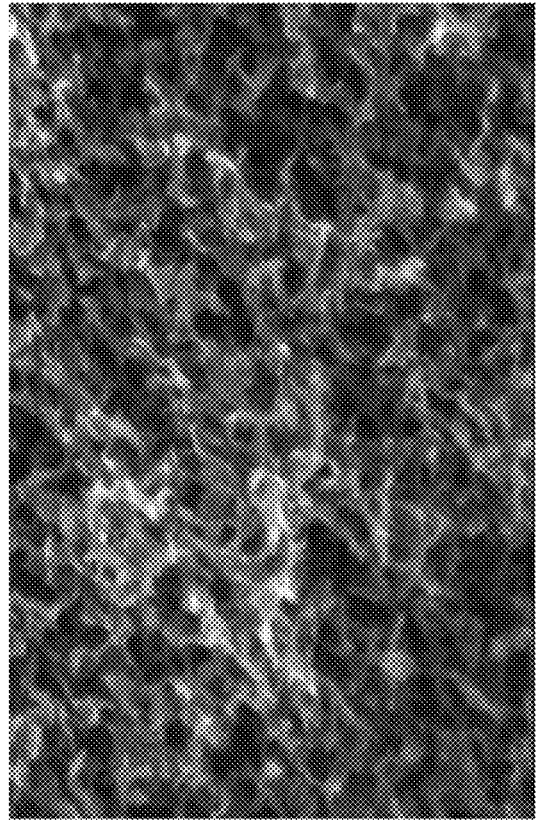
FIG. 36B is a scanning electron photomicrograph of the interior of a carbon aerogel bead according to a non-limiting embodiment of the disclosure.

Scanning electron micrograph (SEM) images of the skin of the carbon beads of Example 17D at two different magnifications are provided as FIGS. 35A and 35B. Scanning electron micrograph (SEM) images of the skin of the carbon beads of Example 17F at two different magnifications are provided as FIGS. 35C and 35D. SEM images of the interiors of the carbon beads from Examples 17D and 17F at high magnification are provided as FIGS. 36A and 36B, respectively, showing that samples of both beads appear to consist of entangled nanofoils and nanoribbons. After carbonization, the skin of the microwaved beads (Example 17F; FIGS. 35C and 35D) looked more like their interiors (FIG. 36B), while the skin of the non-microwaved beads (Example 17D; FIGS. 35A and 35B) consisted of a denser crust with fewer openings.

Figure 37B:
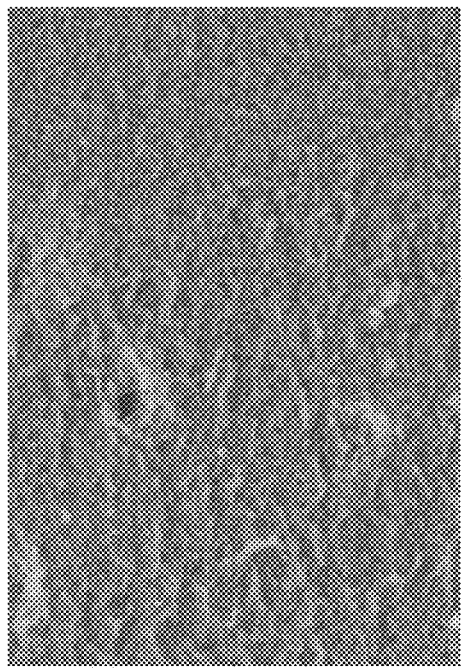
FIG. 37B is a scanning electron photomicrograph of the exterior skin of a carbon aerogel bead according to a non-limiting embodiment of the disclosure.
Figure 37A:
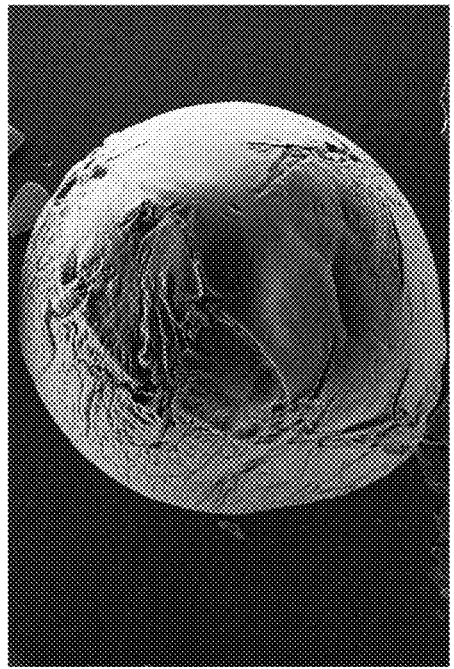
FIG. 37A is a scanning electron photomicrograph a carbon aerogel bead according to a non-limiting embodiment of the disclosure.
Figure 37D:
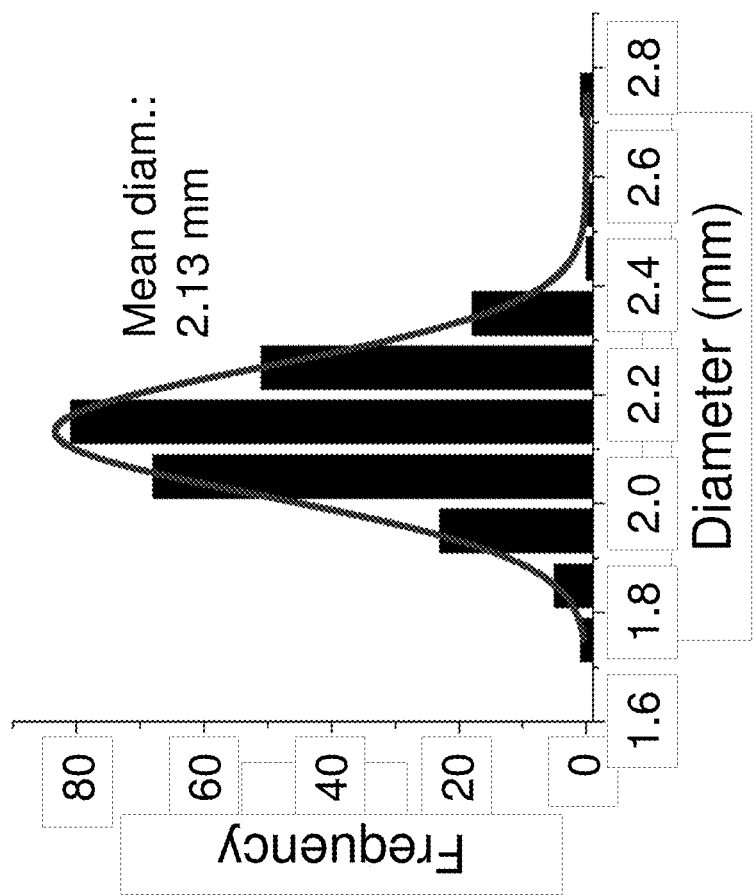
FIG. 37D is a plot showing the mean diameter of carbon aerogel beads according to an embodiment of the disclosure.
Figure 37C:
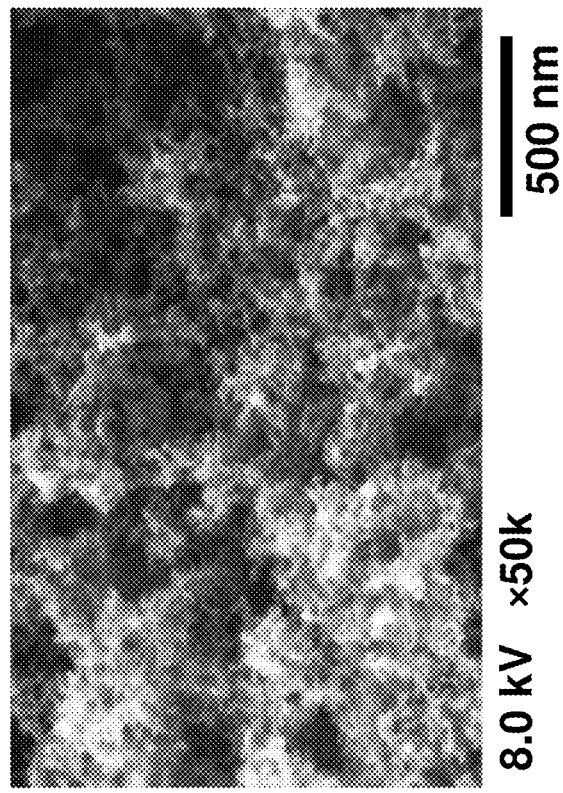
FIG. 37C is a scanning electron photomicrograph of the interior of a carbon aerogel bead according to a non-limiting embodiment of the disclosure.
Figure 38:
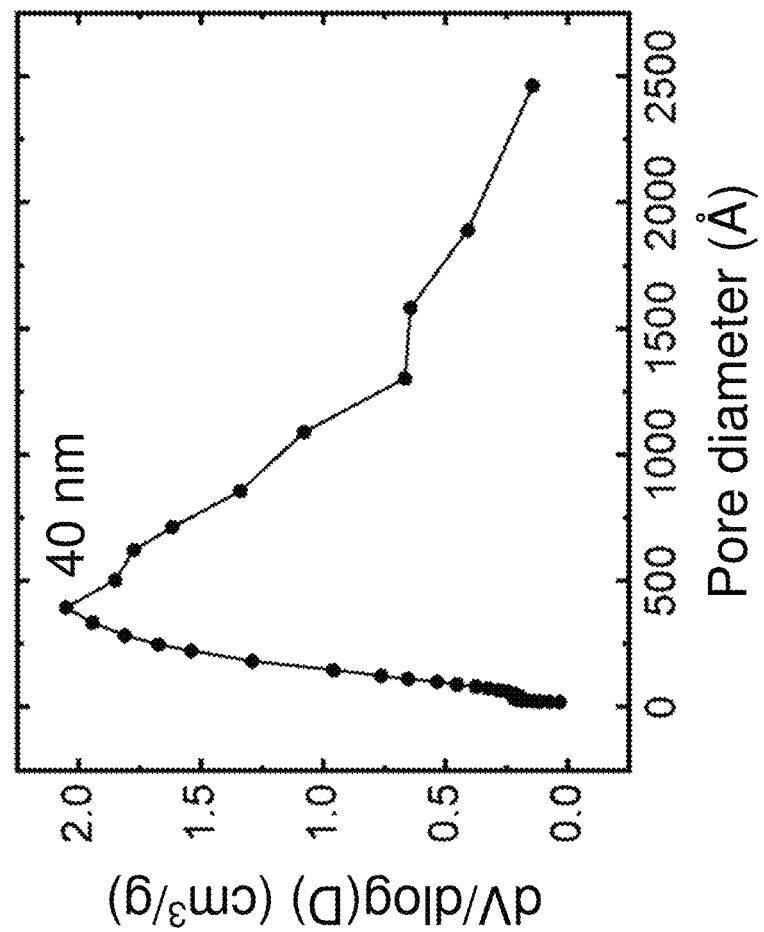
FIG. 38 is a plot showing the pore volume distribution as a function of pore size for carbon aerogel beads according to a non-limiting embodiment of the disclosure.

Example 18. Water-Based Preparation of Polyamic Acid Aerogel Beads and Corresponding Carbon Aerogel Beads from an Aqueous Solution of the Triethylammonium Salt of a Pre-Formed and Isolated Polyamic Acid Added to a Hexane/Acetic Acid Solution Polyamic acid beads were prepared starting with pre-formed and isolated solid polyamic acid obtained from the reaction of 1,4-phenylenediamine and pyromellitic dianhydride in N,N-dimethylacetamide. The solid-state $^{13}$C NMR and $^{15}$N NMR spectra of that polyamic acid are shown in FIG. 21A and FIG. 21B, respectively. The target density was 0.0478. The polyamic acid (5 g) was dissolved in 100 mL water by adding triethylamine (3.4121 g, 4.70 mL, 2.2 mol excess relative to the polyamic acid repeat unit). The solution of the triethylammonium salt of the polyamic acid was added dropwise to 100 mL of hexane:AcOH (90:10 v/v) using a large plastic pipette to form polyamic acid beads. The polyamic acid gel beads were solvent exchanged with ethanol and were dried with SCF $CO_2$ to give polyamic acid aerogel beads. The polyamic acid aerogel beads were carbonized at 1050° C. under $N_2$ to give the corresponding carbon aerogel beads. A SEM photomicrograph of a single bead is shown in FIG. 37A, and the skin and interior is shown as FIGS. 37B and 37C, respectively. The mean diameter of the carbon aerogel beads was 2.1 mm (FIG. 37D). The properties of the carbon aerogel beads are provided in Table 8, and the pore size distribution is provided in FIG. 38.

TABLE 8

Physical characteristics of Example 18

| Property | Value |
|---|---|
| Carbonization yield(% w/w) | 34 |
| $\rho_b$ (g/cm$^3$) | 0.0877 |
| $\rho_s$ (g/cm$^3$) | 2.1824 |
| porosity (% v/v) | 96 |
| BET surface area (m$^2$/g) | 451 |
| Micropore surface area (m$^2$/g) | 123 |
| $V_{Total}$ (cm$^3$/g) | 10.95 |
| $V_{1.7-300}$ (cm$^3$/g) | 1.9 |
| $V_{Total}/V_{1.7-300}$ | 5.76 |

Figure 39B:
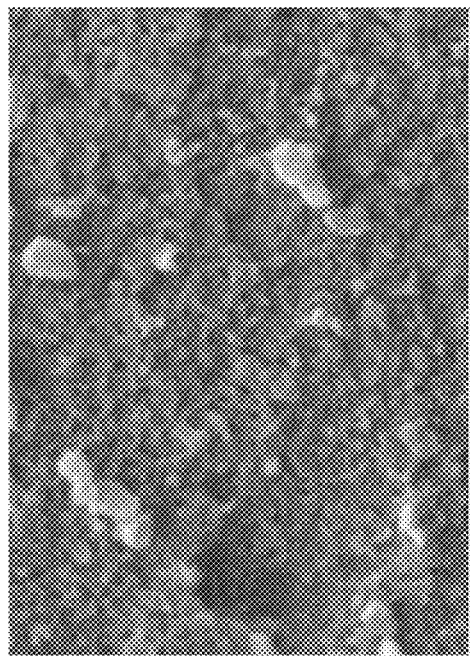
FIG. 39B is a scanning electron photomicrograph of the interior of a carbon aerogel bead according to a non-limiting embodiment of the disclosure.
Figure 39A:
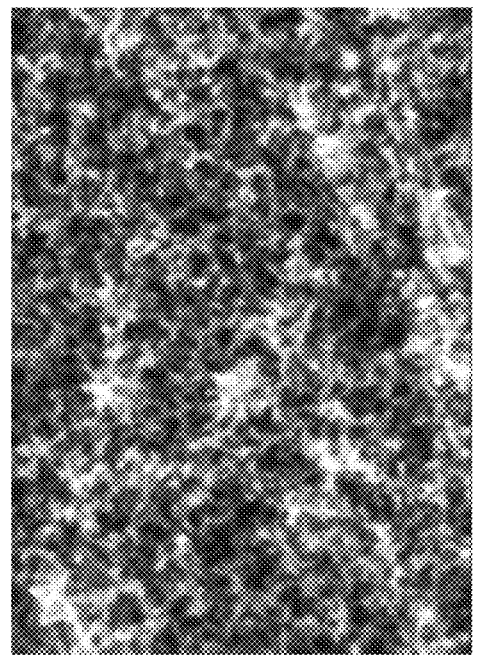
FIG. 39A is a scanning electron photomicrograph of the exterior skin of a carbon aerogel bead according to a non-limiting embodiment of the disclosure.

Example 19. Water-Based Preparation of Polyamic Acid Aerogel Beads and the Corresponding Carbon Aerogel Beads from an Aqueous Solution of the Triethylammonium Salt of a Pre-Formed and Isolated Polyamic Acid Added to an Aqueous Acetic Acid Solution Polyamic acid aerogel beads were prepared starting with preformed and isolated solid polyamic acid obtained from the reaction of 1,4-phenylene diamine and pyromellitic dianhydride in N,N-dimethylacetamide. The solid-state $^{13}$C NMR and $^{15}$N NMR spectra of that polyamic acid are shown in FIG. 21A and FIG. 21B, respectively. The polyamic acid (5 g) was suspended as a solid powder in 30 mL of water, and it was dissolved by adding triethylamine (3.4121 g, 4.70 mL, 2.2 mol excess relative to the polyamic acid repeat unit). The target density was 0.144. The aqueous triethylammonium salt solution of the polyamic acid was added dropwise to 100 mL of 20% aqueous acetic acid using a large plastic pipette to form polyamic acid wet-gel beads. The beads were solvent exchanged with ethanol and dried with SCF $CO_2$ to give polyamic acid aerogel beads. The polyamic acid beads were carbonized at 1050° C. under $N_2$ to give the corresponding carbon aerogel beads. SEM photomicrographs of the skin and the interior of a carbon aerogel bead are shown as FIGS. 39A and 39B, respectively. The mean diameter of the beads was 2.6 mm. The properties of the carbon aerogel beads are provided in Table 9, and the pore size distribution is provided in FIG. 39C.

TABLE 9

Physical characteristics of Example 19

| Property | Value |
|---|---|
| Carbonization yield (% w/w) | 36 |
| $\rho_b$ (g/cm$^3$) | 0.168 |
| $\rho_s$ (g/cm$^3$) | 2.118 |
| porosity (% v/v) | 92.1 |
| BET surface area (m$^2$/g) | 465 |
| Micropore surface area (m$^2$/g) | 113 |
| $V_{Total}$ (cm$^3$/g) | 5.49 |
| $V_{1.7-300}$ (cm$^3$/g) | 2.97 |
| $V_{Total}/V_{1.7-300}$ | 1.85 |

Figure 40A:
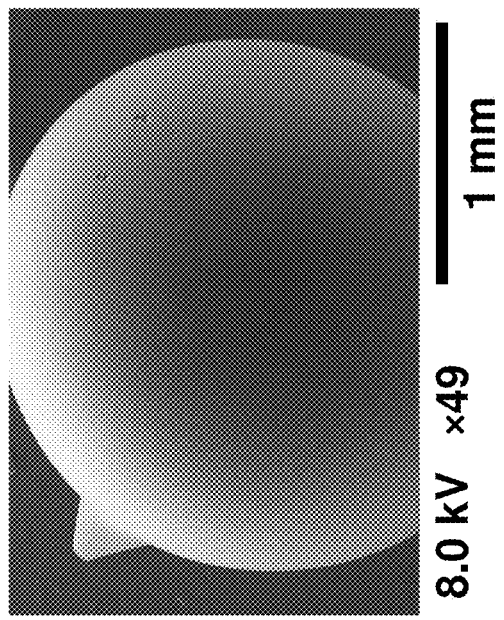
FIG. 40A is a scanning electron photomicrograph a carbon aerogel bead according to a non-limiting embodiment the disclosure.
Figure 40C:
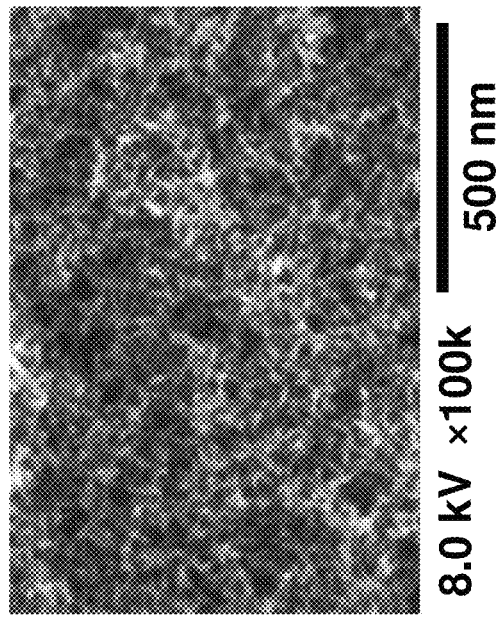
FIG. 40C is a scanning electron photomicrograph of the interior of a carbon aerogel bead according to a non-limiting embodiment of the disclosure.
Figure 40B:
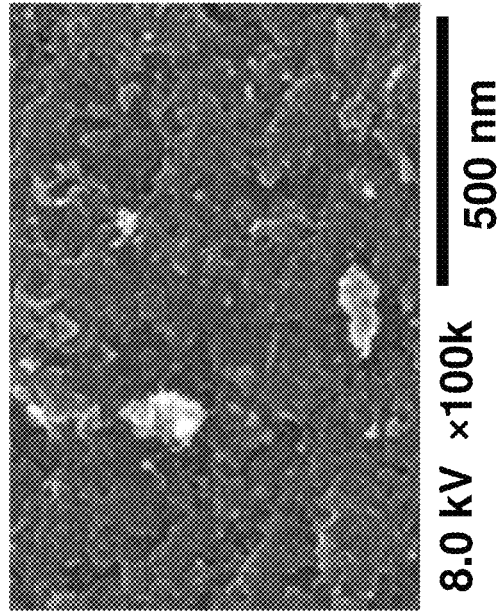
FIG. 40B is a scanning electron photomicrograph of the exterior skin of a carbon aerogel bead according to a non-limiting embodiment of the disclosure.
Figure 41B:
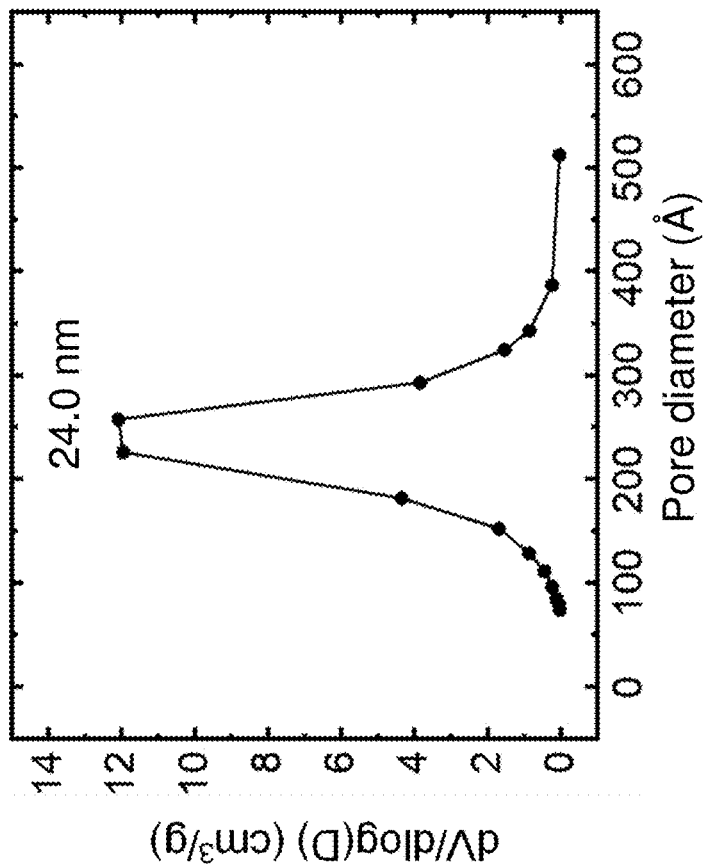
FIG. 41B is a plot showing the pore volume distribution as a function of pore size for carbon aerogel beads according to a non-limiting embodiment of the disclosure.
Figure 41A:
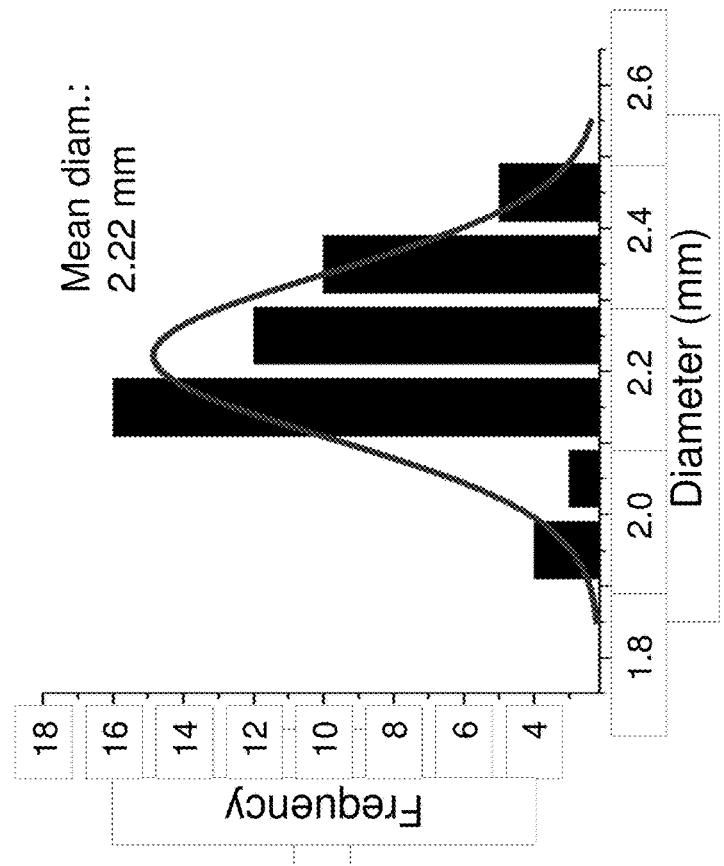
FIG. 41A is a plot showing the mean diameter of carbon aerogel beads according to a non-limiting embodiment of the disclosure.

Example 20. Water-Based Preparation of Polyamic Acid Aerogel Beads and of the Corresponding Carbon Aerogel Beads from an Aqueous Solution the Triethylammonium Salt of Pre-Formed and Isolated Polyamic Acid Added to an Aqueous Acetic Acid/Acetic Anhydride Solution Polyamic acid aerogel beads were prepared starting with pre-formed and isolated solid polyamic acid obtained from the reaction of 1,4-phenylenediamine and pyromellitic dianhydride in N,N-dimethylacetamide. The solid-state $^{13}$C NMR and $^{15}$N NMR spectra of that polyamic acid are shown in FIG. 21A and FIG. 21B, respectively. Solid polyamic acid (5 g) was suspended in 30 mL water, and was dissolved by adding triethylamine (3.4121 g, 4.70 mL, 2.2 mol excess relative to the polyamic acid repeat unit). The target density was 0.144. The aqueous solution of the triethylammonium salt of the polyamic acid was added dropwise to 100 mL of $H_2O$:AcOH:AcOAc (80:20:20 v/v/v) using a large plastic pipette to form gel beads. The gel beads were solvent exchanged with ethanol and were dried with SCF $CO_2$ to give polyamic acid aerogel beads. The polyamic acid aerogel beads were carbonized at 1050° C. under $N_2$ to give the corresponding carbon aerogel beads. A SEM photomicrograph of a single bead is shown in FIG. 40A, and the skin and interior are shown as FIGS. 40B and 40C, respectively. The mean diameter of the beads was 2.2 mm (FIG. 41A). The pore size distribution is provided in FIG. 41B. The properties of the carbon aerogel beads are provided in Table 10.

TABLE 10

Physical characteristics of Example 10

| Property | Value |
|---|---|
| Carbonization yield (% w/w) | 36.7 |

TABLE 10-continued

Physical characteristics of Example 10

| Property | Value |
|---|---|
| $\rho_b$ (g/cm$^3$) | 0.284 |
| $\rho_s$ (g/cm$^3$) | 2.041 |
| porosity (% v/v) | 86.1 |
| BET surface area (m$^2$/g) | 402 |
| Micropore surface area (m$^2$/g) | 102 |
| $V_{Total}$ (cm$^3$/g) | 3.03 |
| $V_{1.7-300}$ (cm$^3$/g) | 2.39 |
| $V_{Total}/V_{1.7-300}$ | 1.27 |

Example 21A. Water-Based Preparation of Polyamic Acid Aerogel Beads from Aqueous, In-Situ Prepared Triethylammonium Salt Solutions of a Polyamic Acid Electrosprayed into Aqueous Hydrochloric Acid Solution 1,4-Phenylenediamine (PDA, 66.30 g, 60.27 mL, 0.6131 mol) was dissolved in 1 L of water in a 2 L beaker. Dissolution was assisted with mild heating (86-87° F.). If the solution was allowed to cool below 83° F., PDA began to precipitate. In such a case, PDA was re-dissolved by heating above 84° F. Triethylamine (TEA: 148.89 g, 205.2 mL, 1.4713 mol, 2.4 mol excess) was added to the solution and the mixture was stirred for about 5 minutes. During stirring, the 2 L beaker was covered tightly with copper foil held in place with multiple rubber bands. Subsequently, pyromellitic dianhydride (PMDA; 133.70 g, 79.58 mL, 0.6130 mol)) was added to the solution under vigorous stirring. The orange solution was stirred for 1-3 days at room temperature, gradually becoming very viscous.

Alternatively, PMDA (133.70 g, 79.58 mL, 0.6130 mol) was added as a white solid all at once into the PDA solution under vigorous stirring. The temperature of the mixture increased to 105-110° F. The texture and the color of the solid suspension changed with time. The color changed from purplish in the beginning to gray. Vigorous stirring of the suspension was continued for 18-24 hours. At the end of that period, TEA (148.89 g, 205.2 mL, 1.4713 mol, 2.4 mol excess) was added to the suspension. The temperature of the solution increased significantly, and all solid material dissolved, yielding a dark orange solution. Vigorous stirring was continued for 24-72 hours. The orange solution became very viscous. During the stirring, the 2 L beaker was covered with copper foil held in place with multiple rubber bands.

Irrespective of the preparation method, the target density ($T_d$) for the polyamic acid aeroge beads was 0.166 g/mL ((66.30+133.70)) g/(1000+205.2) L). The actual target density (taking into consideration of volumes of PDA and PMDA) was: (66.30+133.70) g/(1000+205.2+60.27+79.58) mL=200 g/1345.05 mL=0.149 g/mL. The target density of the thermally imidized aerogel beads was 0.147 g/mL.

At the end of the stirring period, the viscous orange aqueous triethylammonium salt solution of the polyamic acid was electrosprayed into aq. HCl (20% v/v) using a 20-needle (22 gauge) spray head. The volume of the HCl receiving bath was 4 L per L of electrosprayed solution. The flow rate was adjusted with a dual-barrel syringe pump to 1.5 mL/min per needle, or 30 mL/min for the entire spray head. The voltage difference between the needles and the receiving bath was set at 8 kV. The distance between the tip of the needles and the collection bath was 15 cm. When the droplets of the aqueous triethylammonium salt solution of the polyamic acid hit the surface of the HCl receiving bath, solid gel beads formed that sank to the bottom of the receiving bath. The beads stayed in the HCl receiving baths for 24 hours. Subsequently, the beads were washed four times with water (2 gallons per wash per 1 L of electrosprayed solution), and three times with ethanol (6 L per wash per L of electrosprayed solution). The beads were then dried with SCF $CO_2$.

Figure 42A:
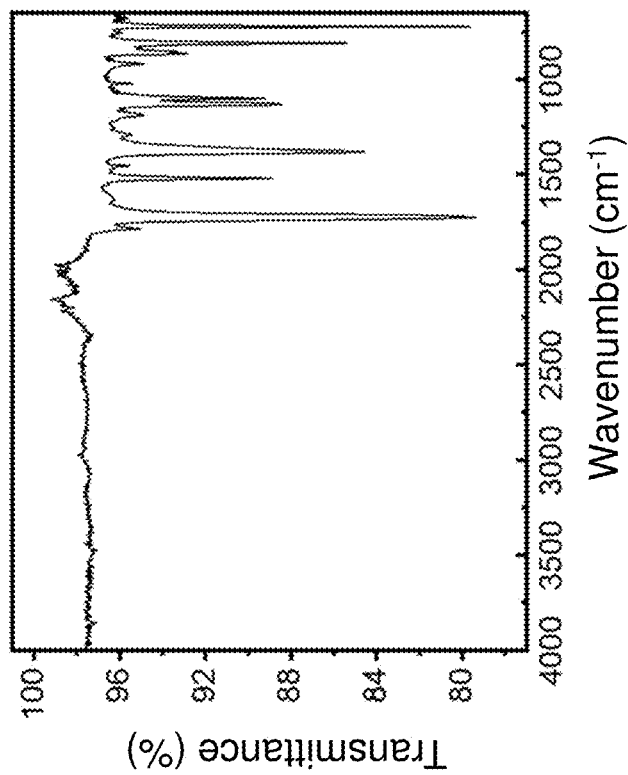
FIG. 42A is an FTIR spectrum of polyamic acid aerogel beads according to a non-limiting embodiment of the disclosure.

The above processes were run twice. The polyamic acid aerogel beads received, combined from both runs, totaled 292.92 g. The yield from PDA+PMDA (400 g) was 73.23% by weight. The tap density of the polyamic acid aerogel beads was 0.149 g cm-3. The IR spectrum of the polyamic acid aerogel beads is shown in FIG. 42A.

Figure 42B:
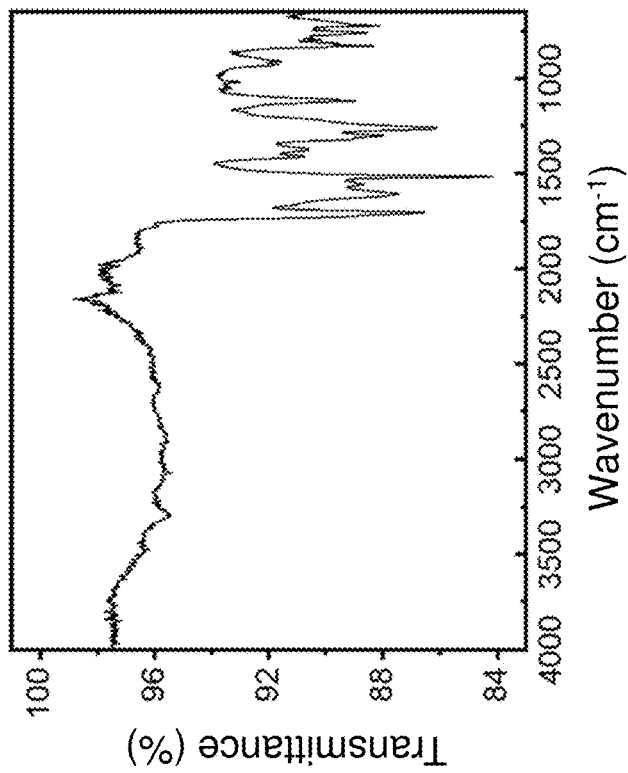
FIG. 42B is an FTIR spectrum of polyimide aerogel beads according to a non-limiting embodiment of the disclosure.

Example 21B. Thermal Conversion of Polyamic Acid Aerogel Beads to the Corresponding Polyimide Aerogel Beads A portion (99.99 g) of the polyamic acid aerogel beads of Example 21A was imidized at 300° C. for 4 hours in air to form polyimide aerogel beads (received: 78.64 g, 78.64% yield by weight). Tap density: 0.151 g cm-3. The IR spectrum of the imidized beads is shown in Figure FIG. 42B.

Example 21C. Pyrolytic Conversion of Polyamic Acid Aerogels Beads to Carbon Aerogel Beads A portion (192.92 g) of the polyamic acid aerogel beads of Example 21A was carbonized directly at 1050° C. for 2 hours under flowing $N_2$ to form the corresponding carbon aerogel beads (received: 76.17 g, 39.48% yield by weight). Tap density: 0.155 g cm-3. FIG. 43A shows a collection of carbon aerogel beads derived from pyrolysis of electrosprayed polyamic acid aerogel beads. FIG. 43B is a high magnification SEM of the skin of one bead. FIG. 43C shows the cross section of one bead and FIG. 43D shows a high-magnification image of the interior.

Figure 44B:
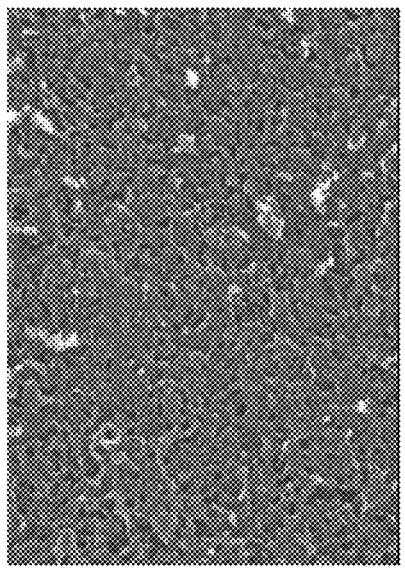
FIG. 44B is a scanning electron photomicrograph of the exterior skin of a carbon aerogel bead according to a non-limiting embodiment of the disclosure.
Figure 44D:
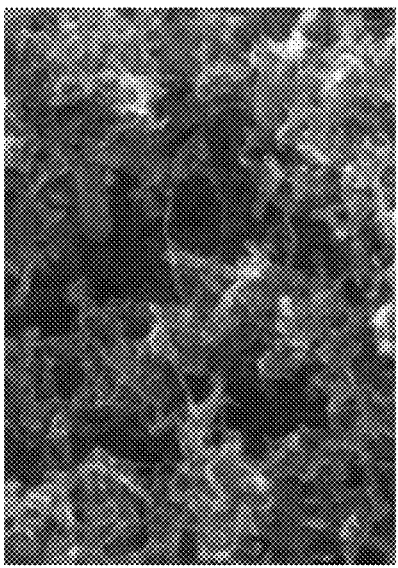
FIGS. 44C and 44D are scanning electron photomicrographs of the interior of a carbon aerogel bead according to a non-limiting embodiment of the disclosure.
Figure 44A:
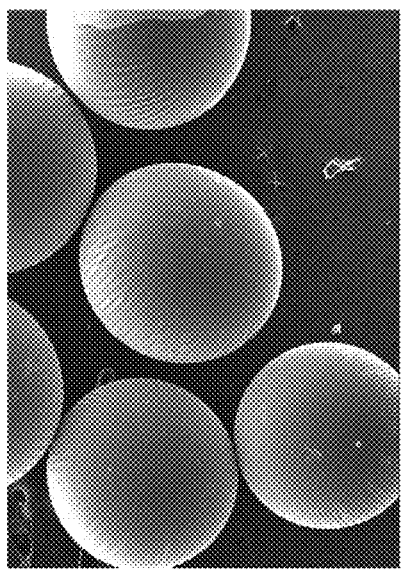
FIG. 44A is a scanning electron photomicrograph of a collection of carbon aerogel beads according to a non-limiting embodiment of the disclosure.
Figure 44C:
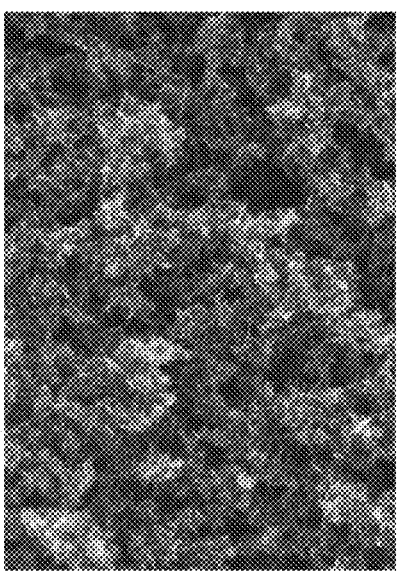

Example 21D. Pyrolytic Conversion of Polyimide Aerogels Beads to Carbon Aerogel Beads The thermally imidized beads (Example 21B; 78.64 g) were carbonized at 1050° C. for 2 hours under flowing $N_2$ to carbon aerogel beads. Received: 37.68 g. Yield from polyimide aerogel beads: 47.91% weight per weight. Yield from the polyamic acid aerogel beads (started with 99.99 g): 37.68% weight per weight. Yield from the polyamic acid aerogel beads (calculated): 37.70% weight per weight. Tap density: 0.144 g cm-3. FIG. 44A shows a collection of carbon aerogel beads derived from polyimide aerogel beads, which in turn were derived from thermal imidization of polyamic acid aerogel beads. FIG. 44B is a high magnification SEM of the skin of one bead. FIG. 44C and FIG. 44D show SEM images of the interior of one bead at two different magnifications. The actual overall yield of carbon aerogel from PDA and PMDA was 26.46% weight per weight. The calculated percent yield based on partial yields along processing was 28.26% weight per weight. Physical characteristics of the electrosprayed polyamic acid aerogel beads, their corresponding imidized aerogel beads, and the two carbonized versions, by direct carbonization of the polyamic acid aerogel beads and of the imidized derivatives, are presented in Table 11.

TABLE 11

Physical characteristics of electrosprayed (ES) polyamic acid (PAA) aerogel beads, the corresponding polyimide (PI) aerogel beads received via thermal imidization of the ES-PAA aerogel beads, and of the corresponding carbon aerogel beads (C-ES-PAA and C-PI, respectively).

| Property | ES-PAA | PI (from ES-PAA) | C-ES-PAA | C-PI |
|---|---|---|---|---|
| Yield from previous step (% weight per weight) | 73.23 | 78.64 | 39.48 | 47.91 |
| tap density ($\rho_{tap}$, g/cm$^3$) | 0.149 | 0.151 | 0.155 | 0.144 |
| skeletal density ($\rho_s$, g/cm$^3$) | 1.4692 | 1.7877 | 1.9900 | 2.3409 |
| BET surface area ($\sigma$, m$^2$/g) | 385 | 245 | 346 | 352 |
| Micropore surface area (m$^2$/g) | 80 | 92 | 117 | 125 |
| $V_{1.7\text{-}300}$ (cm$^3$/g) | 2.28 | 1.47 | 1.52 | 1.52 |
| Pore width ($4V_{1.7\text{-}300}/\sigma$, nm) | 23.3 | 24.0 | 17.7 | 17.5 |

Example 22. Some Factors Controlling the Bead Size of Polyamic Acid Aerogel Beads Obtained from Aqueous, In-Situ Prepared Triethylammonium Salt Solutions of Polyamic Acid Electrosprayed into Aqueous Hydrochloric Acid Solutions, and of the Corresponding Carbon Aerogel Beads An aqueous solution of the triethylammonium salt of the PDA/PMDA polyamic acid was prepared in water as described in Example 21A at the same target density ($T_d$=0.166 g/mL). The solution was separated in several parts, which were electrosprayed under various conditions into aqueous hydrochloric acid solutions as in Example 21A. The parameters that were varied included the electrospraying voltage, the flow rate, the viscosity of the aqueous solution of the triethylammonium salt of the PDA/PMDA polyamic acid. The wet-gel polyamic acid beads were washed with water and ethanol and were dried to polyamic acid aerogel beads using SCF $CO_2$. The polyamic acid aerogel beads were carbonized to carbon aerogel beads at 1050° C., under flowing nitrogen as in Example 21A. The size of the beads was measured from images taken through an optical microscope: (a) at the wet-gel state; (b) after drying to polyamic acid aerogels; and (c) after carbonization to carbon aerogel beads.

Figure 45A:
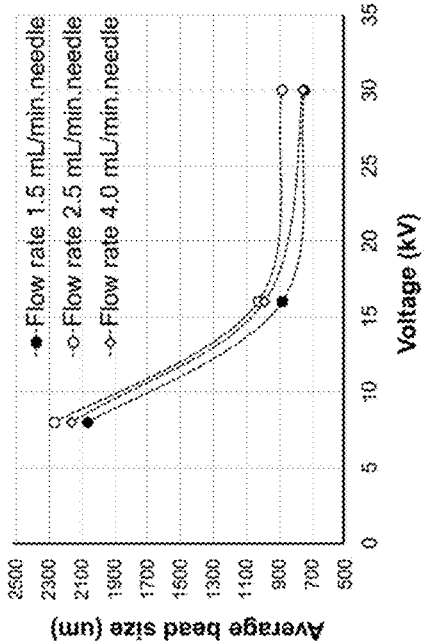
FIG. 45A is a graph showing average bead size at the polyamic acid wet-gel stage as a function of electrospinning conditions according to a non-limiting embodiment of the disclosure.
Figure 45C:
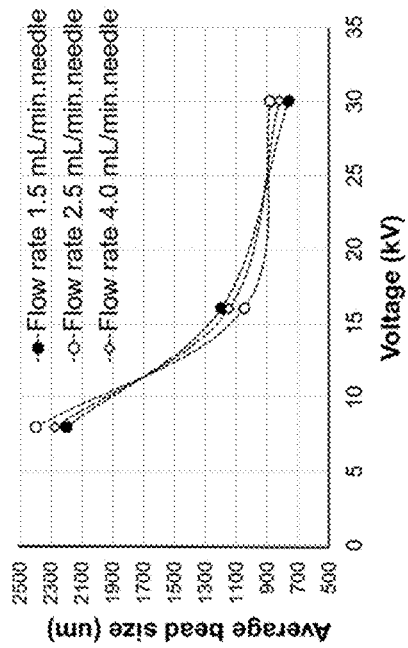
FIGS. 45C and 45D are graphs showing average bead size at the carbon aerogel stage as a function of electrospinning conditions according to a non-limiting embodiment of the disclosure.
Figure 45B:
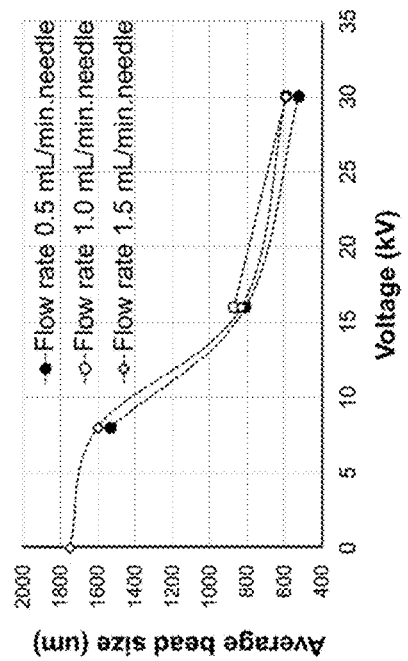
FIG. 45B is a graph showing average bead size at the polyamic acid aerogel stage as a function of electrospinning conditions according to a non-limiting embodiment of the disclosure.

Using a low-viscosity (66.7 cP) aqueous solution of the triethylammonium salt of polyamic acid, and the same 20 needle spraying head with 22-gauge needles as in Example 21A, FIG. 45A shows the variation of the average bead size of wet-gel polyamic acid beads as a function of the flow rate and of the electrospraying voltage. FIG. 45B shows the variation of the average size of polyamic acid aerogel beads as a function of the flow rate and of the electrospraying voltage; and FIG. 45C shows the variation of the average size of the corresponding carbon aerogel beads as a function of the flow rate and of the electrospraying voltage. All other things being equal, FIG. 45A, FIG. 45B and FIG. 45C together show that the sizes of the polyamic acid gel and aerogel beads are about equal, but the size of the corresponding carbon aerogel beads is smaller.

Figure 45D:
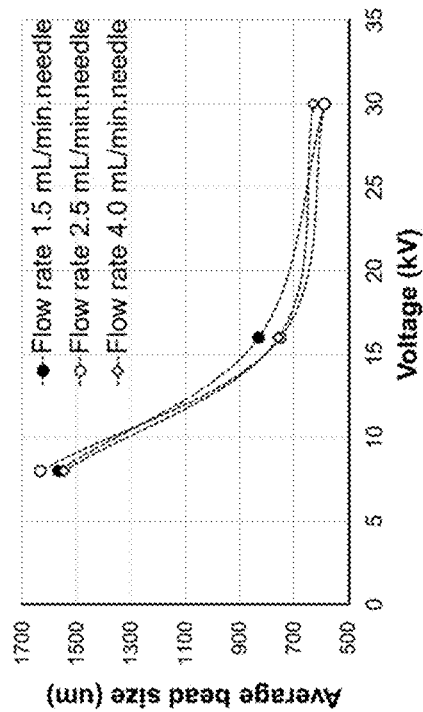

Using a high-viscosity (309 cP) aqueous solution of the triethylammonium salt of polyamic acid, and the same 20 needle spraying head with 22-gauge needles as in Example 21A, FIG. 45D shows the variation of the average size of carbon aerogel beads as a function of the flow rate and of the electrospraying voltage. Amongst the parameters investigated in FIG. 45A to FIG. 45D, the electrospraying voltage was the most significant factor influencing bead size.

Figure 46B:
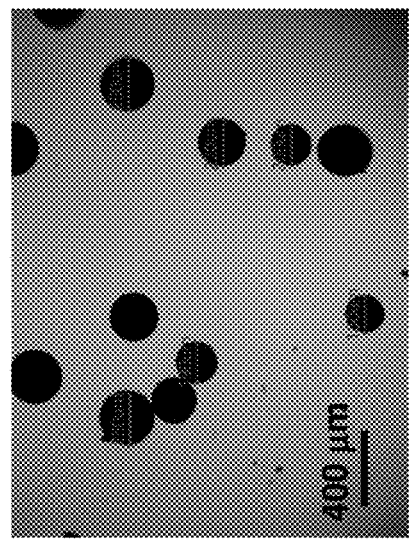
FIGS. 46A and 46B are photomicrographs of carbon aerogel beads obtained by pyrolysis of polyamic acid aerogel beads obtained at two different electrospinning conditions according to a non-limiting embodiment of the disclosure.
Figure 46A:
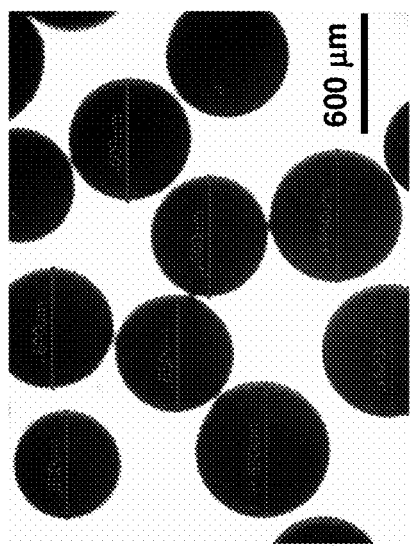

In addition to the electrospraying voltage, another factor that plays a role on the size of the beads is the gauge of the needles. FIG. 46A shows carbon aerogel beads prepared with a low-viscosity solution electrosprayed through 22-gauge needles at 30 kV and a flow rate of 2.5 mL per minute. FIG. 46B shows smaller carbon aerogel beads electrosprayed under the same conditions, but through 28-gauge needles. The effect of the gauge of the needles on the bead size applies directly to spraying using compressed gas assistance as in Example 17.

Example 23. Water-Based Preparation of Polyamic Acid Aerogel Beads from an Aqueous Solution of the Triethylammonium Salt of Pre-Formed and Isolated Solid Polyamic Acid from Acidification by Delta-Gluconolactone Hydrolysis Polyamic acid (5 g; from reaction of PDA/PMDA in a 1:1 mol ratio) was added to 100 mL of water. Triethylamine (3.41 g, 2.2 mol excess relative to the monomer repeat unit) was added to the suspension and the mixture was stirred until the polyamic acid was fully dissolved. Delta-gluconolactone (DGL; 6.59 g, 0.037 mol, 2.4 mol excess relative to the monomer repeat unit) was added to the triethylammonium salt solution of the polyamic acid, and the mixture was stirred until the DGL was dissolved. At about 15 minutes before the gelation point, which at room temperature was approximately 1.5 hours, the solution was added dropwise into an aqueous solution of acetic acid (20% v/v). The droplets sunk in this solution. In higher volume percent ratios of acetic acid, e.g., >35% v/v, the droplets floated initially. The resulting millimeter-sized beads were aged for 24 hours in the acetic acid receiving solution, then washed twice with water, solvent exchanged with ethanol, and dried with supercritical fluid $CO_2$ to provide polyamic acid aerogel beads.

Figure 47:
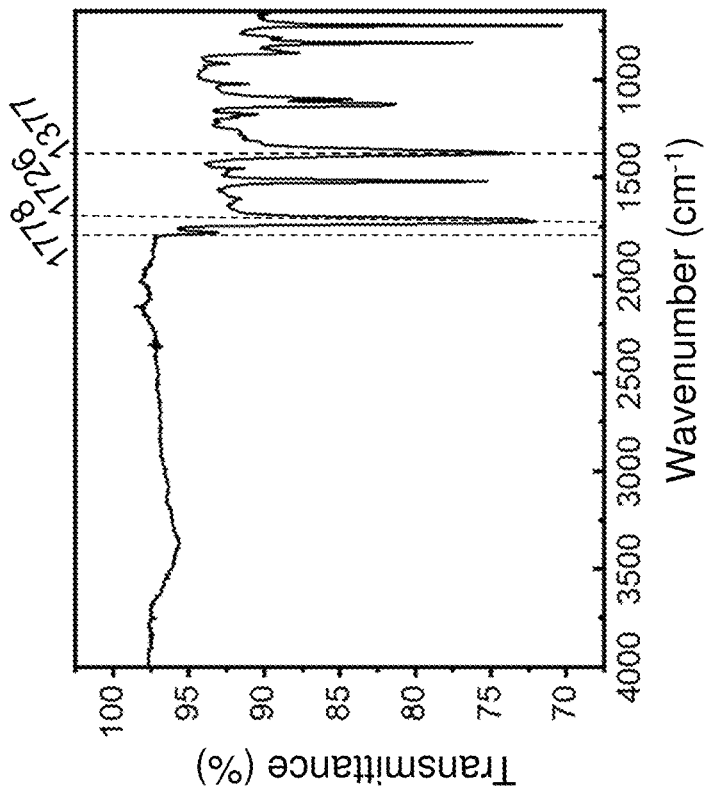
FIG. 47 is an FTIR spectrum of a polyimide aerogel monolith according to a non-limiting embodiment of the disclosure.

Example 24. Water-Based Preparation of Polyamic Acid and Polyimide Monolithic Gels from an Aqueous Solution of the Triethylammonium Salt of Pre-Formed and Isolated Solid Polyamic Acid from Acidification by Delta-Gluconolactone Hydrolysis Polyamic acid (5 g; from reaction of PDA/PMDA in a 1:1 mol ratio) was added to 50 mL of water. Triethylamine (3.41 g, 2.2 mol excess relative to the monomer repeat unit) was added to the suspension and the mixture was stirred until the polyamic acid was fully dissolved. Delta-gluconolactone (DGL: 6.59 g, 0.037 mol, 2.4 mol excess relative to the monomer repeat unit) was added to the aqueous triethylammonium salt solution of the polyamic acid, and the mixture was stirred until DGL was dissolved. The resulting solution was divided into molds and left to gel at room temperature. The gelation time was about 15 min. Notably, in more dilute solutions, for example using the same amount of polyamic acid and triethylamine, but 100 mL of water, the gelation time was about 1.5 hours (see Example 23). The resulting wet-gels were aged in the molds for 24 hours. Subsequently, the molded wet-gels were covered with water in the molds and microwaved for 4×10 seconds. The microwaved wet-gels were washed with water in their molds, demolded with the aid of ethanol, and washed four times with ethanol, each time remaining in ethanol for 24 hours. The wet gels were dried with supercritical $CO_2$. An aerogel sample was analyzed with FTIR, which indicated the polyamic acid was quantitatively converted to the polyimide (FIG. 47).

The following six Examples were prepared via a high-shear emulsion gelation method with in situ formed triethylammonium salt solutions of polyamic acid using various methods of mixing PDA, PMDA and TEA. A further scope of those Examples was to compare the properties of polyimide (PI), polyamic acid (PAA) and of the corresponding carbon aerogels coming from the same aqueous triethylammonium salt solutions of polyamic acid.

Example 25. Emulsion-Based Preparation of Micron-Size Polyimide and Polyamic Acid Aerogel Beads from an Aqueous, In-Situ Prepared Triethylammonium Salt Solution of Polyamic Acid (Sequential PDA, TEA, and PMDA Addition at Room Temperature)

Micron-size polyimide and polyamic acid gel beads at target densities equal to 0.079 g/cm³ and 0.094 g/cm³, respectively, were prepared via gelation of an aqueous triethylammonium salt solution of polyamic acid in emulsions. For this, PDA (27.94 g) was dissolved in 808 g of water. Triethylamine (TEA: 62.87 g, 86.66 mL, 2.4:1 mol/mol ratio to PDA or PMDA) was added in the solution and the mixture was stirred for 5 minutes. PMDA (56.36 g, 0.26 mol, 1:1 mol/mol ratio relative to PDA) was added to the mixture, and the mixture was stirred for 24 hours at room temperature. The resulting aqueous triethylammonium salt solution of the polyamic acid had a viscosity at room temperature equal to 9.5 cP, and was separated in two halves.

Acetic anhydride (56.71 g, 52.41 mL, 4.3 mol/mol ratio relative to PMDA in the polyamic acid) was added to the first half of the aqueous triethylammonium salt solution of the polyamic acid, and the resulting sol was stirred magnetically for 60 seconds. At the end of that period, the sol was poured into an immiscible phase under shear using a Ross mixer at 3000 rpm. The immiscible phase was prepared by dissolving 8 g of surfactant (Hypermer® H70), in 800 mL of mineral spirits. The sol was added to the mineral spirits phase at a 1:2 v/v ratio. Gelation in a small portion of the sol put aside as a control took place at room temperature in 3-4 min from the addition of acetic anhydride. After stirring under high shear for 4-5 minutes, the mixture was removed from the Ross mixer and left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical $CO_2$ and are referred to as PI aerogel beads.

The second half of the aqueous triethylammonium salt solution of the polyamic acid was poured into an immiscible phase under shear using a Ross mixer at 3000 rpm. The immiscible phase was prepared by dissolving 30 g of surfactant (Hypermer® H70) in 1600 mL of hexane. The aqueous solution was added to the hexane phase at a 1:4 v/v ratio. The mixture was stirred under high shear at 3000 rpm for 4 minutes, and a quasi-stable emulsion was established. At the end of that period, acetic acid was added to the emulsion at a 25% v/v ratio relative to hexane, and the mixture was stirred with the Ross mixer at 3000 rpm for 2 minutes. The mixture was then removed from the Ross mixer and was left to stand for 1-3 hours. The hexane layer was decanted. The gel beads were collected using filtration under reduced pressure, and they were solvent-exchanged with ethanol three times. The ethanol-exchanged (washed) gel beads were dried using supercritical $CO_2$ and are referred to as PAA aerogel beads.

Carbonization of the PI and PAA aerogel beads was performed at 1050° C. for 2 hours under flowing nitrogen using a ramp rate of 3° per minute. Carbon aerogel beads from PI and PAA are referred to as C-PI and C-PAA, respectively. Data for all aerogel beads from this example are provided in Table 12. FIG. 48A shows a low magnification SEM image of C-PI aerogel beads. FIG. 48B shows a high magnification SEM image of the surface of a C-PI aerogel bead. FIG. 48C shows a low magnification SEM image of C-PAA aerogel beads. FIG. 48D shows a higher magnification SEM image of the surface of a C-PAA aerogel bead.

TABLE 12

Physical characteristics of beads from Example 25

| Property | bead sample | | | |
|---|---|---|---|---|
| | PI | C-PI | PAA | C-PAA |
| Approximate diameter (μm) | 10-40 | 5-20 | 4-20 | 2-10 |
| Carbonization yield (% w/w) | | 38.6 | | 32.9 |
| Tap density (g/cm³) | 0.333 | 0.314 | 0.086 | 0.159 |
| Skeletal density (g/cm³) | 1.3514 | 2.0570 | 1.3602 | 2.0523 |
| BET surface area (m²/g) | 117 | 157 | 293 | 323 |
| Micropore surface area (m²/g) | 0.94 | 57 | 0.00 | 92 |
| $V_{1.7-300}$ (cm³/g) | 0.83 | 0.51 | 2.40 | 1.55 |
| Av. mesopore diameter (nm) | 27 | 12 | 31 | 19 |

Example 26. Emulsion-Based Preparation of Micron-size Polyimide and Polyamic Acid Aerogel Beads from an Aqueous, in-situ Prepared Triethylammonium Salt Solution of Polyamic Acid (Sequential PDA, TEA, and PMDA Addition at 50-60° C.)

Micron-size polyimide and polyamic acid gel beads at target densities equal to 0.079 g/cm³ and 0.094 g/cm³, respectively, were prepared via gelation of an aqueous triethylammonium salt solution of polyamic acid in emulsions. For this, PDA (27.94 g) was dissolved in 808 g of water. Triethylamine (TEA: 62.87 g, 86.66 mL, 2.4:1 mol/mol ratio to PDA or PMDA) was added in the solution and the mixture was stirred for 5 minutes. PMDA (56.36 g, 0.26 mol, 1:1 mol/mol ratio relative to PDA) was added to the mixture, and the solution was stirred for 24 hours at 50-60° C. At the end of the period, the resulting aqueous triethylammonium salt solution of the polyamic acid was allowed to cool back down to room temperature, it had a viscosity at room temperature equal to 9.2 cP, and was separated in two halves.

Acetic anhydride (56.71 g, 52.41 mL, 4.3 mol/mol ratio relative to PMDA in the polyamic acid) was added to the first half of the aqueous triethylammonium salt solution of the polyamic acid, and the resulting sol was stirred magnetically for 60 seconds. At the end of that period, the sol was poured into an immiscible phase under shear using a Ross mixer at 3000 rpm. The immiscible phase was prepared by dissolving 8 g of surfactant (Hypermer® H70), in 800 mL of mineral spirits. The sol was added to the mineral spirits phase at a 1:2 v/v ratio. Gelation in a small portion of the sol put aside as a control took place at room temperature in 3-4 min from the addition of acetic anhydride. After stirring under high shear for 4-5 minutes, the mixture was removed from the Ross mixer and left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical $CO_2$ and are referred to as PI aerogel beads.

The second half of the aqueous triethylammonium salt solution of the polyamic acid was poured into an immiscible phase under shear using a Ross mixer at 3000 rpm. The immiscible phase was prepared by dissolving 30 g of surfactant (Hypermer® H70) in 1600 mL of hexane. The aqueous solution was added to the hexane phase at a 1:4 v/v ratio. The mixture was stirred under high shear at 3000 rpm for 4 minutes, and a quasi-stable emulsion was established. At the end of that period, acetic acid was added to the emulsion at a 25% v/v ratio relative to hexane, and the mixture was stirred with the Ross mixer at 3000 rpm for 2 minutes. The mixture was then removed from the Ross mixer and was left to stand for 1-3 hours. The hexane layer was decanted. The gel beads were collected using filtration under reduced pressure, and they were solvent-exchanged with ethanol three times. The ethanol-exchanged (washed) gel beads were dried using supercritical $CO_2$ and are referred to as PAA aerogel beads.

Figure 49A:
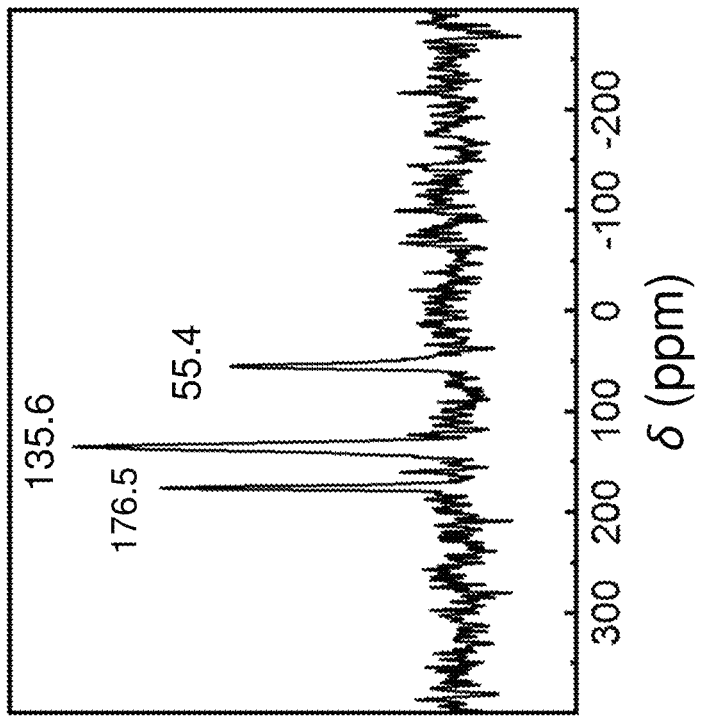
FIGS. 49A and 49B are $^{13}C$ and $^{15}N$ solid-state NMR spectra, respectively, of polyimide aerogel microbeads according to a non-limiting embodiment of the disclosure.
Figure 49B:
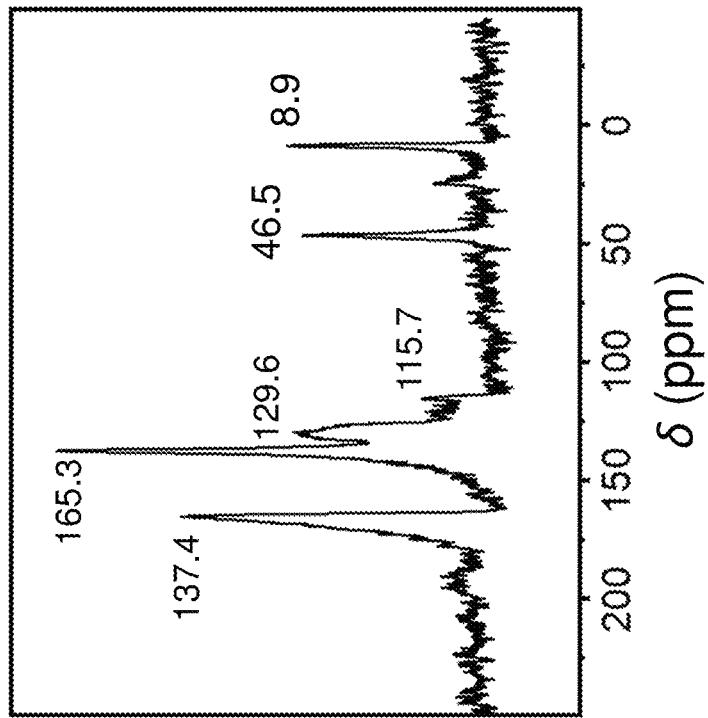

Carbonization of the PI and PAA aerogel beads was performed at 1050° C. for 2 hours under flowing nitrogen using a ramp rate of 3° per minute. Carbon aerogel beads from PI and PAA are referred to as C-PI and C-PAA, respectively. Data for all aerogel beads from this example are provided in Table 13. FIG. 49A and FIG. 49B show the solid-state $^{13}C$ and $^{15}N$ NMR spectra of the PI aerogel microbeads, respectively. The imide to amide group ratio was 1.25 indicating more than 50% conversion of the amide groups to imides. The resonance at 55.4 ppm was attributed to triethylammonium. FIG. 49C and FIG. 49D show the solid-state $^{13}C$ and $^{15}N$ NMR spectra of the PAA aerogel beads, respectively. The imide to amide group ratio was 3.48. The resonance at 55.7 ppm was attributed to triethylammonium. FIG. 50A shows a low magnification SEM image of the C-PI aerogel beads. FIG. 50B shows a high magnification SEM image of the surface of a C-PI aerogel bead. FIG. 50C shows a low magnification SEM image of the C-PAA aerogel beads. FIG. 50D shows a higher magnification SEM image of the surface of a C-PAA aerogel bead.

TABLE 13

Physical characteristics of beads from Example 26

| Property | PI | C-PI | PAA | C-PAA |
|---|---|---|---|---|
| Approximate diameter (μm) | 10-40 | 5-20 | 4-20 | 2-7 |
| Carbonization yield (% w/w) | | 36.7 | | 36.0 |
| Tap density (g/cm³) | 0.165 | 0.203 | 0.108 | 0.145 |
| Skeletal density (g/cm³) | 1.4365 | 2.1036 | 1.312 | 2.1124 |
| BET surface area (m²/g) | 234 | 262 | 299 | 311 |
| Micropore surface area (m²/g) | 26 | 79 | 49 | 89 |
| $V_{1.7-300}$ (cm³/g) | 1.03 | 0.95 | 1.86 | 1.69 |
| Av. mesopore diameter (nm) | 17 | 15 | 24 | 22 |

Example 27. Emulsion-Based Preparation of Micron-Size Polyimide and Polyamic Acid Aerogel Beads from an Aqueous, In-Situ Prepared Triethylammonium Salt Solution of Polyamic Acid According to Solid-Suspension Method 1

Micron-size polyimide and polyamic acid gel beads at target densities equal to 0.079 g/cm³ and 0.094 g/cm³, respectively, were prepared via gelation of an aqueous triethylammonium salt solution of polyamic acid in emulsions. For this, PDA (27.94 g) was dissolved in 808 g of water. PMDA (56.36 g, 0.26 mol, 1:1 mol/mol ratio relative to PDA) was added to the PDA solution, and the resulting solid suspension was stirred magnetically or mechanically for 24 hours at room temperature. At the end of the period, triethylamine (TEA: 62.87 g, 86.66 mL, 2.4:1 mol/mol ratio to PDA or PMDA) was added in the solid suspension, and the resulting solution was stirred for 24 more hours at room temperature. The resulting aqueous triethylammonium salt solution of the polyamic acid had a viscosity at room temperature equal to 15.6 cP, and was separated in two halves.

Acetic anhydride (56.71 g, 52.41 mL, 4.3 mol/mol ratio relative to PMDA in the polyamic acid) was added to the first half of the aqueous triethylammonium salt solution of the polyamic acid, and the resulting sol was stirred magnetically for 60 seconds. At the end of that period, the sol was poured into an immiscible phase under shear using a Ross mixer at 3000 rpm. The immiscible phase was prepared by dissolving 8 g of surfactant (Hypermer® H70), in 800 mL of mineral spirits. The sol was added to the mineral spirits phase at a 1:2 v/v ratio. Gelation in a small portion of the sol put aside as a control took place at room temperature in 3-4 min from the addition of acetic anhydride. After stirring under high shear for 4-5 minutes, the mixture was removed from the Ross mixer and left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical $CO_2$ and are referred to as PI aerogel beads.

The second half of the aqueous triethylammonium salt solution of the polyamic acid was poured into an immiscible phase under shear using a Ross mixer at 3000 rpm. The immiscible phase was prepared by dissolving 30 g of surfactant (Hypermer® H70) in 1600 mL of hexane. The aqueous solution was added to the hexane phase at a 1:4 v/v ratio. The mixture was stirred under high shear at 3000 rpm for 4 minutes, and a quasi-stable emulsion was established. At the end of that period, acetic acid was added to the emulsion at a 25% v/v ratio relative to hexane, and the mixture was stirred with the Ross mixer at 3000 rpm for 2 minutes. The mixture was then removed from the Ross mixer and was left to stand for 1-3 hours. The hexane layer was decanted. The gel beads were collected using filtration under reduced pressure, and they were solvent-exchanged with ethanol three times. The ethanol-exchanged (washed) gel beads were dried using supercritical $CO_2$ and are referred to as PAA aerogel beads.

Figure 51B:
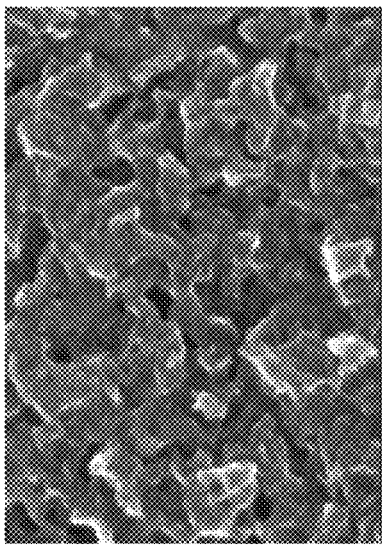
FIGS. 51A and 51B are scanning electron photomicrographs of a collection of carbon aerogel microbeads and their surfaces, respectively, obtained by pyrolysis of polyimide aerogel microbeads according to a non-limiting embodiment of the disclosure.
Figure 51D:
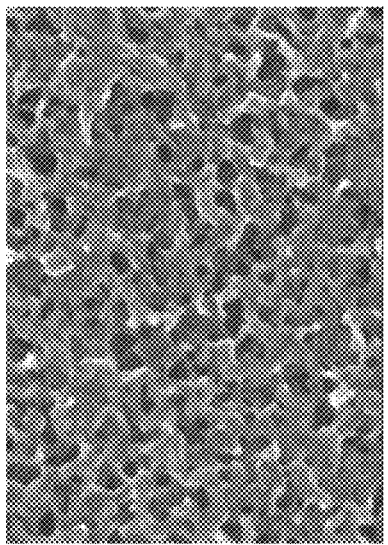
FIGS. 51C and 51D are scanning electron photomicrographs of a collection of carbon aerogel microbeads, and their surfaces, respectively, obtained from pyrolysis of polyamic acid aerogel microbeads according to a non-limiting embodiment of the disclosure.
Figure 51A:
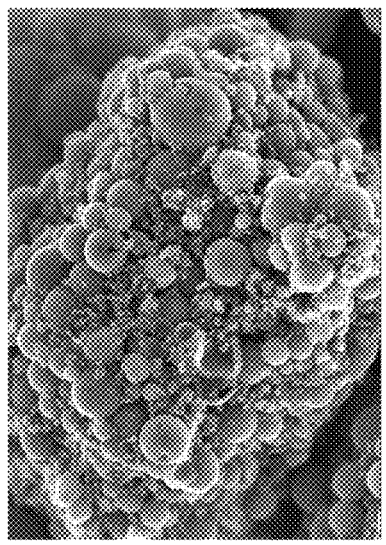
Figure 51C:
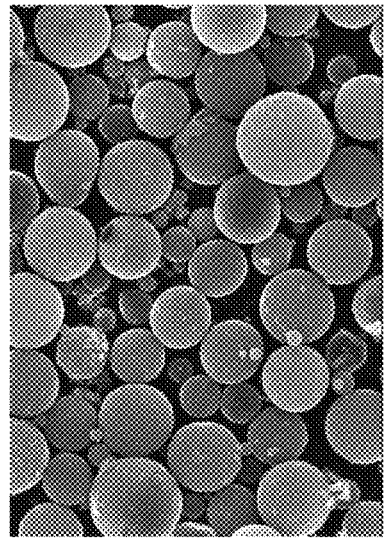

Carbonization of the PI and PAA aerogel beads was performed at 1050° C. for 2 hours under flowing nitrogen using a ramp rate of 3° per minute. Carbon aerogel beads from PI and PAA are referred to as C-PI and C-PAA, respectively. Data for all aerogel beads from this example are provided in Table 14. FIG. 51A shows a low magnification SEM image of the C-PI aerogel beads. C-PI beads agglomerate and form larger lumps together with debris. FIG. 51B shows a high-magnification SEM image of the surface of a C-PI aerogel bead. FIG. 51C shows a low-magnification SEM image of the C-PAA aerogel beads. FIG. 51D shows a higher-magnification SEM image of the surface of a C-PAA aerogel bead. The surface of the beads is formed by denser polymer with few pores.

TABLE 14

Physical characteristics of beads from Example 27

| Property | bead sample | | | |
|---|---|---|---|---|
| | PI | C-PI | PAA | C-PAA |
| Approximate diameter (μm) | 20-60 | 10-30 | 4-20 | 2-10 |
| Carbonization yield (% w/w) | | 30.4 | | 30.2 |
| Tap density (g/cm$^3$) | 0.269 | 0.313 | 0.231 | 0.284 |
| Skeletal density (g/cm$^3$) | 1.3247 | 2.0299 | 1.3619 | 2.0945 |
| BET surface area (m$^2$/g) | 79 | 142 | 180 | 250 |
| Micropore surface area (m$^2$/g) | 32 | 58 | 36 | 83 |
| $V_{1.7-300}$ (cm$^3$/g) | 0.42 | 0.55 | 1.33 | 1.13 |
| Av. mesopore diameter (nm) | 22 | 16 | 29 | 18 |

Example 28. Emulsion-Based Preparation of Micron-Size Polyimide and Polyamic Acid Aerogel Beads from an Aqueous, In-Situ Prepared Triethylammonium Salt Solution of Polyamic Acid According to Solid-Suspension Method 2

Micron-size polyimide and polyamic acid gel beads at target densities equal to 0.079 g/cm$^3$ and 0.094 g/cm$^3$, respectively, were prepared via gelation of an aqueous triethylammonium salt solution of polyamic acid in emulsions. For this, PDA (27.94 g, 0.26 mol) and PMDA (56.36 g, 0.26 mol, 1:1 mol/mol ratio relative to PDA) were added in rapid succession in 808 g of water. The resulting solid suspension was stirred magnetically or mechanically for 24 hours at room temperature. At the end of the period, triethylamine (TEA: 62.87 g, 86.66 mL, 2.4:1 mol/mol ratio to PDA or PMDA) was added in the solid suspension, and the resulting solution was stirred for 24 more hours at room temperature. The resulting aqueous triethylammonium salt solution of the polyamic acid had a viscosity at room temperature equal to 16.4 cP, and was separated in two halves.

Acetic anhydride (56.71 g, 52.41 mL, 4.3 mol/mol ratio relative to PMDA in the polyamic acid) was added to the first half of the aqueous triethylammonium salt solution of the polyamic acid, and the resulting sol was stirred magnetically for 60 seconds. At the end of that period, the sol was poured into an immiscible phase under shear using a Ross mixer at 3000 rpm. The immiscible phase was prepared by dissolving 8 g of surfactant (Hypermer® H70) in 800 mL of mineral spirits. The sol was added to the mineral spirits phase at a 1:2 v/v ratio. Gelation in a small portion of the sol put aside as a control took place at room temperature in 3-4 min from the addition of acetic anhydride. After stirring under high shear for 4-5 minutes, the mixture was removed from the Ross mixer and left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical $CO_2$ and are referred to as PI aerogel beads.

The second half of the aqueous triethylammonium salt solution of the polyamic acid was poured into an immiscible phase under shear using a Ross mixer at 3000 rpm. The immiscible phase was prepared by dissolving 30 g of surfactant (Hypermer® H70) in 1600 mL of hexane. The aqueous solution was added to the hexane phase at a 1:4 v/v ratio. The mixture was stirred under high shear at 3000 rpm for 4 minutes, and a quasi-stable emulsion was established. At the end of that period, acetic acid was added to the emulsion at a 25% v/v ratio relative to hexane, and the mixture was stirred with the Ross mixer at 3000 rpm for 2 minutes. The mixture was then removed from the Ross mixer and was left to stand for 1-3 hours. The hexane layer was decanted. The gel beads were collected using filtration under reduced pressure, and they were solvent-exchanged with ethanol three times. The ethanol-exchanged (washed) gel beads were dried using supercritical $CO_2$ and are referred to as PAA aerogel beads.

Figure 52B:
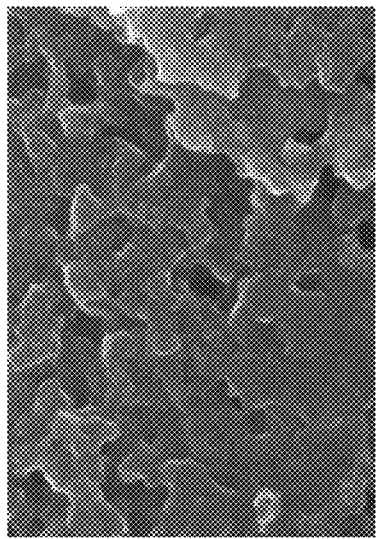
FIGS. 52A and 52B are scanning electron photomicrographs of a collection of carbon aerogel microbeads and their surfaces, respectively, obtained by pyrolysis of polyimide aerogel microbeads according to a non-limiting embodiment of the disclosure.
Figure 52D:
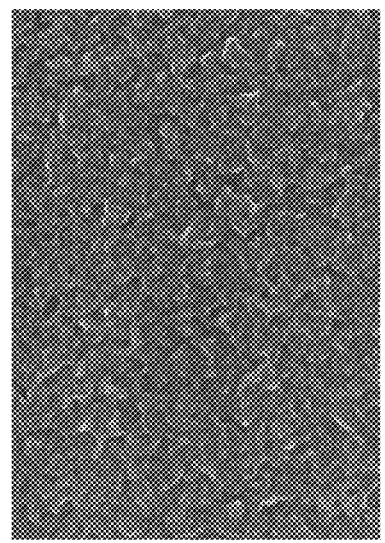
FIGS. 52C and 52D are scanning electron photomicrographs of a collection of carbon aerogel microbeads and their surfaces, respectively, obtained by pyrolysis of polyamic acid aerogel microbeads according to a non-limiting embodiment of the disclosure.
Figure 52A:
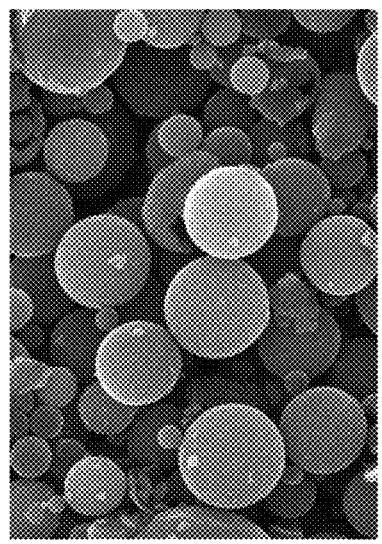
Figure 52C:
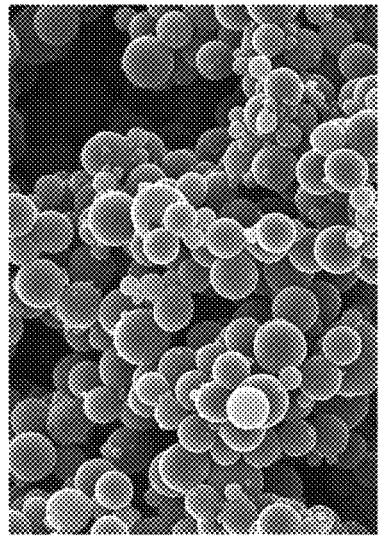

Carbonization of the PI and PAA aerogel beads was performed at 1050° C. for 2 hours under flowing nitrogen using a ramp rate of 3° per minute. Carbon aerogel beads from PI and PAA are referred to as C-PI and C-PAA, respectively. Data for all aerogel beads from this example are provided in Table 15. FIG. 52A shows a low-magnification SEM image of the C-PI aerogel beads. FIG. 52B shows a high-magnification SEM image of the surface of a C-PI aerogel bead. FIG. 52C shows a low-magnification SEM image of the C-PAA aerogel beads. FIG. 52D shows a higher-magnification SEM image of the surface of a C-PAA aerogel bead.

TABLE 15

Physical characteristics of beads from Example 28

| Property | bead sample | | | |
|---|---|---|---|---|
| | PI | C-PI | PAA | C-PAA |
| Approximate diameter (μm) | 10-40 | 5-20 | 4-20 | 2-10 |
| Carbonization yield (% w/w) | | 34.1 | | 33.5 |
| Tap density (g/cm$^3$) | 0.500 | 0.571 | 0.519 | 0.637 |
| Skeletal density (g/cm$^3$) | 1.3157 | 2.0922 | 1.3346 | 2.0808 |
| BET surface area (m$^2$/g) | 12 | 30 | 0.54 | 5.5 |
| Micropore surface area (m$^2$/g) | 2.3 | 4.4 | 0.0 | 0.7 |
| $V_{1.7-300}$ (cm$^3$/g) | 0.16 | 0.21 | <0.1 | <0.1 |
| Av. pore diameter (nm) | 46 | 31 | 57 | 23 |

Example 29. Emulsion-Based Preparation of Micron-Size Polyimide and Polyamic Acid Aerogel Beads from an Aqueous, In-Situ Prepared Triethylammonium Salt Solution of Polyamic Acid According to Solid-Suspension Method 3

Micron-size polyimide and polyamic acid gel beads at target densities equal to 0.080 g/cm$^3$ and 0.094 g/cm$^3$, respectively, were prepared via gelation of an aqueous triethylammonium salt solution of polyamic acid in emulsions. For this, PDA (16.76 g, 0.15 mol), PMDA (33.81 g, 0.15 mol, 1:1 mol/mol ratio relative to PDA) and triethylamine (TEA: 37.72 g, 51.99 mL, 2.4:1 mol/mol ratio to PDA or PMDA) were added in rapid succession in 485 g of water. The resulting solution was stirred for 24 hours at room temperature. The resulting aqueous triethylammonium salt solution of the polyamic acid had a viscosity at room temperature equal to 317 cP.

Acetic anhydride (23.74 g, 21.94 mL, 4.2 mol/mol ratio relative to PMDA or PDA in the polyamic acid) was added to a portion (200 g) of the aqueous triethylammonium salt solution of the polyamic acid, and the resulting sol was stirred magnetically for 60 seconds. At the end of that period, the sol was poured into an immiscible phase under shear using a Ross mixer at 3000 rpm. The immiscible phase was prepared by dissolving 4.5 g of surfactant (Hypermer® H70) in 400 mL of mineral spirits. The sol was added to the mineral spirits phase at a 1:2 v/v ratio. Gelation in a small portion of the sol put aside as a control took place at room temperature in 3 min from the addition of acetic anhydride. After stirring under high shear for 4-5 minutes, the mixture was removed from the Ross mixer and left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical CO$_2$ and are referred to as PI aerogel beads.

A second portion (200 g) of the aqueous triethylammonium salt solution of the polyamic acid was poured into an immiscible phase under shear using a Ross mixer at 3000 rpm. The immiscible phase was prepared by dissolving 8.6 g of surfactant (Hypermer® H70) in 800 mL of hexane. The aqueous solution was added to the hexane phase at a 1:4 v/v ratio. The mixture was stirred under high shear at 3000 rpm for 2 minutes, and a quasi-stable emulsion was established. At the end of that period, acetic acid was added to the emulsion at a 25% v/v ratio relative to hexane, and the mixture was stirred with the Ross mixer at 3000 rpm for 1 minutes. The mixture was then removed from the Ross mixer and was left to stand for 1-3 hours. The hexane layer was decanted. The gel beads were collected using filtration under reduced pressure, and they were solvent-exchanged with ethanol three times. The ethanol-exchanged (washed) gel beads were dried using supercritical CO$_2$ and are referred to as PAA aerogel beads.

Figure 53B:
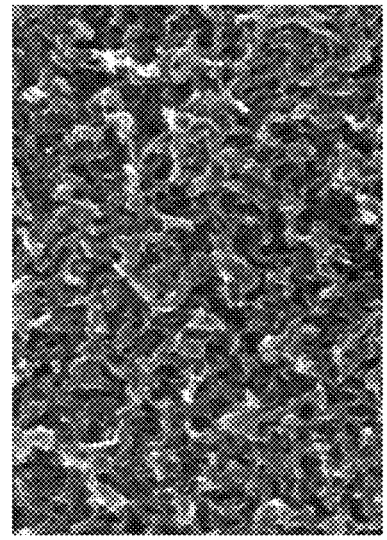
FIGS. 53A and 53B are scanning electron photomicrographs of a collection of carbon aerogel microbeads and their surfaces, respectively, obtained by pyrolysis of polyimide aerogel microbeads according to a non-limiting embodiment of the disclosure.
Figure 53D:
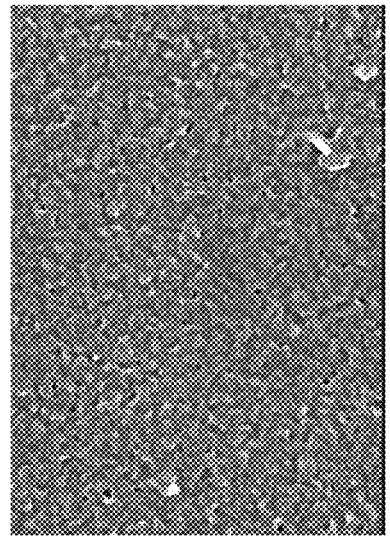
FIGS. 53C and 53D are scanning electron photomicrographs of a collection of carbon aerogel microbeads and their surfaces, respectively, obtained from pyrolysis of polyamic acid aerogel microbeads according to a non-limiting embodiment of the disclosure.
Figure 53A:
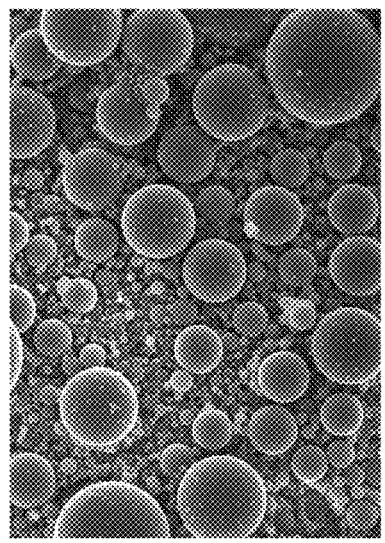
Figure 53C:
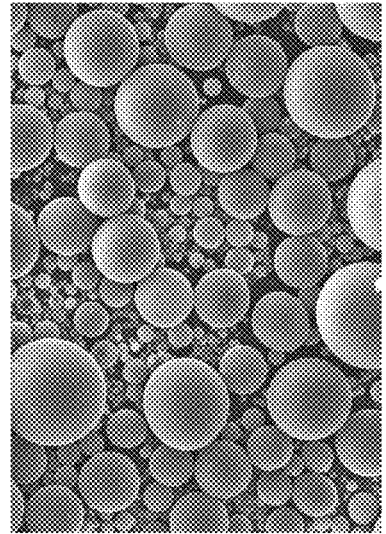

Carbonization of the PI and PAA aerogel beads was performed at 1050° C. for 2 hours under flowing nitrogen using a ramp rate of 3° per minute. Carbon aerogel beads from PI and PAA are referred to as C-PI and C-PAA, respectively. Data for all aerogel beads from this example are provided in Table 16. FIG. 53A shows a low-magnification SEM image of the C-PI aerogel beads. There is debris between the beads. FIG. 53B shows a high-magnification SEM image of the surface of a C-PI aerogel bead. FIG. 53C shows a low-magnification SEM image of the C-PAA aerogel beads. FIG. 53D shows a higher-magnification SEM image of the surface of a C-PAA aerogel bead. The surface of all beads of this example show some texture.

TABLE 16

Physical characteristics of beads from Example 29

| Property | bead sample | | | |
|---|---|---|---|---|
| | PI | C-PI | PAA | C-PAA |
| Approximate diameter (μm) | 20-60 | 13-30 | 4-20 | 2-10 |
| Carbonization yield (% w/w) | | 33.9 | | 31.5 |
| Tap density (g/cm$^3$) | 0.405 | 0.575 | 0.283 | 0.317 |
| Skeletal density (g/cm$^3$) | 1.3411 | 2.0682 | 1.3272 | 2.0624 |
| BET surface area (m$^2$/g) | 25 | 5 | 143 | 184 |
| Micropore surface area (m$^2$/g) | 2.7 | 0.0 | 7.2 | 58.34 |
| $V_{1.7-300}$ (cm$^3$/g) | 0.15 | <0.1 | 1.23 | 0.74 |
| Av. mesopore diameter (nm) | 21 | 16 | 32 | 16 |

Example 30. Emulsion-Based Preparation of Micron-Size Polyimide and Polyamic Acid Aerogel Beads from an Aqueous Triethylammonium Salt Solution of Pre-Formed and Isolated Polyamic Acid Micron-size polyimide and polyamic acid gel beads at target densities equal to 0.078 g/cm$^3$ and 0.093 g/cm$^3$, respectively, were prepared via gelation of an aqueous triethylammonium salt solution of the previously-prepared polyamic acid in emulsions. For this, solid polyamic acid (30 g, isolated previously after a polymerization reaction of PDA with PMDA in N,N-dimethylacetamide as the solvent) was suspended in 291 g of water. The polyamic acid was dissolved by adding triethylamine (TEA: 22.63 g, 31.19 mL, 2.4:1 mol/mol ratio of TEA to PMDA or PDA in the polyamic acid). After 24 hours of stirring at room temperature, the resulting aqueous triethylammonium salt solution of the polyamic acid was separated in two halves.

Acetic anhydride (20.41 g, 18.86 mL, 4.2 mol/mol ratio relative to PMDA or PDA in the polyamic acid) was added to the first half of the aqueous triethylammonium salt solution of the polyamic acid, and the resulting sol was stirred magnetically for 60 seconds. At the end of that period, the sol was poured into an immiscible phase under high shear using a Ross mixer at 3000 rpm. The immiscible phase was prepared by dissolving 4.5 g of surfactant (Hypermer® H70) in 400 mL of mineral spirits. The sol was added to the mineral spirits phase at a 1:2 v/v ratio. Gelation in a small portion of the sol put aside as a control took place at room temperature in 3-4 min from the addition of acetic anhydride. After stirring under high shear for 4-5 minutes, the mixture was removed from the Ross mixer and was left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical CO$_2$ and are referred to as PI aerogel beads.

The second half of the aqueous triethylammonium salt solution of the polyamic acid was poured into an immiscible phase under high shear using a Ross mixer at 3000 rpm. The immiscible phase was prepared by dissolving 6.5 g of surfactant (Hypermer® H70) in 650 mL of hexane. The aqueous solution was added to the hexane phase at a 1:4 v/v ratio. The mixture was stirred under high shear at 3000 rpm for 2 minutes, and a quasi-stable emulsion was established. At the end of that period, acetic acid was added to the emulsion at a 25% v/v ratio relative to hexane, and the mixture was stirred with the Ross mixer at 3000 rpm for 1 minute. The mixture was then removed from the Ross mixer and was left to stand for 1-3 hours. The hexane layer was decanted. The gel beads were collected using filtration under reduced pressure, and they were solvent-exchanged with ethanol three times. The ethanol-exchanged (washed) gel beads were dried using supercritical $CO_2$ and are referred to as PAA aerogel beads.

Figure 54B:
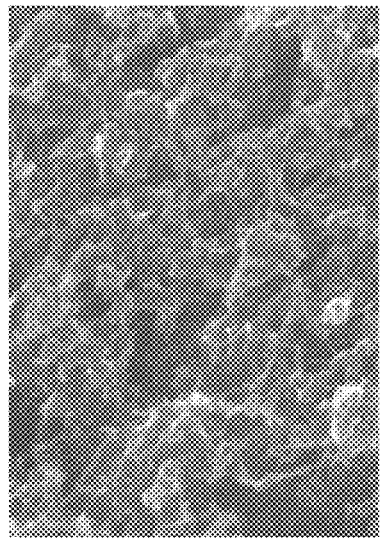
FIGS. 54A and 54B are scanning electron photomicrographs of a collection of carbon aerogel microbeads and their surfaces, respectively, obtained from pyrolysis of polyimide aerogel microbeads according to a non-limiting embodiment of the disclosure.
Figure 54D:
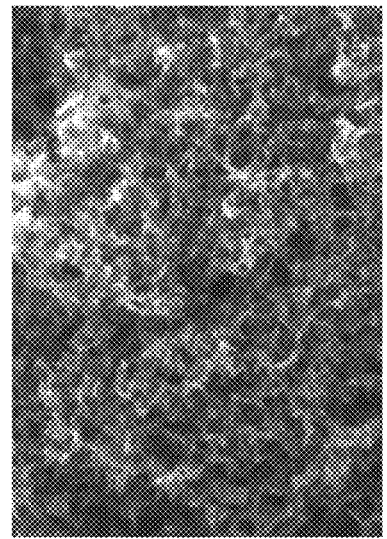
FIGS. 54C and 54D are scanning electron photomicrographs of a collection of carbon aerogel microbeads, and their surfaces, respectively, obtained from pyrolysis of polyamic acid aerogel microbeads according to a non-limiting embodiment of the disclosure.
Figure 54A:
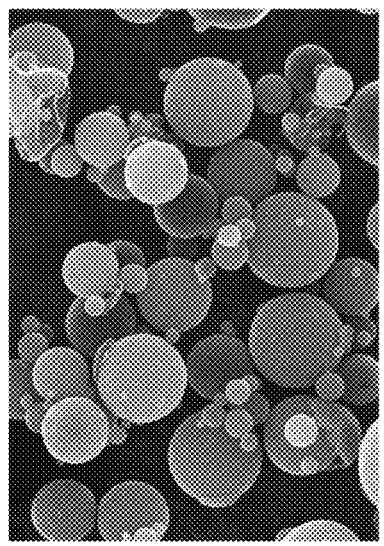
Figure 54C:
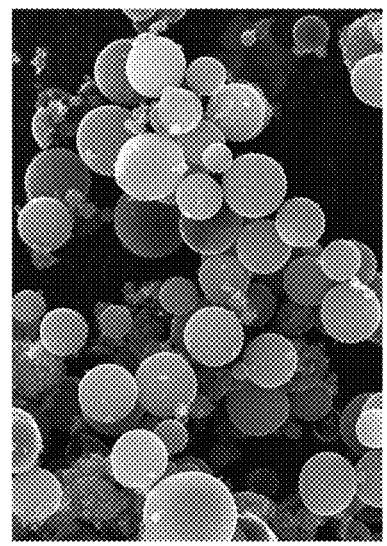

Carbonization of the PI and PAA aerogel beads was performed at 1050° C. for 2 hours under flowing nitrogen using a ramp rate of 3° per minute. Carbon aerogel beads from PI and PAA are referred to as C-PI and C-PAA, respectively. Data for all aerogel beads from this example are provided in Table 17. FIG. 54A shows a low-magnification SEM image of the C-PI aerogel beads. FIG. 54B shows a high-magnification SEM image of the surface of a C-PI aerogel bead. FIG. 54C shows a low-magnification SEM image of the C-PAA aerogel beads. FIG. 54D shows a higher-magnification SEM image of the surface of a C-PAA aerogel bead.

TABLE 17

Physical characteristics of beads from Example 30

| Property | PI | C-PI | PAA | C-PAA |
|---|---|---|---|---|
| Approximate diameter (μm) | 20-60 | 10-30 | 4-20 | 2-10 |
| Carbonization yield (% w/w) | | 37.2 | | 38.9 |
| Tap density (g/cm$^3$) | 0.124 | 0.176 | 0.097 | 0.106 |
| Skeletal density (g/cm$^3$) | 1.3698 | 2.0914 | 1.3664 | 2.1284 |
| BET surface area (m$^2$/g) | 309 | 642 | 330 | 750 |
| Micropore surface area (m$^2$/g) | 1.0 | 369 | 13 | 379 |
| $V_{1.7-300}$ (cm$^3$/g) | 1.27 | 1.21 | 3.22 | 2.90 |
| Av. mesopore diameter (nm) | 16 | 8.1 | 36 | 16 |

Example 31. Emulsion-Based Preparation of Micron-size Polyimide Aerogel Beads from an Aqueous Triethylammonium Salt Solution of Pre-Formed and Isolated Polyamic Acid from Reaction of 4,4'-Oxydianiline (ODA) and PMDA Micron-size polyimide gel beads were prepared at a target density equal to 0.054 g/cm$^3$ via gelation in an emulsion of an aqueous triethylammonium salt solution of the previously prepared polyamic acid. For this, solid polyamic acid (10 g, isolated previously after a polymerization reaction of 4,4'-oxydianiline (ODA) with PMDA in N,N-dimethylacetamide as the solvent) was suspended in 150 g of water. The polyamic acid was dissolved by adding triethylamine (TEA, 5.81 g, 8.01 mL, 2.4:1 mol/mol ratio of TEA to PMDA or ODA in the polyamic acid). After 24 hours of stirring at room temperature, the resulting aqueous triethylammonium salt solution of the polyamic acid was processed as follows.

Acetic anhydride (11.64 g, 10.77 mL, 4.3 mol/mol ratio relative to PMDA or ODA in the polyamic acid) was added to the aqueous triethylammonium salt solution of the polyamic acid, and the resulting sol was stirred magnetically for 30 seconds, at which point it became viscous. At the end of that period, the sol was poured into an immiscible phase under high shear using a Ross mixer at 4000 rpm. The immiscible phase was prepared by dissolving 8 g of surfactant (Hypermer® H70) in 600 mL of mineral spirits. The sol was added to the mineral spirits phase at a ~1:3 v/v ratio. Gelation in a small portion of the sol put aside as a control took place at room temperature in 1 min from the addition of acetic anhydride. After stirring under high shear for 2 minutes, the mixture was removed from the Ross mixer and was left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical $CO_2$ and are referred to as PI aerogel beads.

Figure 55A:
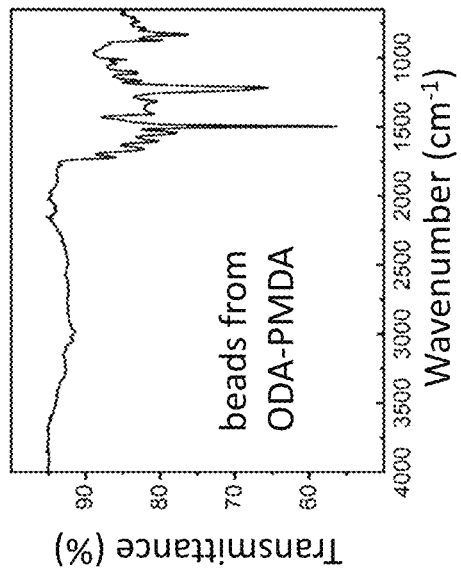
FIG. 55A is an FTIR spectrum of a polyamic acid obtained by reaction of ODA and PMDA in N,N-dimethylacetamide.
Figure 55B:
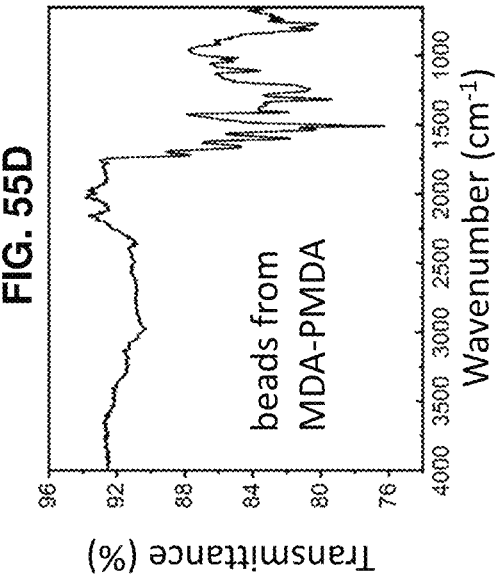
FIG. 55B is an FTIR spectrum of polyimide aerogel beads according to a non-limiting embodiment of the disclosure.

Carbonization of the PI aerogel beads was performed at 1050° C. for 2 hours under flowing nitrogen using a ramp rate of 30 per minute. Carbon aerogel beads are referred to as C-PI. Data for all aerogel beads from this example are provided in Table 18. FIG. 55A shows the IR spectrum of the polyamic acid obtained by reacting ODA and PMDA in N,N-dimethylacetamide. FIG. 55B shows the IR spectrum of the emulsion-derived PI aerogels. FIG. 56A shows a low-magnification SEM image of the C-PI aerogel beads. FIG. 56B shows a higher-magnification SEM image of the surface of a C-PAA aerogel bead.

TABLE 18

Physical characteristics of beads from ODA-PMDA according to Example 31

| Property | PI | C-PI |
|---|---|---|
| Approximate diameter (μm) | 10-80 | 5-40 |
| Carbonization yield (% w/w) | | 38.07 |
| Tap density (g/cm$^3$) | 0.228 | 0.588 |
| Skeletal density (g/cm$^3$) | 1.2805 | 1.8947 |
| BET surface area (m$^2$/g) | 65 | 13.6 |
| Micropore surface area (m$^2$/g) | 0.00 | 2.9 |
| $V_{1.7-300}$ (cm$^3$/g) | 0.74 | 0.17 |
| Av. mesopore diameter (nm) | 46 | 33.2 |

Example 32. Emulsion-Based Preparation of Micron-Size Polyimide Aerogel Beads from an Aqueous Triethylammonium Salt Solution of Pre-Formed and Isolated Polyamic Acid from Reaction of 4,4'-Methylenedianiline (MDA) and PMDA Micron-size polyimide gel beads were prepared at a target density of 0.054 g/cm$^3$ via gelation in an emulsion of an aqueous triethylammonium salt solution of the previously prepared polyamic acid. For this, solid polyamic acid (10 g, isolated previously after a polymerization reaction of 4,4'-methylenedianiline (MDA) with PMDA in N,N-dimethylacetamide as the solvent) was suspended in 150 g of water. The polyamic acid was dissolved by adding triethylamine (TEA: 5.84 g, 8.05 mL, 2.4:1 mol/mol ratio of TEA to PMDA or MDA in the polyamic acid). After 24 hours of stirring at room temperature, the resulting aqueous triethylammonium salt solution of the polyamic acid was processed as follows.

Acetic anhydride (11.7 g, 10.81, 4.3 mol/mol ratio relative to PMDA or MDA in the polyamic acid), was added to the aqueous triethylammonium salt solution of the polyamic acid, and the resulting sol was stirred magnetically for 50 seconds. At the end of that period, the sol was poured into an immiscible phase under high shear using a Ross mixer at 4000 rpm. The immiscible phase was prepared by dissolving 8 g of surfactant (Hypermer® H70) in 600 mL of mineral spirits. The sol was added to the mineral spirits phase at a ~1:3 v/v ratio. Gelation in a small portion of the sol put aside as a control took place at room temperature in 1.5 min from the addition of acetic anhydride. After stirring under high shear for 3 minutes, the mixture was removed from the Ross mixer and was left to stand for 1-3 hours. The mineral spirits layer was decanted. The gel beads were collected using filtration under reduced pressure, and they were solvent-exchanged with ethanol three times. The ethanol-exchanged (washed) gel beads were dried using supercritical $CO_2$ and are referred to as PI aerogel beads.

Figure 55C:
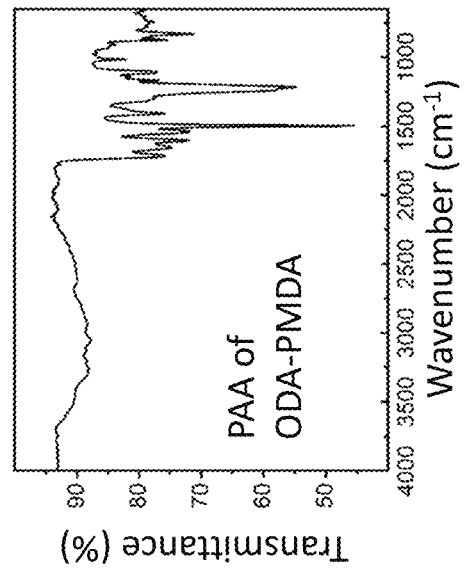
FIG. 55C is an FTIR spectrum of a polyamic acid obtained by reaction of MDA and PMDA in N,N-dimethylacetamide.
Figure 55D:
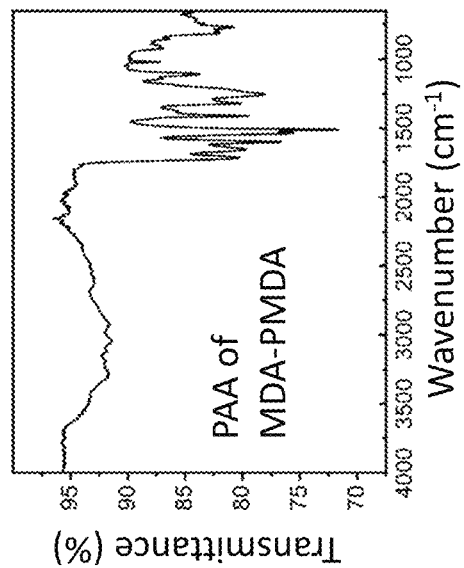
FIG. 55D is an FTIR spectrum of polyimide aerogel beads according to a non-limiting embodiment of the disclosure.

Carbonization of the PI aerogel beads was performed at 1050° C. for 2 hours under flowing nitrogen using a ramp rate of 3° per minute. Carbon aerogel beads are referred to as C-PI. Data for all aerogel beads from this example are provided in Table 19. FIG. 55C shows the IR spectrum of the polyamic acid obtained by reacting MDA and PMDA in N,N-dimethylacetamide. FIG. 55D shows the IR spectrum of the emulsion-derived PI aerogels. FIG. 56C shows a low-magnification SEM image of the C-PI aerogel beads. FIG. 56D shows a higher-magnification SEM image of the surface of a C-PAA aerogel bead. The surfaces of the ODA-PMDA and MDA-PMDA beads were rather dense.

TABLE 19

Physical characteristics of beads from MDA-PMDA of Example 32

| Property | bead sample PI | C-PI |
|---|---|---|
| Approximate diameter (μm) | 5-10 | <5 |
| Carbonization yield (% w/w) | | 40.00 |
| Tap density (g/cm³) | 0.228 | 0.588 |
| Skeletal density (g/cm³) | 1.2805 | 1.8947 |
| BET (m²/g) | 1.17 | 6.09 |
| Micropore surface area (m²/g) | 0.00 | 0.00 |
| $V_{1.7-300}$ (cm³/g) | 0.021 | <0.1 |
| Av. mesopore diameter (nm) | 62 | 15.5 |

Example 33. Preparation of Metal Polyamate Salt Aerogel Beads from an Aqueous Salt Solution of Pre-Formed and Isolated Polyamic Acid of PDA and PMDA and Conversion to Metal- or Metal Oxide-Doped Carbon Aerogels Millimeter-sized metal polyamate salt gel beads were prepared by adding soluble aqueous salt solutions of a previously prepared polyamic acid into solutions comprising suitable metal ions. Generally, the solid polyamic acid (isolated previously after a polymerization reaction of PDA with PMDA in N,N-dimethylacetamide as the solvent) was dissolved in water with the aid of a base. Examples of suitable bases include, but are not limited to, sodium hydroxide, ammonium hydroxide, tetrabutylammonium hydroxide, triethylamine, and diisopropylethylamine. For example, in one embodiment, the polyamic acid (20 g) was suspended in 150 mL of water and was dissolved by adding solid sodium hydroxide (NaOH; 4.9 g, 2:1 mol/mol ratio to either PMDA or PDA in the polyamic acid). The resulting solution was separated into five equal portions. Each portion was added dropwise using a disposable pipet into five separate aqueous solutions of metal salts, each made with a 4:1 molar ratio of metal salt relative to the monomer repeat unit in the corresponding sodium polyamate solution. The volume of each metal salt solution was 80 mL. Metals studied were iron (Fe), nickel (Ni), silver (Ag), magnesium (Mg), and lanthanum (La), in the form of the salts $FeCl_3$, Ni(II) acetate tetrahydrate, $AgNO_3$, $MgCl_2$, and La(III) acetate hydrate. Other salts included later qualitatively included dysprosium and yttrium (as $DyCl_3$ and $YCl_3$).

When the droplets of the aqueous sodium polyamate solution entered each metal salt receiving solution, the corresponding metal polyamate beads were formed. After the addition was complete, the beads were aged for 24 hours in their receiving baths. Subsequently, the beads were washed with water (4 times, 4 hours each time), ethanol (4 times, 4 hours each time), and dried with SCF $CO_2$. Portions of each batch of beads were pyrolyzed for 2 hours at 850° C. under flowing nitrogen gas. Table 20 summarizes properties of the metal polyamate aerogels and their carbonized counterparts. Each type of metal polyamate beads is abbreviated by the chemical symbol for the corresponding metal, the corresponding carbonized materials are abbreviated by the chemical symbol of the metal preceded by "C—". For SEM purposes, metal polyamate salts are abbreviated as "M PAate", where M is the chemical symbol of the corresponding metal.

Figure 57B:
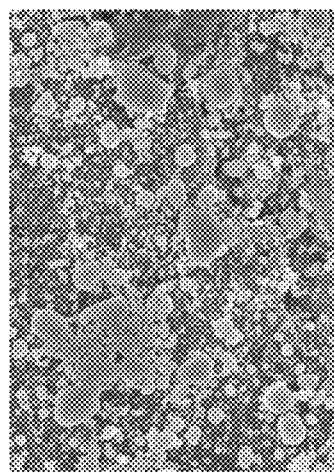
FIG. 57B is a scanning electron photomicrograph of the surface of millimeter-sized carbon aerogel beads obtained by pyrolysis of silver polyamate aerogel beads according to a non-limiting embodiment of the disclosure
Figure 57D:
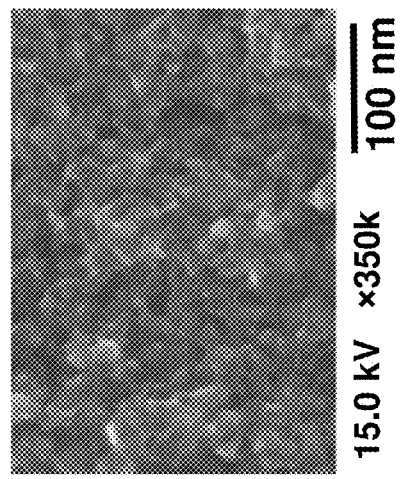
FIG. 57C and FIG. 57D are scanning electron photomicrographs at two different magnifications of the interior of millimeter-sized carbon aerogel beads obtained by pyrolysis of silver polyamate aerogel beads according to a non-limiting embodiment of the disclosure
Figure 57A:
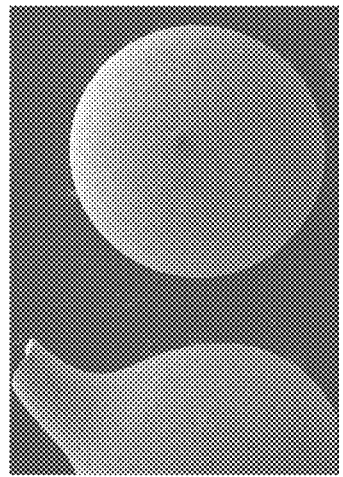
FIG. 57A is a scanning electron photomicrograph of millimeter-sized carbon aerogel beads obtained by pyrolysis of silver polyamate aerogel beads according to a non-limiting embodiment of the disclosure.
Figure 57C:
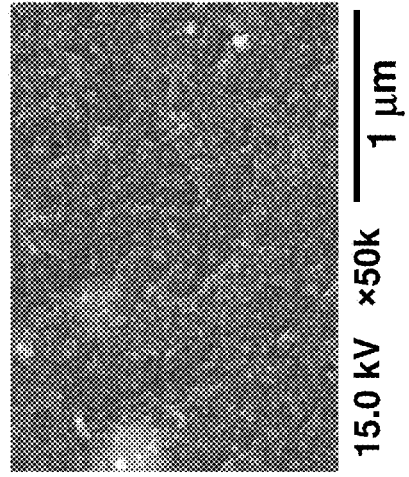

FIG. 57A shows the SEM image of carbonized Ag polyamate beads. FIG. 57B shows the surface of a carbonized Ag polyamate bead at a higher magnification. FIGS. 57C and 57D show the interior of a Ag polyamate bead at two different magnifications.

Figure 58B:
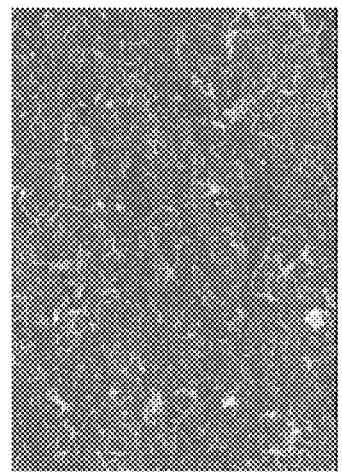
FIG. 58B is a scanning electron photomicrograph of the surface of millimeter-sized carbon aerogel beads obtained by pyrolysis of lanthanum polyamate aerogel beads according to a non-limiting embodiment of the disclosure
Figure 58D:
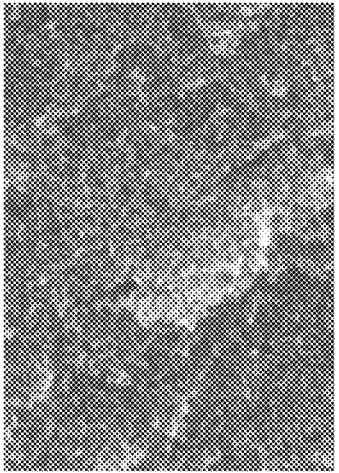
FIG. 58C and FIG. 58D are scanning electron photomicrographs at two different magnifications of the interior of millimeter-sized carbon aerogel beads obtained by pyrolysis of lanthanum polyamate aerogel beads according to a non-limiting embodiment of the disclosure
Figure 58A:
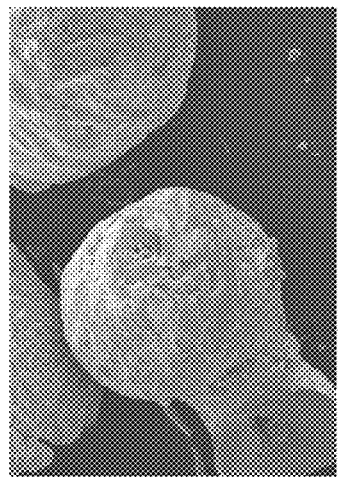
FIG. 58A is a scanning electron photomicrograph of millimeter-sized carbon aerogel beads obtained by pyrolysis of lanthanum polyamate aerogel beads according to a non-limiting embodiment of the disclosure.
Figure 58C:
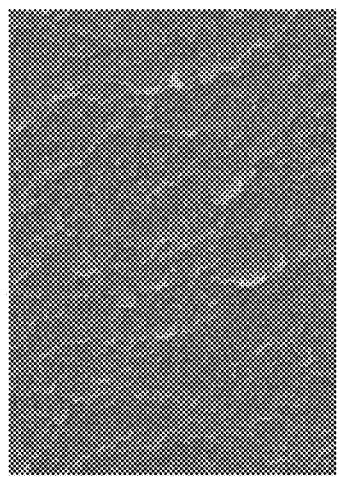

FIG. 58A shows the SEM image of carbonized La polyamate beads. FIG. 58B shows the surface of a carbonized La polyamate bead at a higher magnification. FIGS. 58C and 58D show the interior of a La polyamate bead at two different magnifications.

Figure 59B:
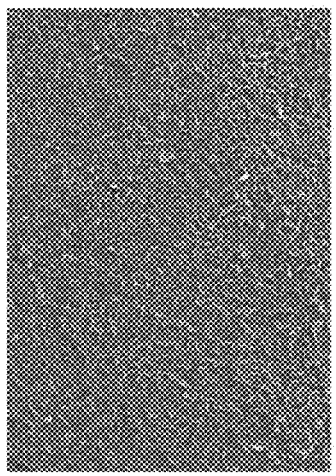
FIG. 59B is a scanning electron photomicrograph of the surface of millimeter-sized carbon aerogel beads obtained by pyrolysis of magnesium polyamate aerogel beads according to a non-limiting embodiment of the disclosure
Figure 59D:
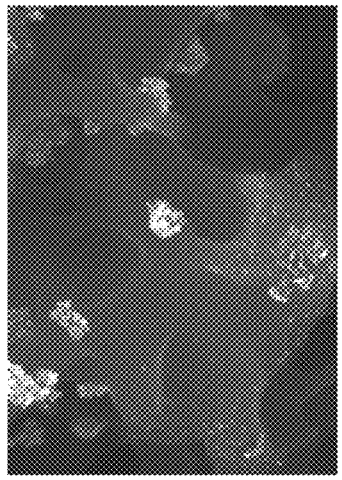
FIG. 59C and FIG. 59D are scanning electron photomicrographs at two different magnifications of the interior of millimeter-sized carbon aerogel beads obtained by pyrolysis of magnesium polyamate aerogel beads according to a non-limiting embodiment of the disclosure
Figure 59A:
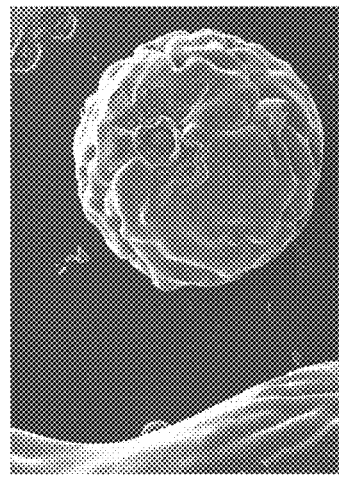
FIG. 59A is a scanning electron photomicrograph of millimeter-sized carbon aerogel beads obtained by pyrolysis of magnesium polyamate aerogel beads according to a non-limiting embodiment of the disclosure.
Figure 59C:
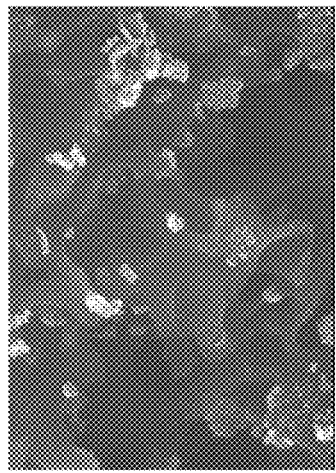

FIG. 59A shows the SEM image of carbonized Mg polyamate beads. FIG. 59B shows the surface of a carbonized Mg polyamate bead at a higher magnification. FIGS. 59C and 59D show the interior of a Mg polyamate bead at two different magnifications. The data in Table 20 and SEM images of FIGS. 57-57 show that the chemical identity of the metal ion affects the morphology and the material properties of both the aerogels and the carbon aerogels.

TABLE 20

Properties of metal polyamate aerogel beads and of the corresponding metal-or metal oxide-doped carbon aerogel beads.

| Property | bead sample | | | | | | | | | |
|---|---|---|---|---|---|---|---|---|---|---|
| | Fe | C—Fe | Ni | C—Ni | Ag | C—Ag | Mg | C—Mg | La | C—La |
| Residual mass at 1000° C. in air (%) | N/A | 85 | 20 | 60 | 18 | 88 | 14 | 35 | 29 | 58 |

TABLE 20-continued

Properties of metal polyamate aerogel beads and of the corresponding metal-or metal oxide-doped carbon aerogel beads.

| Property | bead sample | | | | | | | | | |
|---|---|---|---|---|---|---|---|---|---|---|
| | Fe | C—Fe | Ni | C—Ni | Ag | C—Ag | Mg | C—Mg | La | C—La |
| Carbonization yield (% w/w) | N/A | 62.5 | | 30.4 | | 60.2 | | 34.3 | | 41.0 |
| Skeletal density (g/cm$^3$) | N/A | N/A | 1.62 | N/A | 2.29 | 3.29 | 1.49 | 2.24 | 2.32 | N/A |
| BET surface area (m$^2$/g) | N/A | 2.0 | 421 | 68 | 419 | 1.40 | 88 | 77 | 591 | 222 |
| Micropore surface area (m$^2$/g) | N/A | 0.0 | 90 | 0.0 | 0.0 | 0.0 | 61 | 0.0 | 0.0 | 0.0 |
| Residual mass at 1000° C. in air (%) | N/A | 85 | 20 | 60 | 18 | 88 | 14 | 35 | 29 | 58 |
| V$_{1-7-300}$ (cm$^3$/g) | N/A | <0.1 | 1.75 | 0.11 | 0.84 | <0.1 | 0.19 | 0.28 | 1.87 | 0.48 |
| Av. mesopore diameter (nm) | N/A | >30 | 16.3 | 6.0 | 7.6 | >30 | 8.4 | 14.5 | 11.7 | 8.1 |

N/A: Not Available

RESULTS SUMMARY

Overall, the interior structure of the polyamic acid beads of the disclosure consisted of entangled nanofoils, while the structure of the interior of monoliths and beads that were prepared in water and chemically imidized with acetic anhydride depended on the target density. At lower target densities, the interior consisted of interconnected, short nanofibers similar to those observed with synthesis in organic solvents. At higher target densities, the morphology could be considered a hybrid of the two extremes. For example, at lower resolution electron microscopy, the structure might appear fibrous, while at higher resolution it might look like entangled nanofoils. Chemically, lower target-density aerogels made by imidization with acetic anhydride in water consisted of more imide than amide, while as the target density increased, the ratio of the two functional groups moved in favor of the amide. Solid-state $^{15}$N NMR is a tool that can quantify the imide-to-amide ratio in the aerogels, and can also differentiate between terminal, unreacted amines and residual ammonium ions present due to unreacted polyamate on the aerogel polymeric backbone. Without wishing to be bound by theory, it is believed that the chemical composition of the aerogel, and its morphology, are both related to the solubility of acetic anhydride in water. Further, the skin of polyamic acid beads formed in acetic acid alone was closer in appearance to the interior, while the skin of beads formed in acetic acid further containing acetic anhydride was dense and featureless. Finally, gelation of polyamate salts with metal ions in aqueous solution yields beads with internal morphologies that vary depending on the metal.

What is claimed is:

1. A method of forming a polyimide aerogel, the method comprising:
   providing an aqueous solution of a polyamic acid salt, the polyamic acid salt comprising a polyamic acid including carboxylic acid groups, wherein the carboxylic acid groups are associated with an alkali metal cation and greater than 95% of the carboxylic acid groups are present as carboxylate anions, wherein providing the aqueous solution of the polyamic acid salt comprises:
   providing a polyamic acid;
   adding the polyamic acid to water to form an aqueous suspension of the polyamic acid; and
   adding an alkali metal hydroxide to the aqueous suspension of the polyamic acid to form the aqueous solution of the polyamic acid salt;
   imidizing the polyamic acid salt to form a polyimide gel; and
   drying the polyimide gel to form the polyimide aerogel.

2. The method of claim 1, wherein the alkali metal hydroxide is lithium hydroxide, sodium hydroxide, or potassium hydroxide.

3. The method of claim 1, wherein the polyimide gel is in bead form, and wherein imidizing the polyamic acid salt comprises adding a dehydrating agent to the aqueous solution of the polyamic acid salt to form a gelation mixture; the method further comprising adding the gelation mixture to a solution of a water-soluble acid in water to form the polyimide gel beads, wherein adding comprises dripping the gelation mixture into the solution of the water soluble acid in water, spraying the gelation mixture under pressure through one or more nozzles into the solution of the water-soluble acid in water using pressure; or electrospraying the gelation mixture into the solution of the water soluble acid in water.

4. The method of claim 3, wherein the dehydrating agent is acetic anhydride.

5. The method of claim 4, wherein the water-soluble acid is a mineral acid or is acetic acid.

6. The method of claim 1, wherein the polyimide gel is in bead form, and wherein imidizing the polyamic acid salt comprises adding a dehydrating agent to the aqueous solution of the polyamic acid salt to form a gelation mixture, the method further comprising combining the gelation mixture with a water-immiscible solvent comprising a surfactant; and mixing the resulting mixture.

7. The method of claim 1, wherein the polyimide gel is in bead form, and wherein imidizing the polyamic acid salt comprises chemical imidization, the method comprising:
   combining the aqueous solution of the polyamic acid salt with a water-immiscible solvent comprising a surfactant;

mixing the resulting mixture to form an emulsion; and
adding a dehydrating agent to the emulsion.

8. The method of claim 1, further comprising adding an electroactive material to the aqueous solution of the polyamic acid salt.

9. The method of claim 1, wherein drying the polyimide gel comprises:
optionally, washing or solvent exchanging the polyimide gel; and
subjecting the polyimide gel to elevated temperature conditions, lyophilizing the polyimide gel, or contacting the polyimide gel with supercritical fluid carbon dioxide.

10. The method of 9, further comprising converting the polyimide aerogel to an isomorphic carbon aerogel, the converting comprising pyrolyzing the polyimide aerogel under inert atmosphere at a temperature of at least about 650° C.

11. A method of forming a polyimide aerogel in bead form, the method comprising:
providing an aqueous solution of a polyamic acid salt, the polyamic acid salt comprising a polyamic acid including carboxylic acid groups, wherein the carboxylic acid groups are associated with a cationic species and greater than 95% of the carboxylic acid groups are present as carboxylate anions;
imidizing the polyamic acid salt to form a polyimide gel, wherein the imidizing comprises adding a dehydrating agent to the aqueous solution of the polyamic acid salt to form a gelation mixture;
adding the gelation mixture to a water-immiscible solvent, wherein adding comprises dripping the gelation mixture into the water-immiscible solvent, spraying the gelation mixture under pressure through one or more nozzles into the water-immiscible solvent using pressure, or electrospraying the gelation mixture into the water-immiscible solvent; and
drying the polyimide gel to form the polyimide aerogel.

12. The method of claim 11, wherein the dehydrating agent is acetic anhydride.

13. The method of claim 11, further comprising an acid.

14. The method of claim 13, wherein the acid is acetic acid.

* * * * *

UNITED STATES PATENT AND TRADEMARK OFFICE
CERTIFICATE OF CORRECTION

| | | |
|---|---|---|
| PATENT NO. | : 12,077,639 B2 | Page 1 of 1 |
| APPLICATION NO. | : 17/546761 | |
| DATED | : September 3, 2024 | |
| INVENTOR(S) | : Leventis et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 211 days.

Signed and Sealed this
Twenty-second Day of April, 2025

Coke Morgan Stewart
*Acting Director of the United States Patent and Trademark Office*